United States Patent
Sasaki et al.

(10) Patent No.: US 8,059,939 B2
(45) Date of Patent: Nov. 15, 2011

(54) RECORDING MEDIUM, PLAYBACK DEVICE, AND INTEGRATED CIRCUIT

(75) Inventors: Taiji Sasaki, Osaka (JP); Hiroshi Yahata, Osaka (JP); Tomoki Ogawa, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/560,845

(22) Filed: Sep. 16, 2009

(65) Prior Publication Data
US 2010/0067873 A1    Mar. 18, 2010

Related U.S. Application Data

(60) Provisional application No. 61/097,694, filed on Sep. 17, 2008.

(51) Int. Cl.
 H04N 5/93    (2006.01)
 H04N 13/04   (2006.01)
 G11B 7/00    (2006.01)
 G11B 7/20    (2006.01)

(52) U.S. Cl. .......... 386/284; 386/280; 386/282; 348/51; 369/44.27; 369/94

(58) Field of Classification Search .......... 386/125, 386/111, 126, E9.014, E9.04; 348/51, E13.014, 348/E13.044, E13.058, E13.059, E13.071, 348/E13.072, E13.073; 369/44.27, 94
See application file for complete search history.

(56) References Cited

U.S. PATENT DOCUMENTS

| | | | |
|---|---|---|---|
| 6,573,819 B1 * | 6/2003 | Oshima et al. | 386/111 |
| 6,925,250 B1 | 8/2005 | Oshima et al. | |
| 2007/0171781 A1 * | 7/2007 | Imai et al. | 369/44.27 |

FOREIGN PATENT DOCUMENTS

| | | |
|---|---|---|
| EP | 0 888 018 | 12/1998 |
| JP | 11-191895 | 7/1999 |
| JP | 2000-270347 | 9/2000 |
| JP | 3935507 | 3/2007 |
| JP | 2007-166651 | 6/2007 |

* cited by examiner

*Primary Examiner* — Thai Tran
*Assistant Examiner* — Syed Y Hasan
(74) *Attorney, Agent, or Firm* — Wenderoth Lind & Ponack, L.L.P.

(57) ABSTRACT

On a recording medium, stereoscopic and monoscopic specific areas are located one after another next to a stereoscopic/monoscopic shared area. The stereoscopic/monoscopic shared area is a contiguous area to be accessed both in stereoscopic video playback and monoscopic video playback. The stereoscopic specific area is a contiguous area to be accessed immediately before a long jump occurring in stereoscopic video playback. In both the stereoscopic/monoscopic shared area and the stereoscopic specific area, extents of base-view and dependent-view stream files are arranged in an interleaved manner. The extents on the stereoscopic specific area are next in order after the extents on the stereoscopic/monoscopic shared area. The monoscopic specific area is a contiguous area to be accessed immediately before a long jump occurring in monoscopic video playback. The monoscopic specific area has a copy of the entirety of the extents of the base-view stream file recorded on the stereoscopic specific area.

6 Claims, 59 Drawing Sheets

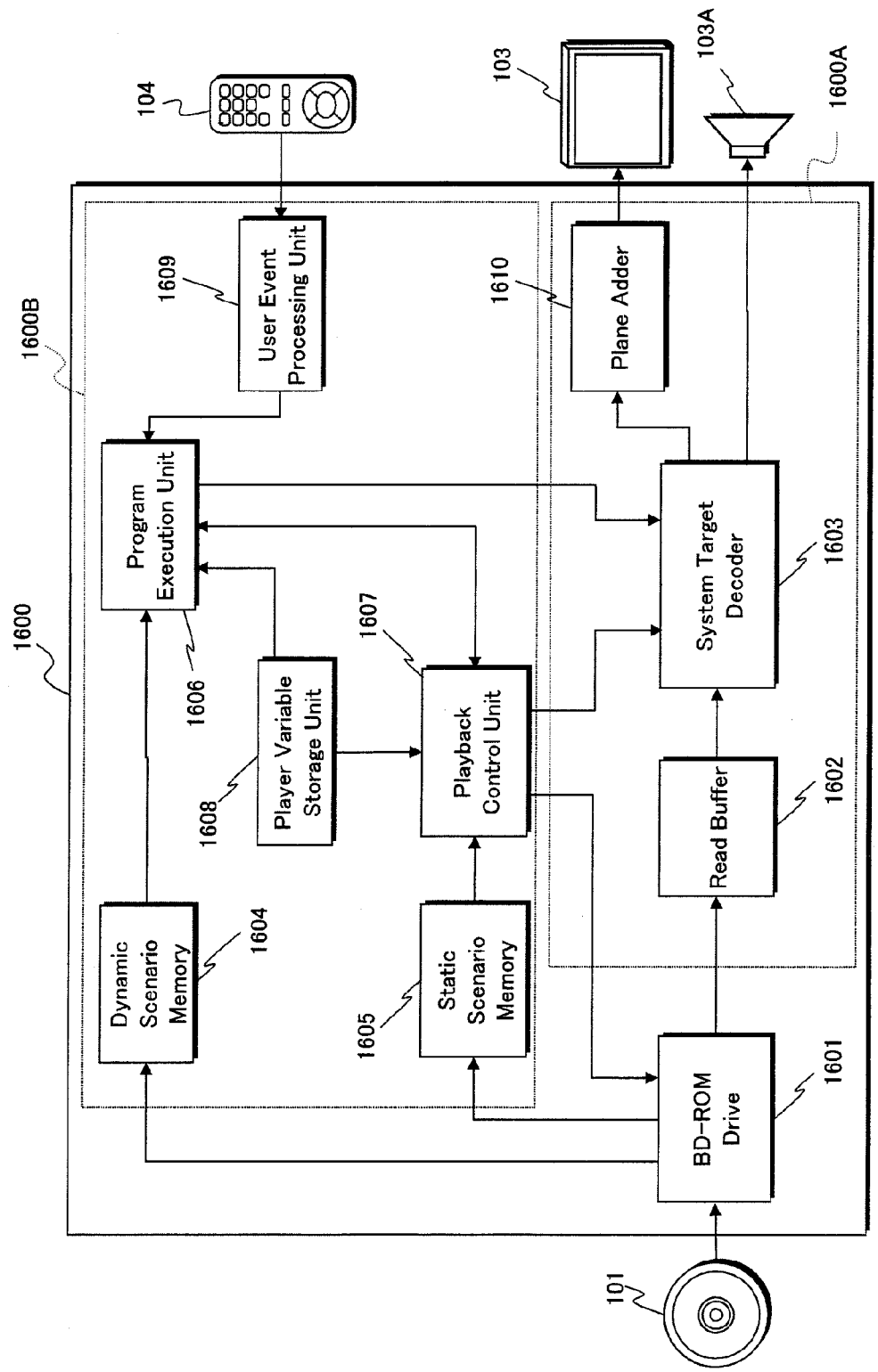

FIG.17

| 1701 | 1702 | 1701 | 1702 | 1701 | 1702 |
|---|---|---|---|---|---|
| 0 | Language Code | 11 | Player audio mixing mode for Karaoke | 22 | Secondary Audio Stream number |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | Secondary Video Stream number | 32 | reserved |

| S JUMP (Sector) | 0 to 10000 | 10001 to 20000 | 20001 to 40000 | 40000 to 1/10 Stroke | 1/10 Stroke or more |
|---|---|---|---|---|---|
| T JUMP (ms) | 250 | 300 | 350 | 700 | 1400 |

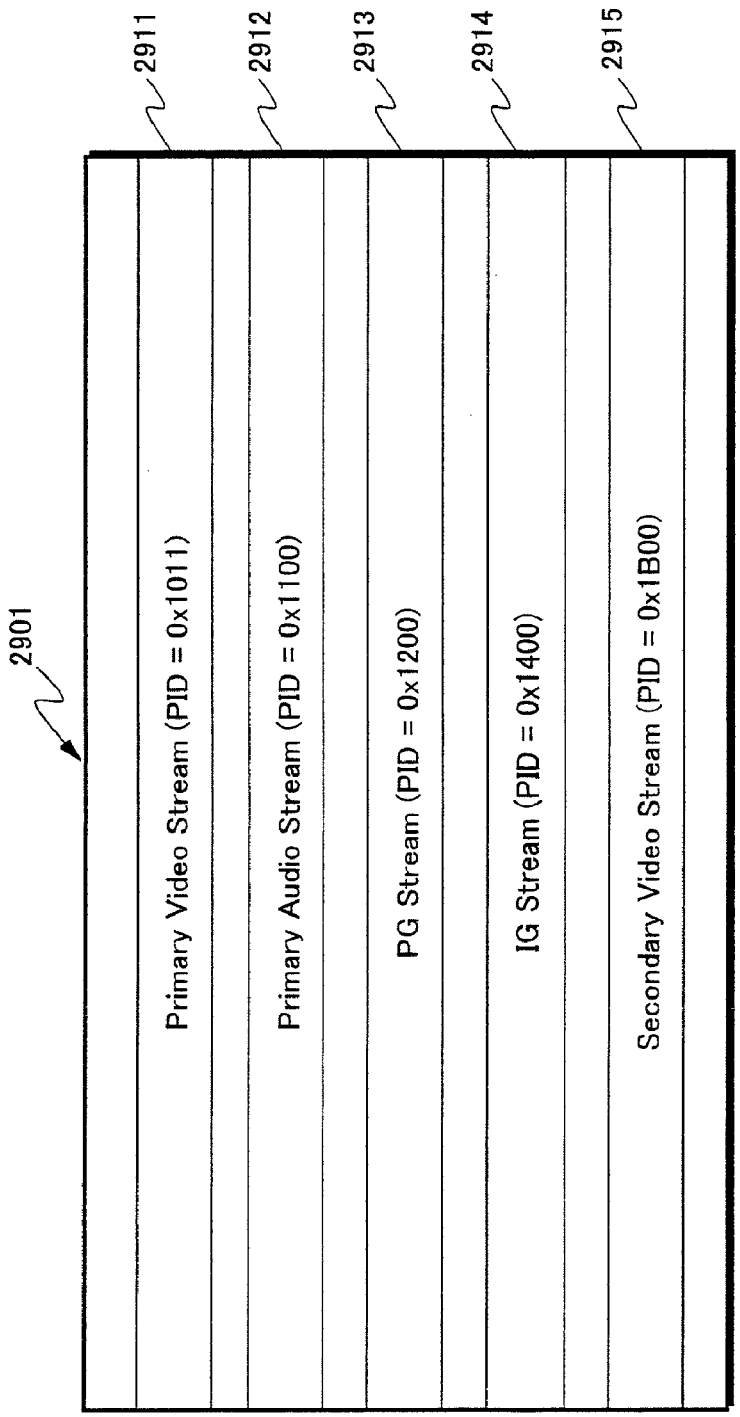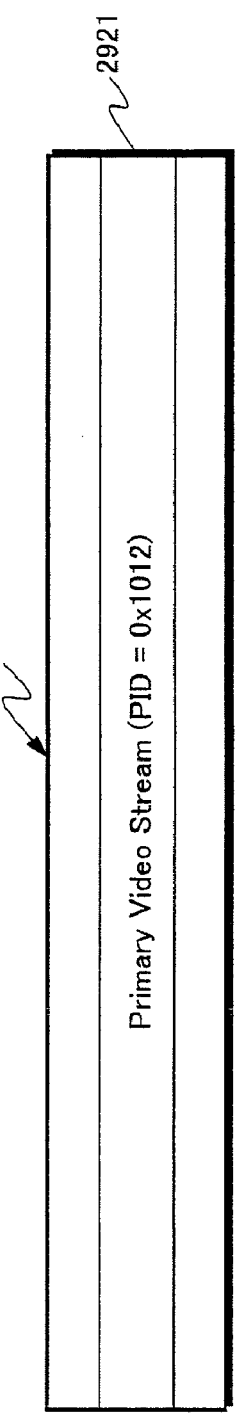
FIG.29A
FIG.29B

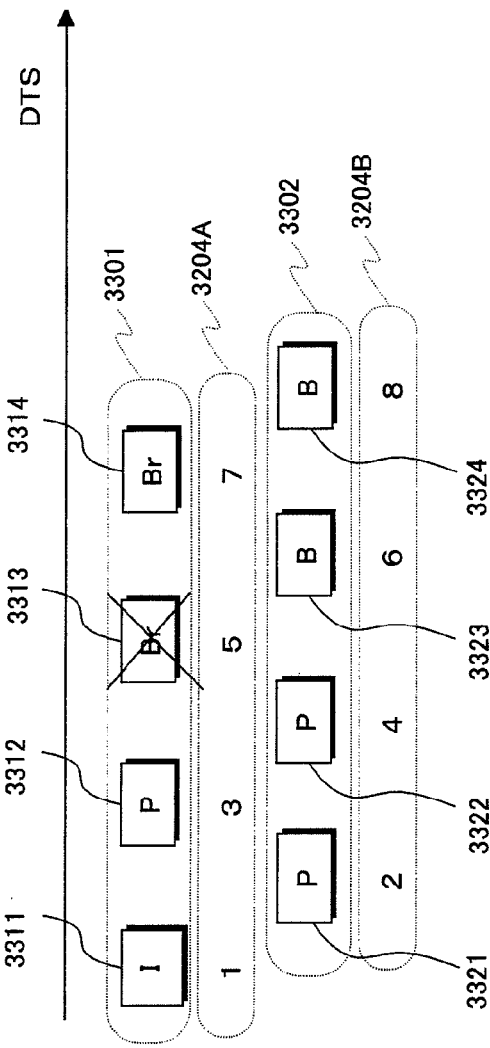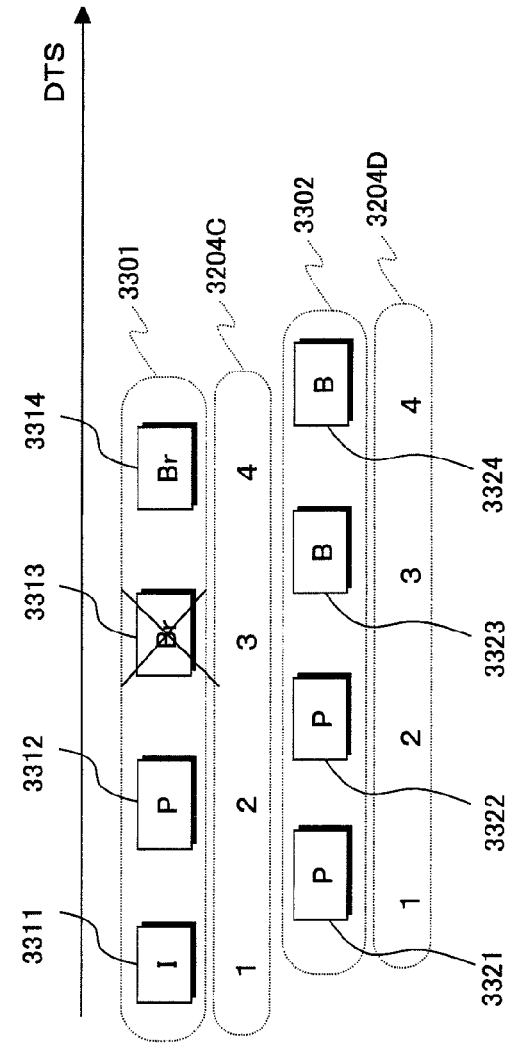

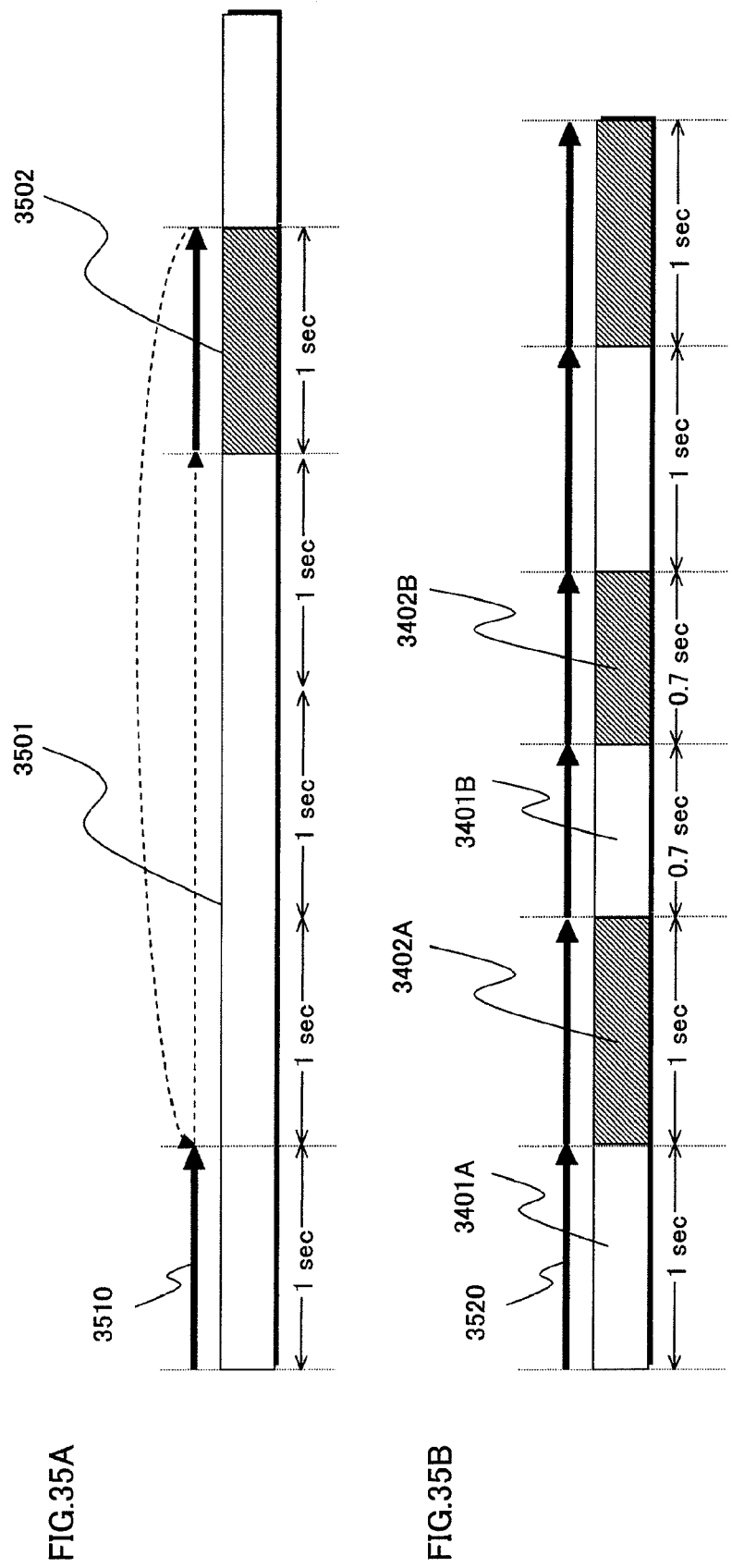

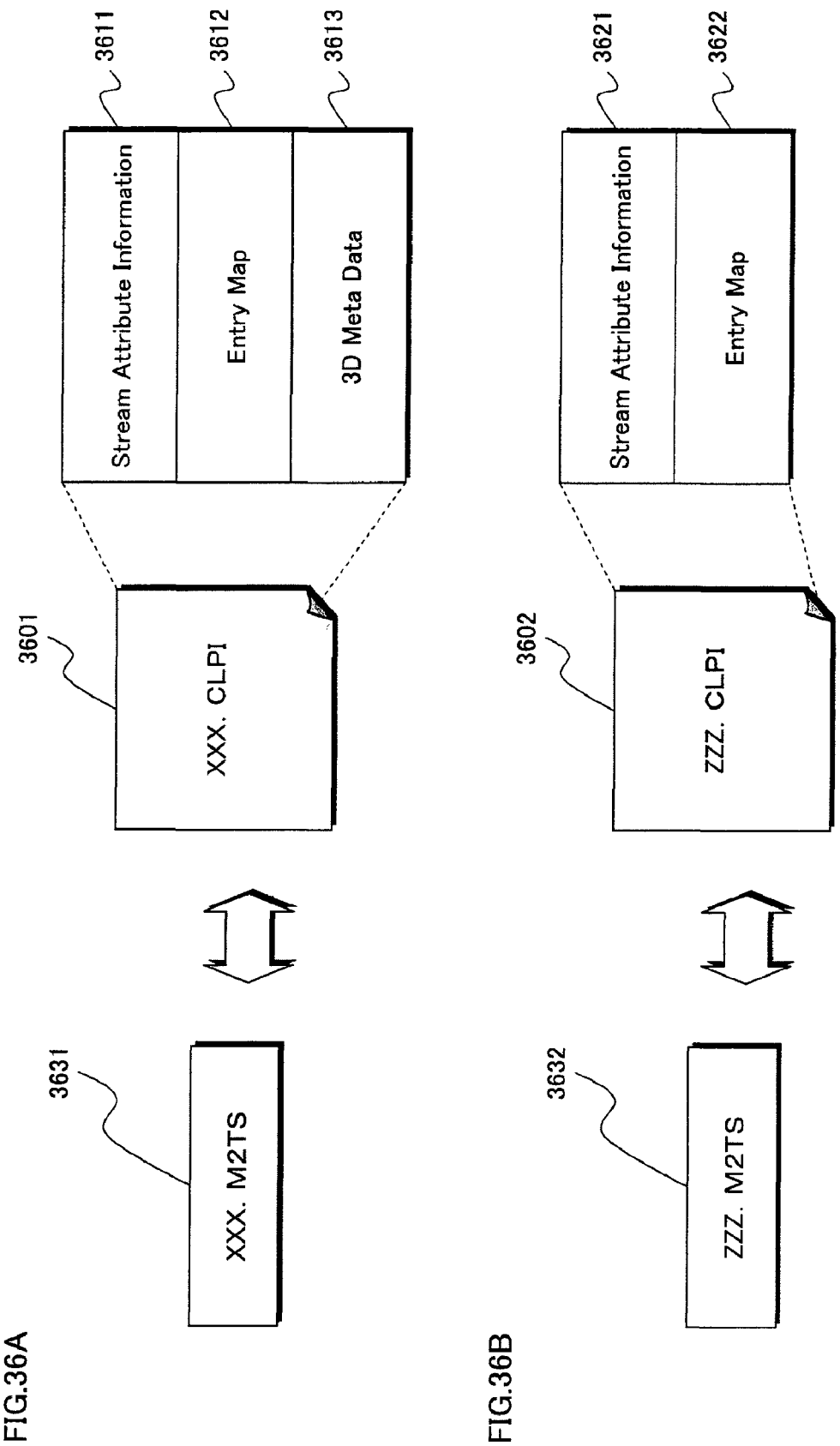

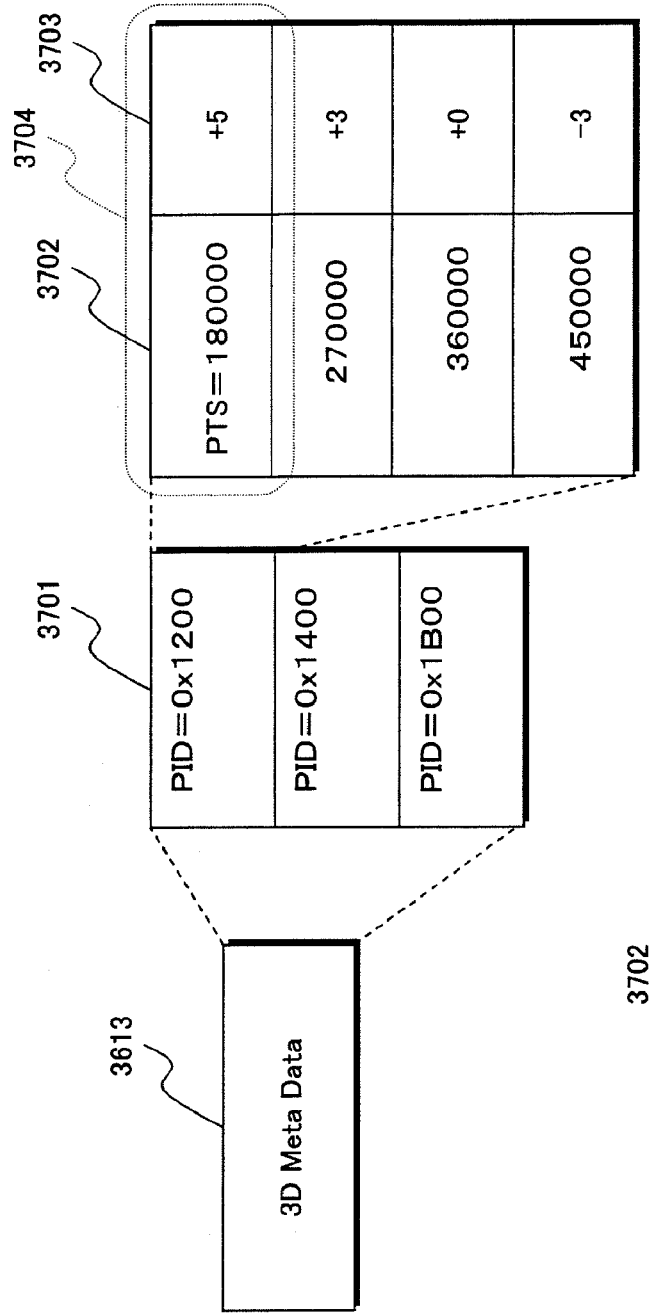
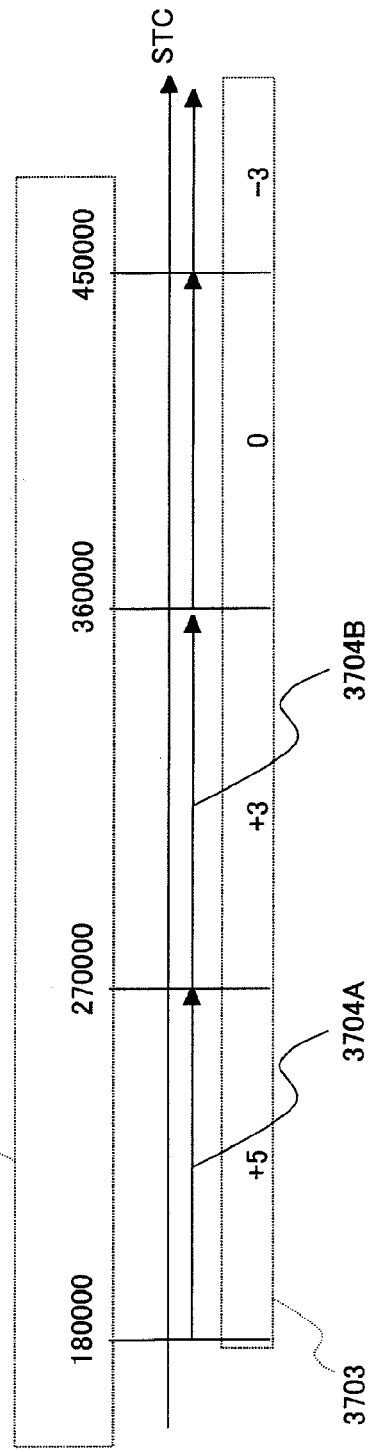
FIG.37A
FIG.37B

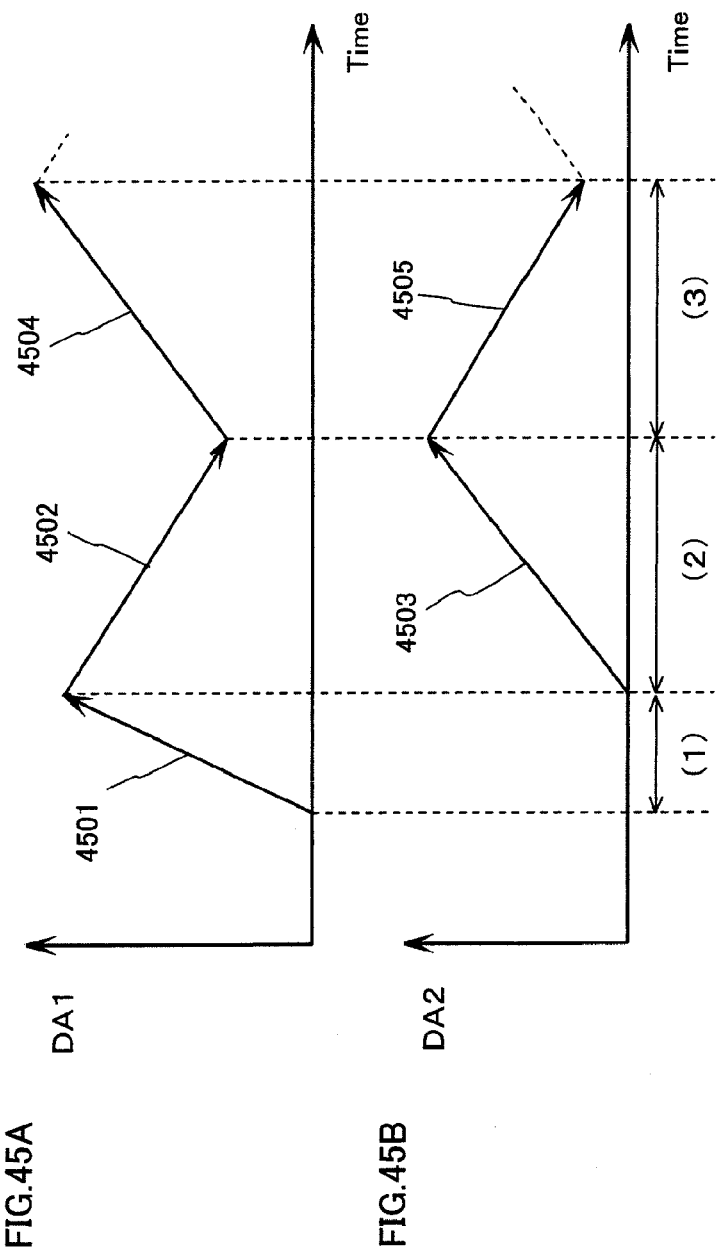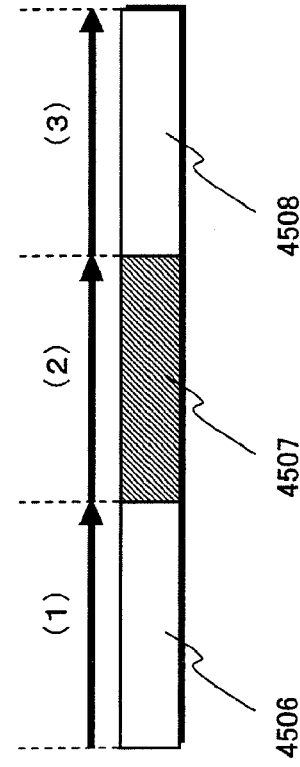
FIG.45A
FIG.45B
FIG.45C

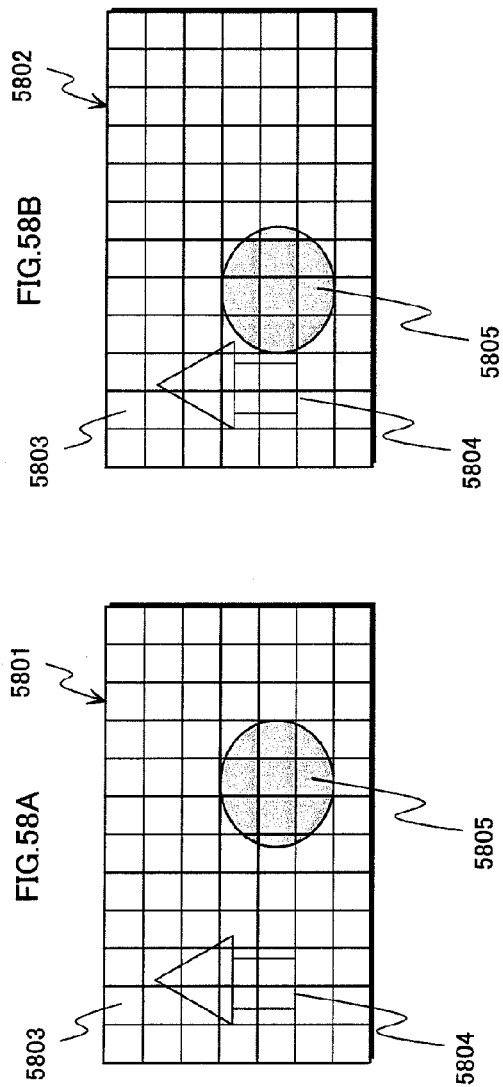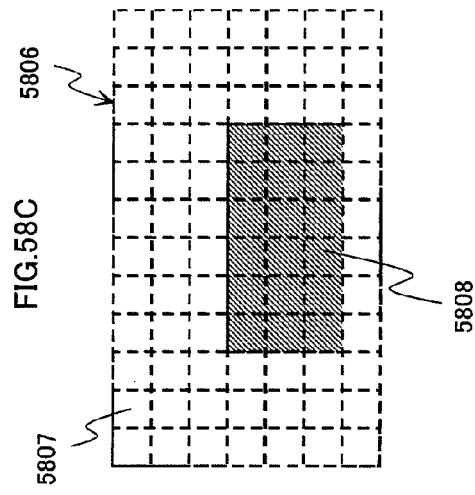

_US 8,059,939 B2_

RECORDING MEDIUM, PLAYBACK DEVICE, AND INTEGRATED CIRCUIT

This application claims benefit to the provisional U.S. application 61/097,694, filed Sep. 17, 2008.

BACKGROUND OF THE INVENTION (1) Field of the Invention

The present invention relates to a technology for stereoscopic video playback and especially to the allocation of a video stream on a recording medium.

(2) Description of the Related Art

For distribution of moving image contents, optical discs such as DVDs and Blu-ray discs (BDs) are widely used. BDs are with larger capacity compared with DVDs and thus capable of storing high quality video images. Specifically, for example, a DVD is capable of storing standard definition (SD) images at the resolution of 640×480 according to the VGA, and 720×480 according to the NTSC standard. In contrast, a BD is capable of storing high definition (HD) images at the maximum resolution of 1920×1080.

In recent years, there is an increasing number of movie theaters where customers can enjoy stereoscopic (which is also referred to as three-dimensional (3D)) video images. In response to this trend, developments of a technology are underway, the technology for storing 3D video images onto an optical disc without degrading high image quality. Here, the requirement to be satisfy is that 3D video images are recorded on optical discs in a manner to ensure compatibility with playback devices having only playback capability of two-dimensional (2D) video images (which is also referred to as monoscopic video images). Such a playback device is hereinafter referred to as "2D playback device". Without the compatibility, it is necessary to produce two different optical discs per content, one to be used for 3D video playback and the other for 2D video playback. This would cause increase in cost. Accordingly, it is desirable to provide an optical disc storing 3D video images in a manner that a 2D playback device is allowed to execute 2D video playback and that a playback device supporting playback of both 2D and 3D video images (which is hereinafter referred to as "2D/3D playback device") is allowed to execute both 2D and 3D video playback.

FIG. 59 is a schematic diagram illustrating the mechanism for ensuring the compatibility of an optical disc storing 3D video images with 2D playback devices (see Patent Document 1). An optical disc 2401 has a 2D/left-view AV (Audio Visual) stream file and a right-view AV stream file recorded thereon. The 2D/left-view AV stream contains a 2D/left-view stream. The 2D/left-view stream represents video images to be visible to the left eye of a viewer in stereoscopic playback and on the other hand, also allows the use in monoscopic playback. The right-view AV stream file contains a right-view stream. The right-view stream represents video images to be visible to the right eye of a viewer in stereoscopic playback. The video streams have the same frame rate but different presentation times shifted from each other by half a frame period. For example, when the frame rate of the video streams is 24 frames per second, the frames of the left- and right-view streams are alternately displayed every ¼s second.

As shown in FIG. 59, the 2D/left-view and right-view AV stream files are divided into a plurality of extents 2402A-2402C and 2403A-2403C, respectively, in GOPs (group of pictures) on the optical disc 2401. That is, each extent contains at least one GOP. Furthermore, the extents 2402A-2402C of the 2D/left-view AV stream file and the extents 2403A-2403C of the right-view AV stream file are alternately arranged on a track 2401A of the optical disc 2401. Each two adjacent extents 2402A-2403A, 2402B-2403B and 2402C-2403C have the same length of playback time. Such an arrangement of extents is referred to as an interleaved arrangement. Groups of extents recorded in an interleaved arrangement on a recoding medium are used both in stereoscopic playback and monoscopic playback, as described below.

As shown in FIG. 59, a 2D playback device 2404 causes a 2D optical disc drive 2404A to sequentially read the extents 2402A-2402C of the 2D/left-view AV stream from the optical disc 2401 and a video decoder 2404B to sequentially decode the read extents into left-view frames 2406L. As a result, left views, i.e., 2D video images are played back on a display device 2407. Note that the arrangement of the extents 2402A-2402C on the optical disc 2401 is designed in view of the seek performance and the reading rate of the 2D optical disc drive 2401A so as to ensure seamless playback of the 2D/left-view AV stream file.

As shown in FIG. 59, a 2D/3D playback device 2405, when accepting the selection of 3D video playback from the optical disc 2401, causes a 3D optical disc drive 2405A to alternately read the 2D/left-view AV stream file and the right-view AV stream file extent by extent from the optical disc 2401, more specifically, in the order of the reference numbers 2402A, 2403A, 2402B, 2403B, 2402C, and 2403B. Of the read extents, those belonging to the 2D/left-view stream are supplied to a left video decoder 2405L, whereas those belonging to the right-view stream are supplied to a right-video decoder 2405R. The video decoders 2405L and 2405R alternately decode the received extents into video frames 2406L and 2406R, respectively. As a result, left and right video images are alternately displayed on a 3D display device 2408. In synchronization with the switching between left and right video images, 3D glasses 2409 cause the left and right lenses to opacify alternately. Through the 3D glasses 2409, the video images presented on the display device 2408 appear to be 3D video images.

As described above, the interleaved arrangement enables an optical disc having 3D video images to be used for both 2D video playback by a 2D playback device and 3D video playback by a 2D/3D playback device.

PATENT DOCUMENTS

[Patent Document 1] Japanese Patent No. 3935507

SUMMARY OF THE INVENTION

There are optical discs having a plurality of recording layers such as a dual layer disc. With such an optical disc, a series of AV stream files may be recorded on disc areas extending over two layers. Even with a single layer disc, in addition, a series of AV stream files may be recorded on separate areas between which a different file is recorded. In such cases, the optical pickup of an optical disc drive needs to execute a focus jump or a track jump in data reading from the optical disc. The focus jump is a jump caused by a layer switching, and the track jump is a jump caused by a movement of the optical pickup in a radial direction of the optical disk. Generally, these jumps involve longer seek time, thus called long jumps. Ensuring seamless video playback regardless of a long jump needs the extent accessed immediately before the long jump to have a large size enough to satisfy the condition for preventing buffer underflow in a video decoder during the long jump.

In order to satisfy the above-mentioned condition in both 2D and 3D video playback when the 2D/left-view AV stream file and the right-view AV stream file are arranged in an interleaved manner as shown in FIG. 59, however, the area accessed immediately before the long jump needs to have a larger size of an extent of the right-view AV stream file in addition to a sufficiently larger size of the extent of the 2D/left-view AV stream since both the extents have the same playback time. As a result, a 2D/3D playback device needs to allocate a larger buffer capacity to a right video decoder, the buffer capacity larger than that satisfying the above-mentioned condition. This is not desirable since it prevents further reduction in buffer capacity and further improvement in memory efficiency of a playback device.

An object of the present invention is to provide a recording medium having stream files recorded thereon in an arrangement to allow further reduction in the buffer capacity necessary for stereoscopic playback.

A recording medium according to the invention includes a base-view stream file and a dependent-view stream file recorded thereon. The base-view stream file is to be used for monoscopic video playback. The dependent-view stream file is to be used for stereoscopic video playback in combination with the base-view stream file. The recording medium has a stereoscopic/monoscopic shared area, a stereoscopic specific area, and a monoscopic specific area. The stereoscopic/monoscopic shared area is a contiguous area to be accessed both while a stereoscopic video is to be played back and while a monoscopic video is to be played back. The stereoscopic/monoscopic shared area is also an area in which a plurality of extents belonging to the base-view stream file and a plurality of extents belonging to the dependent-view stream file are arranged in an interleaved manner. Both of the stereoscopic specific area and the monoscopic specific area are contiguous areas located one after another next to the stereoscopic/monoscopic shared area. The stereoscopic specific area is an area to be accessed immediately before a long jump occurring in stereoscopic video playback. The stereoscopic specific area is also an area in which extents belonging to the base-view stream file and extents belonging to the dependent-view stream file are arranged in an interleaved manner. The extents recorded on the stereoscopic specific area are next in order after the extents recorded on the stereoscopic/monoscopic shared area. The monoscopic specific area is an area to be accessed immediately before a long jump occurring in monoscopic video playback. The monoscopic specific area has a copy of the entirety of the extents that belong to the base-view stream file and are recorded on the stereoscopic specific area.

When video images are played back from the recording medium according to the present invention described above, the stereoscopic specific area is accessed immediately before a long jump occurring in stereoscopic playback, whereas the monoscopic specific area is accessed immediately before a long jump occurring in monoscopic playback. Thus, the playback path for stereoscopic playback and the playback path for monoscopic playback are separated immediately before their respective long jumps. This allows the extent sizes of the stream files arranged on the stereoscopic specific area to be determined regardless of the extent size of the base-view stream file arranged on the monoscopic specific area. Especially, sizes and an arrangement of extents recorded on the stereoscopic specific area are allowed to be designed to satisfy only the condition for seamless playback of stereoscopic video images. Independently of that, sizes and an arrangement of extents recorded on the monoscopic specific area are allowed to be designed to satisfy only the condition for seamless playback of monoscopic video images. As a result, further reduction in the buffer capacity necessary for stereoscopic playback can be achieved.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 16 is a functional block diagram of a 2D playback device;

FIG. 17 is a list of system parameters stored in a player variable storage unit shown in FIG. 16;

FIG. 22 is a table showing an example of the relationship between jump distances and jump times specified for BD-ROM discs;

FIGS. 29A and 29B are schematic diagrams showing elementary streams multiplexed into a 2D/left-view AV stream file and a right-view stream file, respectively;

FIGS. 33A and 33B are schematic diagrams showing values of a decode counter 3204 allocated to the pictures of a 2D/left-view stream 3301 and a right-view stream 3302, respectively;

FIGS. 35A and 35B are schematic diagrams showing the relationship between playback times and playback paths;

FIGS. 36A and 36B are schematic diagrams showing the data structures of clip information files linked to the 2D/left-view AV stream file and the right-view AV stream file, respectively;

FIGS. 37A and 37B are schematic diagrams showing the data structure of 3D meta data 3613 shown in FIG. 36A;

FIGS. 45A, 45B, 45C are schematic diagrams showing the relationship between the physical order of extents of each AV stream file recorded on the BD-ROM disc 101 in the interleaved arrangement, the progression of the data amounts accumulated in the read buffers 3902 and 3911 during 3D video playback and the physical order of extents of the AV stream files recorded on the BD-ROM disc 101 in the interleaved arrangement;

FIGS. 58A, 58B, 58C are schematic diagrams showing a process of calculating depth information by the video encoder 5701 shown in FIG. 57.

DESCRIPTION OF THE PREFERRED EMBODIMENT

The following describes a recording medium and a playback device pertaining to embodiments of the present invention with reference to the drawings.

First Embodiment

Figure 1:
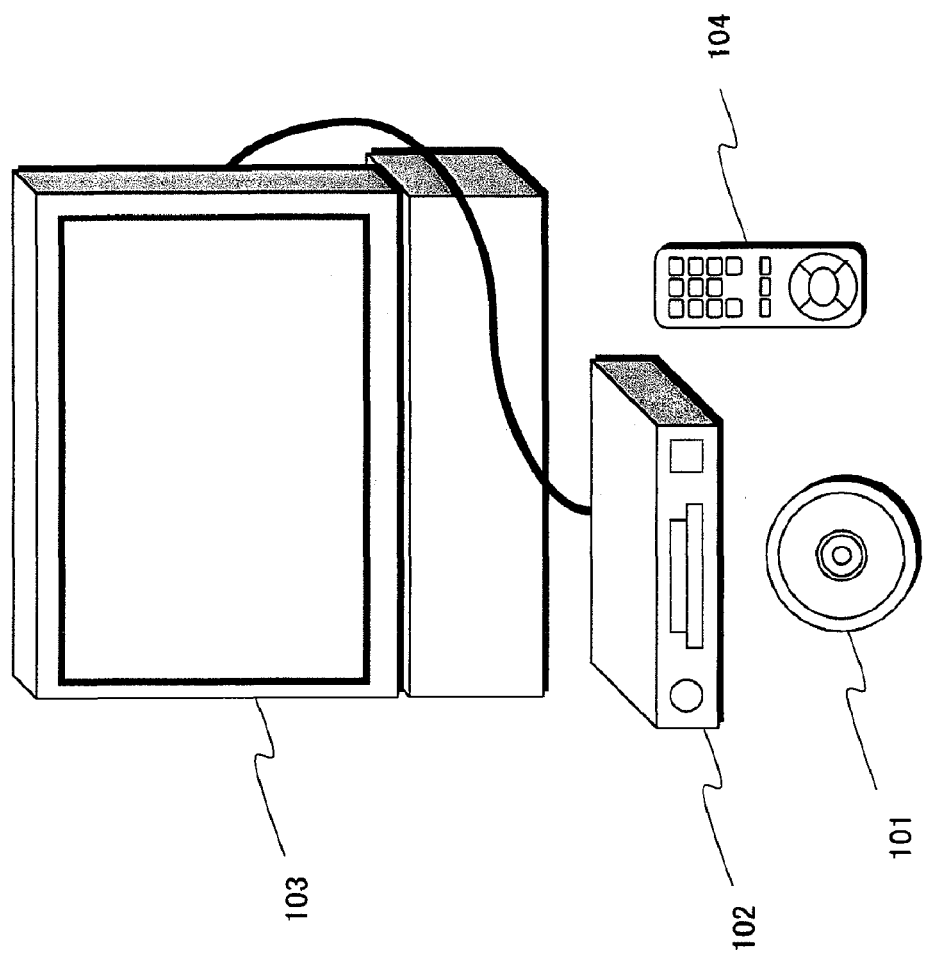
FIG. 1 is a schematic diagram showing a type of usage of a recording medium according to a first embodiment of the present invention.

First, the following describes a usage pattern of a recording medium in accordance with a first embodiment of the present invention. FIG. 1 is a schematic diagram showing a usage pattern of the recording medium. In FIG. 1, a BD-ROM disc 101 is depicted as the recording medium. A playback device 102, a display device 103, and a remote control 104 constitute one home theater system. The BD-ROM disc 101 provides movies to the home theater system.

<Data Structure of 2D BD-ROM Disc>

Of the BD-ROM disc 101, which is the recording medium pertaining to the first embodiment of the present invention, the data structure relating to the storage of 2D video images is described next.

Figure 2:
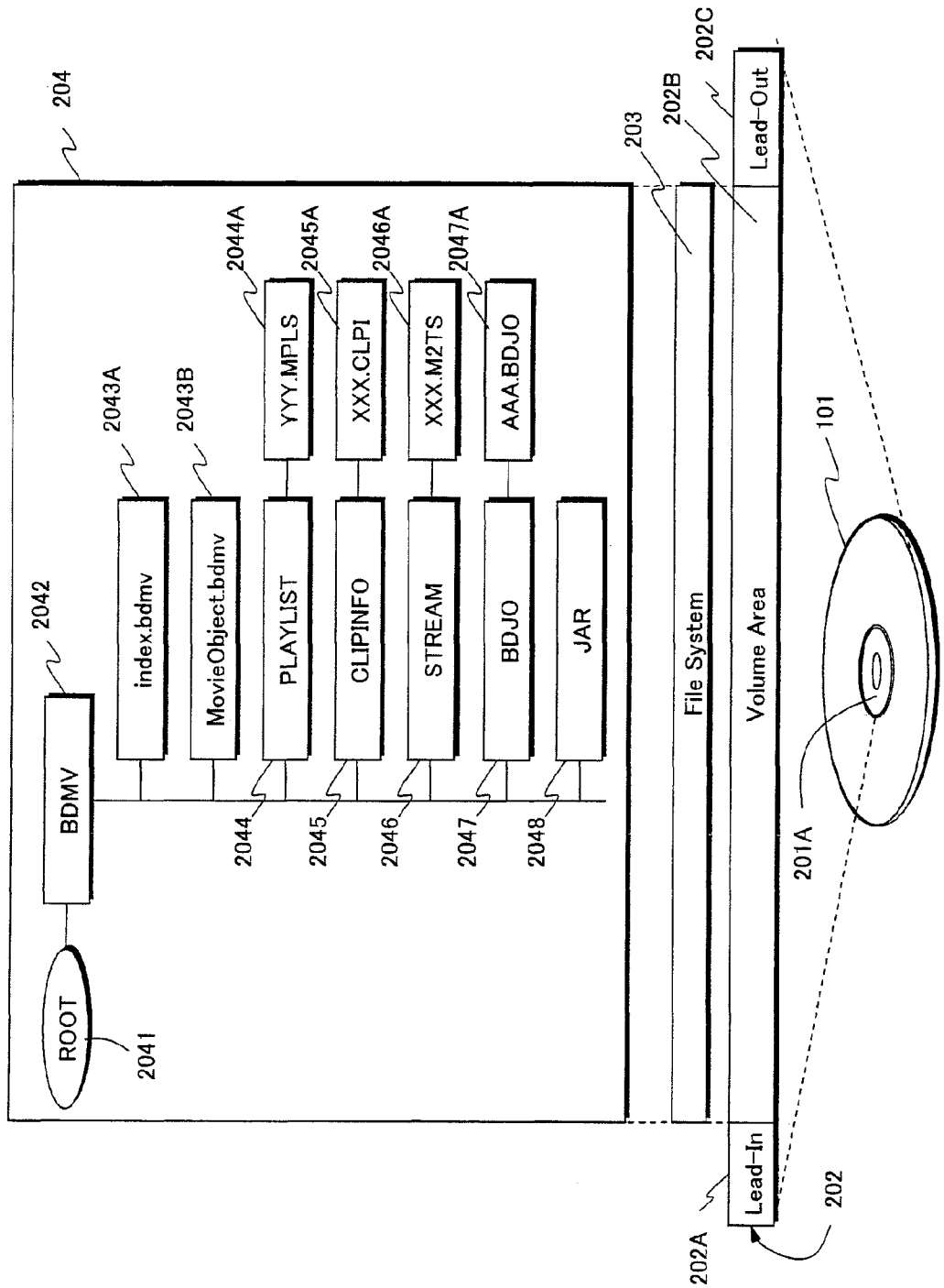
FIG. 2 is a schematic diagram showing the data structure of a BD-ROM disc shown in FIG. 1.

FIG. 2 is a schematic diagram showing the data structure of the BD-ROM disc 101. On the BD-ROM disc 101, a track 202 is formed spiraling from the inner to outer circumference of the BD-ROM disc 101, as with DVDs and CDs. In FIG. 2, the track 202 is virtually extended in a transverse direction. The left side of FIG. 2 represents the inner circumferential part of the BD-ROM disc 101 and the right side represents the outer circumferential part. The track 202 is a recording area. The inner circumferential part of the recording area 202 is a lead-in area 202A, and the outer circumferential part thereof is a lead-out area 202C. Between the lead-in area 202A and the lead-out area 202C is a volume area 202B for storing logical data.

The volume area 202B is divided into a plurality of access units each called a "sector" and the sectors are numbered consecutively from the top thereof. These consecutive numbers are called logical addresses (or logical block numbers). Data is read from the disc 101 by designating a logical address. In the BD-ROM disc 101, usually logical addresses are substantially equivalent to physical addresses on the disc 101. That is, in an area where the logical addresses are consecutive, the physical addresses are also substantially consecutive. Accordingly, data pieces having consecutive logical addresses can be consecutively read out without a seek of the pickup of the disc drive.

On an inner side of the lead-in area 202A, the BD-ROM disc 101 has a special area called BCA (burst cutting area) 201. The BCA 201 is a special area readable only by a disc drive. That is, the BCA 201 is unreadable by an application program. Therefore, the BCA is often used for copyright protection technology, for example.

At the head of the volume area 202B, volume information of a file system 203 is stored. Subsequent to the volume information, application data such as video data is stored in the volume area 202B. The file system is a system for displaying the data structure in terms of directories and files. For example, PCs (personal computers) employ a file system, such as FAT or NTFS, so that the structure of data stored on the hard disk is expressed in directories and files to improve the usability of the stored data. The BD-ROM disc 101 employs UDF (Universal Disc Format) as the file system 203. Yet, any other file system, such as ISO 9660, is also applicable. This file system 203 enables the logical data stored on the disc 101 to be accessed and read out in units of directories and files, as with the PCs.

More specifically, when the UDF is employed as the file system 203, the volume area 202B includes a recording area for storing a file set descriptor, a recording area for storing a terminating descriptor, and a plurality of directory areas. Each area is accessed by using the file system 203. Here, the "file set descriptor" indicates a logical block number (LBN) of a sector that stores the file entry of the root directory. The "terminating descriptor" indicates the termination of the file set descriptor.

Each directory area has the same internal structure. Each directory area has a file entry, a directory file, and a file recording area.

The "file entry" includes a descriptor tag, an ICB tag, and an allocation descriptor. The "descriptor tag" indicates that the area is of a file entry. Here, the descriptor tag may alternatively indicate that the area is of a space bitmap descriptor. For example, the descriptor tag having the value of "261" means that the area is of a "file entry". The "ICB tag" indicates attribute information of the file entry. The "allocation descriptor" indicates the LBN of the recording location of the directory file.

The "directory file" includes the file identifier descriptor of a subordinate directory and the file identifier descriptor of a subordinate file. The "file identifier descriptor of the subordinate directory" is reference information used for accessing the subordinate directory located below the directory corresponding to the directory area. This file identifier descriptor includes identification information of the subordinate directory, the length of the directory name of the subordinate directory, a file entry address, and the directory name of the subordinate directory. Here, the file entry address indicates the LBN of the file entry of the subordinate directory. The "file identifier descriptor of the subordinate file" is reference information for accessing the subordinate file located below the directory corresponding to the directory area. This file identifier descriptor includes identification information of the subordinate file, the length of the file name of the subordinate file, a file entry address, and the file name of the subordinate file. Here, the file entry address indicates the LBN of the file entry of the subordinate file. By tracing the file identifier descriptors of subordinate directories/files, the file entries of the subordinate directories/files can be sequentially found, starting from the file entry of the root directory.

The "file recording area for storing the subordinate file" is the area for storing the file entry of the subordinate file located below the directory corresponding to the directory area and the body of the subordinate file. The "file entry" includes a descriptor tag, an ICB tag, and allocation descriptors. The "descriptor tag" indicates that the area is of a file entry. The "ICB tag" indicates attribute information of the file entry. The "allocation descriptors" indicate the arrangement of the extents constituting the body of the subordinate file. Each allocation descriptor is assigned to one of the extents. When the subordinate file is divided into a plurality of extents, the file entry includes a plurality of allocation descriptors. More specifically, each allocation descriptor includes the size of an extent and the LBN of the recording location of the extent. Furthermore, the two most significant bits of each allocation descriptor indicate whether an extent is actually recorded at the recording location. More specifically, when the two most significant bits indicate "0", an extent has been allocated to the recording location and has been actually recorded thereat. When the two most significant bits indicate "1", an extent has been allocated to the recording location but has not been yet recorded thereat. The logical addresses of the extents constituting each file can be found by referencing the allocation descriptors of the file entry of the file.

Like the file system employing the UDF, the general file system 203, when dividing each file into a plurality of extents and then recorded in the volume area 202B, also stores the information showing the locations of the extents, such as the above-mentioned allocation descriptors, in the volume area 202B. By referencing the information, the location of each extent, particularly the logical address thereof can be found.

With further reference to FIG. 2 showing the directory/file structure 204 on the BD-ROM disc 101, a BD movie (BDMV: BD Movie) directory 2042 is located immediately below a ROOT directory 2041. Below the BDMV directory 2042 are: an index file (index.bdmv) 2043A, a movie object file (MovieObject.bdmv) 2043B; a playlist (PLAYLIST) directory 2044; a clip information (CLIPINFO) directory 2045; a stream (STREAM) directory 2046; a BD-J object (BDJO: BD Java Object) directory 2047; and a Java™ archive (JAR: Java Archive) directory 2048. The index file 2043 stores an index table. The index table defines correspondence between titles and objects. The STREAM directory 2046 stores an AV stream file (XXX.M2TS) 2046A. The AV stream file 2046A stores AV contents, which represent audio and video, multiplexed therein. The CLIPINF directory 2045 includes a clip information file (XXX.CLPI) 2045A. The clip information file 2045A stores management information of the AV stream file 2046A. The PLAYLIST directory 2044 stores a playlist file (YYY.MPLS) 2044A. The playlist file 2044A defines a logical playback path of the AV stream file 2046A. The BDJO directory 2047 stores therein a BD-J object file (AAA.BDJO) 2047A. The movie object file (MovieObject.bdmv) 2043B and the BD-J object file 2047A each store a program called "object" that defines a dynamic scenario.

More specifically, the directory file structure 204 is implemented to have a ROOT directory area, a BDMV directory area, a PLAYLIST directory area, a CLIPINF directory area, a STREAM directory area, a BDJO directory area, and a JAR directory area in the volume area 202B of the BD-ROM disc 101. By tracing the file identifier descriptor mentioned above, a series of file entries is sequentially found from the ROOT directory to the directories. That is, the file entry of the ROOT directory can lead to the file entry of the BDMV directory. Similarly, the file entry of the BDMV directory can lead to the file entry of the PLAYLIST directory, and the file entry of the BDMV directory can lead the file entries of the CLIPINF directory, the STREAM directory, the BDJO directory, and the JAR directory.

The following describes the data structure of each file that exists below the BDMV directory 2042.

<<Index File>>

Figure 3:
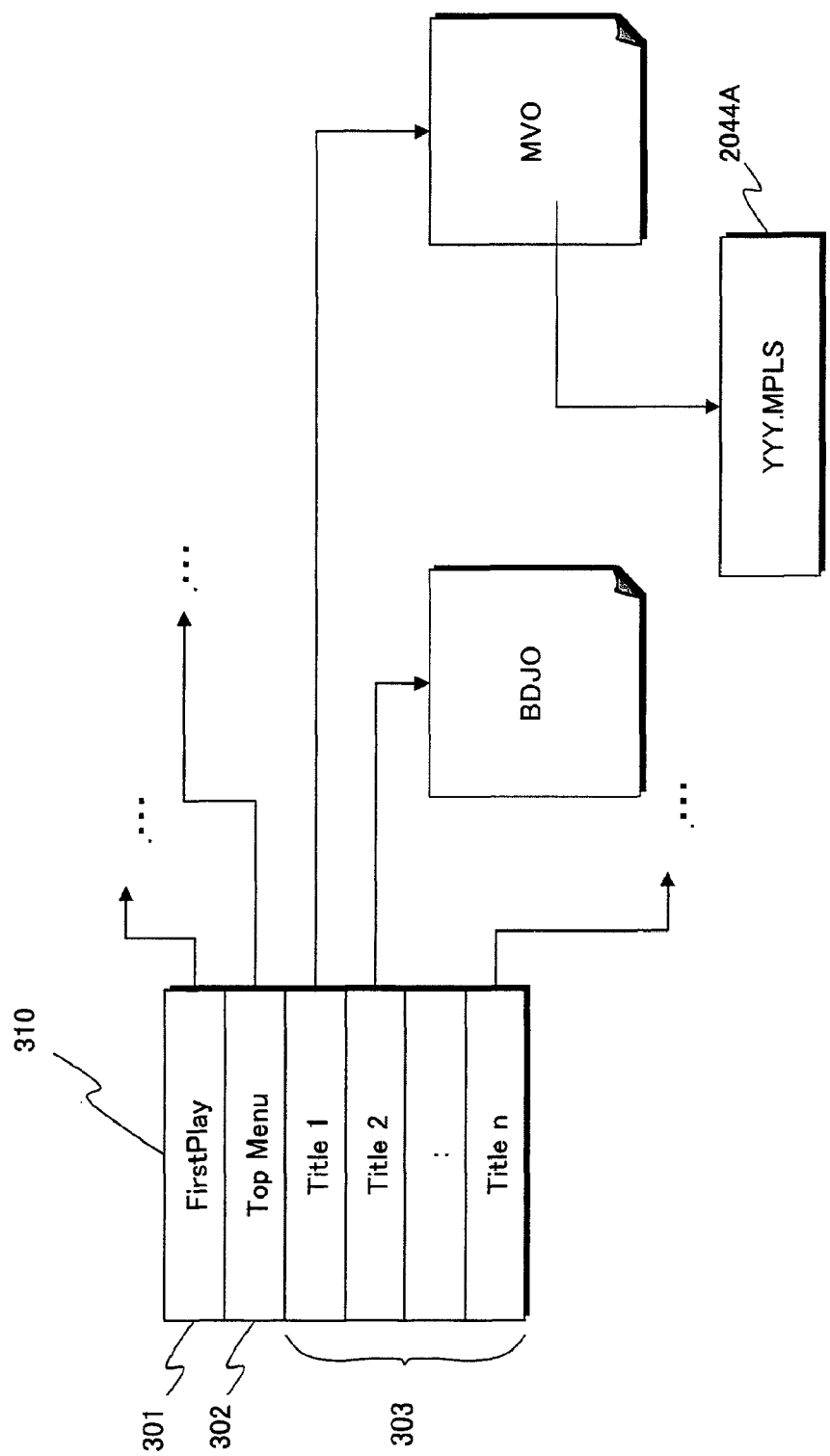
FIG. 3 is a schematic diagram showing an index table stored in an index file shown in FIG. 2.

FIG. 3 is a schematic diagram showing an index table stored in the index file 2043A. The index table 310 stores items, such as "first play" 301, "top menu" 302, and "title k" 303 (k=1, 2, ..., n). Each item is associated with either of the movie object MVO and the BD-J object BDJO. Each time a menu or a title is called in response to a user operation or an application program, a control unit of the playback device 102 refers to a corresponding item in the index table 310, and calls an object corresponding to the item from the disc 101. The control unit then executes the program of the called object. More specifically, the "first play" 301 specifies an object to be called when the disc 101 is loaded into the disc drive. The "Top menu" 302 specifies an object for displaying a menu on the display device 103 when a command "go back to menu" is input responsive, for example, to a user operation. The "title k" 303 specifies an object for playing back, when a user operation requests a title to be played back, a AV stream file corresponding to the requested title from the disc 101, in accordance with the playlist file 2044A.

<<Movie Object File>>

The movie object file 2043B generally stores a plurality of movie objects. Each movie object stores a sequence of navigation commands. A navigation command causes the playback device 101 to execute playback processes similarly to general DVD players. A navigation command includes, for example, read-out command to read out a playlist file corresponding to a title, a playback command to play back stream data from an AV stream file indicated by a playlist file, and a progression command to make a progression to another title. The control unit of the playback device 101 calls a movie object in response, for example, to a user operation and executes navigation commands included in the called movie object in the order of the sequence. Thus, in a manner similar to general DVD players, the playback device 101 displays a menu on the display device to allow a user to select one of the commands. The playback device 101 then executes a playback start/stop of a title or switching to another title in accordance with the selected command, thereby dynamically changing the progress of video playback.

<<BD-J Object File>>

The BD-J object file 2047A includes a single BD-J object. The BD-J object is a program to cause a Java virtual machine mounted on the playback device 101 to execute the processes of title playback and graphics rendering. The BD-J object stores an application management table and identification information of the playlist file to be referred. The application management table indicates a list of Java application programs that are to be actually executed by the Java virtual machine. The identification information of the playlist file to be referred identifies a playlist file that corresponds to a title to be played back. The Java virtual machine calls a BD-J object in accordance with a user operation or an application program, and executes signaling of the Java application program according to the application management table included in the BD-J object. Consequently, the playback device 101 dynamically changes the progress of the video playback of the title, or causes the display device 103 to display graphics independently of the title video.

<<JAR Directory>>

The JAR directory 2048 stores the body of each Java application program executed in accordance with a BD-J objects. The Java application programs include those for causing the Java virtual machine to execute playback of a title and those for causing the Java virtual machine to execute graphics rendering.

<<AV Stream File for 2D Video>>

Figure 4:
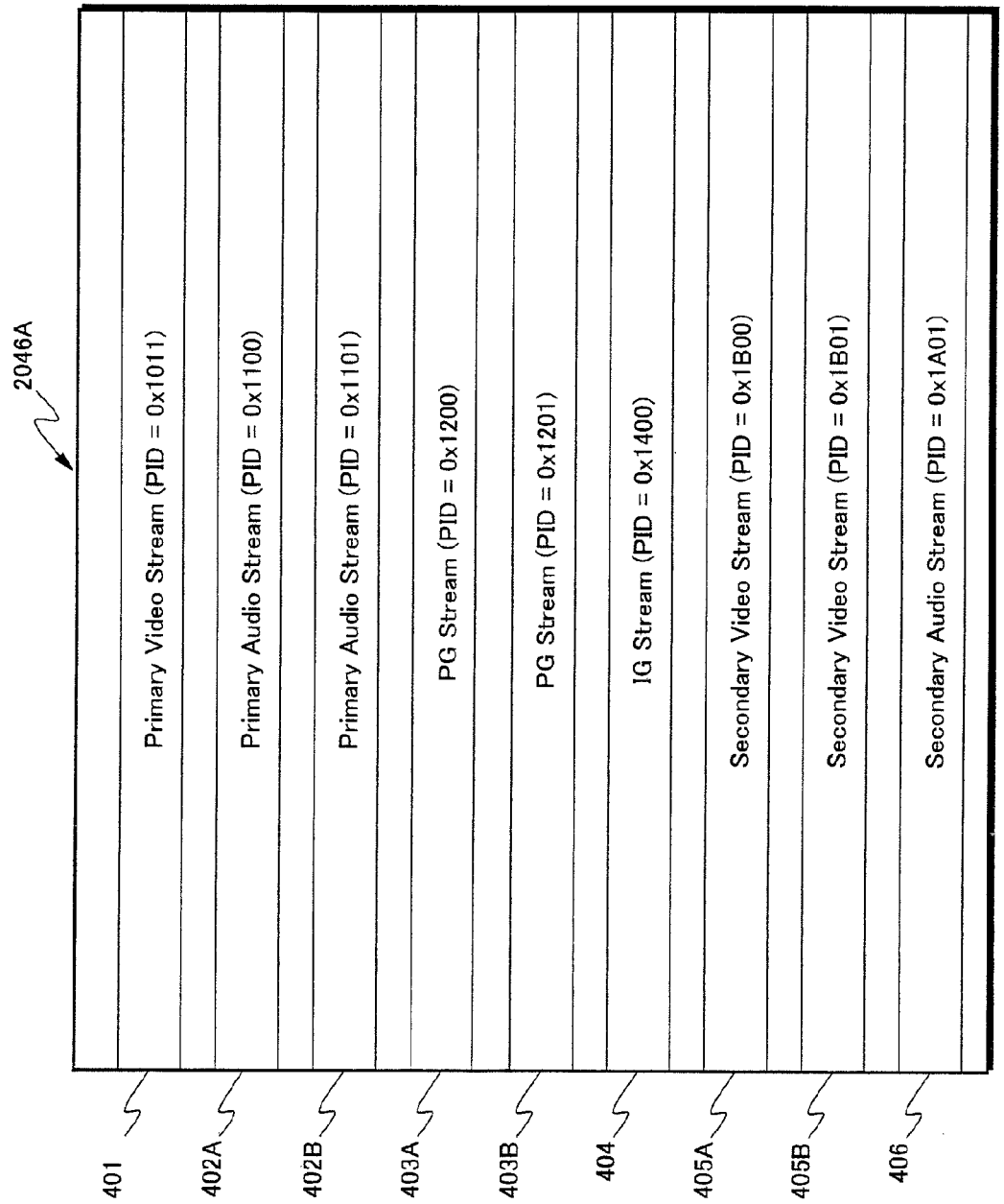
FIG. 4 is a schematic diagram showing elementary streams multiplexed in an AV stream file 2046A used for 2D video playback shown in FIG. 2.

The AV stream file 2046A is a digital stream in MPEG-2 transport stream (TS) format, and is obtained by multiplexing a plurality of elementary streams. FIG. 4 is a schematic diagram showing elementary streams multiplexed in an AV stream file 2046A used for playback of 2D video images. The AV stream file 2046A shown in FIG. 4 has multiplexed therein a primary video stream 401, primary audio streams 402A and 402B, presentation graphics (PG) streams 403A and 403B, an interactive graphics (IG) stream 404, secondary video streams 405A and 405B, and a secondary audio stream 406.

The primary video stream 401 represents the primary video of a movie, and the secondary video streams 405A and 405B represent secondary video of the movie. The primary video is the major video of a content, such as the main feature of a movie, and is displayed on the entire screen, for example. On the other hand, the secondary video is displayed simultaneously with the primary video with the use, for example, of a picture-in-picture method, so that the secondary video images are displayed in a smaller window presented on the full screen displaying the primary video image. Each video stream is encoded by a method, such as MPEG-2, MPEG-4 AVC, or SMPTE VC-1.

The primary audio streams 402A and 402B represent the primary audio of the movie. The secondary audio stream 406 represents secondary audio to be mixed with the primary audio. Each audio stream is encoded by a method, such as AC-3, Dolby Digital Plus ("Dolby Digital" is registered trademark), MLP, DTS (Digital Theater System: registered trademark), DTS-HD, or linear PCM (Pulse Code Modulation).

The PG streams 403A and 403B represent subtitles of the movie. The PG streams 403A and 403B each represent subtitles in a different language, for example. The IG stream 404 represents an interactive screen. The interactive screen is created by disposing graphical user interface (GUI) components on the screen of the display device 103.

The elementary streams 401-406 contained in the AV stream file 2046A are identified by packet IDs (PIDs). For example, the primary video stream 401 is assigned with PID 0x1011. The primary audio streams 402A and 402B are each assigned with any of PIDs from 0x1100 to 0x111F. The PG streams 403A and 403B are each assigned with any of PIDs from 0x1200 to 0x121F. The IG stream 404 is assigned with any of PIDs from 0x1400 to 0x141F. The secondary video streams 405A and 405B are each assigned with any of PIDs from 0x1B00 to 0x1B1F. The secondary audio stream 406 is assigned with any of PIDs from 0x1A00 to 0x1A1F.

Figure 5:
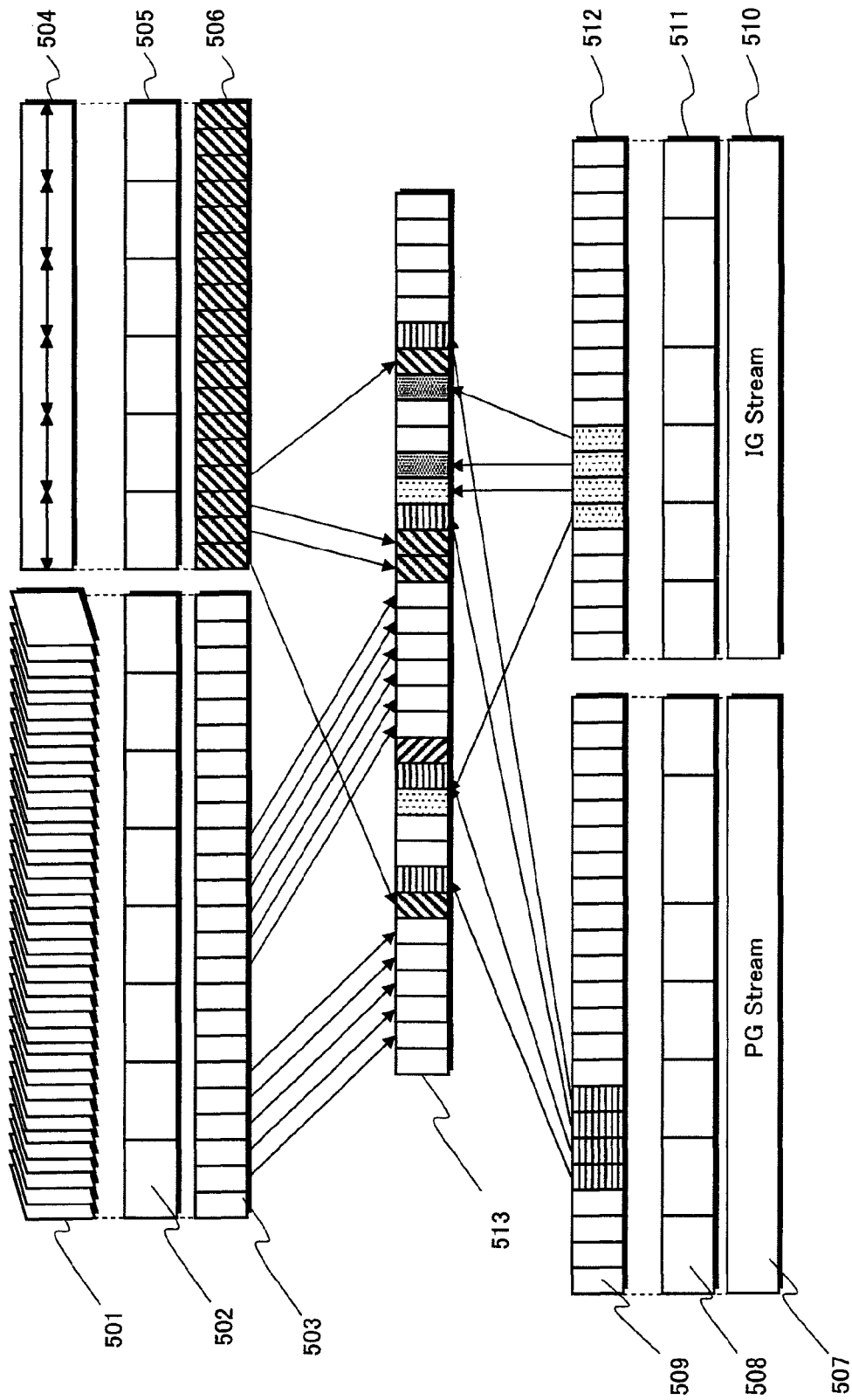
FIG. 5 is a schematic diagram showing an arrangement of packets in each elementary stream multiplexed in the AV stream file shown in FIG. 2.

FIG. 5 is a schematic diagram showing a sequence of packets in each elementary stream multiplexed in the AV stream file 513. Firstly, a video stream 501 having a plurality of video frames is converted to a series of PES packets 502. Then, each PES packet 502 is converted to a TS packet 503. Similarly, an audio stream having a plurality of audio frames 504 are converted into a series of PES packets 505. Then, each of the PES packets 505 is converted to a TS packet 506. Similarly, stream data of the PG stream 507 and the IG stream 510 are separately converted into a series of PES packets 508 and a series of PES packets 511, and further into a series of TS packets 509 and a series of TS packets 512, respectively. Lastly, these TS packets 503, 506, 509, and 512 are arranged and multiplexed into one stream to constitute the AV stream file 513.

Figure 6:
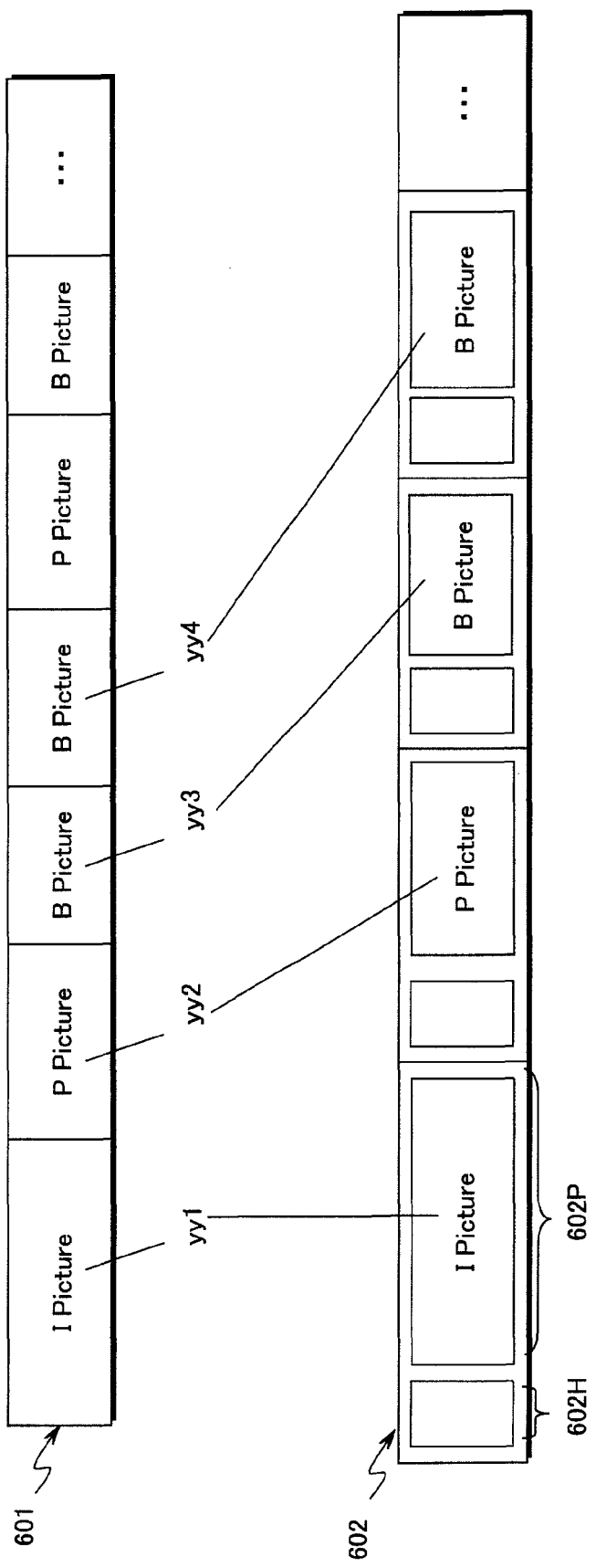
FIG. 6 is a schematic diagram showing a detail of a method for storing a video stream into PES packets shown in FIG. 5.

FIG. 6 is a schematic diagram showing a detail of a method for storing a video stream 601 in PES packets 602. As shown in FIG. 6, in the encoding process of the video stream 601, video data of each video frame or field was treated as one picture and the data amount thereof was separately reduced. Here, pictures mean the units in which video data is encoded. A moving image compression coding method such as MPEG-2, MPEG-4 AVC, and SMPTE VC-1, reduces data amount by using spatial and temporal redundancy in the moving images. Inter-picture predictive coding is employed as the method using the temporal redundancy. In inter-picture predictive coding, first, a reference picture is assigned to each picture to be encoded, the reference picture being a picture earlier or later in presentation time than the picture to be encoded. Next, a motion vector is detected between the picture to be encoded and the reference picture, and then motion compensation is performed by using the motion vector. Furthermore, the picture processed by the motion compensation is subtracted from the picture to be encoded, and then, spatial redundancy is removed from the difference between the pictures. Thus, each picture is reduced in data amount.

As shown in FIG. 6, the video stream 601 contain an I picture yy1, a P picture yy2, B pictures yy3 and yy4, . . . , starting from the top. Here, I pictures are pictures compressed by intra-picture predictive coding that uses only a picture to be encoded without any reference picture. P pictures are pictures compressed by inter-picture predictive coding that uses the uncompressed form of one already-compressed picture as a reference picture. The B picture is compressed by inter-picture predictive coding that simultaneously uses the uncompressed forms of two already-compressed pictures as reference pictures. Note that some B pictures may be referred to as Br pictures when the uncompressed forms of the B pictures are used as reference pictures for other pictures by inter-picture predictive encoding. In the video stream 601, each picture with a predetermined header attached constitutes one video access unit. The pictures can be read from the video stream 601 in video access units.

As shown in FIG. 6, each PES packet 602 contains a PES payload 602P and a PES header 602H. The I picture yy1, the P picture yy2, and the B pictures yy3 and yy4 of the video stream 601 are separately stored in the PES payloads 602P of different PES packets 602. Each PES header 602H stores a presentation time and a decoding time, i.e., a PTS (presentation time-stamp) and a DTS (decoding time-stamp), respectively, of a picture stored in the PES payload 602P of the same PES packet 602.

Figure 7A:
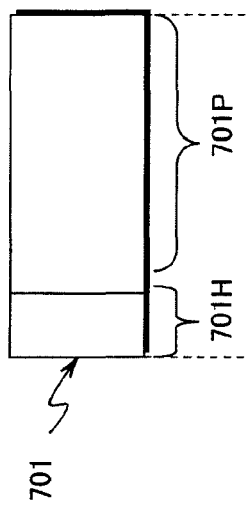
FIGS. 7A, 7B, 7C are schematic views respectively showing the format of a TS packet, the format of a source packet, and an arrangement of source packets constituting the AV stream file shown in FIG. 5.
Figure 7B:
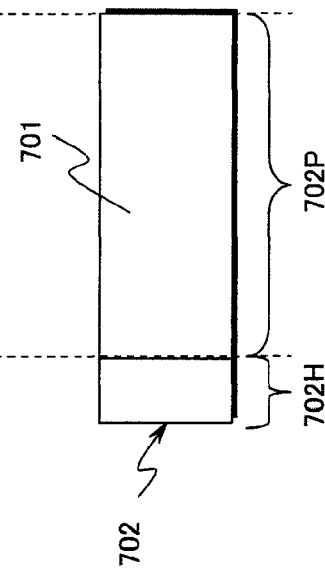
Figure 7C:
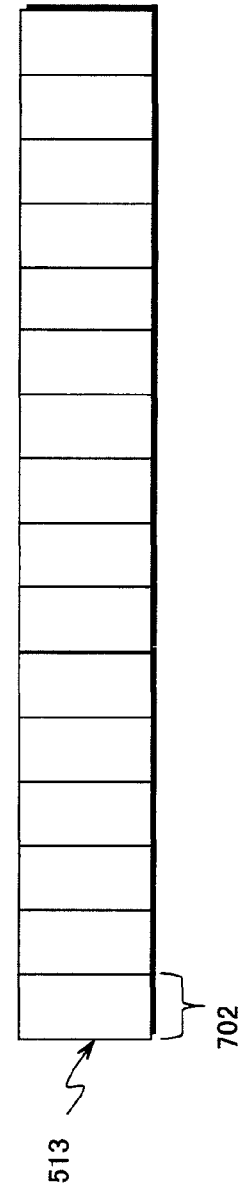

FIGS. 7A, 7B, and 7C schematically show the format of a TS packet 701 and a source packet 702 constituting the AV stream file 513. The TS packet 701 is 188-byte long. As shown in FIG. 7A, the TS packet 701 is composed of a 4-byte long TS header 701H and a 184-byte long TS payload 701P. Each PES packet is divided and stored in the TS payload 701P of a different TS packet 701. Each TS header 701H stores information such as a PID. The PID identifies an elementary stream having data stored in the PES payload 601P when the PES packet 601 is reconstructed from data stored in the TS payload 701P of the same TS packet 701. When the AV stream file 513 is written in the BD-ROM disc 101, as shown in FIG. 7B, a 4-byte long header (TP_Extra_Header) 702H is added to each TS packet 701. The header 702H particularly includes an ATS (Arrival_Time_Stamp). The ATS shows the transfer start time at which the TS packet is to be transferred to a PID filter inside a system target decoder, which is described later. In the manner described above, each packet 701 is converted to a 192-byte long source packet and written into the AV stream file 513. Consequently, as shown in FIG. 7C, the plurality of source packets 702 are sequentially arranged in the AV stream file 513. The source packets 702 are serially assigned from the top of the AV stream file 513. The serial numbers are called SPNs (source packet numbers).

The TS packets contained in the AV stream file include those are converted from an elementary stream representing audio, video, subtitles and the like. The TS packets also include those comprise a PAT (Program Association Table), a PMT (Program. Map Table), a PCR (Program Clock Reference) and the like. The PAT shows the PID of a PMT included in the same AV stream file. The PID of the PAT itself is 0. The PMT stores the PIDs identifying the elementary streams representing video, audio, subtitles and the like included in the same AV stream file, and the attribute information of the elementary streams. The PMT also has various descriptors relating to the AV stream file. The descriptors particularly have information such as copy control information showing whether copying of the AV stream file is permitted or not. The PCR stores information indicating the value of STC (System Time Clock) to be associated with an ATS of the packet. The STC is a clock used as a reference of the PTS and the DTS in a decoder. With the use of PCR, the decoder synchronizes the STC with the ATC that is the reference of the ATS.

Figure 8:
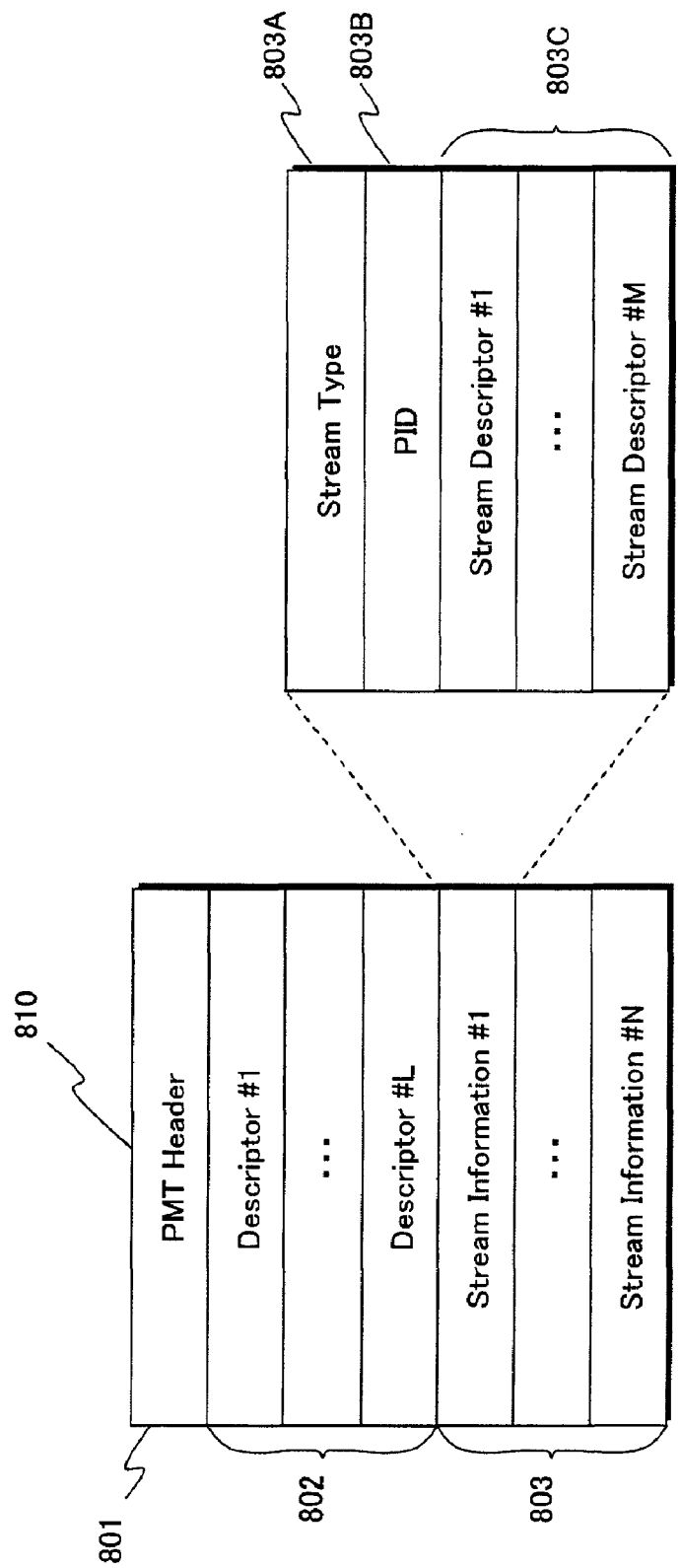
FIG. 8 is a schematic diagram showing the data structure of a PMT.

FIG. 8 is a schematic diagram showing the data structure of the PMT 810. The PMT 810 includes, from the top thereof, a PMT header 801, a plurality of descriptors 802, a plurality of pieces of stream information 803. The PMT header 801 indicates the length of data stored in the PMT 810. Each descriptor 802 relates to the entire AV stream file 513. The aforementioned copy control information is described in one of the descriptors 802. Each piece of stream information 803 relates to a different one of the elementary streams included in the AV stream file 513. Each piece of stream information 803 includes a stream type 803A, a PID 803B, and a stream descriptor 803C. The stream type 803A includes identification information of the codec used for compressing the elementary stream. The PID 803B indicates the PID of the elementary stream. The stream descriptor 803C includes attribute information of the elementary stream, such as a frame rate and an aspect ratio.

<<Clip Information File>>

Figure 9:
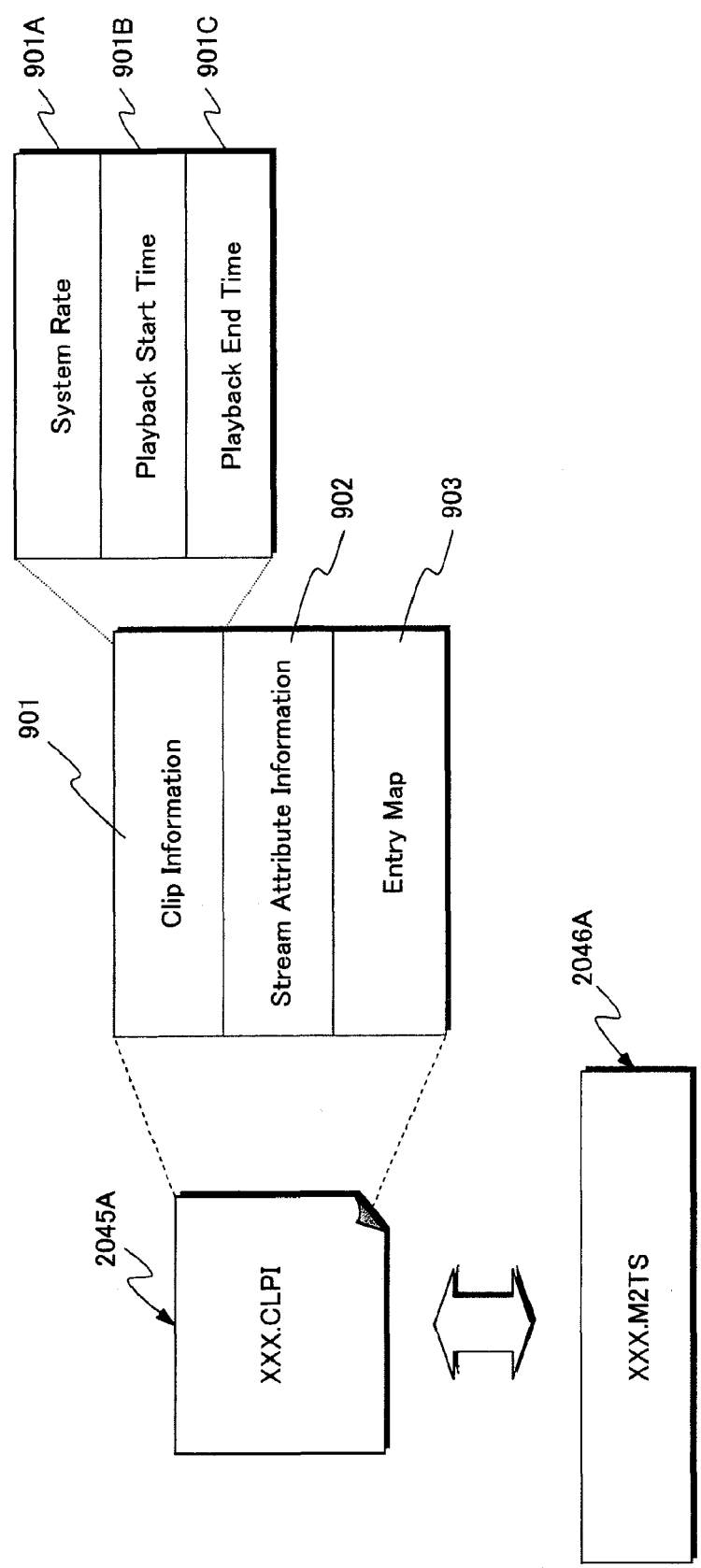
FIG. 9 is a schematic diagram showing the data structure of a clip information file shown in FIG. 2.

FIG. 9 is a schematic diagram showing the data structure of a clip information file. As shown in FIG. 9, the clip information file 2045A is in one-to-one correspondence with the AV stream file 2046A. The clip information file 2045A includes clip information 901, stream attribute information 902, and an entry map 903.

As shown in FIG. 9, the clip information 901 includes a system rate 901A, a playback start time 901B, and a playback end time 901C. The system rate 901A indicates the maximum transfer rate at which the AV stream file 2046A is transferred to the PID filter in the system target decoder, which is described later. The interval between the ATSs of the source packets in the AV stream file 2046A is set so that the transfer rate of the source packet is limited to the system rate or lower. The playback start time 901B shows the PTS of the video access unit located at the top of the AV stream file 2046A. For instance, the playback start time 901B shows the PTS of the first video frame. The playback end time 901C shows the value of the STC delayed a predetermined time from the PTS of the video access unit located at the end of the AV stream file 2046A. For instance, playback end time 901C shows the sum of PTS of the last video frame and the playback time of one frame.

Figure 10:
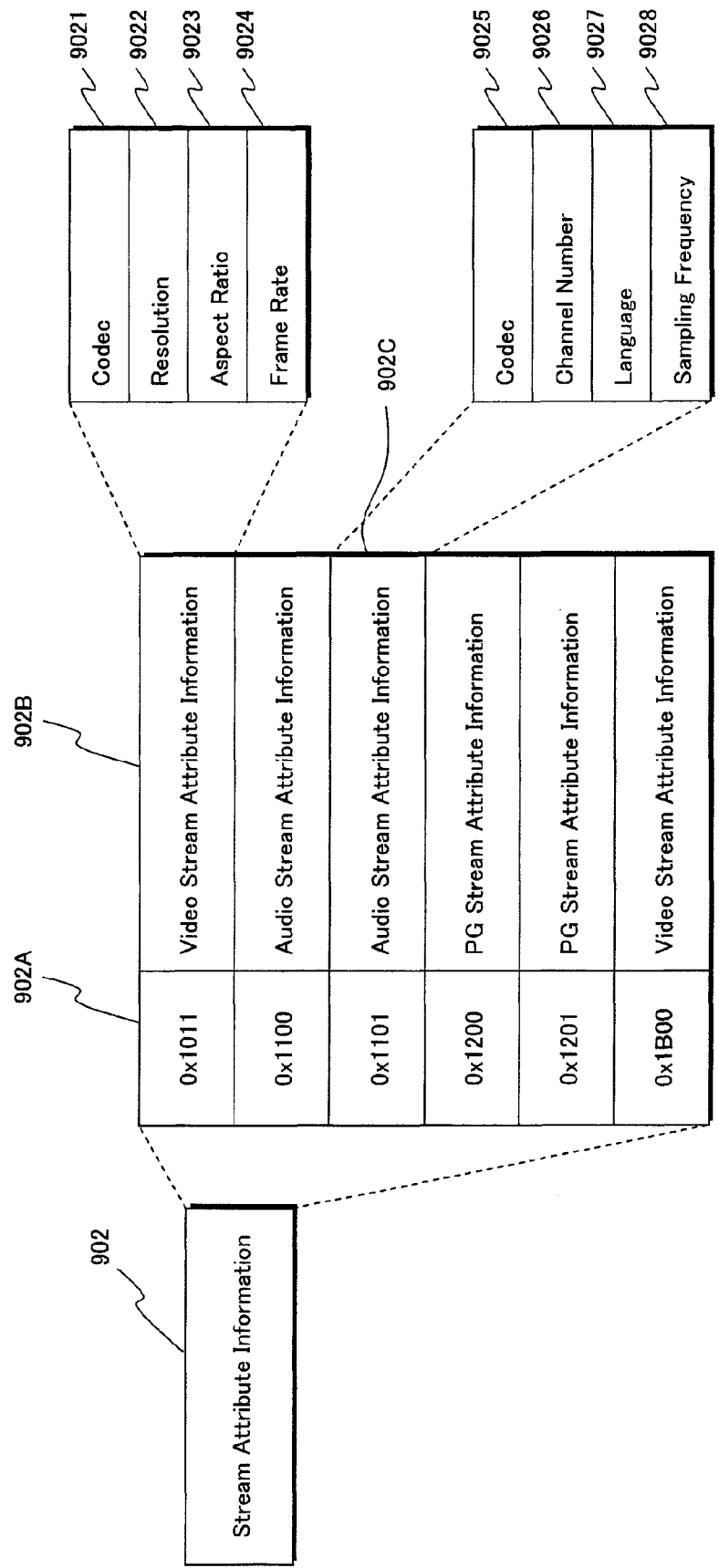
FIG. 10 is a schematic diagram showing the data structure of stream attribute information shown in FIG. 9.

FIG. 10 is a schematic diagram showing the data structure of the stream attribute information 902. As shown in FIG. 10, pieces of attribute information of the elementary streams are associated with different PIDs 902A. Each piece of attribute information is different depending on whether it corresponds to a video stream, an audio stream, a PG stream, or an IG stream. For example, each piece of attribute information 902B corresponds to a video stream and includes a codec type 9021 used for the compression of the video stream as well as a resolution 9022, an aspect ratio 9023 and a frame rate 9024 of the pictures composing the video stream. On the other hand, each piece of audio stream attribute information 902C corresponds to am audio stream and has a codec type 9025 used for compressing the audio stream, the number of channels 9026 included in the audio stream, a language 9027, and a sampling frequency 9028. These pieces of attribute information 902B and 902C are used for initializing a decoder in the playback device 102.

Figure 11A:
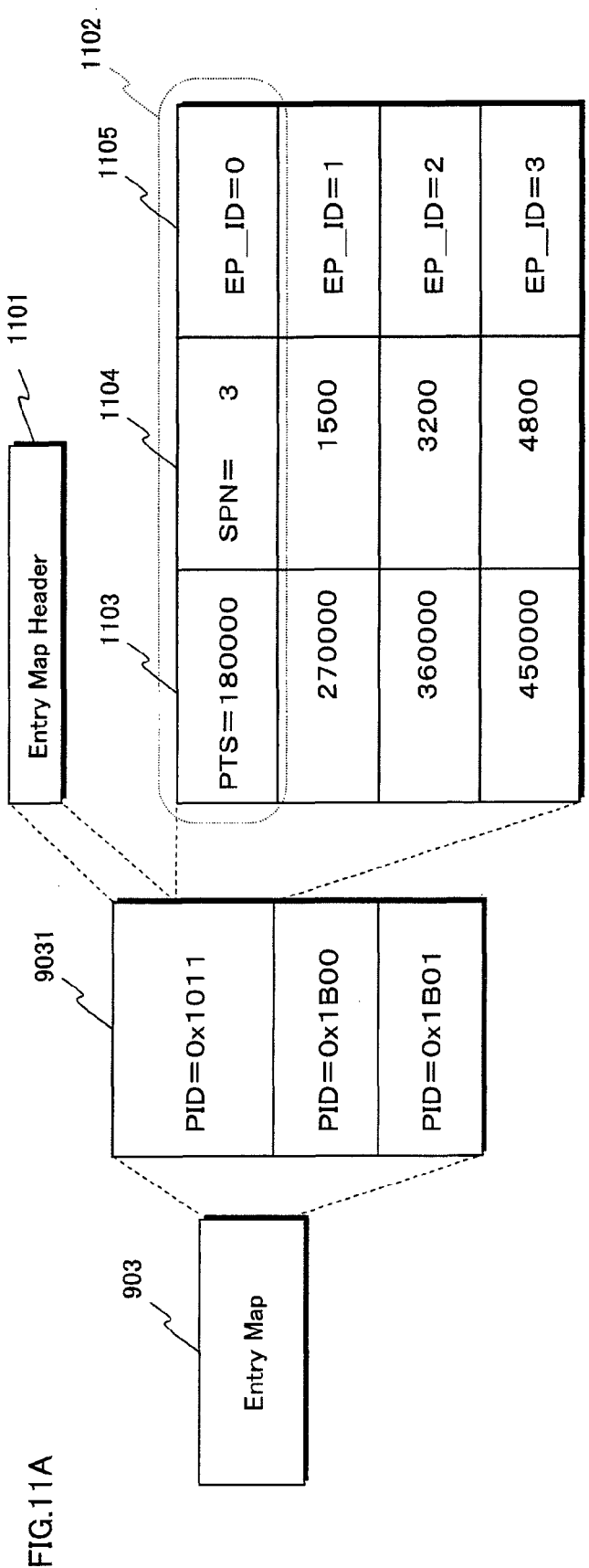
FIGS. 11A and 11B are schematic views showing the data structure of an entry map shown in FIG. 10.

FIG. 11A is a schematic diagram showing the data structure of the entry map 903. As shown in FIG. 11A, one entry map is provided for each of the video streams in the AV stream file 2046A and is associated with the PID of a corresponding video stream. The entry map 9031 of a video stream includes an entry map header 1101 and entry points 1102 in the stated order from the top. The entry map header 1101 includes the PID of the corresponding video stream and the total number of the entry points 1102. Each entry point 1102 is information showing a pair of PTS 1103 and SPN 1104 in correspondence with a different entry map ID (EP_ID) 1105. The PTS 1103 indicates a PTS of each I pictures in the video stream, and the SPN 1104 indicates the first SPN including the I picture in the AV stream file 2046.

Figure 11B:
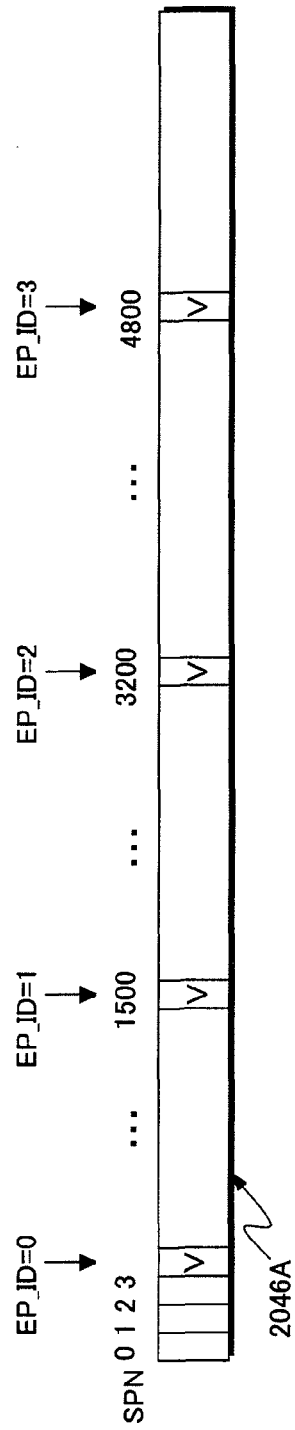

FIG. 11B schematically shows, out of the source packets included in the AV stream file 2046A, source packets whose correspondence with EP_IDs are shown by the entry map 903. With reference to the entry map 903, the playback device 102 can specify the SPN within the AV stream file 2046A corresponding to an arbitrary point during the playback of the video stream. For instance, to execute special playback such as fast-forward or rewind, the playback device 102 specifies source packets having the SPNs corresponding to the EP_IDs by using the entry map 903, and selectively extracts and decodes the source packets. As a result, the I picture can be selectively played back. Thus, the playback device 102 can efficiently perform the special playback without analyzing the AV stream file 2046A.

<<Playlist File>>

Figure 12:
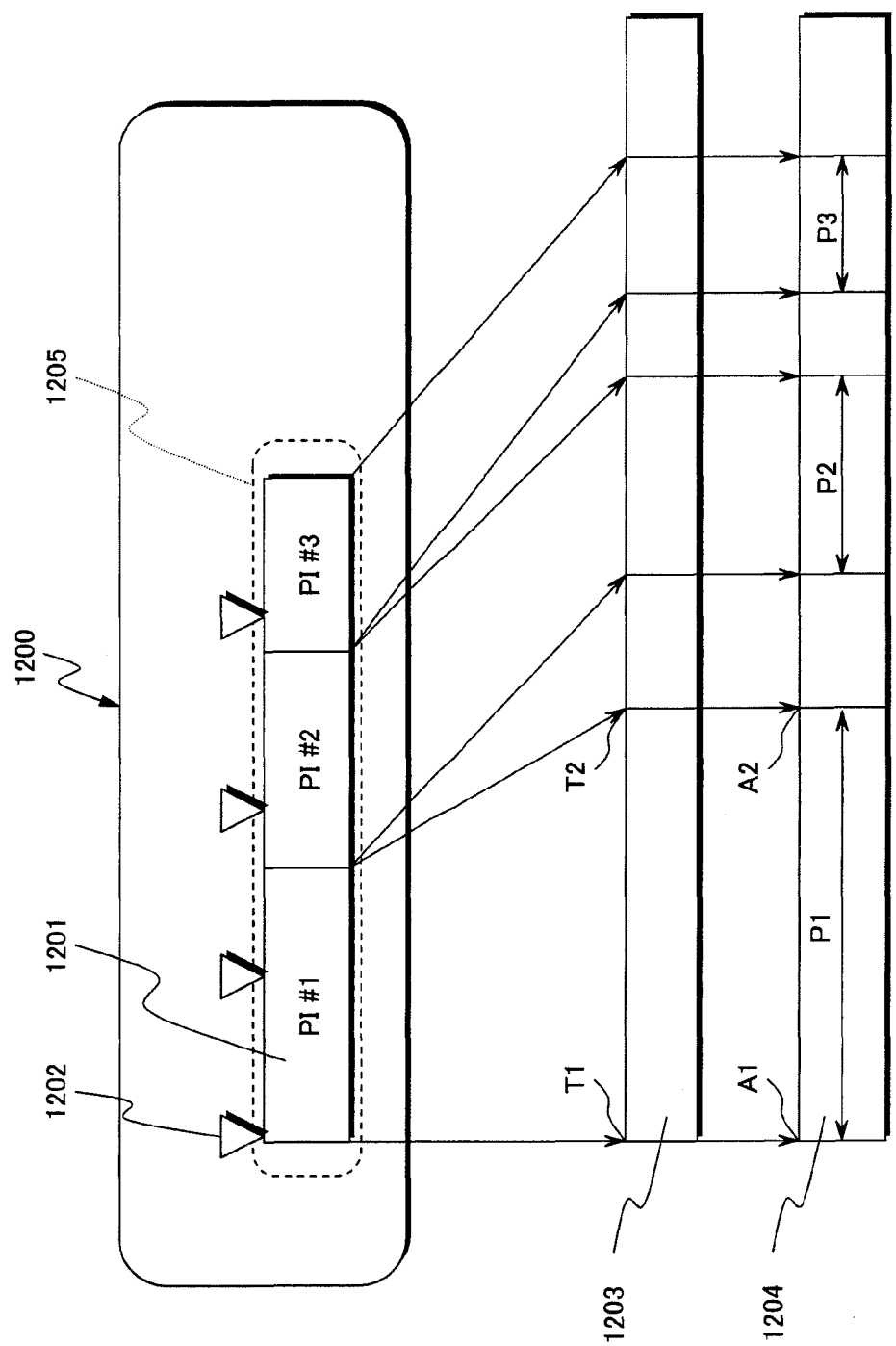
FIG. 12 is a schematic diagram showing the data structure of a playlist file shown in FIG. 2.

FIG. 12 is a schematic diagram showing the data structure of a playlist file 1200. The play list file 1200 indicates the playback path of an AV stream file 1204. More specifically, the playlist file 1200 shows portions P1, P2, and P3 to be actually decoded in the AV stream file 1204 and the decoding order of these portions P1, P2, and P3. The playlist file 1200 particularly defines with PTSs a range of each of the portions P1, P2, and P3 that are to be decoded. The defined PTS are converted to SPNs of the AV stream file 1204 using the clip information file 1203. As a result, the range of each of the portions P1, P2, and P3 is now defined with SPNs.

As shown in FIG. 12, the playlist file 1200 includes at least one piece of playitem (PI) information 1201. Each piece of playitem information 1201 defines a different one of playback sections in the playback path using a pair of PTSs respectively representing the start time T1 and the end time T2. Each piece of playitem information 1201 is identified by a playitem ID unique to the piece of playitem information 1201. The pieces of playitem information 1201 are written in the same order as the order of the corresponding playback sections in the playback path. Reversely, the playback path of a series of playback sections defined by the pieces of playitem information 1201 is referred to as a "main path" 1205.

The playlist file 1200 further includes an entry mark 1202. The entry mark 1202 shows a time point in the main path 1205 to be actually played back. The entry mark 1202 can be assigned to a playback section defined by the playitem information 1201. For example, as shown in FIG. 12, a plurality of entry marks 1202 are assigned to one piece of playitem information PI #1. The entry mark 1202 is particularly used for searching a start position of playback when random access is made. When the playlist file 1200 defines a playback path for a movie title, for instance, the entry marks 1202 may be assigned to the top of each chapter. Consequently, the playback device 102 enables the movie title to be played back starting from any of the chapters.

Figure 13:
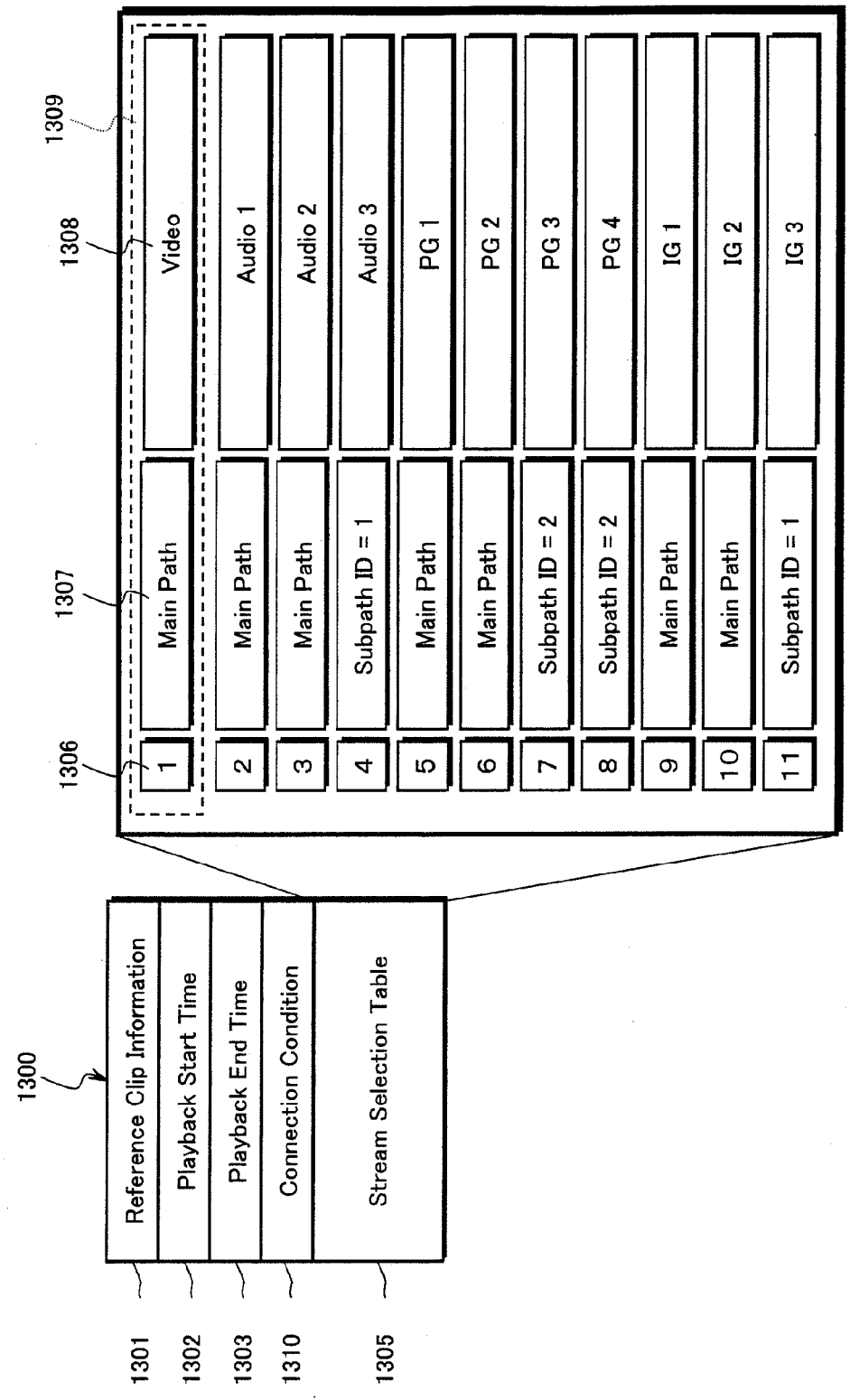
FIG. 13 is a schematic diagram showing the data structure of playitem information 1300.

FIG. 13 is a schematic diagram showing the data structure of playitem information 1300. FIG. 13 shows that the playitem information 1300 includes reference clip information 1301, a playback start time 1302, a playback end time 1303, a connection condition 1310, and a stream selection table 1305.

The reference clip information 1301 identifies a clip information file that is necessary for converting PTSs to SPNs. The playback start time 1302 and the playback end time 1303 respectively show the PTSs of the top and the end of the AV stream file to be decoded. The playback device 102 refers to the entry map from the clip information file indicated by the reference clip information 1301, and obtains SPNs respectively corresponding to the playback start time 1302 and the playback end time 1303. Thus, the playback device 102 identifies a portion of the AV stream file to start reading and plays back the AV stream starting from the identified portion.

The connection condition 1310 specifies a condition for connecting video images to be played back between the playback section defined by a pair of playback start time 1302 and playback end time 1303 and the playback section specified by the previous piece of playitem information in the playlist file. The connection condition 1310 has three types, "1", "5", and "6", for example. When the connection condition 1310 indicates "1", the video images to be played back from the portion of the AV stream file specified by the piece of playitem information does not need to be seamlessly connected with the video images to be played back from the portion of the AV stream file specified by the previous piece of playitem information. On the other hand, when the connection condition 1310 indicates "5" or "6", both the video images to be played back need to be seamlessly connected with each other.

Figure 14A:
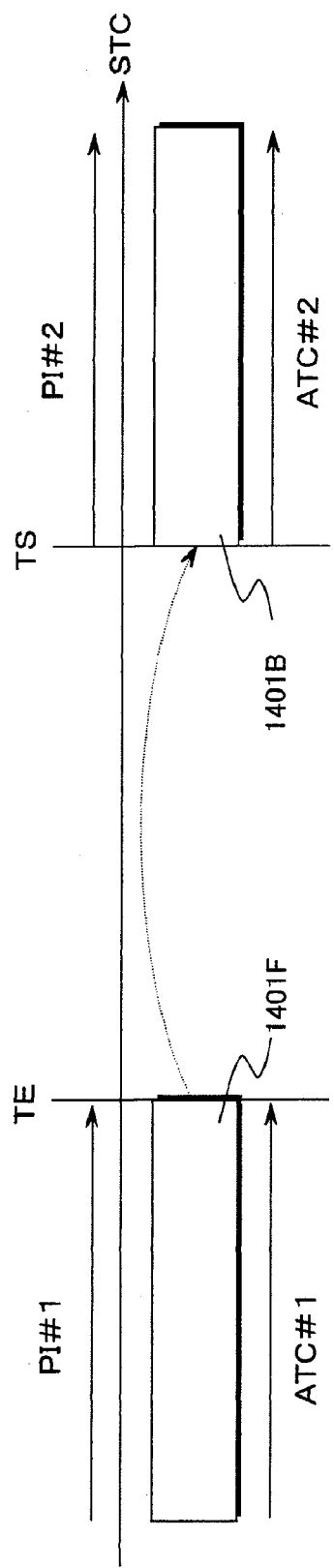
FIGS. 14A and 14B are schematic views showing the relationship between playback sections specified by the playitem information to be connected when the connection condition 1310 indicates "5" and "6", respectively.
Figure 14B:
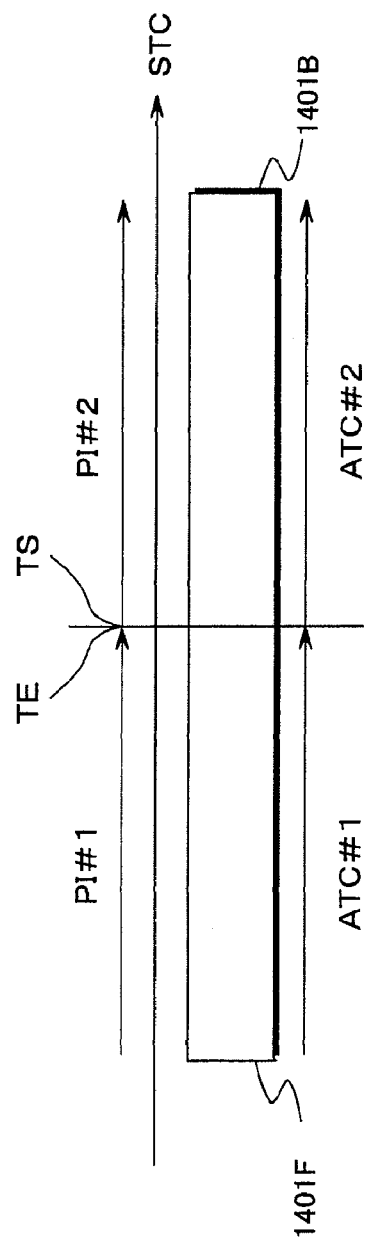

FIGS. 14A and 14B each schematically show the relationships between playback sections defined by the playitem information to be connected when the connection condition 1310 indicates "5" or "6". When the connection condition 1310 indicates "5", as shown in FIG. 14A, the STCs of two pieces of playitem information PI#1 and PI#2 may be inconsecutive. That is, PTS TE at the end of the first AV stream file 1401F defined by the preceding first playitem information PI#1 and PTS TS at the top of the second AV stream file 1401B defined by the following second playitem information PI#2 may be inconsecutive. Note that, in this case, several constraint conditions must be satisfied. For example, when the second AV stream file 1401B is supplied to a decoder subsequently to the first AV stream file 1401F, each of the AV stream files needs to be created so that the decoder can smoothly decodes the file. Furthermore, the last frame of the audio stream contained in the first AV stream file must overlap the first frame of the audio stream contained in the second AV stream file. On the other hand, when the connection condition 1310 indicates "6", as shown in FIG. 14B, the first AV stream file 1402F and the second AV stream file 1402B must be handled as a series of AV stream files, in order to allow the decoder to duly perform the decode processing. That is, STCs and ATCs must be consecutive between the first AV stream file 1402F and the second AV stream file 1402B.

Referring to FIG. 13 again, the stream selection table 1305 shows a list of elementary streams that the decoder in the playback device 102 can select from the AV stream file during the time between the playback start time 1302 and the playback end time 1303. The stream selection table 1305 particularly includes a plurality of stream entries 1309. Each of the stream entries 1309 includes a stream selection number 1306, stream path information 1307, and stream identification information 1308 of a corresponding elementary stream. The stream selection numbers 1306 are serial numbers assigned to the stream entries 1309, and used by the playback device 102 to identify the elementary streams. Each piece of stream path information 1307 shows an AV stream file to which an elementary stream to be selected belongs. For example, if the stream path information 1307 shows "main path", the AV stream file corresponds to the clip information file indicated by the reference clip information 1301. If the stream path information 1307 shows "subpath ID=1", the AV stream file to which the elementary stream to be selected is an AV stream defined by a piece of sub-playitem information included in the subpath whose subpath ID=1. The sub-playitem information piece defines a playback section that falls between the playback start time 1302 and the playback end time 1303. Note that the subpath and the sub-playitem information are descried in the next section of this specification. Each piece of stream identification information 1308 indicates the PID of a corresponding one of the elementary streams multiplexed in an AV stream file specified by the stream path information 1307. The elementary streams indicated by the PIDs are selectable during the time between the playback start time 1302 and the playback end time 1303. Although not shown in FIG. 13, each piece of stream entry 1309 also contains attribute information of a corresponding elementary stream. For example, the attribute information of an audio stream, a PG stream, and an IG stream indicates a language type of the stream.

Figure 15:
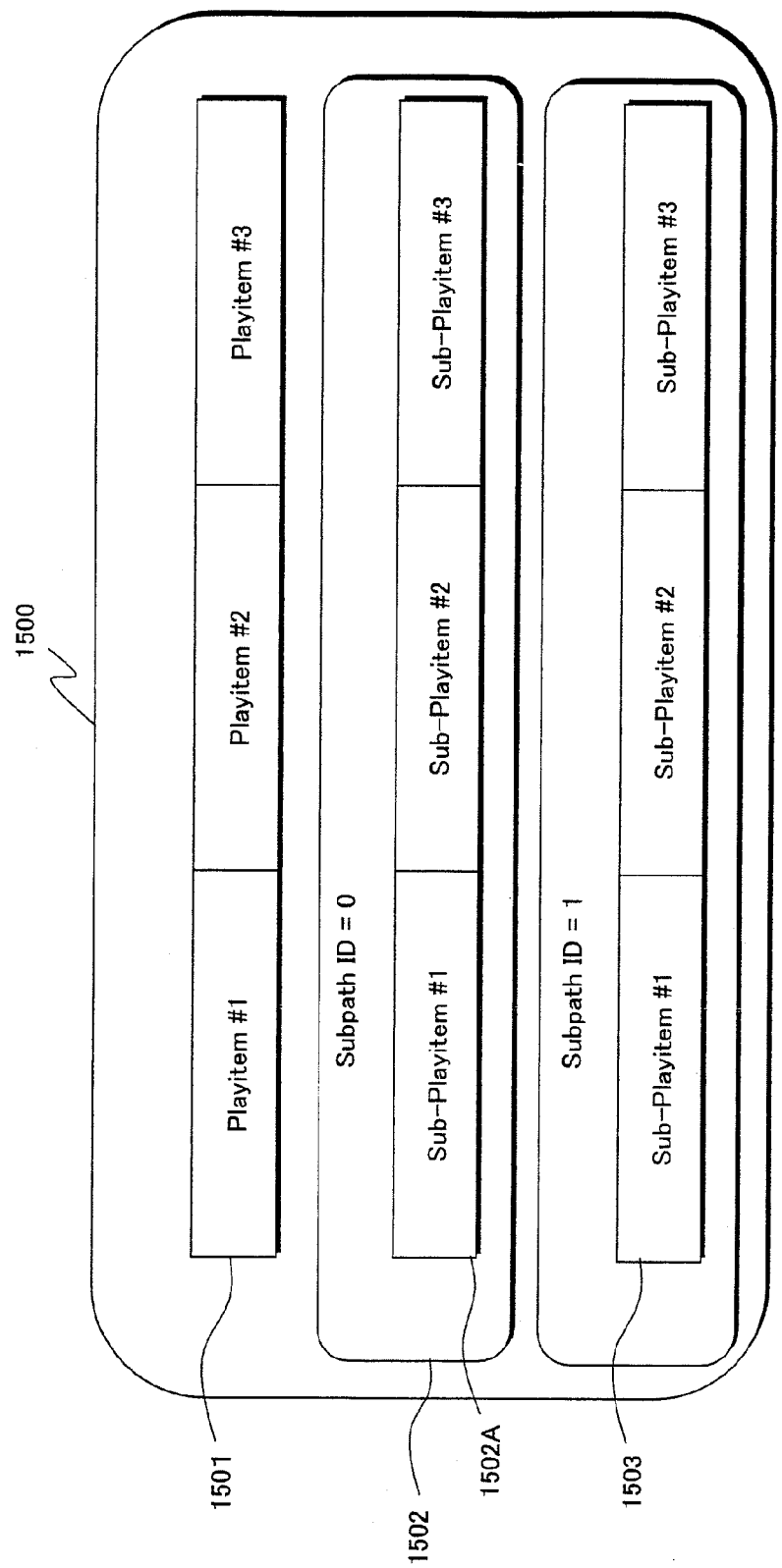
FIG. 15 is a schematic diagram showing the data structure of a playlist file when the playback path to be specified includes subpaths.

FIG. 15 is a schematic diagram showing the data structure of a playlist file 1500 when the playback path to be defined includes subpaths. As shown in FIG. 15, the playlist file 1500 may include one or more subpaths in addition to the main path 1501. Subpaths 1502 and 1503 are each a playback path parallel to the main path 1501. The serial numbers are assigned to the subpaths 1502 and 1503 in the order they are registered in the playlist file 1500. The serial numbers are each used as a subpath ID for identifying the subpath. Similarly to the main path 1501 that is a playback path of a series of playback sections defined by the pieces of playitem information #1-3, each of the subpaths 1502 and 1503 is a playback path of a series of playback sections defined by sub-playitem information #1-3. The data structure of the sub-playitem information 1502A is identical with the data structure of the playitem information shown in FIG. 13. That is, each piece of sub-playitem information 1502A includes reference clip information, a playback start time, and a playback end time. The playback start time and the playback end time of the sub-playitem information are expressed on the same time axis as the playback time of the main path 1501. For example, in the stream entry 1309 included in the stream selection table 1305 of the playitem information #2, assume that the stream path information 1307 indicates "subpath ID=0", and the stream identification information 1308 indicates the PG stream #1. Then, in the subpath 1502 with subpath ID=0, for the playback section of the playitem information #2, the PG stream #1 is selected as the decode target from an AV stream file corresponding to the clip information file shown by the reference clip information of the sub-playitem information #2.

Furthermore, the sub-playitem information includes a field called an SP connection condition. The SP connection condition carries the same meaning as a connection condition of the playitem information. That is, when the SP connection condition indicates "5" or "6", each portion of the AV stream file defined by two adjacent pieces of sub-playitem information needs to satisfy the same condition as the condition described above.

<Configuration of 2D Playback Device>

Next, the configuration for the playback device 102 to play back 2D video images from the BD-ROM disc 101, i.e., the configuration of a 2D playback device will be described below.

FIG. 16 is a functional block diagram showing a 2D playback device 1600. The 2D playback device 1600 has a BD-ROM drive 1601, a playback unit 1600A, and a control unit 1600B. The playback unit 1600A has a read buffer 1602, a system target decoder 1603, and a plane adder 1610. The control unit 1600B has a dynamic scenario memory 1604, a static scenario memory 1605, a program execution unit 1606, a playback control unit 1607, a player variable storage unit 1608, and a user event processing unit 1609. The playback unit 1600A and the control unit 1600B are each implemented on a different integrated circuit. Alternatively, the playback unit 1600A and the control unit 1600B may also be implemented on a single integrated circuit.

When the BD-ROM disc 101 is loaded into the BD-ROM drive 1601, the BD-ROM drive 1601 radiates laser light to the disc 101, and detects change in light reflected from the disc 101. Furthermore, using the change in the amount of reflected light, the BD-ROM drive 1601 reads data recorded on the disc 101. The BD-ROM drive 1601 has an optical head, for example. The optical head has a semiconductor laser, a collimate lens, a beam splitter, an objective lens, a collecting lens, and an optical detector. A beam of light radiated from the semiconductor laser sequentially passes the collimate lens, the beam splitter, and the objective lens to be collected on a recording layer of the BD-ROM disc 101. The collected beam is reflected and diffracted by the recording layer. The reflected and diffracted light passes the objective lens, the beam splitter, and the collecting lens, and is collected onto the optical detector. As a result, a playback signal is generated at a level in accordance with the intensity of the collected light, and the data is decoded using the playback signal.

The BD-ROM drive 1601 reads data from the BD-ROM disc 101 based on a request from the playback control unit 1607. Out of the read data, an AV stream file is transferred to the read buffer 1602, a playlist file and a clip information file are transferred to the static scenario memory 1605, and an index file, a movie object file and a BD-J object file are transferred to the dynamic scenario memory 1604.

The read buffer 1602, the dynamic scenario memory 1604, and the static scenario memory 1605 are each a buffer memory. A memory device in the playback unit 1600A is used as the read buffer 1602. Memory devices in the control unit 1600B are used as the dynamic scenario memory 1604 and the static scenario memory 1605. In addition, different areas in a single memory device may be used as these memories 1602, 1604 and 1605. The read buffer 1602 stores therein an AV stream file. The static scenario memory 1605 stores therein a playlist file and a clip information file, namely static scenario information. The dynamic scenario memory 1604 stores therein dynamic scenario information, such as an index file, a movie object file, and a BD-J object file.

The system target decoder 1603 reads an AV stream file from the read buffer 1602 in units of source packets and demultiplexes the AV stream file. The system target decoder 1603 then decodes each of elementary streams obtained by the demultiplexing. Information necessary for decoding each elementary stream, such as the type of a codec and attribute of the stream, is transferred from the playback control unit 1607 to the system target decoder 1603. The system target decoder 1603 outputs a primary video stream, a secondary video stream, an IG stream, and a PG stream that have been decoded in video access units. The output data are used as primary video plane data, secondary video plane data, IG plane data, and PG plane data, respectively. On the other hand, the system target decoder 1603 mixes the decoded primary audio stream and secondary audio stream and outputs the resultant data to an audio output device, such as an internal speaker 103A of a display device. In addition, the system target decoder 1603 receives graphics data from the program execution unit 1606. The graphics data is used for rendering graphics such as a GUI menu on a screen, and is in a raster data format such as JPEG and PNG. The system target decoder 1603 processes the graphics data and outputs the data as image plane data. Details of the system target decoder 1603 will be described below.

The user event processing unit 1609 detects a user operation via the remote control 104 and a front panel of the playback device 102. Based on the user operation, the user event processing unit 1609 requests the program execution unit 1606 or the playback control unit 1607 to perform a relevant process. For example, when a user instructs to display a pop-up menu by pushing a button on the remote control 104, the user event processing unit 1609 detects the push, and identifies the button. The user event processing unit 1609 further requests the program execution unit 1606 to execute a command corresponding to the button, which is a command to display the pop-up menu. On the other hand, when a user pushes a fast-forward or a rewind button on the remote control 104, for example, the user event processing unit 1609 detects the push, and identifies the button. In addition, the user event processing unit 1609 requests the playback control unit 1607 to fast-forward or rewind the playback being currently executed according to a playlist.

The playback control unit 1607 controls transfer of files, such as an AV stream file and an index file, from the BD-ROM disc 101 to the read buffer 1602, the dynamic scenario memory 1604, and the static scenario memory 1605. A file system managing the directory file structure 204 shown in FIG. 2 is used for this control. That is, the playback control unit 1607 causes the BD-ROM drive to transfer the files to each of the memories 1602, 1604 and 1605 using a system call for opening files. The file opening is composed of a series of the following processes. First, a file name to be detected is provided to the file system by a system call, and an attempt is made to detect the file name from the directory/file structure 204. When the detection is successful, a content of a file entry of the target file is transferred to a memory of the playback control unit 1607, and FCB (File Control Block) is generated in the memory. Subsequently, a file handle of the target file is returned from the file system to the playback control unit 1607. After this, the playback control unit 1607 can transfer the target file from the BD-ROM disc 101 to each of the memories 1602, 1604 and 1605 by showing the file handle to the BD-ROM drive.

The playback control unit 1607 decodes the AV stream file to output video data and audio data by controlling the BD-ROM drive 1601 and the system target decoder 1603. More specifically, the playback control unit 1607 reads a playlist file from the static scenario memory 1605 in response to an instruction from the program execution unit 1606 or a request from the user event processing unit 1609, and interprets the content of the file. In accordance with the interpreted content, particularly with the playback path, the playback control unit 1607 specifies an AV stream to be played back, and instructs the BD-ROM drive 1601 and the system target decoder 1603 to read and decode the AV stream to be played back. Such playback processing based on a playlist file is called playlist playback. In addition, the playback control unit 1607 sets various types of player variables in the player variable storage unit 1608 using the static scenario information. With reference to the player variables, the playback control unit 1607 specifies an elementary stream to be decoded, and provides the system target decoder 1603 with information necessary for decoding the elementary streams.

The player variable storage unit 1608 is composed of a group of registers for storing player variables. The player variables include system parameters (SPRM) showing the status of the player 102, and general parameters (GPRM) for general use. FIG. 17 is a list of SPRM. Each SPRM is assigned a serial number 1701, and each serial number 1701 is associated with a variable value 1702. The contents of major SPRM are shown below. Here, the bracketed numbers indicate the serial numbers.

SPRM (0): Language code
SPRM (1): Primary audio stream number
SPRM (2): Subtitle stream number
SPRM (3): Angle number
SPRM (4): Title number
SPRM (5): Chapter number
SPRM (6): Program number
SPRM (7): Cell number
SPRM (8): Selected key name
SPRM (9): Navigation timer
SPRM (10): Current playback time
SPRM (11): Player audio mixing mode for Karaoke
SPRM (12): Country code for parental management
SPRM (13): Parental level
SPRM (14): Player configuration for video
SPRM (15): Player configuration for audio
SPRM (16): Language code for audio stream
SPRM (17): Language code extension for audio stream
SPRM (18): Language code for subtitle stream
SPRM (19): Language code extension for subtitle stream
SPRM (20): Player region code
SPRM (21): Secondary video stream number
SPRM (22): Secondary audio stream number
SPRM (23): Player status
SPRM (24): Reserved
SPRM (25): Reserved
SPRM (26): Reserved
SPRM (27): Reserved
SPRM (28): Reserved
SPRM (29): Reserved
SPRM (30): Reserved
SPRM (31): Reserved The SPRM (10) is the PTS of the picture being currently being decoded, and is updated every time the picture is decoded and written into the primary video plane memory. Accordingly, the current playback point can be known by referring to the SPRM (10).

The language code for the audio stream of the SPRM (16) and the language code for the subtitle stream of the SPRM (18) show default language codes of the player. These codes may be changed by a user with use of the OSD (On Screen Display) of the player 102 or the like, or may be changed by an application program via the program execution unit 1606. For example, if the SPRM (16) shows "English", in playback processing of a playlist, the playback control unit 1607 first searches the stream selection table in the playitem information for a stream entry having the language code for "English". The playback control unit 1607 then extracts the PID from the stream identification information of the stream entry and transmits the extracted PID to the system target decoder 1603. As a result, an audio stream having the same PID is selected and decoded by the system target decoder 1603. These processing can be executed by the playback control unit 1607 with use of the movie object file or the BD-J object file.

During playback processing, the playback control unit 1607 updates the player variables in accordance with the status of the playback. The playback control unit 1607 updates the SPRM (1), the SPRM (2), the SPRM (21) and the SPRM (22) in particular. These SPRM respectively show, in the stated order, the stream selection numbers of the audio stream, the subtitle stream, the secondary video stream, and the secondary audio stream which are currently being processed. As one example, assume that the audio stream number SPRM (1) has been changed by the program execution unit 1606. In this case, the playback control unit 1607 first searches the stream selection table in the playitem information currently being played back for a stream entry including a stream selection number that matches the stream selection number shown by the changed SPRM (1). The playback control unit 1607 then extracts the PID from the stream identification in the stream entry and transmits the extracted PID to the system target decoder 1603. As a result, the audio stream having the same PID is selected and decoded by the system target decoder 1603. This is how the audio stream targeted for playback is switched. The subtitle stream and the secondary video stream to be played back can be switched in a similar manner.

The playback execution unit 1606 is a processor and executes programs stored in the movie object file or the BD-J object file. The playback execution unit 1606 executes the following controls in particular in accordance with the programs. (1) The playback execution unit 1606 instructs the playback control unit 1607 to perform playlist playback processing. (2) The playback execution unit 1607 generates graphics data for a menu or a game as PNG or JPEG raster data, and transfers the generated data to the system target decoder 1603 to be composited with other video data. Specific contents of these controls can be designed relatively flexibly through program designing. That is, the contents of the controls are determined by the programming procedure of the movie object file and the BD-J object file in the authoring procedure of the BD-ROM disc 101.

The plane adder 1610 receives primary video plane data, secondary video plane data, IG plane data, PG plane data, and image plane data from the system target decoder 1603, and composites these data into a video frame or a field by superimposition. The resultant composited video data is outputted to the display device 103 and displayed on a screen thereof.

<<Structure of System Target Decoder>>

Figure 18:
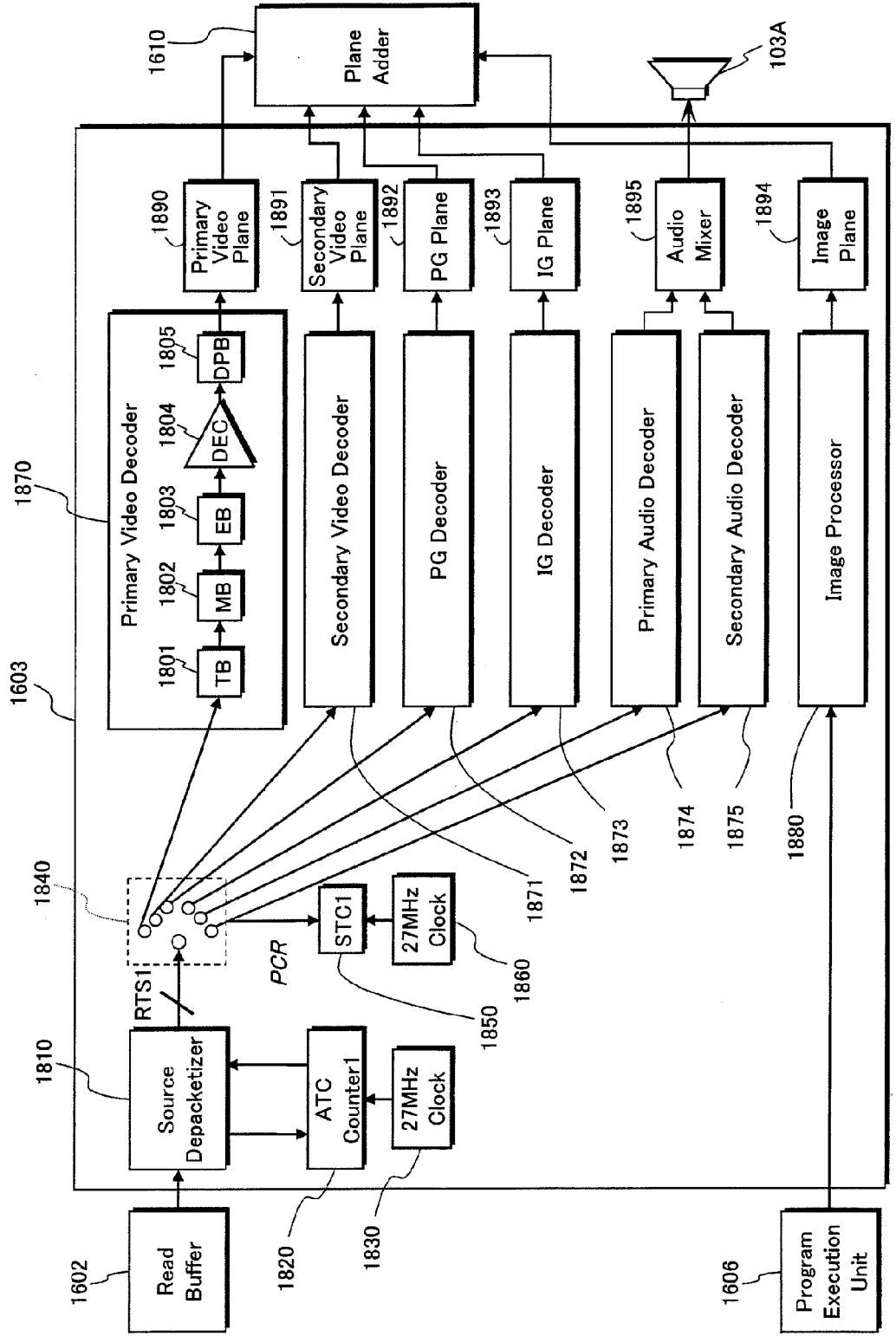
FIG. 18 is a functional block diagram of a system target decoder shown in FIG. 16.

FIG. 18 is a functional block diagram of the system target decoder 1603. As shown in FIG. 18, the system target decoder 1603 includes a source depacketizer 1810, an ATC counter 1820, a first 27 MHz clock 1830, a PID filter 1840, an STC counter (STC1) 1850, a second 27 MHz clock 1860, a primary video decoder 1870, a secondary video decoder 1871, a PG decoder 1872, an IG decoder 1873, a primary audio decoder 1874, a secondary audio decoder 1875, an image processor 1880, a primary video plane memory 1890, a secondary video plane memory 1891, a PG plane memory 1892, an IG plane memory 1893, an image plane memory 1894, and an audio mixer 1895.

The source depacketizer 1810 reads source packets from the read buffer 1602, extracts the TS packets from the read source packets, and transfers the TS packets to the PID filter 1840. The source depacketizer 1810 further adjusts the time of the transfer in accordance with the ATS of each source packet. Specifically, the source depacketizer 1810 first monitors the value of the ATC generated by the ATC counter 182. Here, the value of the ATC is a value of the ATC counter 1820, and is incremented in accordance with a pulse of the clock signal of the first 27 MHz clock 1830. Subsequently, at the instant the value of the ATC and the ATS of a source packet are identical, the source depacketizer 1810 transfers the TS packet extracted from the source packet to the PID filter 1840 at the recording rate $R_{TS1}$ of the AV stream file.

The PID filter 1840 first selects, from among the TS packets outputted from the source depacketizer 1810, TS packets which have a PID that matches a PID pre-specified by the playback control unit 1607. The PID filter 1840 then transfers the selected TS packets to the decoders 1870-1875 depending on the PID of the TS packets. For instance, a TS packet with PID 0x1011 is transferred to the primary video decoder 1870, TS packets with PIDs ranging from 0x1B00 to 0x1B1F, 0x1100 to 0x111F, 0x1A00 to 0x1A1F, 0x1200 to 0x121F, and 0x1400 to 0x141F are transferred to the secondary video decoder 1871, the primary audio decoder 1874, the secondary audio decoder 1875, the PG decoder 1872, and the IG decoder 1873, respectively.

The PID filter 1840 further detects PCR from each TS packet using the PID of the TS packet. In this case, the PID filter 1840 sets the value of the STC counter 1850 to a predetermined value. Herein, the value of the STC counter 1850 is incremented in accordance with a pulse of the clock signal of the second 27 MHz clock 1860. In addition, the value to which the STC counter 1850 is set to is instructed to the PID filter 1840 from the playback control unit 1607 in advance. The decoders 1871-1875 each use the value of the STC counter 1850 as STC. That is, the decoders 1871-1875 perform decoding processing on the TS packets outputted from the PID filter 1840 at the time indicated by the PTS or the DTS shown by the TS packets.

The primary video decoder 1870, as shown in FIG. 18, includes a TB (Transport Stream Buffer) 1801, an MB (Multiplexing Buffer) 1802, an EP (Elementary Stream Buffer) 1803, a compressed video decoder (Dec) 1804, and a DPB (Decoded Picture Buffer) 1805. The TB 1801, the MB 1802, the EB 1803, and the DPB 1805 each are buffer memory, and use an area of a memory device internally provided in the primary video decoder 1807. Some or all of the TB 1801, the MB 1802, the EB 1803, and the DPB 1805 may be separated in different memory devices. The TB 1801 stores the TS packets received from the PID filter 1840 as they are. The MB 1802 stores PES packets reconstructed from the TS packets stored in the TB 1801. Note that when the TS packets are transferred from the TB 1801 to the MB 1802, the TS header is removed from each TS packet. The EB 1803 extracts an encoded video access unit from the PES packets and stores the extracted encoded video access unit therein. The video access unit includes compressed pictures, i.e., I picture, B picture, and P picture. Note that when data is transferred from the MB 1802 to the EB 1803, the PES header is removed from each PES packet. The compressed video decoder 1804 decodes each video access unit in the MB 1802 at the time of the DTS shown by the original TS packet. Herein, the compressed video decoder 1804 changes a decoding scheme in accordance with the compression encoding formats, e.g., MPEG-2, MPEG4AVC, and VC1, and the stream attribute of the compressed pictures stored in the video access unit. The compressed video decoder 1804 further transfers the decoded pictures, i.e., video data of a frame or a field, to the DPB 1805. The DPB 1805 temporarily stores the decoded pictures. When decoding a P picture or a B picture, the compressed video decoder 1804 refers to the decoded pictures stored in the DPB 1805. The DPB 1805 further writes each of the stored pictures into the primary video plane memory 1890 at the time of the PTS shown by the original TS packet.

The secondary video decoder 1871 has the same structure as the primary video decoder 1870. The secondary video decoder 1871 first decodes the TS packets of the secondary video stream received from the PID filter 1840, into uncompressed pictures. Subsequently, the secondary video decoder 1871 writes the resultant uncompressed pictures into the secondary video plane memory 1891 at the time of the PTS shown by the TS packet.

The PG decoder 1872 decodes the TS packets received from the PID filter 1840 into uncompressed graphics data, and writes the resultant uncompressed graphics data to the PG plane 1892 at the time of the PTS shown by the TS packet.

The IG decoder 1873 decodes the TS packets received from the PID filter 1840 into uncompressed graphics data, and writes the resultant uncompressed graphics data to the IG plane 1893 at the time of the PTS shown by the TS packet.

The primary audio decoder 1874 first stores the TS packets received from the PID filter 1840 into a buffer provided therein. Subsequently, the primary audio decoder 1874 removes the TS header and the PES header from each TS packet in the buffer, and decodes the remaining data into uncompressed LPCM audio data. The primary audio decoder 1874 further outputs the resultant audio data to the audio mixer 1895 at the time of the PTS shown by the original TS packet. The primary audio decoder 1874 changes a decoding scheme of the uncompressed audio data in accordance with the compression encoding formats, e.g., Dolby Digital Plus and DTS-HD LBR, and the stream attribute, of the primary audio stream, included in the TS packets.

The secondary audio decoder 1875 has the same structure as the primary audio decoder 1874. The secondary audio decoder 1875 decodes the TS packets of the secondary audio stream received from the PID filter 1840 into uncompressed LPCM audio data. Subsequently, the secondary audio decoder 1875 outputs the uncompressed LPCM audio data to the audio mixer 1895 at the time of the PTS shown by the original TS packet. The secondary audio decoder 1875 changes a decoding scheme of the uncompressed audio data in accordance with the compression encoding format, e.g., Dolby Digital Plus, DTS-HD LBR, or the like and the stream attribute, of the primary audio stream, included in the TS packets.

The audio mixer 1895 mixes (superimposes)) the uncompressed audio data outputted from the primary audio decoder 1874 and the uncompressed audio data outputted from the secondary audio decoder 1875 with each other. The audio mixer 1895 further outputs the resultant composited audio to an internal speaker 103A of the display device 103 or the like.

The image processor 1880 receives graphics data, i.e., PNG or JPEG raster data, along with the PTS thereof from the program execution unit 1606. Upon the reception of the graphics data, the image processor 1880 appropriately processes the graphics data and writes the graphics data to the image plane memory 1894 at the time of the PTS thereof.

<Physical Arrangement of AV Stream File for 2D Video on Disc>

Next, a physical arrangement of AV stream files for 2D video images when being stored onto the BD-ROM disc 101 will be described below. The arrangement allows the 2D video images to be seamlessly played back. Here, seamless playback means that video images and sounds are played back smoothly and continuously from AV stream files.

AV stream files are recorded on the BD-ROM disc 101 as data sequences with consecutive logical addresses. Here, logical addresses are substantially equivalent to physical addresses on the disc, as described above. Accordingly, when logical addresses are consecutive, the corresponding physical addresses can be considered substantially consecutive as well. In other words, the pickup of the disc drive can read data having consecutive logical addresses without seek processes. "Extents" mean, hereinafter, data sequences having consecutive logical addresses in the AV stream files.

In the volume area 202B shown in FIG. 2, an extent is generally recorded in a plurality of physically contiguous sectors. Specifically, the extent is recorded in a file recording area for storing an AV stream file in the STREAM directory area. The logical address of each extent can be known from each allocation descriptor recorded in the file entry of the same file recording area.

Figure 19:
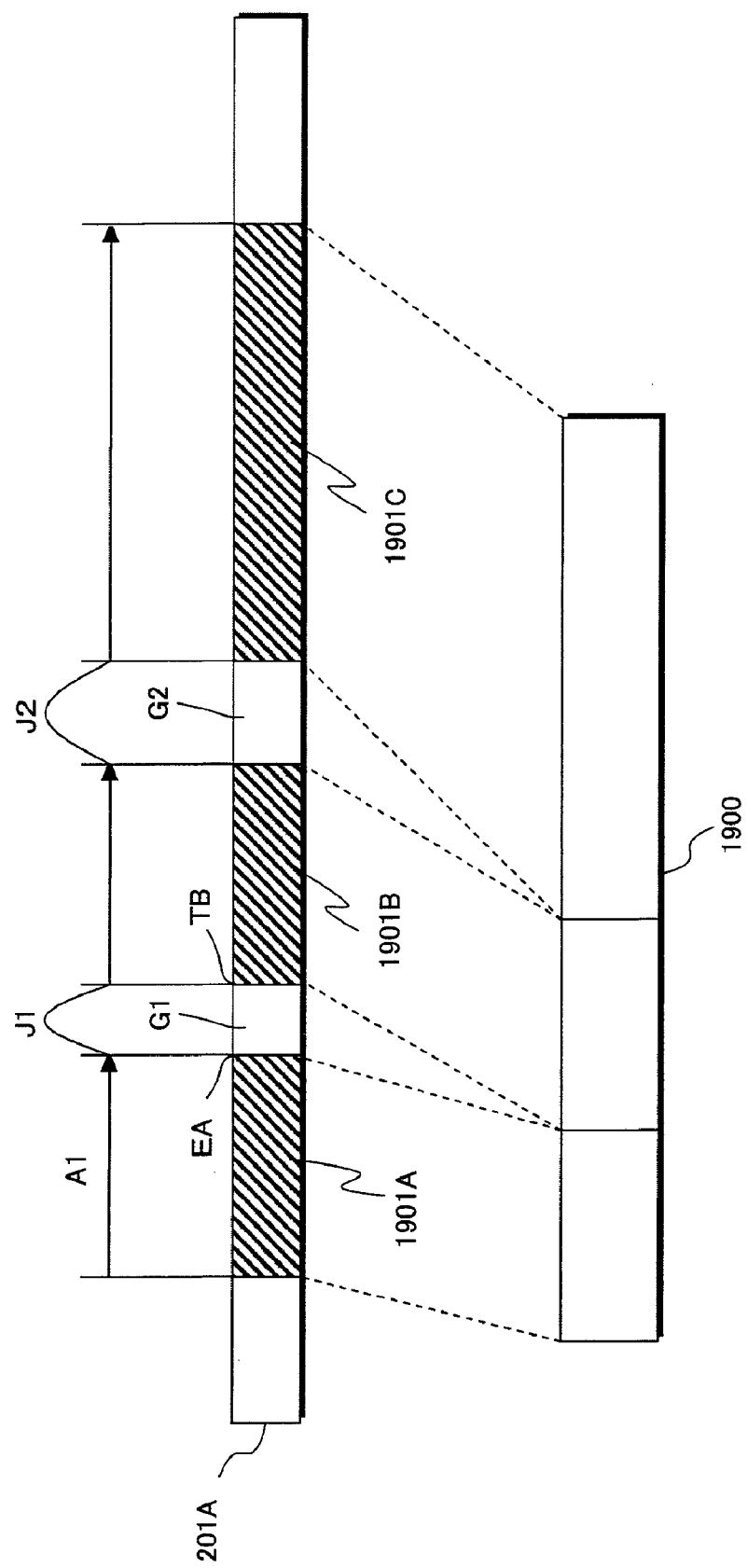
FIG. 19 is a schematic diagram showing an arrangement of extents on the disc 101 shown in FIG. 2.

FIG. 19 is a schematic diagram showing an arrangement of extents on the disc 101. In an example shown in FIG. 19, an AV stream file 1900 is divided into three extents 1901A, 1901B, and 1901C recorded on the track 201A. As shown in FIG. 19, each of the extents 1901A-C is continuously arranged, but different extents 1901A-C are not contiguously arranged, in general. Accordingly, seamlessly playing back video images from the extents 1901A-C needs the physical arrangement of the extents 1901A-C to satisfy predetermined conditions.

A group of arrows A1 shown in FIG. 19 indicates a playback path. As the arrows A1 show, when video images are played back from the AV stream file 1900, the extents 1901A, 1901B, and 1901C are sequentially read by the playback device 102. In this reading operation, the first extent 1901A has been read to its end EA, and at that time, the BD-ROM drive needs to temporarily stop the reading operation by the optical pickup, then increasing the revolving speed of the BD-ROM disc 101 to quickly move the head TB of the second extent 1901B to the location of the optical pickup. These operations of causing the optical pickup to suspend the reading operation and then position the optical pickup over the next area to be read during the suspension is referred to as a "jump". In FIG. 19, convex portions J1 and J2 in the playback path each show a period in which a jump occurs.

Jumps include a track jump and a focus jump, in addition to the operation of increasing or decreasing the revolving speed of the BD-ROM disc 101. Track jumps are operations of moving the optical pickup in a radius direction of the disc. Focus jumps are operations of moving the focus position of the optical pickup from one recording layer to another when the BD-ROM disc 101 is a multi-layer disc. These types of jumps generally cause longer seek time and a larger number of sectors skipped in reading processes, thus referred to as "long jumps". During a jump period, the optical pickup stops the reading operation. During the jump periods J1 and J2 shown in FIG. 19, data is not read from the corresponding portions G1 and G2 on the track 201A, respectively. The length of a portion skipped in a reading process during a jump period such as the portions G1 and G2 is called a jump distance. Jump distances are generally expressed by the number of sectors included in skipped portions. A long jump is specifically defined as a jump whose jump distance exceeds a predetermined threshold value. For example, the BD-ROM standards specify that the threshold value is to be 40,000 sectors in accordance with the type of the disc 101 and the reading capability of an optical disc drive.

During a jump period, the disc drive cannot read data from the BD-ROM disc 101. Thus, seamlessly playing back video images from the AV stream file 1900 needs a physical arrangement of the extents on the disc 101 to be designed in such a manner to allow the decoder 1603 to continue decoding and providing the decoded video data during jump periods.

Figure 20:
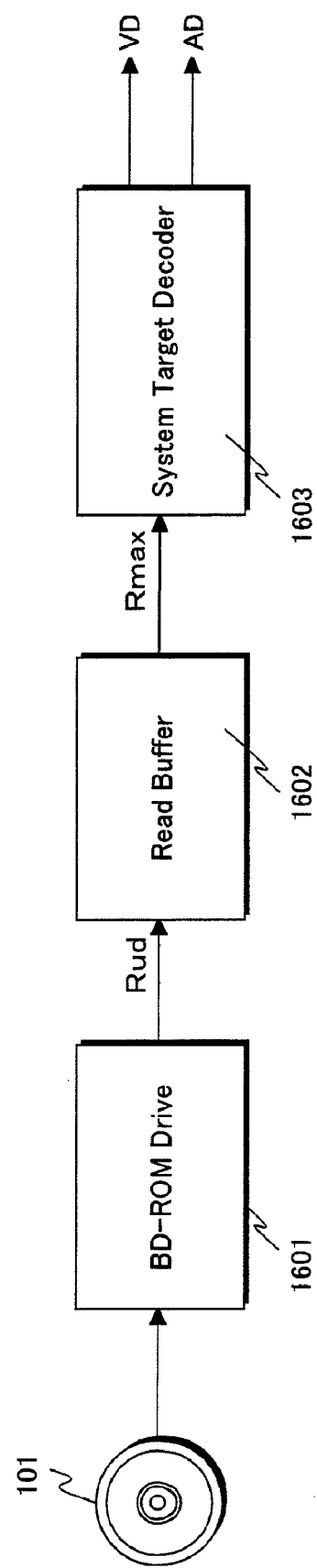
FIG. 20 is a schematic diagram showing the processing channel for converting an AV stream file read from the BD-ROM disc 101 into 2D video data VD and audio data AD in the 2D playback device shown in FIG. 16.

FIG. 20 is a schematic diagram showing the processing channel for converting an AV stream file read from the BD-ROM disc 101 into 2D video data VD and audio data AD. As shown in FIG. 20, the BD-ROM drive 1601 reads an AV stream file from the BD-ROM disc 101 and then stores the AV stream file into the read buffer 1602. The system target decoder 1603 reads the AV stream file from the read buffer 1602 and then decodes the AV stream file into video data VD and audio data AD. Here, the reference symbol $R_{ud}$ denotes the rate of reading data from the BD-ROM drive 1601 to the read buffer 1602, and the reference symbol $R_{max}$ denotes the maximum value of the data transfer rate from the read buffer 1602 to the system target decoder 1603, i.e., the system rate.

Figure 21:
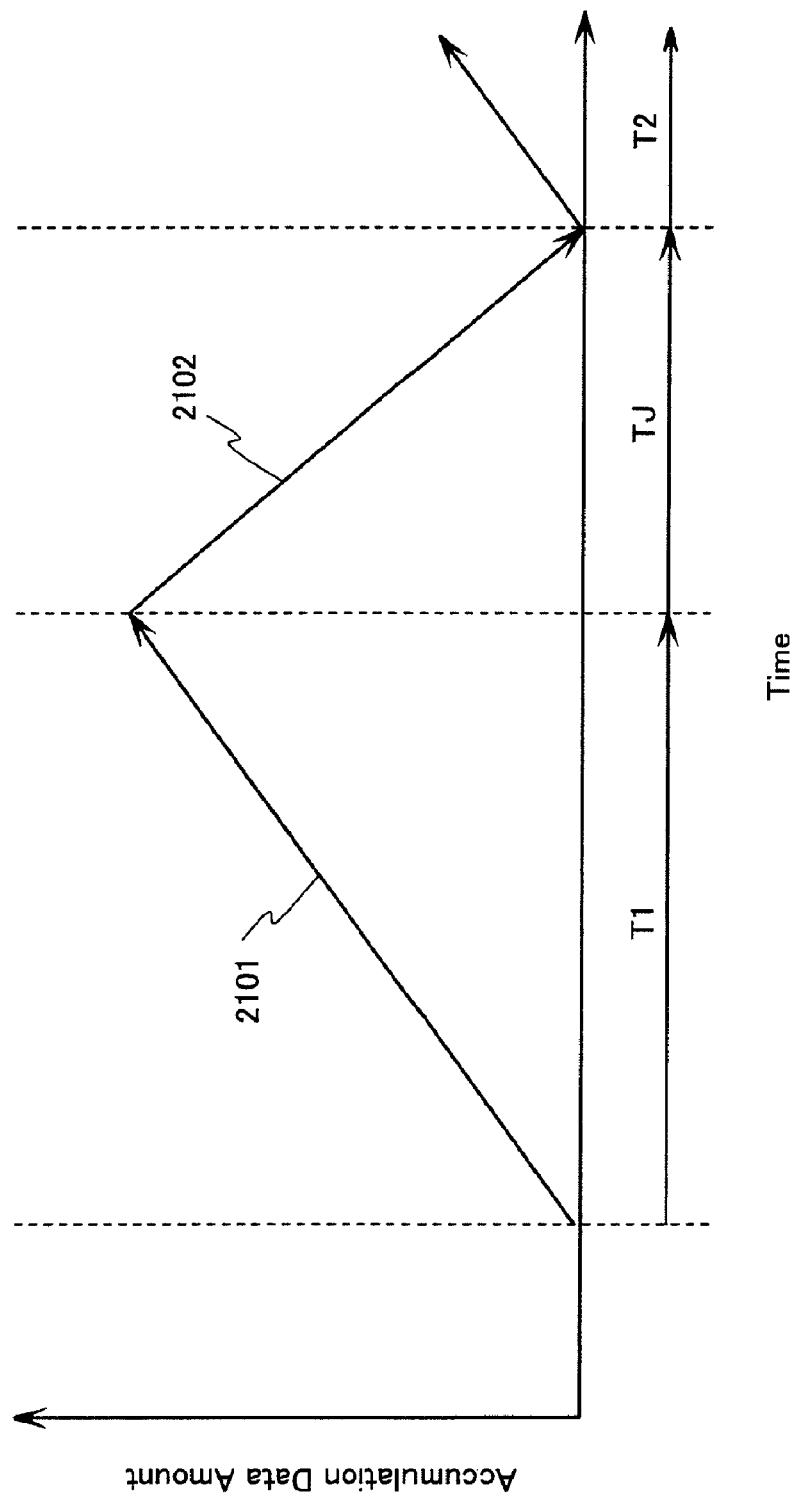
FIG. 21 is a graph showing a progression of the data amount DA accumulated in a read buffer 1602 shown in FIG. 20 during a processing period of an AV stream file.

FIG. 21 is a graph showing a progression of the data amount DA accumulated in the read buffer 1602 during a processing period of an AV stream file. During the first reading period T1 when extents are read from the BD-ROM disc 101 to the read buffer 1602, the accumulated data amount DA increases at the rate equal to the difference $R_{ud}$–$R_{ext}$ between the reading rate $R_{ud}$ and the average transfer rate $R_{ext}$, as shown by an arrow 2101 in FIG. 21. The average transfer rate $R_{ext}$ is an average value of the data transfer rate from the read buffer 1602 to the system target decoder 1603, being always equal to or lower than the system rate $R_{max}$. Note that the BD-ROM drive 1601 actually repeats reading/transfer operations on an intermittent basis. Thus, the BD-ROM drive 1601 prevents the accumulated data amount DA from exceeding the capacity of the read buffer 1602 during the first reading period T1, i.e., an overflow of the read buffer 1602. After completion of reading an extent, a jump is performed to the head of the next extent; During the jump period TJ, the reading of data from the BD-ROM disc 101 is suspended. Accordingly, the accumulated data amount DA decreases at the average transfer rate $R_{ext}$, as shown by an arrow 2102 in FIG. 21. However, if the accumulated data amount DA has been sufficiently increased during the first reading period T1, the accumulated data amount DA will not reach zero during the jump period TJ. In other words, an underflow does not occur in the read buffer 1602. As soon as the second reading period T2 for the next extent starts, the accumulated data amount DA increases again at the rate equal to the difference of the data transfer rates, i.e., $R_{ud}$–$R_{ext}$. As a result, the system target decoder 1603 can provide the video data continuously, regardless of the occurrence of the jump period TJ. Thus, video images can be seamlessly played back from the video data.

As is apparent from the above, realization of seamless playback requires the accumulated data amount DA to be sufficiently increased during the first reading period T1 immediately before the jump period TJ so that the data accumulated in the read buffer 1602 can be continuously transmitted to the system target decoder 1603 even during the period TJ when the jump is performed to the next extent. This can result in the assurance of continuous supply of video data. In order to sufficiently increase the accumulated data amount DA during the reading period T1 immediately before the jump period TJ, the size of the extent to be accessed immediately before the jump needs to be large enough. Such an extent size $S_{extent}$ can be expressed in the following equation (1):

$$S_{extent} \geq \text{CEIL}\left(\frac{1}{8} \times R_{max} \times T_{jump} \times \frac{R_{ud}}{R_{ud} - R_{max}}\right). \quad (1)$$

In Eq. (1), the extent size $S_{extent}$ is represented in units of bytes. The jump time $T_{jump}$ represents the length of the jump period TJ in units of seconds. The reading rate $R_{ud}$ represents the rate of reading data from the BD-ROM disc 101 to the read buffer 1602 in bits per second. The transfer rate $R_{ext}$ represents the average rate of transferring a portion of the AV stream file contained in the extent from the read buffer 1602 to the system target decoder 1603 in bits per second. Dividing the right-hand side of Eq. 1 by the number "8" is for converting the unit of the extent size $S_{extent}$ from bits to bytes. The function CEIL ( ) represents the operation to round up fractional numbers after the decimal point of the value in the parentheses. "Minimum extent size" means, hereinafter, the minimum value of the extent size $S_{extent}$ expressed by the right-hand side of Eq. (1).

More specifically, the above-mentioned transfer rate $R_{ext}$ is determined by the following expression: {(the number of source packets contained in the extent)×(the number of bytes per source packet=192)×8}/(extent ATC time). Here, the "extent ATC time" represents the range of the ATSs appended to the source packets contained in the extent in the value of ATC. Specifically, the extent ATC time is defined by a time period from the ATS of the first source packet in the extent to the ATS of the first source packet in the next extent. Accordingly, the extent ATC time is equal to the time required to transfer all the data contained in the extent from the read buffer 1602 to the system target decoder 1603. It may be specified that the size of each extent is to be a uniform value equal to the source packet length multiplied by a constant factor in order to correctly calculate the extent ATC time. When an extent contains a larger number of source packets than the constant factor, the extent ATC time of the extent may be estimated to be the value obtained by the following expression: (the excess number of source packets)×(the transfer time per source packet)+(the extent ATC time of an extent containing source packets equal in number to the constant factor). Alternatively, the extent ATC time may be defined as the value equal to the sum of the transfer time per source packet and the length of time from the ATS of the first source packet of the extent to the ATS of the last source packet of the same extent. In this case, the calculation of the extent ATC time can be simplified since it does not need to reference the next extent. Note that the possibility of a wraparound in the ATSs needs to be taken into account in the above-mentioned calculation.

On the other hand, the finite size of the read buffer 1602 restricts the maximum value of the jump time $T_{jump}$ allowable for seamless playback. That is, even if the accumulated data amount DA reached the full capacity of the read buffer 1602, an excessively long jump time $T_{jump}$ due to an excessively long jump distance to the next extent would cause the accumulated data amount DA to reach zero during the jump period TJ, and accordingly, depletion of the data accumulated in the read buffer 1602. In this case, the system target decoder 1603 would stop providing video data, and therefore seamless playback could not be achieved. "Maximum jump time $T_{jump\_max}$" means, hereinafter, the length of time required for the accumulated data amount DA to decrease from the full capacity of the read buffer 1602 to zero while data supply to the read buffer 1602 is suspended, that is, the maximum value of the jump time $T_{jump}$ allowable for seamless playback.

General standards of optical discs predetermines the relationship between jump distances and jump times by using the access speed of a disc drive and the like. FIG. 22 shows an example of the relationship between jump distances $S_{jump}$ and jump times $T_{jump}$ specified for BD-ROM discs. In FIG. 22, jump distances $S_{jump}$ are represented in units of sectors. Here, 1 sector=2048 bytes. As shown in FIG. 22, when jump distances fall within the range of 0-10000 sectors, the range of 10001-20000 sectors, the range of 20001-40000 sectors, the range of 40001 sectors-1/10 stroke, and the range of 1/10 stroke or longer, the corresponding jump times are 250 msec, 300 msec, 350 msec, 700 msec, and 1400 msec, respectively. The minimum extent sizes are calculated according to the specification shown in FIG. 22. Furthermore, the AV stream file is divided into a plurality of extents and arranged on the BD-ROM disc 101 in accordance with the minimum extent sizes. When the BD-ROM disc 101 is such a disc, the BD-ROM drive 1601 of the playback device 102 complies with the specification shown in FIG. 22, thereby being able to seamlessly play back video images from the BD-ROM disc 101.

When the BD-ROM disc 101 is a multi-layer disc and a recording layer to be read is switched to another layer, 350 msec is needed for operations such as a focus jump to switch layers in addition to the jump time $T_{jump}$ specified in FIG. 22. This length of time is hereinafter referred to as layer switching time. When there is a layer boundary between two extents to be consecutively read, the minimum extent size accordingly needs to be determined based on the sum of the jump time $T_{jump}$ corresponding to the jump distance $S_{jump}$ between the two extents and the layer switching time.

The maximum jump distance $S_{jump\_max}$ corresponding to the maximum jump time $T_{jump\_max}$ is determined from the specification in FIG. 22 and the layer switching time. For example, when assuming that the maximum jump time $T_{jump\_max}$ is 700 msec, the maximum jump distance $S_{jump\_max}$ is 1/10 stroke (approximately 1.2 GB) and 40000 sectors (approximately 78.1 MB) without and with a layer boundary between two consecutive extents, respectively.

When video images are played back from two different AV stream files in the order in a playback path, seamlessly connecting the video images played back from these files requires the last extent of the previous file and the top extent of the next file to satisfy the following conditions. First, the last extent needs to have a size equal to or larger than the minimum extent size calculated based on the jump distance to the top extent. Next, the jump distance needs to be equal to or shorter than the maximum jump distance $S_{jump\_max}$.

Figure 23:
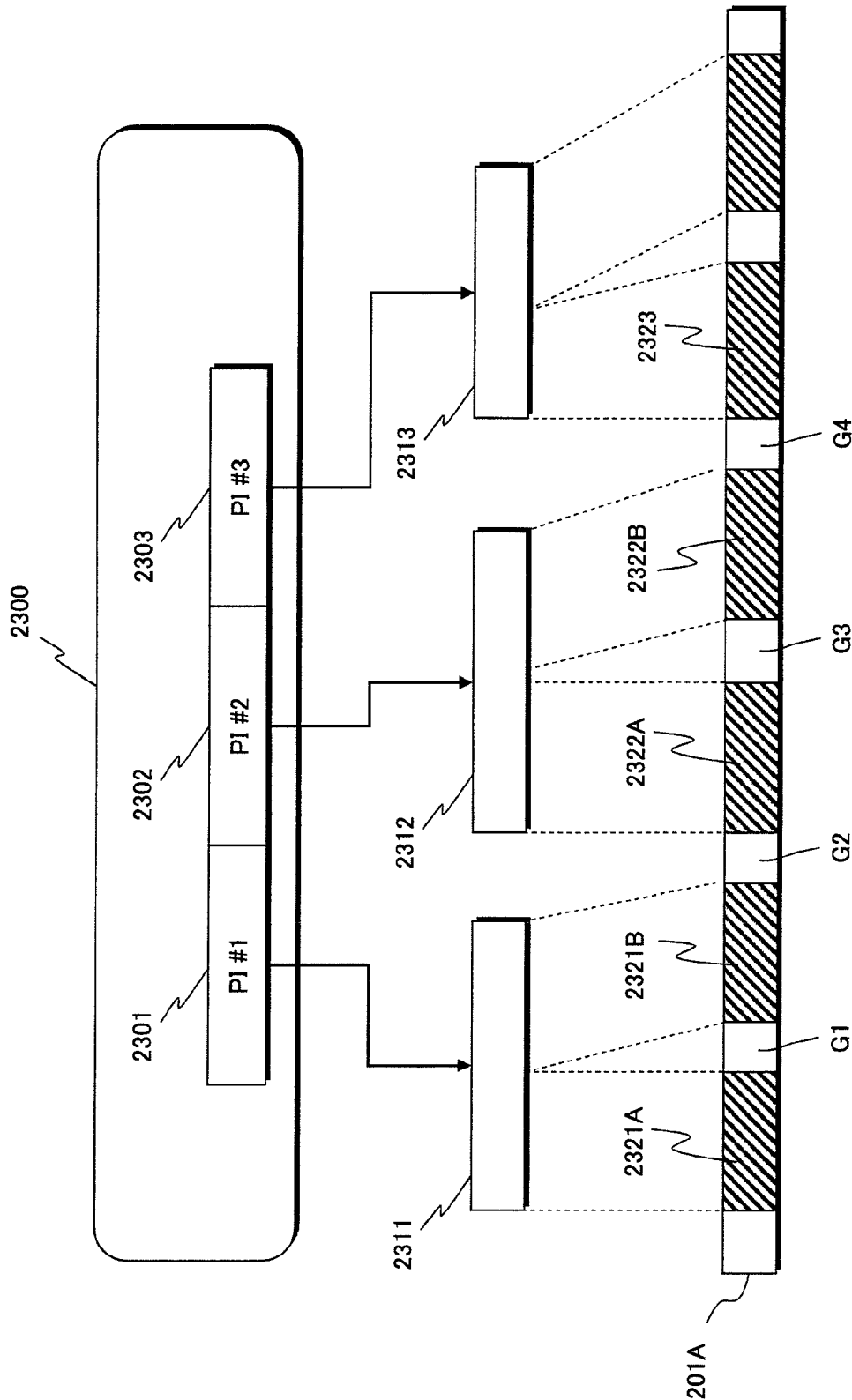
FIG. 23 is a schematic diagram showing an example of an arrangement of extents when videos are continuously played back from three different AV stream files in turn.

FIG. 23 is a schematic diagram showing an example arrangement of extents when video is continuously played back from three different AV stream files in turn. Referring to FIG. 23, a playlist file 2300 includes three pieces of playitem information (PI#1-3) 2301-2303. These pieces of playitem information 2301-2303 specify the entireties of the three different AV stream files 2311-2313, respectively, as a playback section. The files 2311-2313 are divided into extents 2321A, 2321B, 2322A, 2322B, and 2323 and recorded on the track 201A of the BD-ROM disc 101. In the recording area for storing the first file 2311, the top extent 2321A is designed to have a size equal to or larger than the minimum extent size calculated based on a jump distance G1 to the last extent 2321B. On the other hand, the last extent 2321B is designed to have a size equal to or larger than the minimum extent size calculated based on a jump distance G2 to the top extent 2322A of the second file 2312. Furthermore, the jump distance G1 is set at a value not exceeding the maximum jump distance $S_{jump\_max}$. Similarly, in the recording area for storing the second file 2312, the top extent 2322 is designed to have a size equal to or larger than the minimum extent size calculated based on a jump distance G2 to the last extent 2322B; the last extent 2322B is designed to have a size equal to or larger than the minimum extent size calculated based on a jump distance G4 to the top extent 2322A of the third file 2313; and the jump distance G4 is set at a value not exceeding the maximum jump distance $S_{jump\_max}$.

<Principle of 3D Video Playback>

Playback methods of stereoscopic video are roughly classified into two categories, i.e., methods using a holographic technique, and methods using parallax images.

The feature of the methods using the holographic technique is to allow a viewer to perceive objects in video as three-dimensional by giving the viewer's visual perception substantially the same information as optical information provided to visual perception of human beings by actual objects. However, although a technical theory for utilizing these methods for moving video display has been established, it is extremely difficult to realize, according to the present technology, a computer that is capable of real-time processing of an enormous amount of calculation required for the moving video display and a display device having super-high resolution of several thousand lines per 1 mm. Accordingly, there is hardly any idea of when these methods can be realized for commercial use.

On the other hand, the feature of the methods using parallax images is as follows. For one scene, video images for the right eye of a viewer and video images for the left eye of the viewer are separately generated. Subsequently, each video image is played back to allow only the corresponding eye of the viewer to recognize the image, thereby allowing the viewer to recognize the scene as three-dimensional.

Figure 24B:
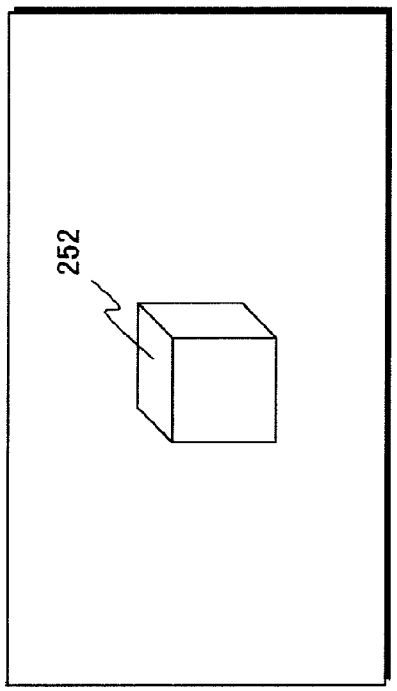
FIGS. 24A, 24B, 24C are schematic diagrams illustrating the principle of stereoscopic video playback according to a method using parallax images.
Figure 24C:
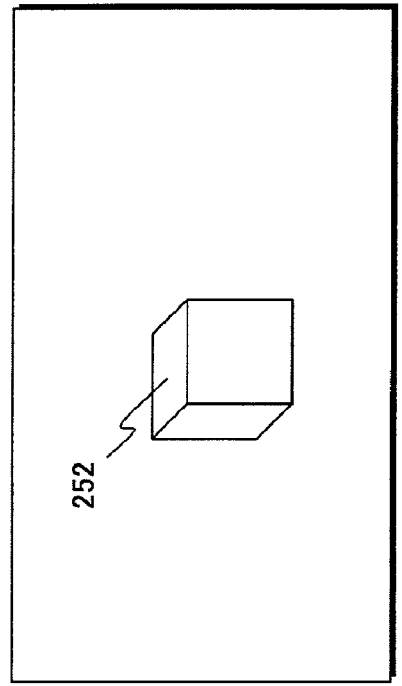
Figure 24A:
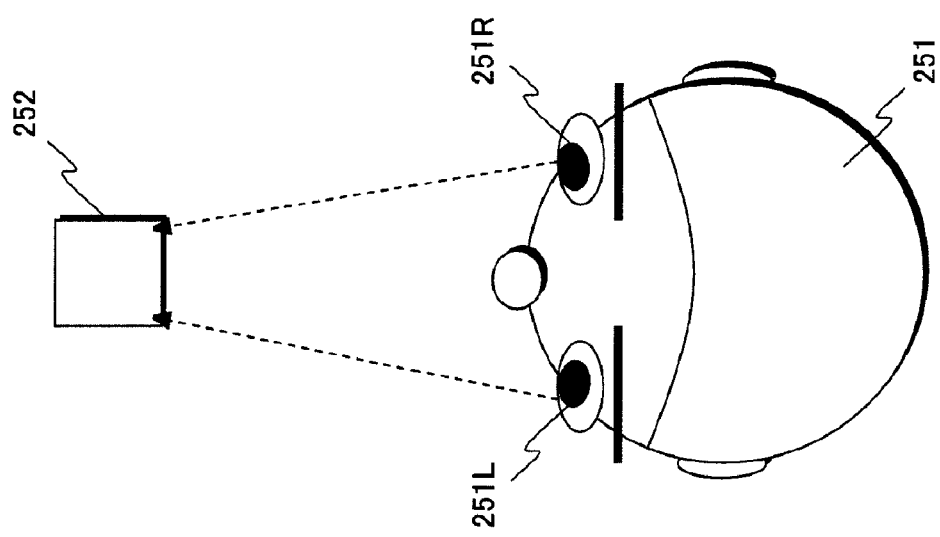

FIGS. 24A, 24B, 24C are schematic diagrams illustrating the principle of playing back 3D video images (stereoscopic video images) according to a method using parallax images. FIG. 24A shows, from the above, when a viewer 251 is looking at a cube 252 placed in front of the viewer's face. FIG. 24B shows the outer appearance of the cube 252 as perceived by a left eye 251L of the viewer 251. FIG. 24C shows the outer appearance of the cube 252 as perceived by a right eye 251R of the viewer 25A. As is clear from comparing FIG. 24B and FIG. 24C, the outer appearances of the cube 252 as perceived by the eyes are slightly different. The difference of the outer appearances, i.e., the parallax view allows the viewer 251 to recognize the cube 252 as three-dimensional. Thus, according to a method using parallax images, first, two images with different viewpoints are prepared for one scene. For example, for the cube 252 placed in front of the face of the viewer 251 as shown in FIG. 24A, two video images with different viewpoints, e.g., FIGS. 24B and 24C are prepared. Here, the difference between the viewpoints is determined by the parallax view of the viewer 251. Next, each video image is played back so as to allow the corresponding eye of the viewer 251 to perceive it. Consequently, the viewer 251 recognizes the scene played back on the screen, i.e., the video image of the cube 252 as three-dimensional. As described above, unlike the methods using the holography technique, the methods using parallax views have an advantage of requiring video images from mere two viewpoints. Hereinafter, video images for the left eye are referred to as "left video images" or "left views", and video images for the right eye are referred to as "right video images" or "right views". Additionally, video images including the video images for the left eye and the video images for the right eye are referred to as "3D video images".

The methods using parallax views are further classified into several methods from the standpoint of how to show video images for the right or left eye to the corresponding eye of the viewer.

One of these methods is called alternate-frame sequencing. According to this method, right video images and left video images are alternately displayed on a screen for a predetermined time, and the viewer observes the screen using stereoscopic glasses with a liquid crystal shutter. Herein, the lenses of the stereoscopic glasses with a liquid crystal shutter (also referred to as "shutter glasses") are each made of a liquid panel. The lenses pass or block light in a uniform and alternate manner in synchronization with video-image switching on the screen. That is, each lens functions as a shutter that periodically blocks an eye of the viewer. More specifically, while a left video image is displayed on the screen, the shutter glasses make the left-side lens to transmit light and the right-hand side lens block light. While an right video image is displayed on the screen, as contrary to the above, the shutter glasses make the right-side glass transmit light and the left-side lens block light. As a result, the eyes of the viewer see afterimages of the right and left video images, which are overlaid with each other, and perceive a stereoscopic video image.

According to the alternate-frame sequencing, as described above, right and left video images are alternately displayed in a predetermined cycle. Thus, for example, when 24 video frames are displayed per second for playing back a normal 2D movie, 48 video frames in total for both right and left eyes need to be displayed for a 3D movie. Accordingly, a display device able to quickly execute rewriting of the screen is preferred for this method.

Another method uses a lenticular lens. According to this method, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Herein, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device may be used instead of the lenticular lens. Alternatively, for example, a longitudinal polarization filter may be provided in the display areas of the left image frame, and a lateral polarization filter may be provided in the display areas of the right image frame. In this case, viewers sees the display through polarization glasses. Herein, for the polarization glasses, a longitudinal polarization filter is provided for the left lens, and a lateral polarization filter is provided for the right lens. Consequently, the right and left video images are respectively perceived only by the corresponding eyes, thereby allowing the viewer to recognize a stereoscopic video image.

A playback method for stereoscopic video with use of the parallax images has already been technically established and is in general use for attractions in amusement parks and the like. Accordingly, among playback methods for stereoscopic video, this method is considered to be closest to practical household use. Thus, in the embodiments of the present invention in the following, the alternate-frame sequencing method or the method using polarization glasses are assumed to be used. However, as a playback method for stereoscopic video, various methods such as a two-color separation method have been proposed. Any of these various methods can be applicable to the present invention, as is the case with the two methods described below, as long as parallax views are used.

<Data Structure for 3D Video on BD-ROM Disc>

Next, regarding the BD-ROM disc that is the recording medium pertaining to the first embodiment of the present invention, the data structure for storing 3D video images will be described below. Here, basic parts of the data structure are identical with those of the data structure for storing 2D video images, which is shown in FIGS. 2-15. Accordingly, the following will mainly describe expanded or changed portions with respect to the data structure for the 2D video images, and the description above is applied for the basic parts. Note that a playback device that can play back solely 2D video images from a BD-ROM disc having stored therein 3D video images is referred to as a "2D playback device", and a playback device that can play back both 2D video images and 3D video images from the same is referred to as a "2D/3D playback device".

A flag for identifying the playback device as either a 2D playback device or a 2D/3D playback device is set to a reserved SPRM shown in FIG. 17. For example, assume that the SPRM (24) is the flag. In this case, when the SPRM (24) is "0", the playback device is a 2D playback device, and when the SPRM (24) is "1", the playback device is a 2D/3D playback device.

<<Index File/Movie Object File>>

Figure 25:
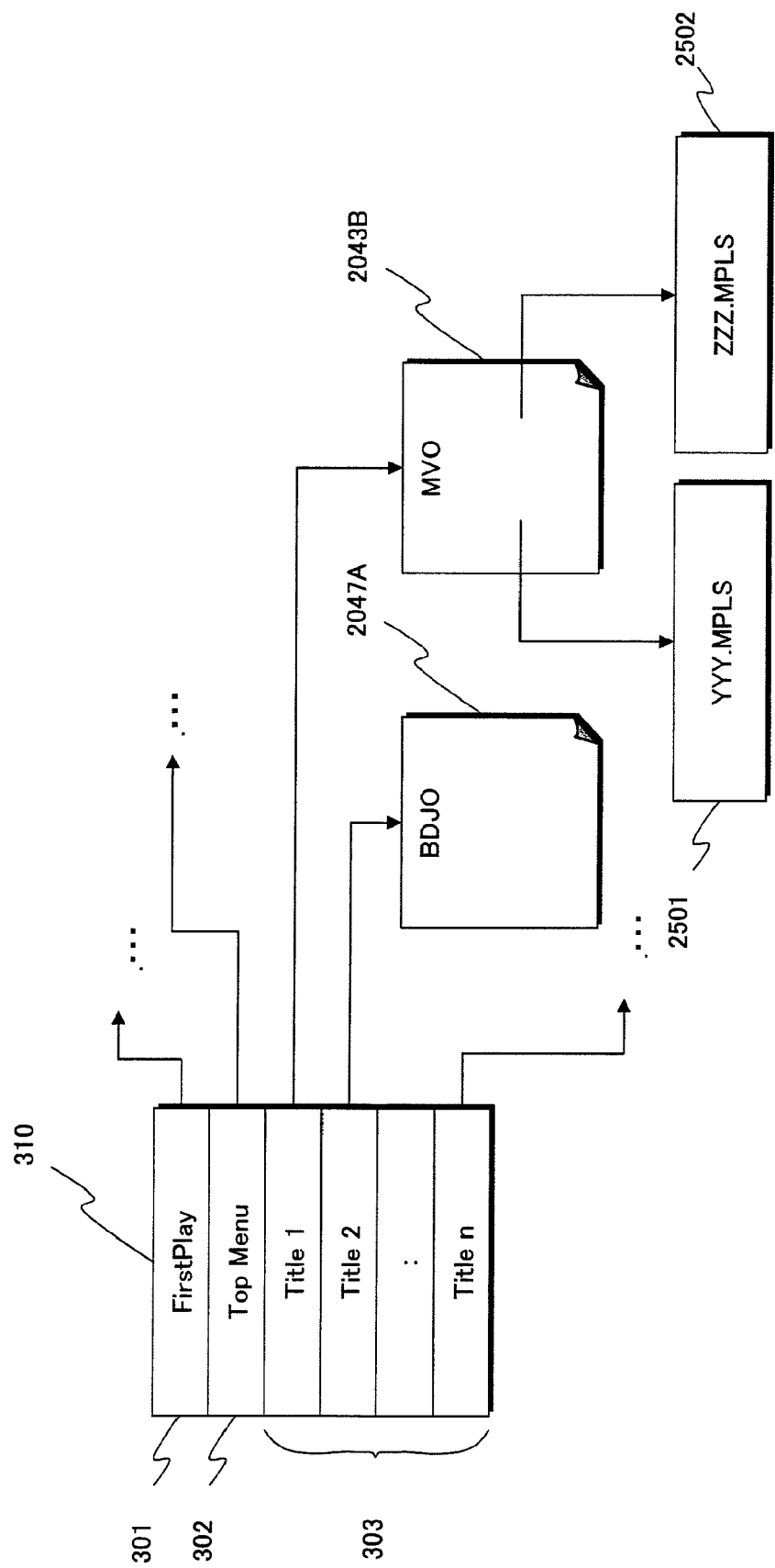
FIG. 25 is a schematic diagram showing a relationship among an index table 310, a movie object MVO, a BD-J object BDJO, a 2D playlist file 2501, and a 3D playlist file 2502.

FIG. 25 is a schematic diagram showing relations among an index table 310, a movie object MVO, a BD-J object BDJO, and playlist files 2501 and 2502. In the BD-ROM disc 101 that stores therein 3D video images, the PLAYLIST directory includes the 3D playlist file 2502 in addition to the 2D playlist file 2501. As is the case with the playlist file 204A, the 2D playlist file 2501 specifies a playback path of 2D video images. For example, when a title 1 is selected by a user operation, the movie object MVO associated with an item "title 1" of the index table 310 is executed. Herein, the movie object MVO is a program for a playlist playback that uses one of the 2D playlist file 2501 and the 3D playlist file 2502. The playback device 102, in accordance with the movie object MVO, first judges whether the playback device 102 supports 3D video playback or not, and if judging affirmatively, further judges whether the user has selected the 3D video playback or not. The playback device 102 then selects, in accordance with the result of the judgment, one of the 2D playlist file 2501 and the 3D playlist file 2502 as a playlist file to be played back.

Figure 26:
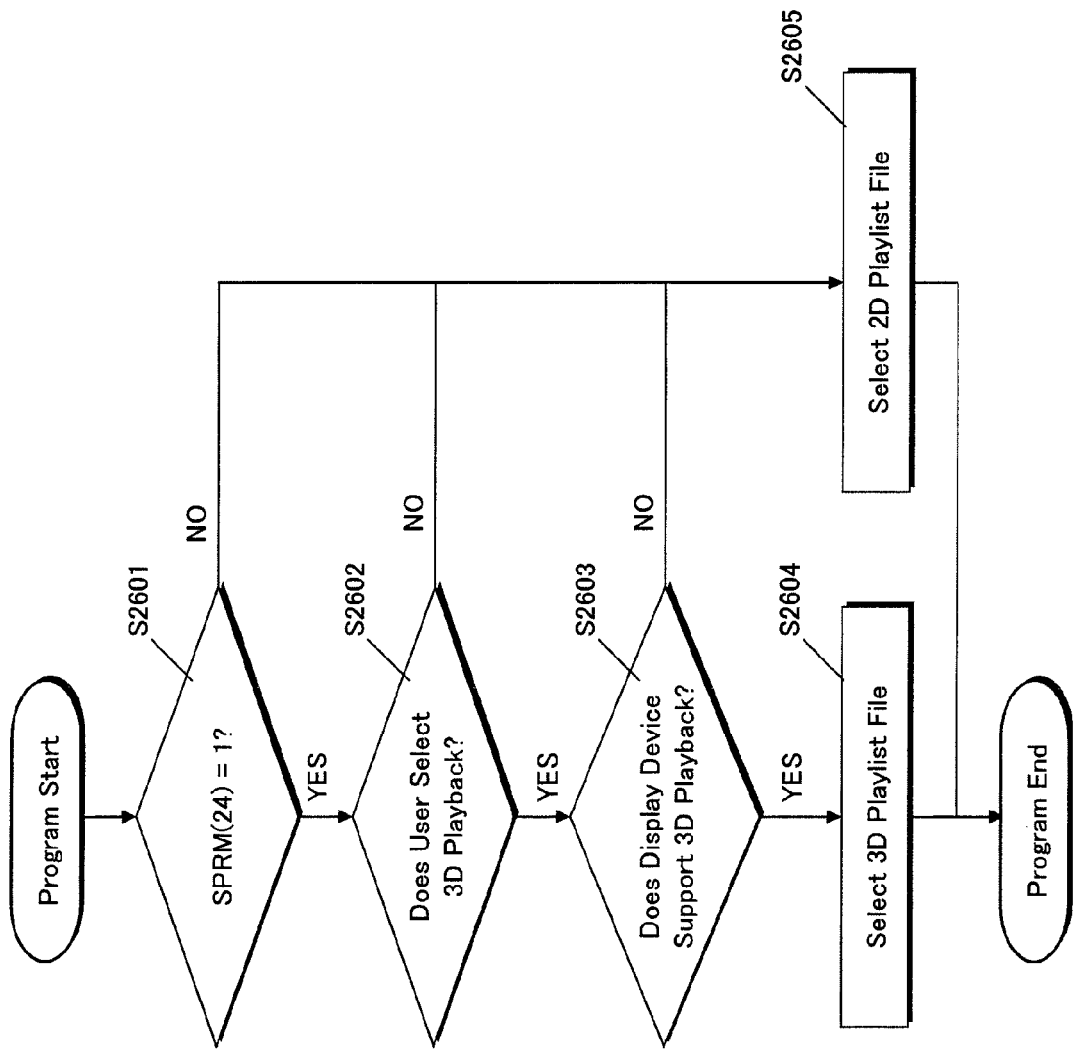
FIG. 26 is a flowchart showing a selection process of a playlist file to be played back, according to a movie object MVO.

FIG. 26 is a flowchart showing selection processing of a playlist file to be played back, the selection processing being executed in accordance with the movie object MVO.

In S2601, the playback device 102 checks the value of the SPRM (24). If the value is 0, the process advances to S2605. If the value is 1, the process advances to S2602.

In step S2602, the playback device 102 causes the display device 103 to display a menu and makes the user to select 2D video playback and 3D video playback. If the user selects the 2D video playback with an operation of a remote control or the like, the process advances to S2605. On the other hand, if the user selects the 3D video playback, the process advances to S2603.

In S2603, the playback device 102 checks whether the display device 103 supports the 3D video playback. For example, if the playback device 102 is connected with the display device 103 using the HDMI format, the playback device 102 exchanges CEC messages with the display device 103 and asks the display device 103 whether the display device 103 supports the 3D video playback. If the display device 103 does not support the 3D video playback, the process advances to S2605. On the other hand, if the display device 103 supports the 3D video playback, the process advances to S2604.

In S2604, the playback device 102 selects the 3D playlist file 2502 as the playback target.

In S2605, the playback device 102 selects the 2D playlist file 2501 as the playback target. Note that in this case, the playback device 102 may cause the display device 103 to display the reason the 3D video playback was not selected.

<<Playlist File>>

Figure 27:
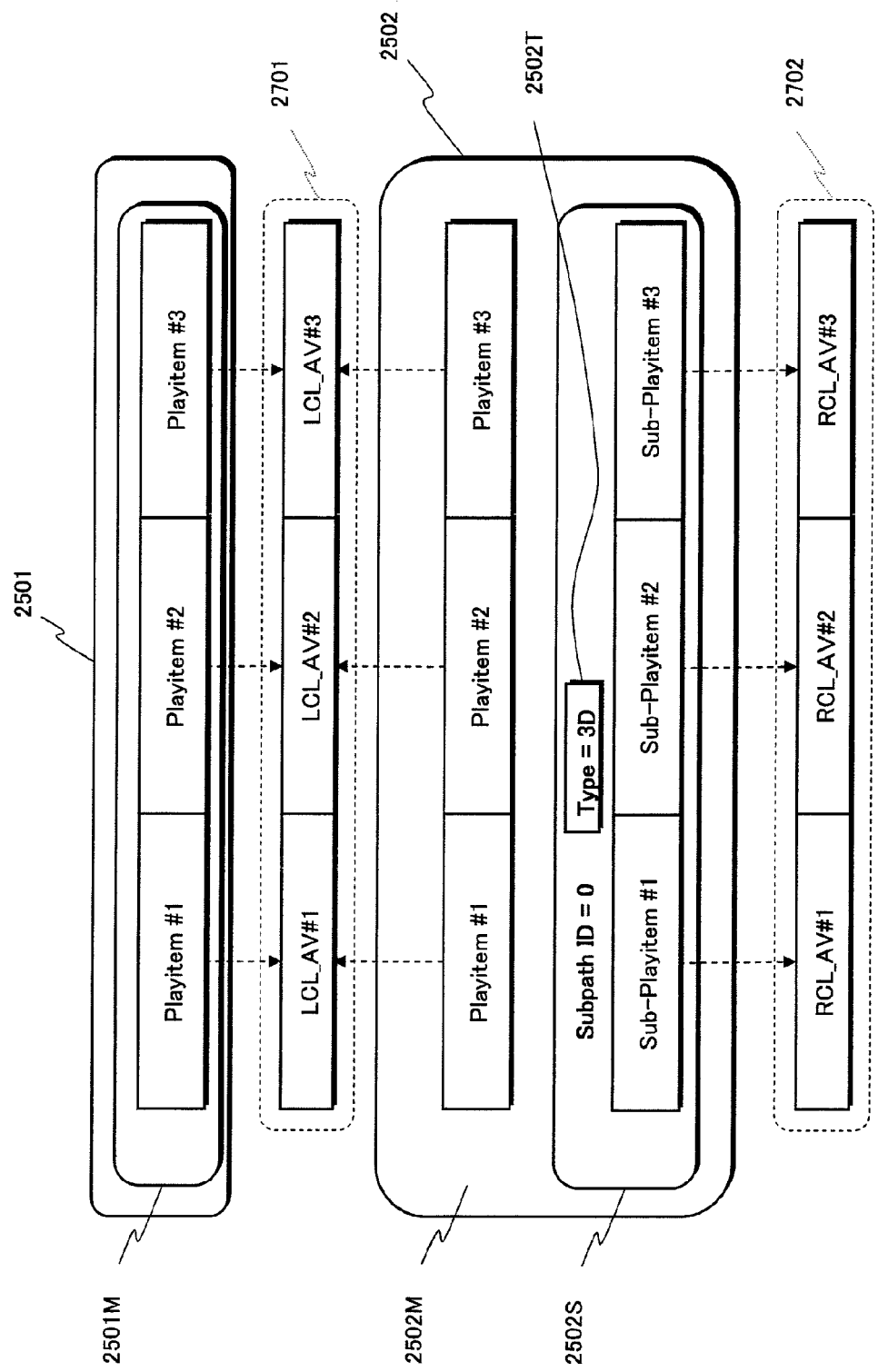
FIG. 27 is a schematic diagram showing an example of the structures of the 2D playlist file 2501 and the 3D playlist file 2502.

FIG. 27 is a schematic diagram showing an example structure of the 2D playlist file 2501 and the 3D playlist file 2502. A first AV stream file group 2701 is composed of AV stream files LCL_AV#1-3 each storing a video stream of 2D video images and is independently used for 2D video playback. The video streams of the AV stream files LCL_AV#1-3 are further used as left-view streams in 3D video playback. Hereinafter, such an AV stream file is referred to as a "2D/left-view AV stream file", and the video stream included therein is referred to as a "2D/left-view stream". On the other hand, a second AV stream file group 2702 is composed of AV stream files RCL_AV#1-3, and is used in combination with the first AV stream file group 2701 for 3D video playback. Hereinafter, such an AV stream file is referred to as a "right-view AV stream file", and the video stream included therein is referred to as a "right-view stream". A main path 2501M of the 2D playlist file 2501 and a main path 2502M of the 3D playlist file 2502 each include three pieces of playitem information #1-3. Each piece of the playitem information #1-3 specifies a playback section in the first AV stream file group 2701. On the other hand, unlike the 2D playlist file 2501, the 3D playlist file 2502 further includes a subpath 2502S. The subpath 2502S includes three pieces of sub-playitem information #1-3, and each piece of the sub-playitem information #1-3 specifies a playback section in the second AV stream file group 2702. The sub-playitem information #1-3 correspond one-to-one with the playitem information #1-3. The length of the playback section specified by each piece of sub-playitem information is equal to the length of the playback section of the corresponding piece of playitem information. The subpath 2502S further includes information 2502T which indicates that a subpath type is "3D". Upon detecting the information 2502T, the 2D/3D playback device synchronizes the playback processing between the subpath 2502S and the main path 2502M. As described above, the 2D playlist file 2501 and the 3D playlist file 2502 may share the same 2D/left-view AV stream file group.

Note that the prefix numbers of the 2D playlist file 2501 and the 3D playlist file 2502 (e.g., "XXX" of "XXX.mpls") may be sequentially numbered. In this manner, the 2D playlist file corresponding to the 2D playlist file can be easily identified.

For each piece of playitem information in the 3D playlist file 2502, a stream entry of the 2D/left-view stream and a stream entry of the right-view stream have been added in the stream selection table 1305 shown in FIG. 13. The stream entries 1309 for the 2D/left-view stream and the right-view stream have the same contents such as the frame rate, the resolution, and the video format. Note that each stream entry 1309 may further have a flag for identifying the 2D/left-view stream and the right-view stream added therein.

In the first embodiment as described above, assume that the 2D playback device plays back 2D video images from the left-view streams. However, the 2D playback device may be designed to play back 2D video images from the right-view streams. It is similarly applicable in the description hereinafter.

Figure 28:
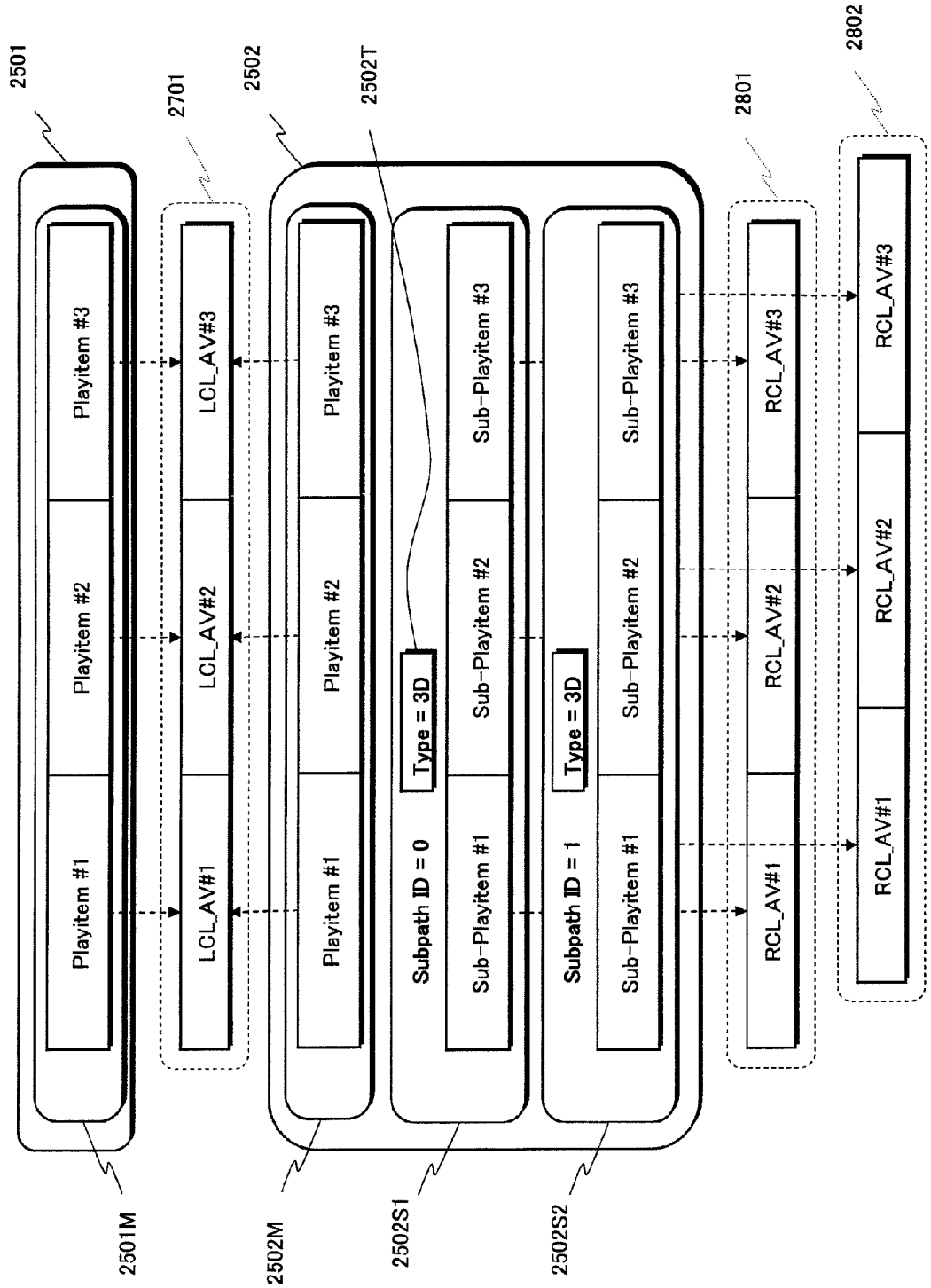
FIG. 28 is a schematic diagram showing another example of the structures of the 2D playlist file 2501 and the 3D playlist file 2502.

FIG. 28 is a schematic diagram showing another example structure of the 2D playlist file 2501 and the 3D playlist file 2502. The STREAM directory of the BD-ROM disc 101 may include two or more kinds of right-view AV stream files for each left-view AV stream file 2701. In this case, the 3D playlist file 2502 may include a plurality of subpaths corresponding one-to-one with the right-view AV stream files. For example, when 3D video images with different parallax views are expressed for the same scene with use of differences between the shared left video image and the right video images, for each different right video image, a different right-view. AV stream file group is recorded on the BD-ROM disc 101. In this case, subpaths which respectively correspond with the right-view AV stream files may be provided in the 3D playlist file 2502 and used according to a desired parallax view. In the example of FIG. 28, the viewpoints of the right video exhibited by a first right-view AV stream file group 2801 and a second right-view AV stream file group 2802 are different. Meanwhile, the 3D playlist file 2502 includes two kinds of subpaths 2502S1 and 2502S2. The subpath 2502S1 having a subpath ID of "0" specifies a playback section in the first right-view AV stream file group 2801. The subpath 2502S2 having the subpath ID of "1" specifies a playback section in the second right-view AV stream file group 2802. the 2D/3D playback device selects one of the two kinds of the subpaths 2502S1 and the 2502S2 in accordance with the size of the screen of the display device 103 or specification by the user, and synchronizes the playback processing of the selected subpath with the playback processing of the main path 2502M. This allows pleasant stereoscopic video display for the user.

<<AV Stream File for 3D Video>>

FIGS. 29A and 29B schematically show elementary streams that are multiplexed into a pair of the AV stream files, and are used for playing back the 3D video images. FIG. 29A shows elementary streams multiplexed into a 2D/left-view AV stream file 2901. The elementary streams are the same as the streams multiplexed into the AV stream file for the 2D video images in FIG. 4. The 2D playback device plays back a primary video stream 2911 as 2D video images, while the 2D/3D playback device plays back the primary video stream 2911 as left video at the time of providing 3D playback. That is, the primary video stream 2911 is a 2D/left-view stream. FIG. 29B shows an elementary stream multiplexed into a right-view AV stream file 2902. The right-view AV stream file 2902 stores therein a right-view stream 2921. The 2D/3D playback device plays back the right-view stream 2902 as the right video at the time of providing the 3D playback. To the right-view stream 2921, a PID of 0x1012 is allocated that is different from a PID of 0x1011 allocated to the left stream 2911.

Figure 30A:
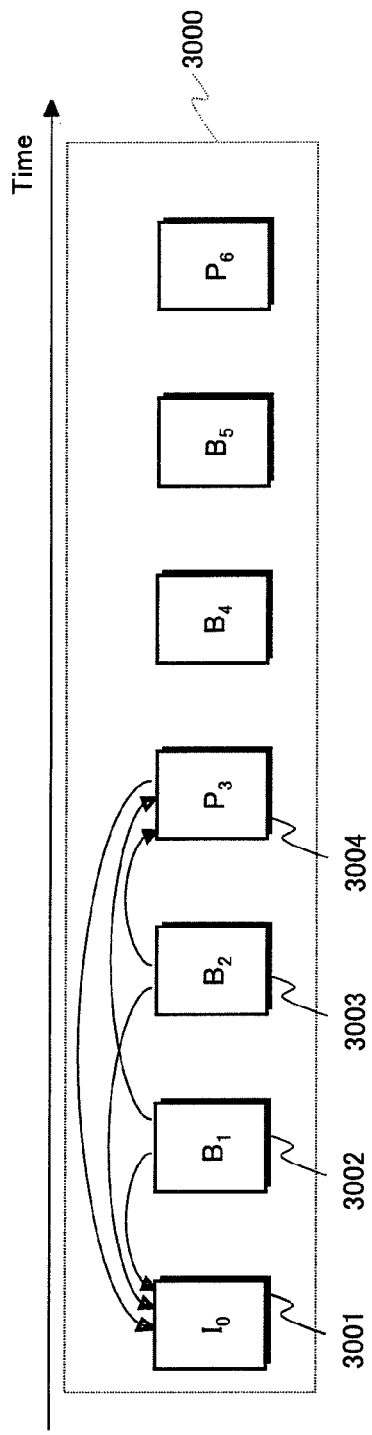
FIGS. 30A and 30B are schematic diagrams showing compression coding methods for a 2D/left-view stream and a right-view stream, respectively.

FIG. 30A is a schematic diagram showing a compression coding format for a 2D video stream 3000. As shown in FIG. 30A, frames/fields of the 2D video stream 3000 are compressed into a picture 3001, a picture 3002 and so on using an inter-picture predictive encoding format. In the encoding format is adopted a redundancy in a time direction of the 2D video stream 3000 (i.e. similarities between previous and/or subsequent pictures whose display orders are serial). Specifically, a top picture is, at first, compressed into an $I_0$ picture 3001 with use of an intra-picture predictive encoding. Here, numbers shown by indexes are serial numbers in FIG. 30A and FIG. 30B. Next, as shown by arrows in FIG. 30A, a fourth picture refers to the $I_0$ picture 3001, and is compressed into a $P_3$ picture 3004. Next, second and third pictures are compressed into a $B_1$ picture and a $B_2$ picture respectively, with reference to the $I_0$ picture 3001 and the $P_3$ picture 3004.

Figure 30B:
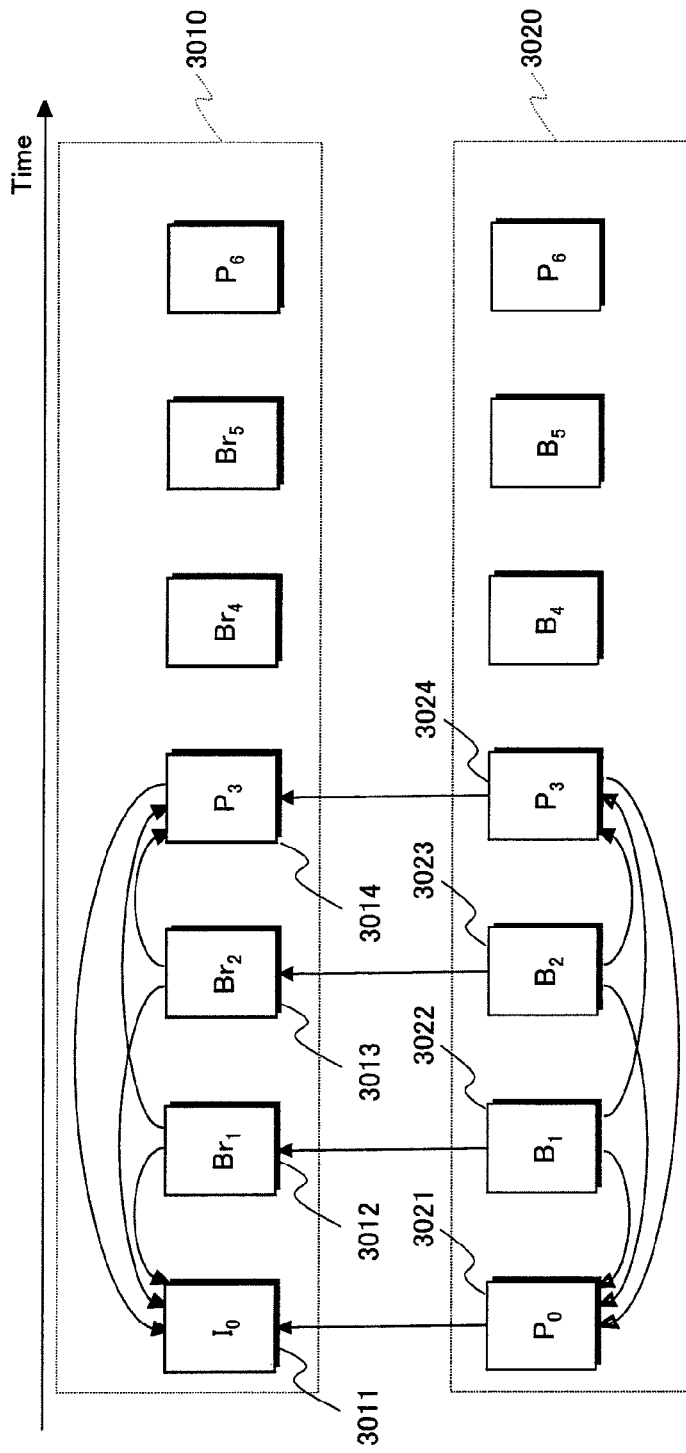

FIG. 30B is a schematic diagram showing a compression encoding format for 3D video streams 3010 and 3020. As shown in FIG. 30B, a left-view stream 3010 is compressed using the inter-picture predictive encoding format that uses the redundancy in the time direction as with the 2D video stream 3000. When a right-view stream 3020 is compressed using the inter-picture predictive encoding format, on the other hand, a redundancy between left and right viewpoints is used in addition to the redundancy in the time direction. That is, as shown by arrows in FIG. 30B, each picture of the right-view stream 3020 is compressed with reference to a picture having a same display time or a picture having a close display time in the 2D/left-view stream 3010 as well as a previous picture and/or a subsequent picture in the right-view stream 3020. For example, a top picture in the right-view stream 3020 is compressed into a $P_0$ picture 3021 with reference to an $I_0$ 3011 picture in the 2D/left-view stream 3010. A fourth picture is compressed into a $P_3$ picture 3024 with reference to the $P_0$ picture 3021 and a $P_3$ picture 3014 in the 2D/left-view stream 3010. Furthermore, second and third pictures are respectively compressed into a $B_1$ picture and a $B_2$ picture with reference to a $Br_1$ picture 3012 and a $Br_2$ picture in the 2D/left-view stream in addition to the $P_0$ picture 3021 and the $P_3$ picture 3024, respectively. Thus, pictures of the right-view stream 3020 are compressed with reference to the 2D/left-view stream 3010. Accordingly, the right-view stream 3020 cannot be decoded alone unlike the 2D/left-view stream 3010. However, since there is a strong correlation between the right video and left video, a data amount of the right-view stream 3020 is drastically smaller than a data amount of the 2D/left-view stream 3010 due to the inter-picture predictive encoding format that uses the redundancy between the right and left viewpoints. Hereinafter, a video stream that can be decoded alone like the 2D/left-view stream 3010 is referred to as a "base-view stream", and a video stream that needs to be decoded with use of the base-view stream is referred to as a "dependent-view stream".

Note that the right-view stream may be compressed into the base-view stream. Furthermore, in that case, the left-view stream may be compressed into the dependent-view stream with use of the right-view stream. In either of the cases, the base view stream is used as the 2D video stream in the 2D playback device. Also, a frame rate of the 2D/left-view stream is a frame rate at which the 2D/left-view stream is decoded alone by the 2D playback device. The frame rate is recorded in a GOP header of the 2D/left-view stream.

Figures 31A, 31B:
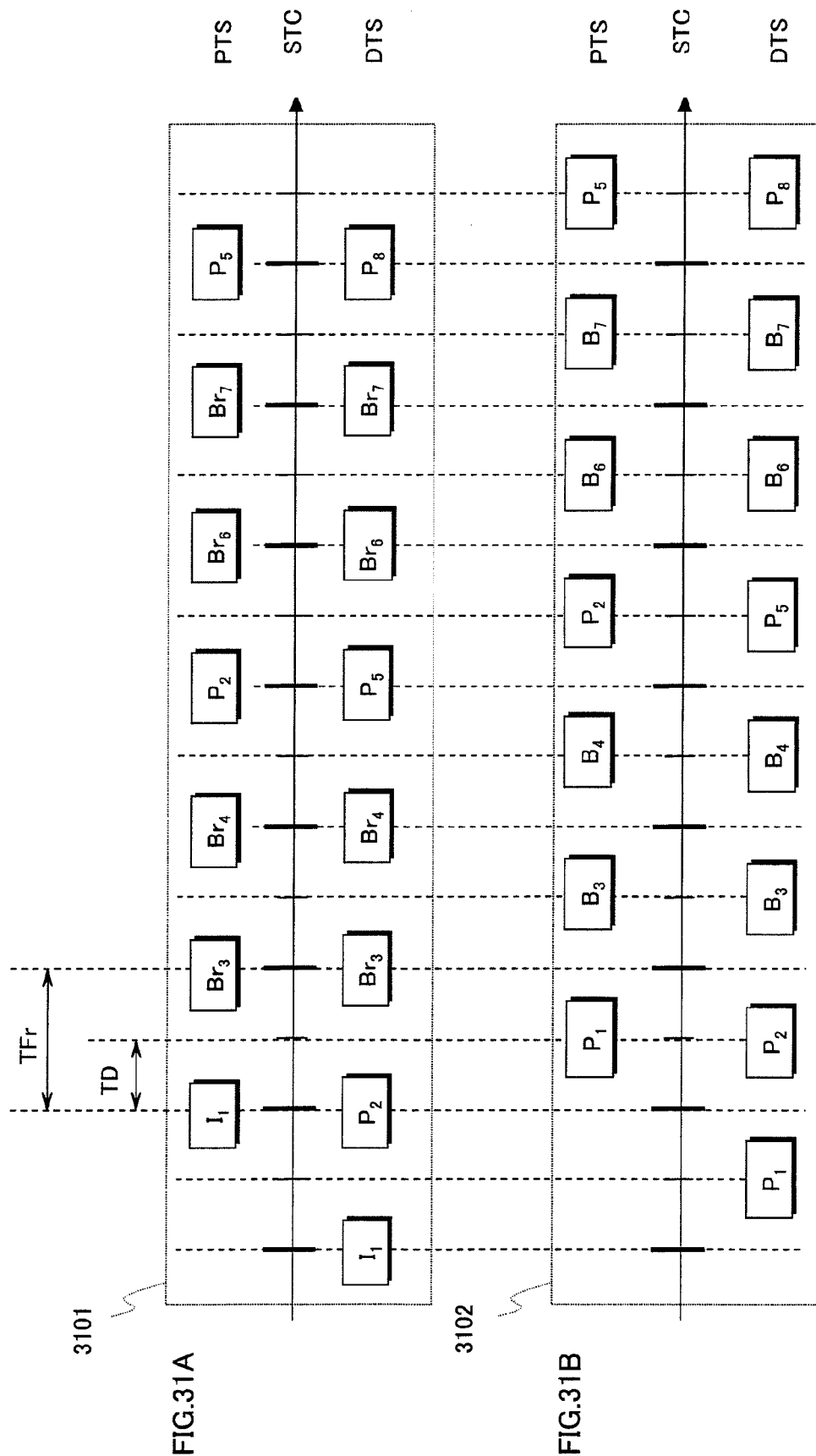
FIGS. 31A and 31B are schematic diagrams showing the relationship between DTSs and PTSs allocated to pictures of a 2D/left-view stream 3101 and a right-view stream 3102, respectively.

FIG. 31A shows an example of a relation between the PTSs and the DTSs allocated to pictures of the 2D/left-view stream 3101, and FIG. 31B shows an example of a relation between the PTSs and the DTSs allocated to pictures of the right-view stream 3102. In both of the video streams 3101 and 3012, DTSs of the pictures alternate one another on the STC. This can be realized by delaying, with respect to DTSs of the pictures of the 2D/left-view stream 3101, the DTSs of pictures of the right-view stream 3102 that refer to corresponding pictures of the 2D/left-view stream 3101 in the inter-picture predictive encoding format shown in FIG. 30B. An interval TD of the delay (i.e. an interval between each picture of the 2D/left-view stream 3101 and a picture of the right-view stream 3102 that immediately succeeds the picture of the 2D/left-view stream) is refereed to as a 3D display delay. The 3D display delay TD is set to a value corresponding to an interval between previous and subsequent pictures of the 2D/left-view stream 3101 (i.e. a value half a frame period or half a field period TFr). Similarly, in both of the video streams 3101 and 3012, PTSs of the pictures alternate one another on the STC. That is, an interval TD between: a PTS of each picture of the 2D/left-view stream 3101; and a PTS of a picture of the right-view stream 3102 that immediately succeeds the picture of the 2D/left-view stream is set to a value corresponding to an interval between pictures of the 2D/left-view stream 3101 (i.e. a value half a frame period or half a field period TFr).

Figure 32:
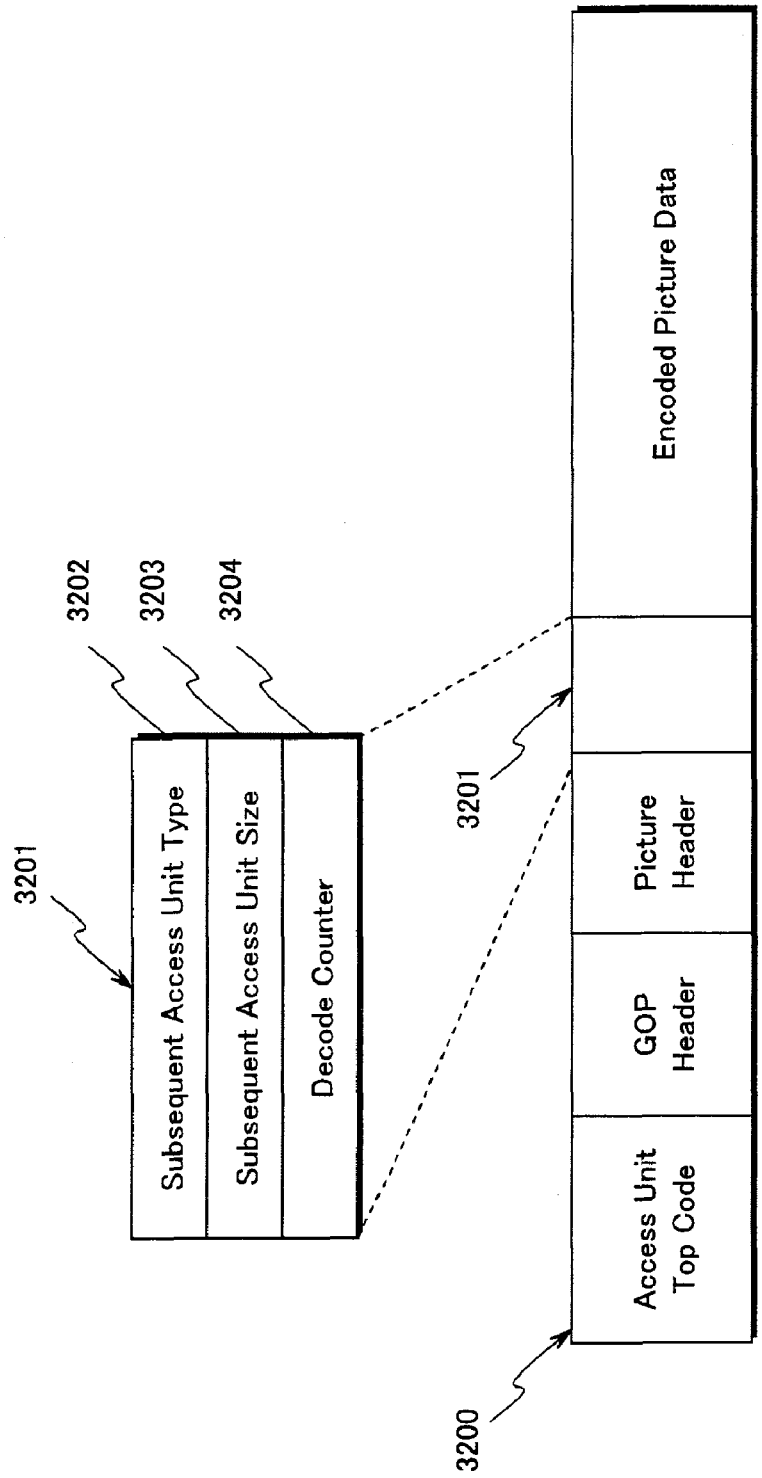
FIG. 32 is a schematic diagram showing the data structure of a video access unit 3200 of the 2D/left-view stream and the right-view stream.

FIG. 32 is a schematic diagram showing the data structure of a video access unit 3200 of each of the 2D/left-view stream and the right-view stream. As shown in FIG. 32, each video access unit 3200 is provided with decoding switch information 3201. A 3D video decoder 4115 (described later) performs, for each video access unit, decoding processing of the 2D/left-view stream and decoding processing of the right-view stream switching therebetween. At that time, the 3D video decoder 4115 specifies a subsequent video access unit to be decoded at a time shown by a DTS provided to each video access unit. However, many video decoders generally ignore the DTSs, and keep on decoding the video access units. For such 3D video decoders, it is favorable that each video access unit of the video stream has information for specifying a subsequent video access unit to be decoded in addition to a DTS. The decode switch information 3201 is information for realizing the switching processing of each of the video access units to be decoded by the 3D video decoder 4115.

As shown in FIG. 32, the decode switch information 3201 is stored in an expansion area (SEI Message or the like when MPEG-4 AVC is used) in each of the video access units. The decode switch information 3201 includes a subsequent access unit type 3202, a subsequent access unit size 3203 and a decode counter 3204.

The subsequent access unit type 3202 is information indicating to which of the 2D/left-view stream and the right-view stream the subsequent video access unit to be decoded belongs. For example, when a value shown by the subsequent access unit type 3202 is "1", it is indicated that the subsequent video access unit belongs to the 2D/left-view stream. When the value shown by the subsequent access unit type 3202 is "2", it is indicated that the subsequent video access unit belongs to the right-view stream. When the value shown by the subsequent access unit type 3202 is "0", it is indicated that the subsequent video access unit is at an end of the stream.

A subsequent video access unit size 3203 is information indicating a size of each subsequent video access unit that is to be decoded. If the subsequent video access unit size 3203 is unavailable in a video access unit, it is necessary to analyze, when a video access unit to be decoded is extracted from a buffer, a structure of the access unit in order to specify its size. By adding the subsequent access unit size 3203 to the decode switch information 3201, the 3D video decoder 4115 can specify the size of the access unit without analyzing the structure of the video access unit. Accordingly, the 3D video decoder 4115 can easily perform processing of extracting video access units from the buffer.

The decode counter 3204 shows a decoding order of the video access units in the 2D/left-view stream starting with an access unit including an I picture. FIG. 33A and FIG. 33B schematically show values each of which is shown by the decode counter 3204, and is allocated to a picture of the 2D/left-view stream 3301 and a picture of the right-view stream 3302. As shown in FIGS. 33A and 33B, there are two manners of allocating values.

In FIG. 33A, "1" is allocated to an I picture 3311 of a 2D/left-view stream 3301 as a value 3204A shown by the decode counter 3204, "2" is allocated to a P picture 3321 of a right-view stream 3302 to be subsequently decoded as a value 3204B shown by the decode counter 3204, and "3" is allocated to a P picture 3322 of the 2D left-view stream 3301 to be further subsequently decoded as a value 3204A shown by the decode counter 3204. Thus, the values 3204A and 3204B shown by the decode counter 3204 that are allocated to the video access units of the 2D/left-view stream 3301 and the right-view stream 3302 are alternately incremented. By allocating the values 3204A and 3204B shown by the decode counter 3204 in such a manner, the 3D video decoder 4115 can immediately specify, with use of the values 3204A and 3204B shown by the decode counter 3204, a missing picture (video access unit) that the 3D video decoder 4115 fails to read due to some error. Accordingly, the 3D video decoder 4115 can appropriately and promptly perform error handling.

In FIG. 33A, for example, the 3D video decoder 4115 fails to read a third video access unit of the 2D/left-view stream 3301 due to an error, and a Br picture 3313 is missing. Therefore, with the Br picture 3313 missing, a Br picture 3313 cannot be referred to during the decoding processing of a third video access unit (B picture 3323) of the right-view stream 3302. Accordingly, the B picture 3323 cannot be decoded properly, and a noise is likely to be included in the played back video. However, if the 3D video decoder 4115 reads and holds therein a value 3204B (shown by the decode counter 3204) of a second video access unit (P picture 3322) of the right-view stream 3302 in decoding processing of the P picture 3322, the 3D video decoder 4115 can predict a value 3204B (shown by the decode counter 3204) of a video access unit to be subsequently decoded. Specifically, as shown in FIG. 33A, the value 3204B (shown by the decode counter 3204) of the second video access unit (P picture 3322) of the right-view stream 3202 is "4". Accordingly, it is predicted that the value 3304A (shown by the decode counter 3204) of the video access unit to be subsequently read is "5". However, since the video access unit to be subsequently read is actually a fourth video access unit of the 2D/left-view stream 3301, the value 3204A (shown by the decode counter 3204) of the video access unit is "7". In such a manner, the 3D video decoder 4115 can detect that the 3D video decoder 4115 fails to read one video access unit. Therefore, the 3D video decoder can execute error handling of "skipping decoding processing of the B picture 3323 extracted from the third video access unit of the right-view stream 3302 since the Br picture 3313 to refer to is missing". Thus, the 3D video decoder 4115 checks, for each decoding processing, the value 3204A and the value 3204B shown by the decode counter 3204. Consequently, the 3D video decoder 4115 can promptly detect a read error of the video access unit, and can promptly execute an appropriate error handling.

As shown in FIG. 33B, a value 3204C and a value 3204D (shown by the decode counter 3204) of a video stream 3301 and a video stream 3302 respectively may be incremented separately. In this case, at a time point where the 3D video decoder 4115 decodes a video access unit of the 2D/left-view stream 3301, the value 3204C shown by the decode counter 3204 is equal to a value 3204D (shown by the decode counter 3204) of a video access unit of the right-view stream 3302 to be subsequently decoded". Meanwhile, at a time point where the 3D video decoder 4115 decodes a video access unit of the right-view stream 3302, the 3D video decoder 4115 can predict that "a value obtained by incrementing, by one, a value 3204D (shown by the decode counter 3204) of the video access unit is equal to a value 3204C (shown by the decode counter 3204) of a video access unit of the 2D/left-view stream 3301 to be subsequently decoded". Therefore, at any time point, the 3D video decoder 4115 can promptly detect a read error of a video access unit with use of the value 3204C and the value 3204D shown by the decode counter 3204. As a result, the 3D video decoder 4115 can promptly execute appropriate error handling.

<Physical Arrangement of AV Stream Files for 3D Video on Disc>

The following will describe physical arrangements of AV stream files on the BD-ROM disc 101, each of the files storing 3D video images therein.

Figure 34A:
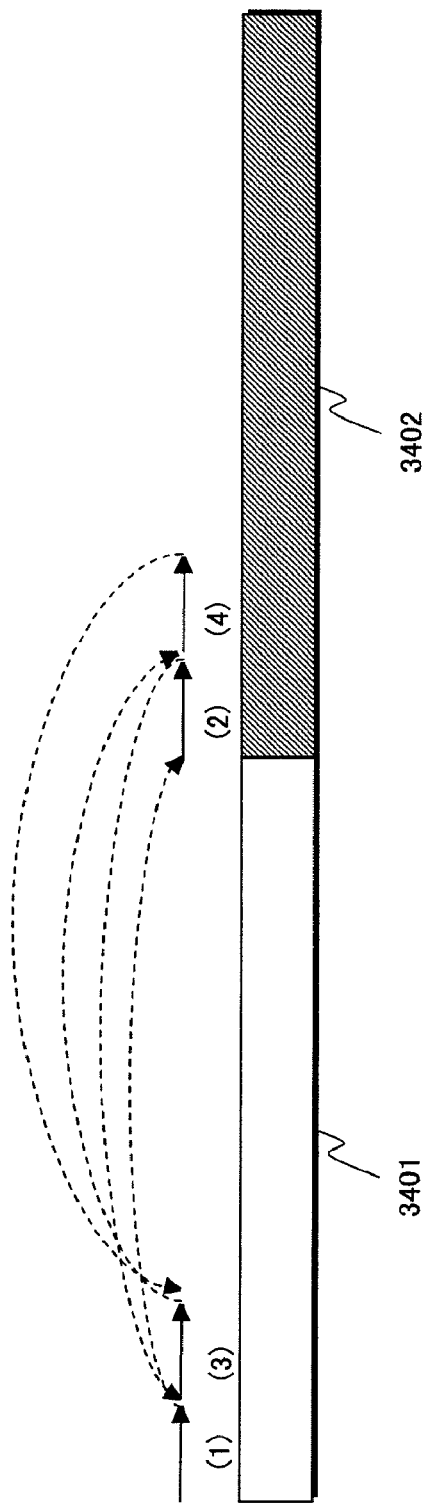
FIGS. 34A and 34B are schematic diagrams showing two types of arrangements of extents of the 2D/left-view AV stream file, and the right-view AV stream file on the BD-ROM disc 101 shown in FIG. 2.
Figure 34B:
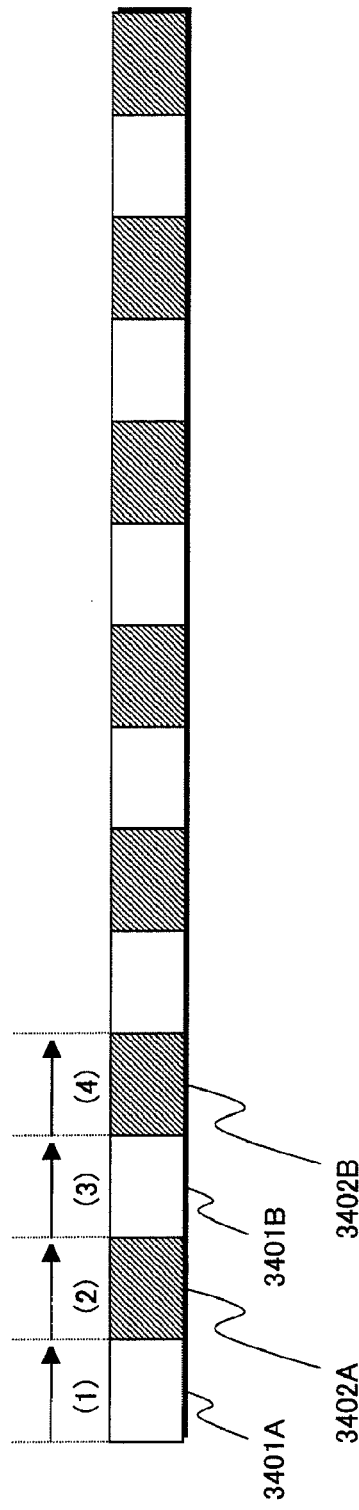

At 3D video playback, a 2D/3D playback device needs to read 2D/left-view AV stream file and right-view AV stream file in parallel from the BD-ROM disc 101. FIG. 34A and FIG. 34B are schematic diagrams showing two types of the arrangement of both the 2D/left-view AV stream file and the right-view AV stream file on the BD-ROM disc 101. Assume that the entirety of the 2D/left-view AV stream file is continuously recorded on the BD-ROM disc 101 as one extent 3401 and, next to the extent, the entirety of the right view AV file is arranged as another extent 3402 as shown in FIG. 34A. In this case, the playback path is designed to run the extent 3401 and the extent 3402 alternately as shown by arrows (1) to (4) in FIG. 34A so that the 2D/3D playback device reads the 2D/left-view AV stream file and the right-view AV stream file in parallel. Accordingly, a long jump occurs each time an extent to be read is switched as shown by dash lines in FIG. 34A. As a result, it is difficult to keep the timing of reading each file earlier than the timing of decoding processing by a 3D video decoder, and thus it is difficult to reliably continue seamless playback. In contrast, in the first embodiment as shown in FIG. 34B, the 2D/left-view AV stream file is divided into a plurality of extents 3401A, 3401B, . . . , the right-view AV stream file is divided into a plurality of extents 3402A, 3402B, . . . , and the extents of both the files are arranged alternately on the BD-ROM disc 101. Such an arrangement of the extents is referred to as an interleaved arrangement. The playback path is designed to run the extents 3401A, 3401B, 3402A, 3402B, . . . , arranged in an interleaved manner in turn, starting from the top extent as shown by arrows (1) to (4) in FIG. 34B. Accordingly, the 2D/3D playback device can alternately read both the files extent by extent without causing a jump, and therefore the reliability of the seamless playback can be improved.

<<Conditions for Playback Time Per Extent>>

The following will describe conditions of playback time of a video stream contained in each extent. FIGS. 35A and 35B are schematic diagrams showing a relationship between playback times and playback paths. Assume that an extent 3501 of the 2D/left-view AV stream file and an extent 3502 of the right-view AV stream file are adjacent to each other as shown in FIG. 35A and a playback time of a video stream contained in the first extent 3501 and the second extent 3502 are four seconds and one second, respectively. Here, the playback path for 3D video images alternately proceeds the extent 3501 and the extent 3502 of the respective files by portions having the same playback time (e.g., one second) as shown by an arrow 3510 in FIG. 35A. Accordingly, when extents of the files have different playback time of video streams, a jump occurs between both the extents 3501 and 3502 as shown by dash lines in FIG. 35A. In contrast, in the first embodiment as shown in FIG. 35B, an extent of the 2D/left-view AV stream file and an extent of the right-view AV stream file adjacent to each other on the BD-ROM disc 101 contain portions of the 2D/left-view stream and the right-view stream; the portions are to be played back with the same timing. In particular, the portions contained in the extents have the same playback time. For example, the top extent 3501A of the 2D/left-view AV stream file and the top extent 3502A of the right-view AV stream file have the same playback time equal to one second; and the second extent 3501B and the second extent 3502B thereof have the same playback time equal to 0.7 seconds. Thus, in the recording areas for storing the 2D/left-view AV stream file and the right-view AV stream file, extents having the same playback time are always adjacent to each other. As a result, the playback path can be designed to run the extents 3501A, 3501B, 3502A, 3502B, . . . , sequentially, starting from the top extent as shown by arrows 3520 in FIG. 35B. Accordingly, the 2D/3D playback device can continuously read the AV stream files without causing a jump when playing back 3D video images. This enables seamless playback to be reliably performed.

<<Top Extent in Recording Area of AV Stream File>>

The top portion of every extent in the recording area for storing an AV stream file contains an I picture of the 2D/left-view stream or a P picture of the right-view stream that has been compressed with reference to the I picture as shown in FIG. 30B. This allows the size of each extent to be determined by using entry points in the clip information file. Accordingly, a playback device can simplify the process of alternately reading extents of a 2D/left-view AV stream file and a right-view AV stream file from the BD-ROM disc 101.

<<Extent Sizes and Intervals>>

The following will describe conditions for the lower limit of the size of each extent and the upper limit of the interval between extents. As described above, causing the 2D playback device to seamlessly play back 2D video images from an AV stream file requires the size of each extent of the AV stream file to be equal to or larger than the minimum extent size and in addition, the interval between the extents to be smaller than the maximum jump distance $S_{jump\_max}$. Accordingly, the size of each extent of the 2D/left-view AV stream file needs to be set at the value equal to or larger than the minimum extent size calculated based on the distance to the next extent in the same file. In addition, the interval between the extents needs to be set at the value not exceeding the maximum jump value $S_{jump\_max}$. This allows the 2D playback device to seamlessly play back 2D video images from the 2D/left-view AV stream file.

Further conditions are required for an interleaved arrangement of extents of 2D/left-view AV stream files and right-view AV stream files in order to seamlessly play back 3D video images therefrom. The conditions and a method for appropriately arranging the extents are partially determined from the capacities of read buffers included in the 2D/3D playback device and the reading capability of a disc drive included therein. A description thereof will be provided after a description of an operational model of the 2D/3D playback device.

<Data Structures of Clip Information Files for 3D Video>

The following describes data structure of clip information file that is associated with an AV stream file storing therein 3D video images. Each of FIG. 36A and FIG. 36B is a schematic diagram showing the data structure of the clip information file. FIG. 36A shows a data structure of a clip information file that is associated with a 2D/left-view AV stream file 3631 (i.e. a 2D/left clip information file 3601), and FIG. 36B shows a data structure of a clip information file that is associated with a right-view AV stream file 3632 (i.e. a right clip information file 3602). The data structure of each of the clip information file 3601 and the clip information file 3602 is basically equal to the data structure of the clip file information that is associated with the AV stream file storing therein 2D video images shown in FIG. 9 and FIG. 10. However, 3D meta data 3613 is added to the 2D/left clip information file 3601. Furthermore, a condition is made for the stream attribute information 3621 of the right clip information file 3602, and information is added to the entry map 3622.

<<3D Meta Data>>

FIG. 37A and FIG. 37B schematically show a data structure of 3D meta data 3613. The 3D meta data 3613 is information used for processing that adds depths to 2D video images that are displayed by playing back the PG stream, IG stream and the secondary video stream that are multiplexed into the 2D/left-view AV stream file. The 3D meta data 3613 includes a table 3701 separately from PIDs of the PG stream, the IG stream and the secondary video stream, as shown in FIG. 37A. Each table 3701 generally includes a plurality of pairs of PTS 3702 and offset values 3703. Each PTS 3702 shows a display time of a frame or a field of one of the PG stream, the IG stream and the secondary video stream. Each offset value 3703 is a number of pixels corresponding to a displacement amount by which a video image shown by the frame or the field at the PTS 3702 is shifted in a horizontal direction when the video image is converted into a right video image and a left video image. The offset values 3702 may be minus values. A pair 3704 of the PTS 3702 and the offset value 3703 is referred to as an offset entry. A valid section of each offset entry ranges from a PTS of the offset entry to a PTS of the subsequent offset entry. For example, when a PTS of an offset entry #1 indicates 180000; a PTS of an offset entry #2 indicates 270000; and a PTS of an offset entry #3 indicates 360000, an offset value +5 of the offset entry #1 is valid in a STC range 3704A from 180000 to 270000, and an offset value +3 of the offset entry #2 is valid in a STC range 3704B from 270000 to 360000. A plane adder 3710 of the 2D/3D playback device (described later) shifts, in the horizontal direction, the video image held in each of the PG plane, the IG plane and the sub-video plane by an offset value with reference to the 3D meta data 3613 so as to convert the video image held in each plane into a left video image and a right video image. Then, the plane adder 3710 combines the video images held in the planes into one video image. Thus, it is possible to generate parallax images from 2D video images in each of the planes. That is, 3D depth perception can be added to each 2D video image. The detail of the plane combination method is described in the description of the plane adder 3710.

Note that contents in the 3D meta data 3613 may be sorted by planes, for example, instead of the PIDs. Thus, the analyzing process of the 3D meta data by the 2D/3D playback device can be simplified. Alternatively, a condition may be added that the length of the valid section of the offset entry is one second or longer, for example, in view of a performance of plane combination processing by the 2D/3D playback device.

<<Stream Attributes Information Relating to Right View Stream>>

Video stream attribute information 902B relating to the 2D/left-view stream shown in FIG. 10 (i.e. the video stream attribute information 902B that is associated with PID=0x1011), should be matched with the video stream attribute information relating to the right-view stream (i.e. the video stream attribute information that is associated with PID=0x1012). Specifically, a codec 9021, a frame rate 9024, an aspect ratio 9023, and a resolution 9022 of the video stream attribute information relating to the 2D/left-view stream and those of the right-view stream should be the same. If the codecs are not the same, a reference relation among the video streams at the time of encoding does not work out. Therefore, the pictures cannot be decoded. Also, if the frame rates, the aspect ratios and the resolutions respectively are not the same, screen displays of the left and right video images cannot be synchronized with each other. As a result, it is not possible to display video images as 3D video images without making the viewers feel uncomfortable.

Alternatively, it is possible to add, to the video stream attribute information relating to the right view stream, a flag showing that it is necessary to refer to the 2D/left-view AV stream file for decoding the video stream. Furthermore, information on the AV stream file referred to may be added to video stream attribution information. In that case, it is possible to judge an adequacy of the correspondence relation between the left and right-view streams with use of the above-mentioned additional information when it is checked whether or not the data to be recorded on the BD-ROM disc 101 has been created according to a specified format in the authoring processing of the BD-ROM disc 101.

<<Entry Map for Right-View Stream>>

Figure 38A:
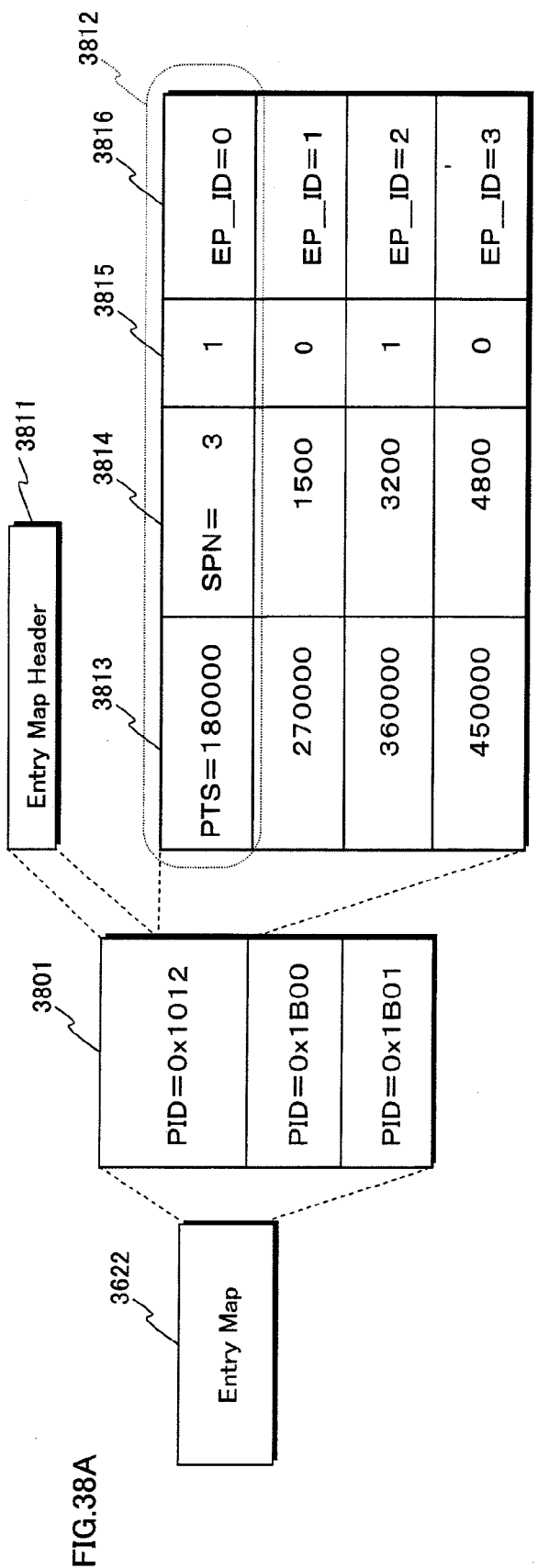
FIGS. 38A and 38B are schematic diagrams showing the data structure of the entry map 3622 of the right-view clip information file 3602 shown in FIG. 36B.
Figure 38B:
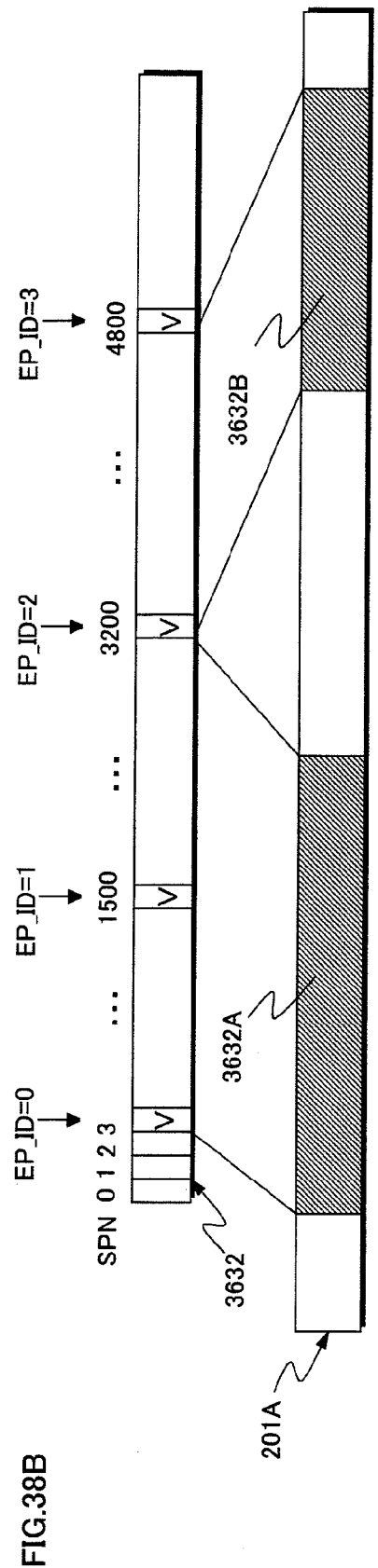

FIGS. 38A and 38B schematically show the data structure of the entry map 3622 of the right clip information file 3602 shown in FIG. 36B. As shown in FIG. 38A, the entry map 3622 is an entry map 3801 relating to the right-view stream (i.e. an entry map header whose PID shown by the entry map header 3811 is 0x1012). A PTS 3813 of each entry point 3812 included in the entry map 3801 is equal to a value obtained by adding a PTS of each I picture included in the 2D/left-view stream to the 3D display delay TD shown in FIG. 31A and FIG. 31B. Here, the PTS of each I picture is written in the entry map 3612 of the 2D/left clip information file 3601 as a PTS of each entry point relating to the 2D/left-view stream. Furthermore, a SPN 3814 including therein a picture of the right-view stream specified by each PTS 3813 is associated with an EP_ID3816 together with the PTS 3813.

Furthermore, an extent start flag 3815 is added to each entry point 3812 as shown in FIG. 38A. Each of the extent start flag 3815 shows whether or not a SPN 3814 having the same entry point 3812 shows a start position of one of extents 3632A, 3632B and so on. For example, as shown in FIG. 38A, the value of the extent start flag 3815 is "1" in an entry point of EP_ID=0. In that case, as shown in FIG. 38B, a value "3" of the SPN 3814 is equal to a SPN of a source packet that exists in the start position of the extent 3632A recorded in the track 201A of the BD-ROM disc 101. Similarly, since the value of the extent start flag 3815 is "1" in the entry point of EP_ID=2, a value "3200" of the SPN 3814 is equal to a SPN of a source packet that exists in the start position of a subsequent extent 3632B. Meanwhile, since the value of the extent start flag 3815 is "0" in the entry point of EP_ID=1, a value "1500" of the SPN 3814 is equal to a SPN of a source packet recorded in a position of each extent except for the start position. Similarly, the extent start flags are added to entry maps relating to the video stream of the 2D/left clip information file 3601. Therefore, the 2D/3D playback device can obtain a size of each extent from the corresponding extent start flag 3815. Thus, processing of reading, from the BD-ROM disc 101, the AV stream files by the 2D/3D playback device may be simplified.

In addition, the entry map header 3811 of the entry map 3801 includes an extent start type. The extent start type indicates which of an extent of the 2D/left view AV stream file and an extent of the right-view AV stream file precedes on the track 201A on the BD-ROM disc 101. Accordingly, by referring to the extent start type, the 2D/3D playback device can easily determine whether a playback request should be made for reading, to the BD-ROM drive, the extent of the 2D/left-view AV stream file or the extent of the right-view AV stream file.

Furthermore, when at the top of the extents exists a TS packet including a top of the I picture of the 2D/left-view stream, an entry point should be associated with a SPN of the source packet including the TS packet. Similarly, when at the top of the extents exists a TS packet including a top of the P picture of the right-view stream having a PTS equal to a sum of a PTS of the I picture of the 2D/left-view stream and a 3D display delay TD, an entry point should be associated with the SPN of the source packet including the TS packet.

Note that an angle switching flag may be provided to each entry point instead of the extent start flag 3815. The angle switching flag (not shown in FIG. 38A or FIG. 38B) is provided to each entry map, and is a 1-bit flag indicating timing of angle switching at multi-angles. With the extent start flag 3601 being compatible with the angle switching 1-bit flag, a bit amount of the entry map as a whole can be decreased. In that case, the entry map header 3813 may be provided with a flag indicating whether a 1-bit field is the "extent start flag" or the "angle switching flag". By checking this flag, the 2D/3D playback device can interpret the meaning of the 1-bit field on the entry map, and therefore switch the processing promptly.

Note that a size of an extent of each AV stream file may be specified by information different from the extent start flag 3815. For example, extent sizes of AV stream files may be listed and stored as meta data in a clip information file. A bit sequence in one-to-one correspondence with an entry point of an entry map may be separately prepared. When the bit sequence indicates "1", the corresponding extent is at the top of the extents. When the bit sequence indicates "0", the extent is not at the top of the extents.

<Playback Device for Playing Back 3D Video>

The following describes the playback device (2D/3D playback device) that plays back 3D video images from the BD-ROM disc 101 in the first embodiment of the present invention. The 2D/3D playback device has a substantially identical structure with the 2D playback device shown in FIG. 16 to FIG. 18. Therefore, the description focuses extension and differences therefrom, and the description of the above-mentioned 2D playback device is incorporated in the following by reference. Regarding the playback processing of 2D video images in accordance with the 2D playlist files that define the playback path of the 2D video images (i.e. the playback processing of the 2D playlist), the 2D/3D playback device has the same structure as the 2D playback device. The details thereof are incorporated in the following by reference. The following describes the playback processing of 3D video images in accordance with the 3D playlist files that define the playback path of the 3D video images (i.e. 3D playlist playback processing).

Figure 39:
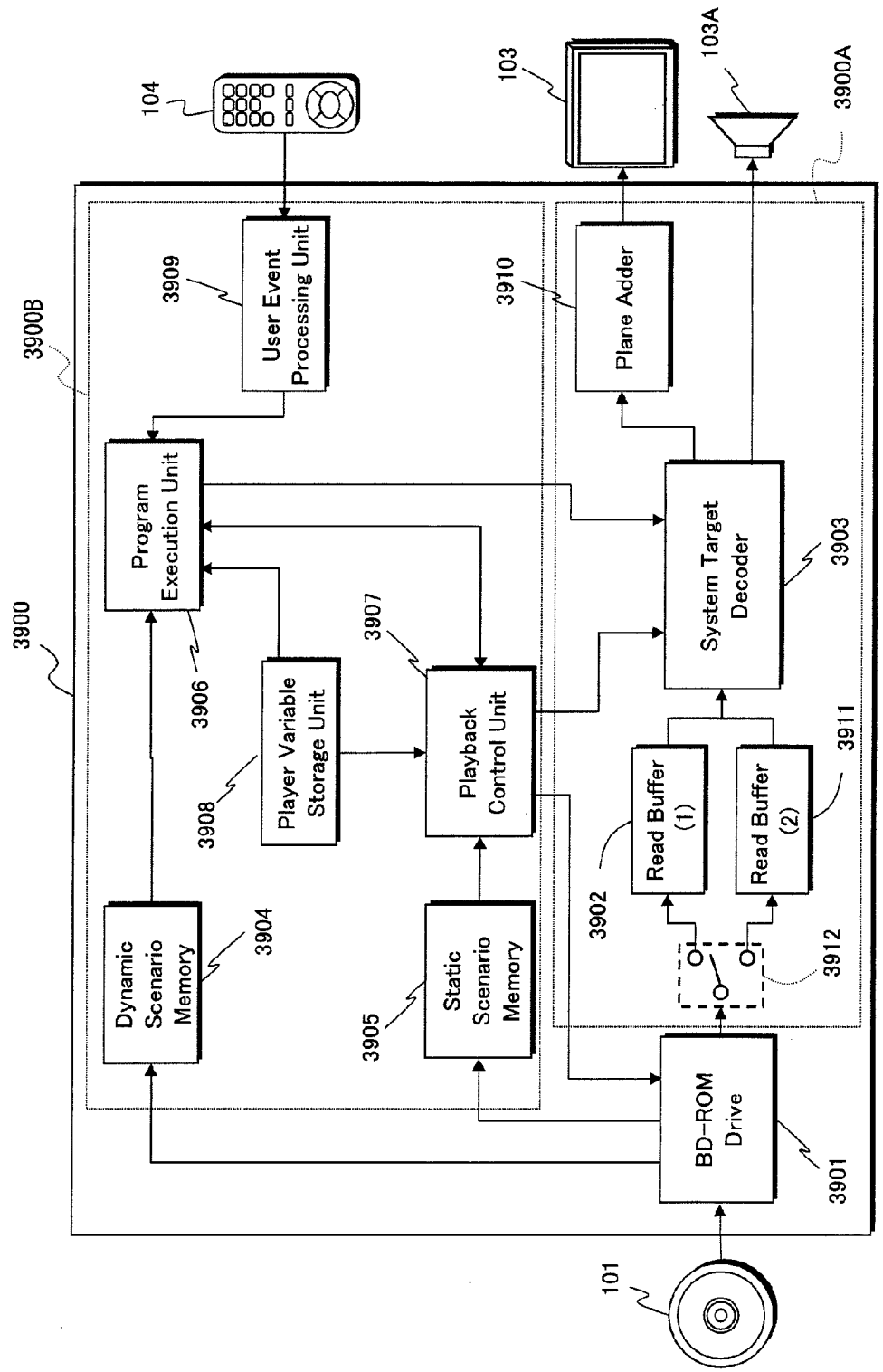
FIG. 39 is the functional block diagram of a 2D/3D playback device 3900.

FIG. 39 shows the function block of a 2D/3D playback device 3900. The 2D/3D playback device 3900 includes a BD-ROM drive 3901, a playback unit 3900A and a control unit 3900B. The playback unit 3900A includes a switch 3912, a read buffer (1) 3902, a read buffer (2) 3911, a system target decoder 3903 and a plane adder 3910. The control unit 3900B includes a dynamic scenario memory 3904, a static scenario memory 3905, a program execution unit 3906, a playback control unit 3907, a player variable storage unit 3908 and a user event processing unit 3909. Here, each of the playback unit 3900A and the control unit 3900B is mounted on a different integrated circuit. Alternatively, the playback unit 3900A and the control unit 3900B may be mounted on a single integrated circuit. Since the control unit 3900B, especially the dynamic scenario memory 3904, the static scenario memory 3905, the program execution unit 3906, the user event processing unit 3909 and the player variable storage unit 3908 have the identical structure with those of the 2D playback device shown in FIG. 16. The details thereof are incorporated in the following by reference.

The BD-ROM drive 3901 includes the identical elements with the BD-ROM drive 1601 in the 2D playback device shown in FIG. 16. With use of these elements, the BD-ROM drive 3901 reads data from the BD-ROM disc 101 in accordance with the request from the playback control 3907. However, unlike the BD-ROM drive 1601 in the 2D playback device, the BD-ROM drive 3901 transfers the AV stream file read from the BD-ROM disc 101 to one of the read buffer (1) 3902 and the read buffer (2) 3911. When the 2D/3D playback device 3900 plays back the 3D video images, the playback control unit 3907 makes requests to the BD-ROM drive 3901 for reading the 2D/left-view AV stream file and the right-view AV stream file alternately in units of extents. In response to these requests, the BD-ROM drive 3901 transfers data of the 2D/left-view AV stream file and data of the right-view AV stream file to the read buffer (1) 3902 and the read buffer (2) 3911, respectively. The switch 3912 transfers the data to either the read buffer (1) 3902 or the read buffer (2) 3911, depending on whether the data is data of the 2D/left-view AV stream file or data of the right-view AV stream file. Thus, when the 2D/3D playback device plays back the 3D video images, the BD-ROM drive 3901 needs to simultaneously read and transfers both the data of the 2D/left-view AV stream file and the data of the right-view AV stream file to the read buffer (1) 3902 and the read buffer (2) 3911, respectively. Therefore, an access speed faster than an access speed of the BD-ROM drive 1601 of the 2D playback device is required for the BD-ROM drive 3901.

The read buffer (1) 3902 and the read buffer (2) 3911 are buffer memories that share a memory element in the playback unit 3900A. Different areas in the single memory element built in the playback unit 3900A are used as the read buffer (1) 3902 and the read buffer (2) 3911, respectively. Alternatively, each of the read buffer (1) 3902 and the read buffer (2) 3911 may be provided in a different memory element. The read buffer (1) 3902 stores therein the data of the 2D/left-view AV stream file transferred from the BD-ROM drive 3901. The read buffer (2) 3911 stores therein the data of the right-view AV stream file transferred from the BD-ROM drive 3901.

Receiving a request from the program execution unit 3906, for example, for performing the 3D playlist playback processing, the playback control unit 3907 refers to the 3D playlist file stored in the static scenario memory 3905 at first. For example, as shown in FIG. 27, the 3D playlist file 2502 defines a main path 2502M and a subpath 2502S. Subsequently, the playback control unit 3907 reads pieces of playitem information #1 to #3 in order from the main path 2502M, and specify 2D/left-view AV stream files LCL_AV#1 to LCL_AV#3 in order with use of the pieces of playitem information #1 to #3. In parallel with that, the playback control unit 3907 further reads pieces of sub-playitem information #1 to #3 in order from the subpath 2502S, and specify right-view AV stream files RCL_AV#1 to LCL_AV#3 in order with use of the pieces of sub-playitem information #1 to #3. Then, the playback control unit 3907 makes an access to the static scenario memory 3905, and refers to the entry maps 3612 and 3622 shown in FIG. 11 and FIGS. 38A and 38B included in the clip information files 3631 and 3632 that are associated with the AV stream files shown in FIGS. 36A and 36B. Then, the playback control unit 3907 determines which of the 2D/left-view stream and the right-view stream an extent at a playback start point belongs to, based on the extent start type written in the entry map header 3813, and determines an initial position of the switch 3912. Subsequently, the playback control unit 3907 makes a request to the BD-ROM drive 3901 for alternately reading the extents of the 2D/left-view AV stream files and the extents of the right-view AV stream files from the playback start point, starting with a file determined to include the extent at the playback start point. After the BD-ROM drive 3901 transfers the whole extent at the playback start point from the BD-ROM drive 3901 to the read buffer (1) 3902 or the read buffer (2) 3911, the BD-ROM drive 3901 transfers the extent from the read buffer (1) 3902 or the read buffer (2) 3911 to the system target decoder 3903. In addition to such processing, the playback control unit 3907 reads the 3D meta data 3613 shown in FIG. 37A and FIG. 37B from the 2D/left clip information file 3631 stored in the static scenario memory 3905, and transfers the 3D meta data 3613 shown in FIG. 37A and FIG. 37B in the plane adder 3910.

Firstly, the system target decoder 3903 reads source packets alternately from the 2D/left-view AV stream file transferred to the read buffer (1) 3902 and the right-view AV stream file transferred to the read buffer (2) 3911. Then, the system target decoder 3903 demultiplexes these read source packets to separate elementary streams from one another. Subsequently, the system target decoder 3903 decodes each of the elementary streams separately. Furthermore, the system target decoder 3903 writes a decoded 2D/left-view stream, a decoded right-view stream, a decoded secondary video stream, a decoded IG stream and a decoded PG stream into built-in dedicated memories that are a 2D/left video plane memory, a right video plane memory, a sub-video plane memory, an IG plane memory and a PG plane memory, respectively. The details of the system target decoder 3903 are described later.

The plane adder 3910 receives 2D/left video plane data, right video plane data, sub-video plane data, IG plane data, PG plane data and image plane data, and combines these data pieces into one video frame or field. The combined video data is outputted to the display device 103 to be displayed on the screen.

Figure 40:
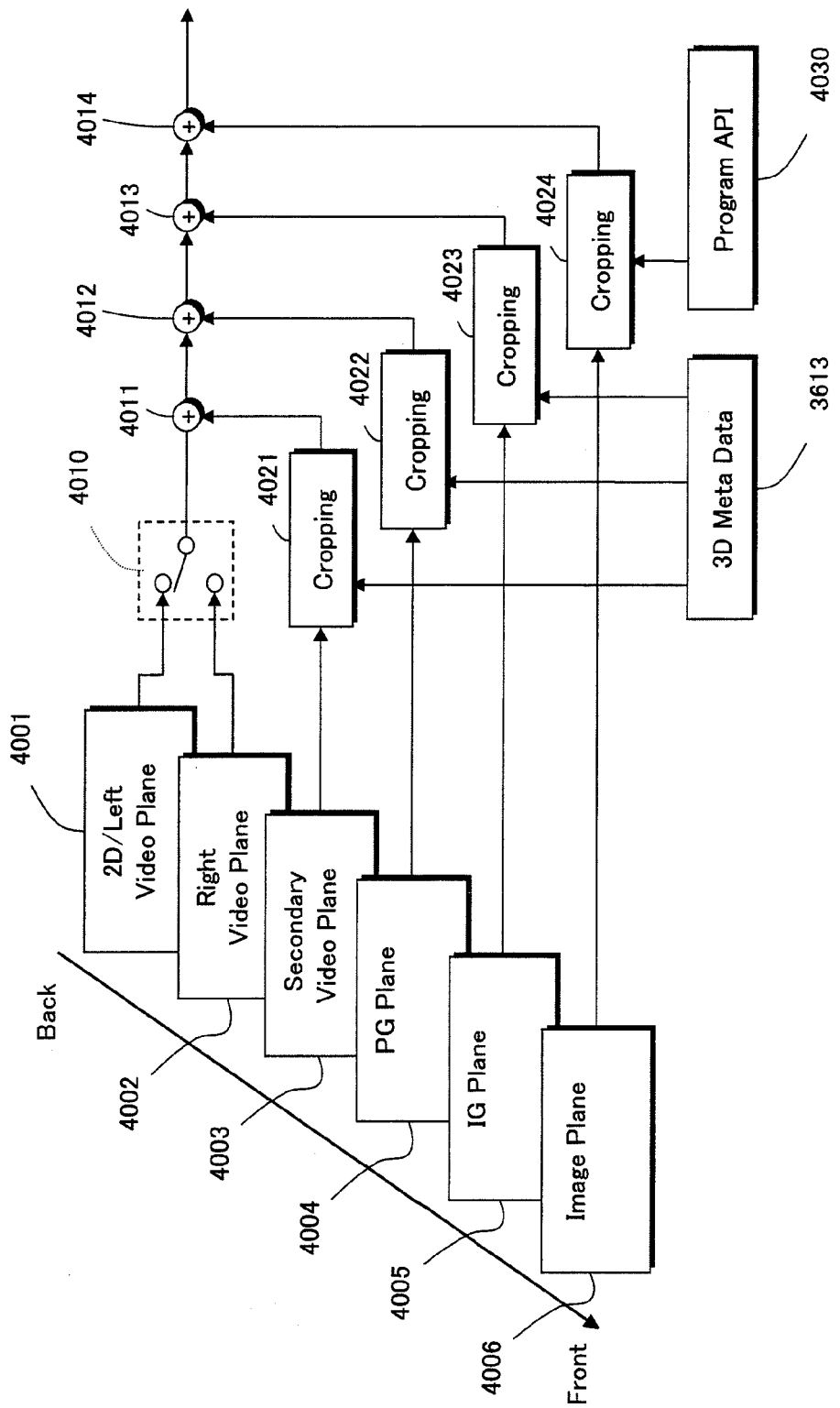
FIG. 40 is a schematic diagram showing a superimposing process of plane data pieces by a plane adder 3910 shown in FIG. 39.

FIG. 40 is a schematic diagram showing a superimposing process of plane data pieces by the plane adder 3910. Each of the plane data pieces are superimposed in order of 2D/left video plane data 4001, right video plane data 4002, sub-video plane data 4003, IG plane data 4004, PG plane data 4005 and image plane data 4006. Specifically, the plane adder 3910 reads the 2D/left video plane data 4001 and the right video plane data 4002 from the system target decoder 3903, and writes the 2D/left video plane data 4001 and the right video plane data 4002 into the planes at times shown by the PTSs of the data pieces. Here, as shown in FIG. 31A and FIG. 31B, a PTS of the 2D/left video plane data 4001 and a PTS of the right video plane data 4002 are different by the 3D display delay TD. Therefore, the 2D/left video plane data 4001 and the right video plane data 4002 are written into the planes alternately at an interval TD. At that time, a switch 4010 in the plane adder 3910 determines which of the plane data in the 2D/left video plane memory and the plane data in the right video plane memory is written at a time shown by the PTS, and reads the determined plane data from the corresponding plane. Therefore, switching between plane memories by the switch 4010 is performed at the interval TD. A first adder 4011 combines the read plane data (the 2D/left video plane data 4001 or the right video plane data 4002) with the sub-video plane data 4003, and a second adder 4012 combines the combined data with the PG plane data 4004, a third adder 4013 combines the combined data with the IG plane data 4005, and finally a fourth plane adder 4014 combines the combined data with the image plane data 4006. By such combination processes, video images shown by the planes are displayed on the screen in a manner that the video images in the 2D/left video plane or the right video plane; the sub-video plane; the IG plane; the PG plane; and the image plane are superimposed onto one another in this order.

The plane adder 3910 further includes four cropping processing units 4021 to 4024. With use of the 3D meta data 3613, a first cropping processing unit 4021, a second cropping processing unit 4022 and a third cropping processing unit 4123 perform cropping processing on the sub-video plane data 4003, the PG plane data 4004 and the IG plane data 4005, respectively. Subsequently, each of the copping processing units 4021 to 4024 converts the plane data into left video plane data and right video plane data alternately. Then, each of plane adders 4011 to 4013 combines: the left video plane data with the 2D/left video plane data; and the right video plane data with the right video plane data.

Figure 41A:
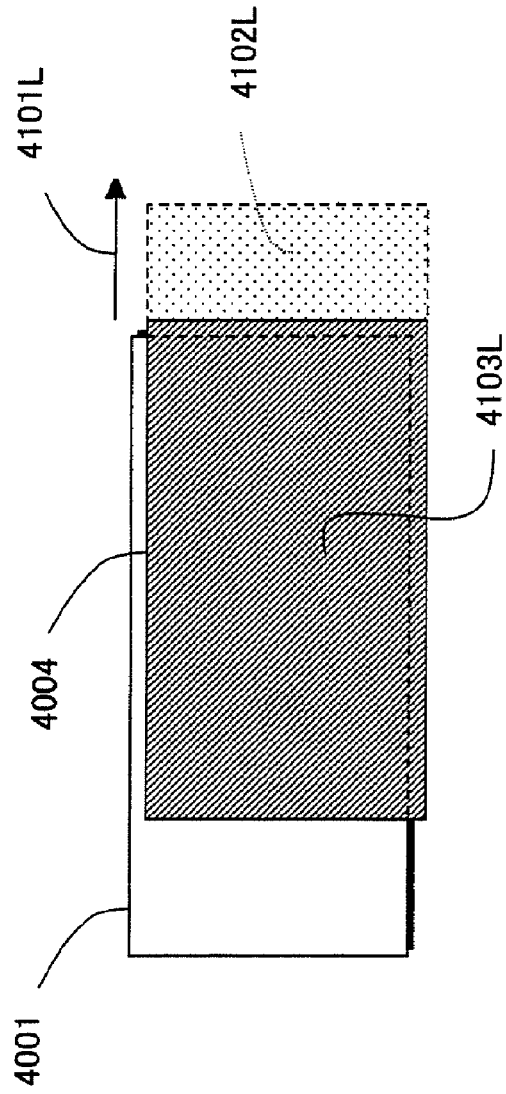
FIGS. 41A and 41B are schematic diagrams showing cropping processes by the cropping processing unit 4022 shown in FIG. 40.
Figure 41B:
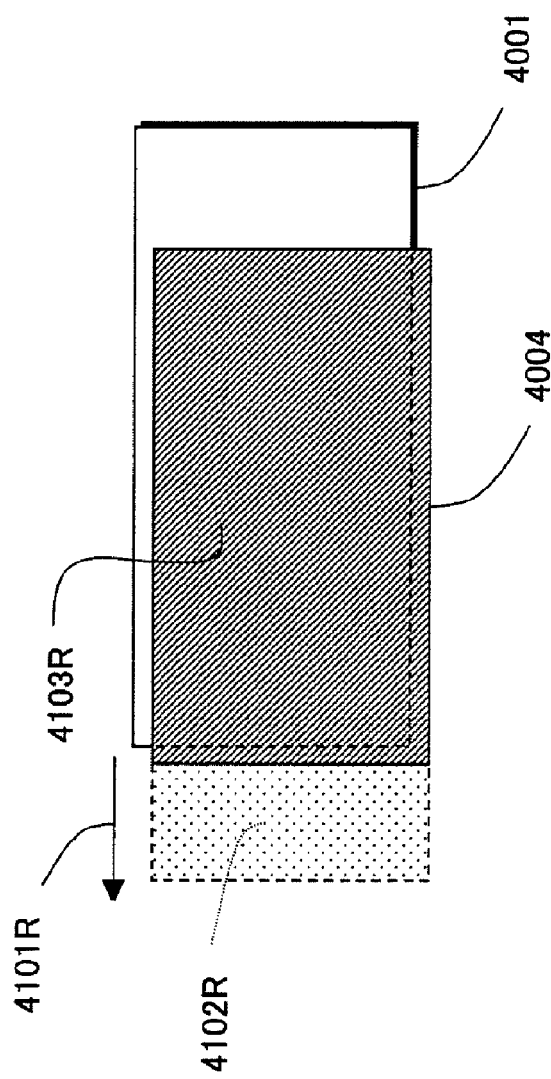

FIG. 41A and FIG. 41B schematically show cropping processing by each of the cropping processing units 4021 to 4023. Each of FIG. 41A and FIG. 41B shows an example of cropping processing performed on the PG plane data 4004 by the second cropping processing unit 4022. Firstly, the second cropping processing unit 4022 searches for the 3D meta data 3701 that is associated with the PID=0x1200 of the PG stream from the 3D meta data 3613 shown in FIG. 37A and FIG. 37B. Then, the second cropping processing unit 4022 searches for an offset entry 3704 that is currently valid from the 3D meta data 3701, and acquires an offset value 3703. If video plane data to be combined with the PG plane data 4004 is 2D/left video plane data 4001, the second cropping processing unit 4022 shifts the PG plane data 4004 in a horizontal direction with respect to the 2D/left video plane data 4001 by the number of pixels corresponding to the acquired offset value 4101L, as shown in FIG. 41A. At that time, if the offset value is positive, the second cropping processing unit 4022 shifts the PG plane data 4004 to the right, and if the offset value is negative, the second cropping processing unit 4022 shifts the PG plane data 4004 to the left. Subsequently, the second cropping processing unit 4022 removes (crops) an area 4102L of the PG plane data 4004 that extends out of the 2D/left video plane data 4001, and the second plane adder 4012 combines a remaining data area 4103L of the PG plane data 4004 with the 2D/left video plane data 4001. Meanwhile, when the video plane data is the right video plane data 4002, the second cropping processing unit 4022 shifts the PG plane data 4004 in a horizontal direction with respect to the right video plane data 4002 by the number of pixels 4101R corresponding to the acquired offset value, as shown in FIG. 41B. At that time, on the other hand, if the offset value is positive, the second cropping processing unit 4022 shifts the PG plane data 4004 to the left, and if the offset value is negative, the second cropping processing unit 4022 shifts the PG plane data 4004 to the right. Subsequently, as with the above-mentioned cropping processing, the second cropping processing unit 4022 removes (crops) an area 4102R of the PG plane data 4004 that extends out of the right video plane data 4002, and the second plane adder 4012 combines a remaining data area 4103R of the PG plane data 4004 with the right video plane data 4002. Similarly, the third cropping processing unit 4023 and the first cropping processing unit 4021 also perform the cropping processing on the IG plane data 4005 and the sub-video plane data 4003, respectively.

Figure 42A:
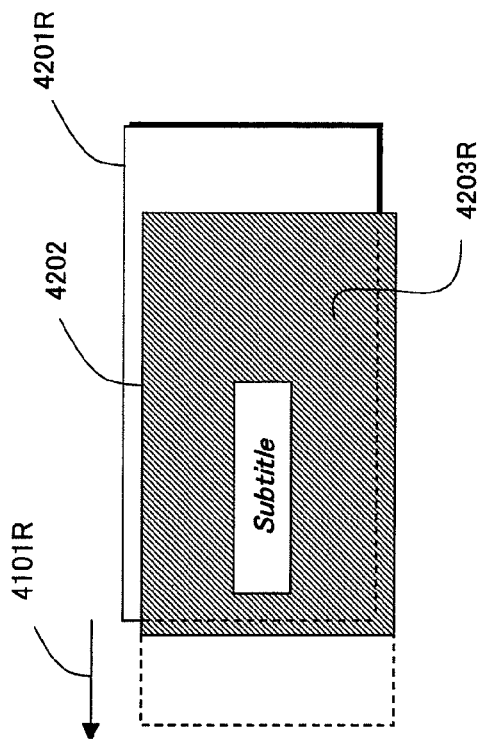
FIGS. 42A, 42B, 42C are schematic diagrams respectively showing left 2D video images, right 2D video images, which are superimposed by the cropping processes shown in FIGS. 41A, 41B, and 3D video images perceived by a viewer.
Figure 42B:
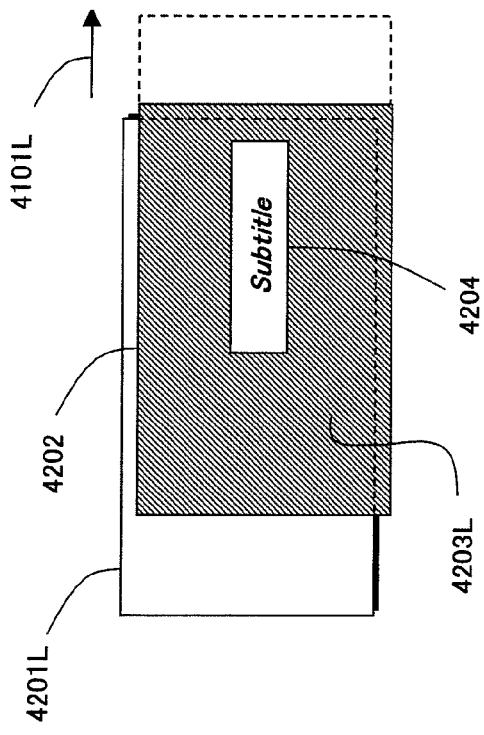
Figure 42C:
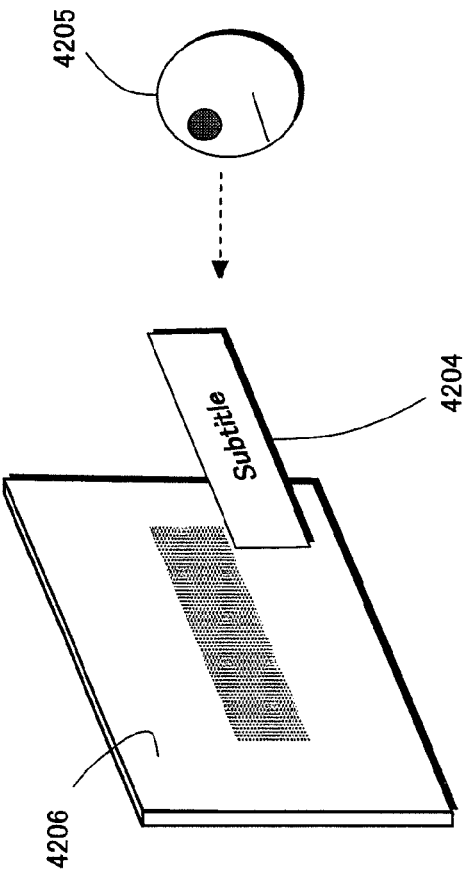

FIG. 42A and FIG. 42B schematically show left and right 2D video images that have been superimposed after the cropping processing shown in FIG. 41A and FIG. 41B, respectively; and FIG. 42C is a schematic diagram showing a 3D video image that has been generated from the 2D video images, and is viewed by the viewer. In planes for the left video, a PG plane 4202 is shifted to the right with respect to a left video plane 4201L by the offset value 4101L as shown in FIG. 42A. Therefore, a left area 4303L of the PG plane 4202 appears to be superimposed on the left video plane 4201L. As a result, a 2D video image 4204 of the subtitles in the PG plane 4202 appears to be shifted to the right from an original position by the offset value 4101L. In planes for the right video, on the other hand, the PG plane 4202 is shifted to the left with respect to right video plane 4201R by the offset value 4101R as shown in FIG. 42B, a right area 4203R of the PG plane 4202 appears to be superimposed on the right video plane 4201R. As a result, the 2D video image 4204 of subtitles in the PG plane 4202 appears to be shifted to the left from an original position by the offset value 4101R. Consequently, as shown in FIG. 42C, a 3D video image 4204 of the subtitles appears to be closer to a viewer 4205 than a video plane 4206. Thus, it is possible to play back parallax images by generating the a pair of left and right plane data pieces from one plane data piece, with use of the cropping processing. That is, a depth can be added to monoscopic video. In particular, it is possible to allow the viewer to see the monoscopic video popping out from the screen.

The following describes FIG. 40. The image plane data 4006 is obtained by decoding, with use of the system target decoder 3903, the graphics data transferred from the program execution unit 3906 to the system target decoder 3903. The graphics data is raster data such as JPEG data or PNG data, and shows a GUI graphics part such as a menu. The fourth cropping processing unit 4024 performs the cropping processing on the image plane data 4006 as with other cropping processing units 4021 to 4023. However, unlike the other cropping processing units 4021 to 4023, the fourth cropping processing unit 4024 reads the offset value from offset information specified by a program API 4030 instead of the 3D meta data 3613. Here, the program API 4030 is executed by the program execution unit 3906, and has a function of calculating offset information corresponding to a depth of the video image shown by the graphics data, and transferring the offset information to the fourth cropping processing unit 4024.

In addition to the above-stated processing, the plane adder 3910 performs processing of converting an output format of the plane data combined by the four plane adders 4011 to 4014 into a format that complies with a 3D display method adopted in a device such as the display device 103 to which the data is outputted. If an alternate-frame sequencing method (i.e. a method for allowing the viewer to view left video images and right video images alternately with use of shutter glasses) is adopted in the device, for example, the plane adder 3910 outputs the combined plane data pieces as one frame or one field. Meanwhile, if a method that uses a lenticular lens is adopted in the device, for example, the plane adder 3910 combines the left and right plane data pieces with one frame or one field of video data with use of the built-in buffer memory. More specifically, the plane adder 3910 temporarily stores and holds therein the left video plane data that has been combined first with the video data in the own buffer memory. Subsequently, the plane adder 3910 combines the right video plane data with the video data, and further combines the resultant data with the left video plane data held in the buffer memory. In the combining processing, each of the left and right plane data pieces is divided, in a vertical direction, into small rectangle areas that are long and thin, and the small rectangle areas are arranged alternately in the horizontal direction in one frame or one field so as to re-constitute the frame or the field. In such a manner, the plane adder 3901 combines the left and right plane data pieces with one frame or one field of video data, and then outputs the combined data.

<<Configuration of System Target Decoder>>

Figure 43:
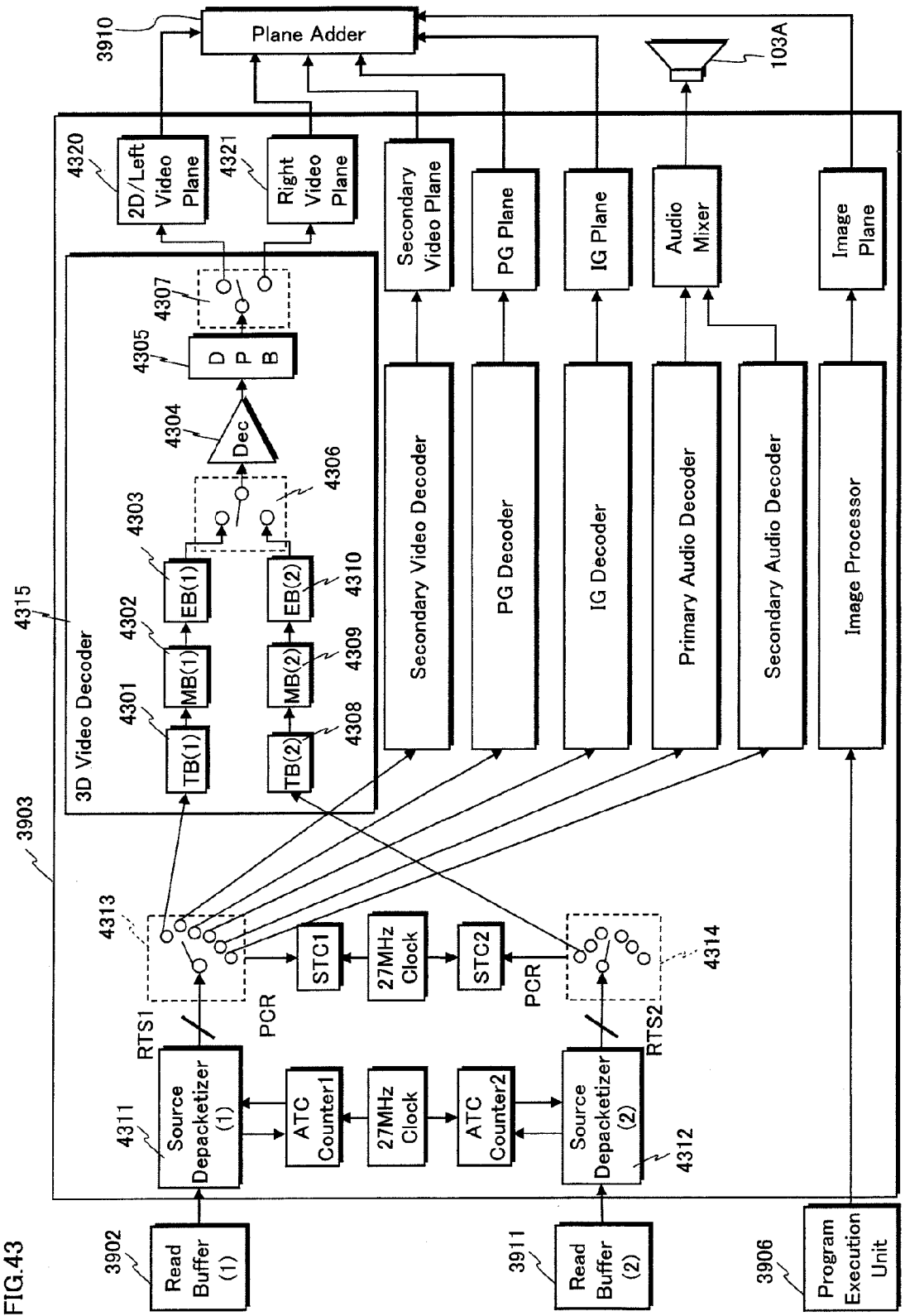
FIG. 43 is a functional block diagram of the system target decoder 3903 shown in FIG. 39.

FIG. 43 is a functional block diagram of the system target decoder 3903 shown in FIG. 39. The following explains the system target decoder 3903 with reference to FIG. 43. Among the components of the system target decoder 3903, the secondary video decoder, the IG decoder, the PG decoder, the primary audio decoder, the secondary audio decoder, the audio mixer, the image processor, and the plane memories are similar to those included in the 2D playback device shown in FIG. 18. Accordingly, explanations about details of the components can be found in the explanation about those shown in FIG. 18.

The source depacketizer (1) 4311 reads source packets from the read buffer (1) 3902, fetches TS packets included in the source packets, and transmits the TS packets to the PID filter (1) 4313. Similarly, the source depacketizer (2) 4312 reads source packets from the read buffer (2) 3911, fetches TS packets included in the source packets, and transmits the TS packets to the PID filter (2) 4314. Each of the source depacketizers 4311 and 4312 further adjusts the time of transferring the TS packets, in accordance with the ATS of the source packets. This adjustment is made in the same manner as made by the source depacketizer 1810 shown in FIG. 18. Thus the detailed explanation of the adjustment made for FIG. 18 is incorporated in the following by reference.

First, the PID filter (1) 4313 selects, from among the TS packets output from the source depacketizer (1) 4311, TS packets having a PID that matches a PID previously designated by the playback control unit 3907. Next, the PID filter (1) 4313 transfers the selected TS packets to the TB (1) 4301, the secondary vide decoder, the IG decoder, the PG decoder, the audio decoder or the secondary audio decoder of the 3D video decoder 4315, depending on the PID of the TS packet. Similarly, the PID filter (2) 4314 transfers the TS packets, output from the source depacketizer (2) 4312, to the decoders, according to the PID of each TPS packet. Here, as shown in FIG. 29B, the right-view AV stream file 2902 includes only the right-view stream. Thus, for the 3D playlist playback, the PID filter (2) 4314 transfers the TS packets mainly to the TB (2) 4308 of the 3D video decoder 4315.

As shown in FIG. 43, the 3D video decoder 4315 includes a TB (1) 4301, an MB (1) 4302, an EB (1) 4303, a TB (2) 4308, an MB (2) 4309, an EB (2) 4310, a buffer switch 4306, a compressed video decoder 4304, a DPB 4305, and a picture switch 4307. The TB (1) 4301, the MB (1) 4302, the EB (1) 4303, the TB (2) 4308, the MB (2) 4309, the EB (2) 4310 and the DPB 4305 are all buffer memories, each of which uses an area of the memory chips included in the 3D video decoder 4315. Note that some or each of these buffer memories may use different one of the memory chips and be isolated from the others.

The TB (1) 4301 receives TS packets that include a 2D/left-view stream from the PID filter (1) 4313, and temporary stores the TS packets. The MB (1) 4302 stores PES packets reconstructed from the TS packets stored in the TB (1) 4301. Note that the TS headers of the TS packets are removed when the TB (1) 4301 transfers the data to the MB (1) 4302. The EB (1) 4303 extracts coded video access units from the PES packets and stores them. Note that the PES headers of the PES packets are removed when the MB (1) 4302 transfers the data to the EB (1) 4303.

The TB (2) 4308 receives TS packets that include a right-view stream from the PID filter (2) 4314, and temporary stores the TS packets. The MB (2) 4309 stores PES packets recovered from the TS packets stored in the TB (2) 4308. Note that the TS headers of the TS packets are removed when the TB (2) 4308 transfers the data to the MB (2) 4309. The EB (2) 4310 extracts coded video access units from the PES packets and stores them. Note that the PES headers of the PES packets are removed when the MB (2) 4309 transfers the data to the EB (2) 4310.

The buffer switch 4306 transfers the video access units stored in the EB (1) 4303 and the EB (2) 4310 to the compressed video decoder 4304 at the times of the DTSs indicated by the original TS packets. Here, the buffer switch 4306 may receive the decode switch information 3201 included in the corresponding video access unit 3200 shown in FIG. 32, back from the compressed video decoder 4304. If this is the case, the buffer switch 4306 can determine to which between the EB (1) 4303 and the EB (2) 4310 to transfer the next video access unit first, by using the decode switch information 3201. Meanwhile, as FIG. 31A and FIG. 31B show, the DTSs of the pictures of the 2D/left-view stream 3101 and the right-view stream 3102 are alternately set up with intervals of the 3D display delay TD. Thus, in the case the compressed video decoder 4304 continues the decoding of the video access units while ignoring the DTSs, the buffer switch 4306 may switch between the EB (1) 4303 and the EB (2) 4310 from the transfer source to the other every time the buffer switch 4306 transfers one of the video access units to the compressed video decoder 4304.

The compressed video decoder 4304 decodes each video access unit transferred from the buffer switch 4306, at the time of the DTS of the corresponding TS packet. Here, the compressed video decoder 4304 uses different decoding methods according to the compression encode format (e.g. MPEG-2, MPEG4AVC and VC1) adopted for the compressed pictures contained in the video access unit, and the stream attribute. The compressed video decoder 4304 further transfers the decoded pictures, namely video data of the frame or the field, to the DPB 4305.

The DPB 4305 temporarily holds the decoded pictures. The compressed video decoder 4304 refers to the decoded pictures held by the DPB 4305 to decode the P pictures and the B pictures. The DPB 4305 further transfers each of the pictures to the picture switch 4307 at the time of the PTS of the corresponding TS packet.

The picture switch 4307 writes the decoded picture transferred from the compressed video decoder 4304, namely the frame/field video data, to the 2D/left video plane 4320 when the picture belongs to a 2D/left-view stream, and to the right video plane 4321 when the picture belongs to a right-view stream.

<Physical Arrangement of AV Stream Files for 3D Video on Disc>

The following will explain a physical arrangement of AV stream files recorded on the BD-ROM disc 101, the arrangement enabling seamless 3D video playback.

Figure 44:
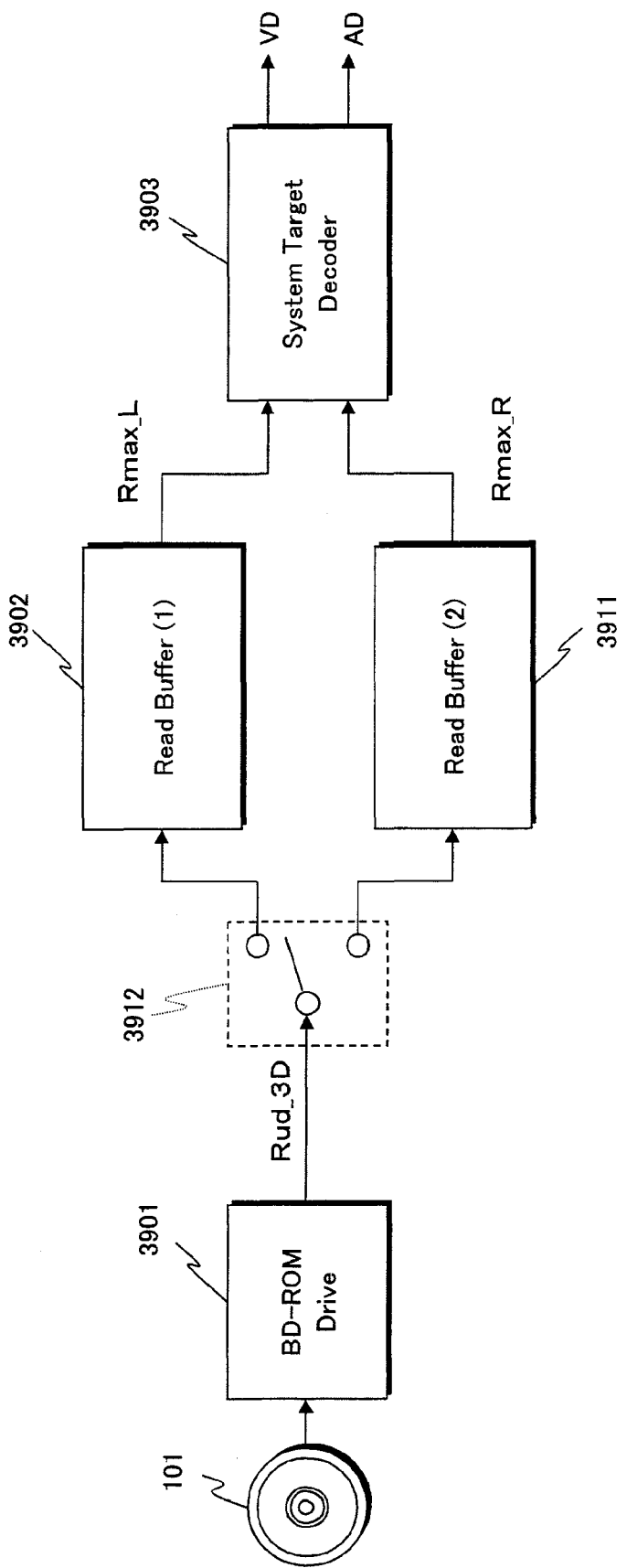
FIG. 44 is a schematic diagram showing the processing channel for playing back 3D video data VD and audio data AD from a 2D/left-view AV stream file and a right-view AV stream file read from the BD-ROM disc 101.

Here, the definition of the data transfer rate of a playback channel will be first provided as assumptions for the following explanation. FIG. 44 is a schematic diagram showing the processing channel for playing back 3D video data VD and audio data AD from a 2D/left-view AV stream file and a right-view AV stream file read from the BD-ROM disc 101. As shown in FIG. 44, the BD-ROM drive 3901 reads the 2D/left-view AV stream file and the right-view AV stream file alternately in units of extents, while transferring the read extents to the switch 3912. The switch 3912 stores the extents of the 2D/left-view AV stream file and the right-view AV stream files into the read buffer (1) 3902 and the read buffer (2) 3911, respectively. The system target decoder 3903 reads data from the read buffers 3902 and 3911 alternately, then decoding the read data. Here, the reference symbol $R_{ud\_3D}$ denotes the rate of reading data from the BD-ROM drive 3601 to each read buffer 3902 and 3911 (in units of bits/second), the reference symbol $R_{ext\_L}$ (which is hereinafter referred to as the first average transfer rate) denotes the average transfer rate of extents from the read buffer (1) 3902 to the system target decoder 3603 (in units of bits/second), and the reference symbol $R_{ext\_R}$ (which is hereinafter referred to as the second average transfer rate) denotes the transfer rate of extents from the read buffer (2) 3911 to the system target decoder 3903 (in units of bits/second). By using these denotations, the conditions for avoiding an underflow of both the read buffers 3902 and 3911 caused by the data transfer from the read buffers 3902 and 3911 to the system target decoder 3903 are represented by the following equation (2):

$$R_{ud\_3D} > R_{ext\_L}, R_{ud\_3D} > R_{ext\_R}. \quad (2)$$

<<Physical Order of Extents in Interleaved Arrangement>>

FIGS. 45A-45C are schematic diagrams showing the relationship between the progression of the data amounts accumulated in the read buffers 3902 and 3911 during 3D video playback and the physical order of extents of the AV stream files recorded on the BD-ROM disc 101 in the interleaved arrangement. The BD-ROM drive 3901 continuously transfers the entirety of a requested single extent from the BD-ROM disc 101 to the read buffer (1) 3902 or the read buffer (2) 3911. For example, when the top extent 4506 in an area to be read on the disc 101 belongs to the 2D/left-view AV stream file as shown in FIG. 45C, the BD-ROM drive 3901 continuously writes the entirety of the top extent 4506 into the read buffer (1) 3902. Here, the system target decoder 3903 does not start reading the top extent 4506 until the entirety of the top extent 4506 has been completely written into the read buffer (1) 3902, that is, until the end of the reading period (1) for the top extent 4506 shown in FIG. 45C. The reasons are as follows. Even if the process of decoding the 2D/left-view AV stream file preceded the process of decoding the right-view AV stream file, the process of playing back 3D video images could not be started until decoding portions of both the files had been completed when playback periods overlap between the portions. Furthermore, the decoded portion of the 2D/left-view AV stream file had to be held in the buffer memory until the end of decoding the corresponding portion of the right-view AV stream file, and thus the buffer memory might be prevented from being reduced in capacity and improved in use efficiency. As a result, during the reading period (1) for the top extent 4506, the data amount DA1 accumulated in the read buffer (1) 3902 increases at the reading rate $R_{ud\_3D}$ as shown by the arrow 4501 in FIG. 45A.

At the end of the reading period (1) for the top extent 4506, the BD-ROM drive 3901 subsequently writes the second extent 4507 into the read buffer (2) 3911. During the reading periods (2), (3), . . . , for the second and subsequent extents 4507, 4508, . . . , the data transfer from the read buffers 3902 and 3911 to the system target decoder 3903 can be started. Accordingly, during the reading period (2) for the second extent 4507, the data amount DA2 accumulated in the read buffer (2) 3911 increases at the difference $R_{ud\_3D} - R_{ext\_R}$ between the reading rate $R_{ud\_3D}$ and the second average transfer rate $R_{ext\_R}$ as shown by the arrow 4503 in FIG. 45B. On the other hand, no data is written from the BD-ROM drive 3901 into the read buffer (1) 3902 while data is being written from the BD-ROM drive 3901 into the read buffer (2) 3911. Accordingly, in this period, the data amount DA1 accumulated in the read buffer (1) 3902 decreases at the first average transfer rate $R_{ext\_L}$ as shown by the arrow 4502 in FIG. 45A. Similarly, during the reading period (3) for the third extent 4508, the data amount DA1 accumulated in the read buffer (1) 3902 increases at the difference $R_{ud\_3D} - R_{ext\_L}$ between the reading rate $R_{ud\_3D}$ and the first average transfer rate $R_{ext\_L}$ as shown by the arrow 4604 in FIG. 45A, and the data amount DA2 accumulated in the read buffer (2) 3911 decreases at the second average transfer rate $R_{ext\_R}$ as shown by the arrow 4505 in FIG. 45B.

As clearly seen from the example shown in FIGS. 45A-45C, the capacities of the read buffers 3902 and 3911 are required to be no less than the size of the top extent of an AV stream file in an area to be read. Specifically, when the top extent belongs to the 2D/left-view AV stream file, the capacity RB1 of the read buffer (1) 3902 (in units of bytes) needs to be no less than the size Extent_L of the extent (in units of bytes):

$$RB1 \geq \text{Extent\_}L \quad (3)$$

Similarly, when the top extent belongs to the right-view AV stream file, the capacity RB2 of the read buffer (2) 3911 (in units of bytes) needs to be no less than the size Extent_R of the extent (in units of bytes):

$$RB2 \geq \text{Extent\_}R \quad (4)$$

The sizes Extent_L and Extent_R respectively included in the right hand sides of Eqs. (3) and (4) are not limited to the sizes of the top extents of the respective AV stream files, and may be preferably the sizes of arbitrary extents. In interrupt playback, not only the top extent of each file but also all the extents thereof can be the top extent in an area to be read. When there is a section in which interrupt playback is prohibited, it is sufficient that all the extents not belonging to the section satisfy Eqs. (3) and (4).

As seen from Eqs. (3) and (4), either one of two extents separately belonging to left- and right-view AV stream files, whichever has a smaller size, is to be located at the head of the area to be read in order to reduce the capacities of the read buffers 3902 and 3911 as much as possible. More specifically, when the extent size Extent_L of the 2D/left-view AV stream file is larger than the extent size Extent_R of the right-view AV stream file (i.e., Extent_L>Extent_R), locating the extent of the right-view AV stream file at the head can reduce the capacities of the read buffers. Conversely, when the extent size Extent_L of the 2D/left-view AV stream file is smaller than the extent size Extent_R of the right-view AV stream file (i.e., Extent_L<Extent_R), the extent of the 2D/left-view AV stream file is to be located at the head. In addition, there is also the advantage that a smaller size of the top extent can start video playback earlier.

Here, when an extent of the 2D/left-view AV stream file and an extent of the right-view AV stream file contain video streams whose playback periods overlap each other, the video streams need to have the same length of playback time, as explained with reference to FIG. 35. Under the condition, either of an extent of the 2D/left-view AV stream file and an extent of the right-view AV stream, whichever has a lower bit rate, also has a smaller extent size. Accordingly, an extent of either the 2D/left-view AV stream file or the right-view AV stream file, whichever has a lower system rate, is arranged at the head in the areas with the files recorded on the BD-ROM disc 101. This arrangement can reduce the sizes of the read buffers than the reversed arrangement, thus reducing the manufacturing cost of the 2D/3D playback device.

Figure 46A:
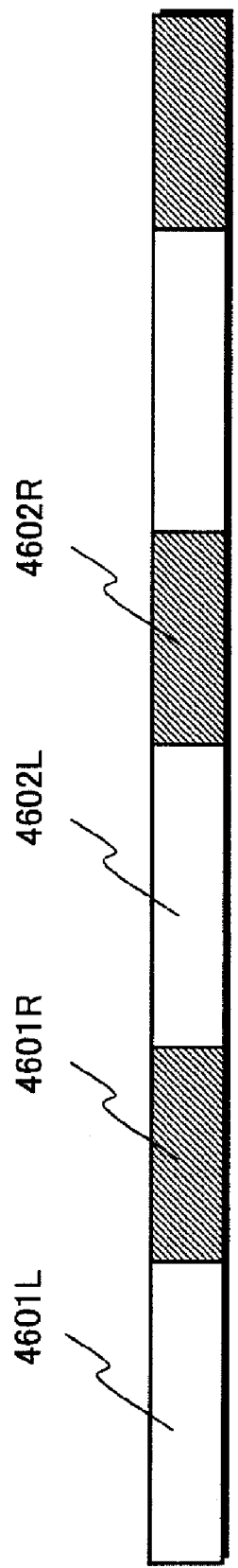
FIGS. 46A and 46B are schematic diagrams showing two types of the order of the extents belonging to AV stream files.
Figure 46B:
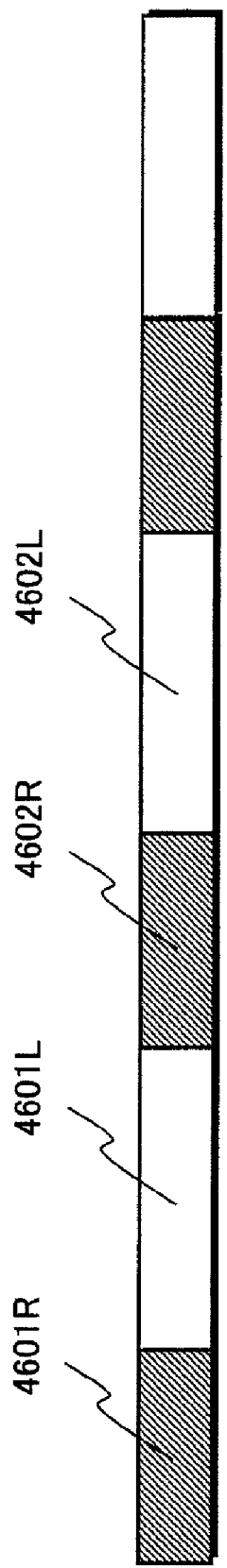

FIGS. 46A and 46B are schematic diagrams specifically showing two types of the order of extents of the AV stream files. Here, assume that the rate $R_{ud\_3D}$ of reading data from the BD-ROM drive 3901 to each read buffer 3902, 3911 is 90 Mbps; the system rate of the 2D/left-view AV stream file is 48 Mbps; the system rate of the right-view AV stream file is 24 Mbps; and the playback time of a video stream contained in each extent 4601L, 4601R, 4602L, 4602R, . . . , is 4 seconds. When the extents of both the AV stream files are arranged in an interleaved manner in the recording area on the BD-ROM disc 101, starting from the extent 4601L of the 2D/left-view AV stream file followed by subsequent extents 4601R, 4602L, 4602R, . . . , as shown in FIG. 46A, the lower limit of the capacity RB1 of the read buffer (1) 3902 is obtained by the following equation based on Eq. (3):

$$RB1 = (48 \text{ Mbps} \times 192/188) \times 4/(8 \times 1024^2) = 23.3 \text{ MB}.$$

Accordingly, the capacity RB1 of the read buffer (1) 3902 needs to be no less than the lower limit 23.3 MB. Note that the ratio 192/188 is the ratio between the bit lengths of a source packet and a TS packet. As shown in FIGS. 7A-7C, each source packet 702 stored in either of the read buffers 3902 and 3911 is larger in data size than a TS packet 701 to be transmitted to the system target decoder 3903 by the size of the header (TP_Extra_Header) 702H. Assume also that 1 $Mb=10^6$ b and 1 $MB=8\times1024^2$ b. On the other hand, when extents are arranged in an interleaved manner, starting from the extent 4601R of the right-view AV stream file followed by the subsequent extents 4601L, 4602R, 4602L, . . . , as shown in FIG. 46B, the lower limit of the capacity RB2 of the read buffer (2) 3911 is obtained by the following equation based on Eq. (4):

$$RB2 = (24 \text{ Mbps} \times 192/188) \times 4/(8 \times 1024^2) = 12.2 \text{ MB}.$$

Accordingly, the capacity RB2 of the read buffer (2) 3911 needs to be no less than the lower limit 12.2 MB. This is less than the above-described lower limit RB1 of 23.3 MB.

As explained with reference to FIG. 30, the 2D/left-view stream 3010 is a base-view stream whereas the right-view stream 3020 is a dependent-view stream. Thus, the right-view AV stream file 3020 is smaller in data size, i.e., lower in system rate, than the 2D/left-view AV stream file 3010. Furthermore, the 2D/left-view AV stream file 2901 as shown in FIG. 29A may contain the primary audio stream 2912, the secondary video stream 2915, the PG stream 2913, and the IG stream 2914 in addition to the primary video stream 2911, in contrast to the right-view AV stream file 2902 as shown in FIG. 29B. The 2D/left-view AV stream file 2901 may also contain a secondary audio stream. Thus, the right-view AV stream file 3020 is even smaller in data size, i.e., even lower in system rate, than the 2D/left-view AV stream file 3010. For this reason, one of extents of right-view AV stream files may be always located at the head in the recording area for storing AV stream files on the BD-ROM disc 101. Furthermore, when interrupt playback is available, of each pair of extents containing portions of left and right video streams having the same playback period, one extent containing the portion of the right-view stream may be arranged before the other. This arrangement can reduce the required capacities of the read buffers as described above. In addition, the 2D/3D playback device can simplify reading processing since the top extent of AV stream files read from the BD-ROM disc 101 is predetermined to belong to a right-view AV stream file.

<<Conditions for Preventing Underflow of Read Buffers>>

Figures 47A, 47B:
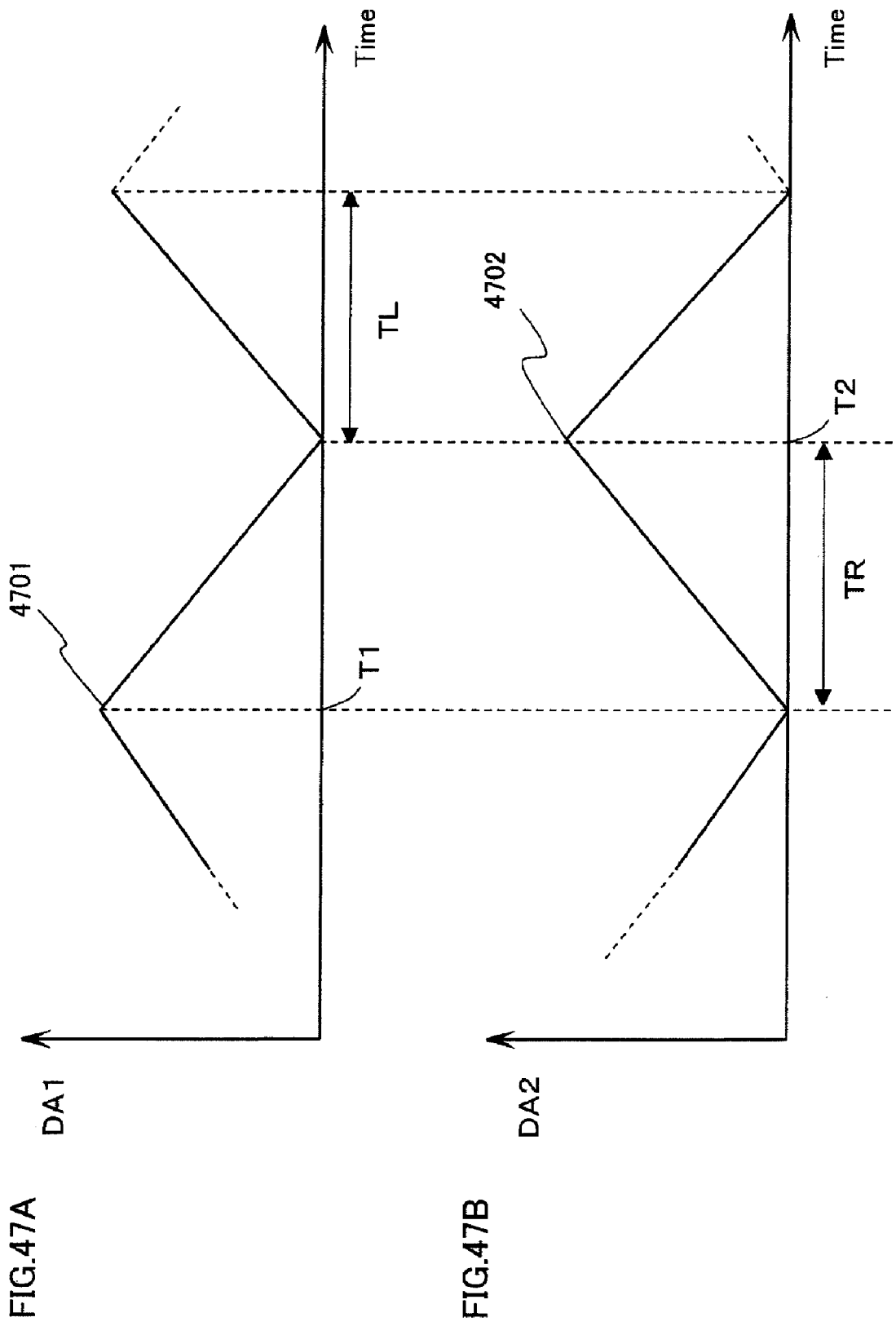
FIGS. 47A and 47B are graphs respectively showing progressions of the data amount DA1 accumulated in the read buffer (1) 3902 and the data amount DA2 accumulated in the read buffer (2) 3911 when the extents of left and right AV stream files are alternately read from the disc 101.

The following will explain conditions with reference to FIGS. 47A and 47B, the conditions for preventing an underflow of both the read buffers 3902 and 3911 when alternately reading extents of left and right AV stream files from an area on the BD-ROM disc 101 where the extents are recorded in an interleaved arrangement.

FIGS. 47A and 47B are graphs respectively showing progressions of the data amount DA1 accumulated in the read buffer (1) 3902 and the data amount DA2 accumulated in the read buffer (2) 3911 when the extents of the left and right AV stream files are alternately read from the disc 101. Since extents of both the AV stream files are read alternately, any extent of one of the AV stream files is not read while extents of the other are read. Meanwhile, the data transfer from each of the read buffers 3902 and 3911 to the system target decoder 3903 is continued. In order to prevent either of the read buffers 3902 and 3911 from an underflow caused by the data transfer to the system target decoder 3903 during the pause of reading extents, it is necessary to accumulate a sufficient amount of data into the read buffers 3902 and 3911 during reading extents. Specifically as shown in FIG. 47A, the data amount DA1 accumulated in the read buffer (1) 3902 reaches a peak 4701 at the time T1 the reading of one extent of the 2D/left-view AV stream file has been completed. After that, the data amount DA1 decreases at the first average transfer rate $R_{ext\_L}$ during the reading period TR for the next extent of the right-view AV stream file. In this case, the data amount DA1 accumulated to the peak 4701 needs to be sufficiently large such that the data amount DA1 does not reach zero, that is, the read buffer (1) 3902 avoids an underflow until the end of the period TR. Furthermore, the capacity RB1 of the read buffer (1) 3902 needs to be no less than the data amount DA1. This condition can be expressed by the following equation (5) with use of the size Extent_R of the extent of the right-view AV stream file read in the period TR:

$$RB1 \geq \text{CEIL}\left(\frac{1}{8} \times \frac{\text{Extent\_R} \times 8}{R_{ud\_3D}} \times R_{ext\_L}\right). \quad (5)$$

In the right hand side of Eq. (5), the extent size Extent_R is multiplied by "8" to convert the units thereof from bytes to bits, and the division by "8" aims to convert the units of the final result from bits to bytes. The function CEIL( ) represents the operation to round up fractional numbers after the decimal point of the value in the parentheses.

Similarly, as shown in FIG. 47B, the data amount DA2 accumulated in the read buffer (2) 3911 reaches a peak 4702 at the time T2 the reading of one extent of the right-view AV stream file has been completed. After that, the data amount DA2 decreases at the second average transfer rate $R_{ext\_R}$ during the reading period TL for the next extent of the 2D/left-view AV stream file. In this case, the data amount DA2 accumulated to the peak 4702 needs to be sufficiently large such that the data amount DA2 does not reach zero, that is, the read buffer (2) 3911 avoids an underflow until the end of the period TL. Furthermore, the capacity RB2 of the read buffer (2) 3911 needs to be no less than the data amount DA2. This condition can be expressed by the following equation (6) with use of the size Extent_L of the extent of the 2D/left-view AV stream file read in the period TL:

$$RB2 \geq \text{CEIL}\left(\frac{1}{8} \times \frac{\text{Extent\_L} \times 8}{R_{ud\_3D}} \times R_{ext\_R}\right). \quad (6)$$

<<Conditions for Realizing Seamless Playback despite Jumps>>

The following will explain the conditions for realizing seamless playback despite jumps required while AV stream files are read.

Figure 48:
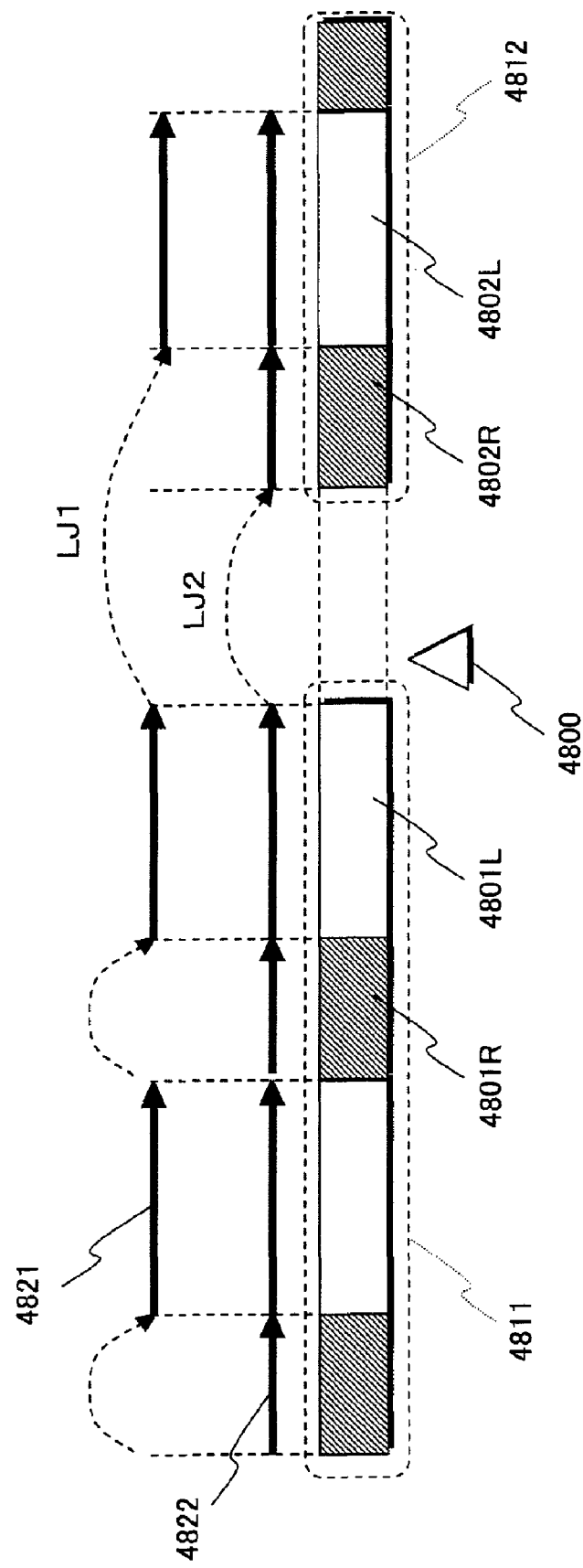
FIG. 48 is a schematic diagram showing an example of the arrangement of extents of the 2D/left-view AV stream file and the right view AV stream file when a long jump is required while the extents of the files are alternately read.

FIG. 48 is a schematic diagram showing an example of the arrangement of extents of the 2D/left-view AV stream file and the right view AV stream file when a jump is required while the extents of the files are alternately read. When the disc 101 is a multi-layer disc, it is preferable, that a series of AV stream files can be recorded over two recording layers on the disc 101. In this case, however, the area in which extents of the 2D/left-view AV stream file and the right view AV stream file are recorded in an interleaved arrangement are divided into two portions between which a layer boundary 4800 is located. "3D extent block" hereinafter denotes extents of both the AV stream files arranged in a sequential and interleaved manner. In the example shown in FIG. 48, a jump from the first 3D extent block 4811 recorded on one of the layers to the second 3D extent block 4812 recorded on the other is required while the AV stream files are read. The jump is, in particular, a long jump that requires processes for switching between the recording layers such as a focus jump. In this case, seamlessly connecting video images to be played back from the two 3D extent blocks 4811 and 4812 despite the long jump requires both the following first and second conditions to be satisfied.

The first condition is for enabling the 2D playback device to seamlessly playing back 2D video images despite the long jump LJ1 across the layer boundary 4800 when the 2D playback device is playing back the 2D video images from the extents of the 2D/left-view AV stream file included in the two 3D extent blocks 4811 and 4812 according to the playback path 4821 for 2D video images shown in FIG. 48. The first condition is that for the seamless connection explained with reference to FIG. 23, more specifically, the combination of the following two subconditions: First, the last extent 4801L of the 2D/left-view AV stream file included in the first 3D extent block 4811 needs to have a size no less than the minimum extent size calculated based on the jump distance of the long jump LJ1 to the top extent 4802L of the 2D/left-view AV stream file included in the second 3D extent block 4812. Second, the jump distance of the long jump LJ1 needs to be no greater than the maximum jump distance $S_{jump\_max}$ determined from the specification shown in FIG. 22 and the layer switching time.

The second condition is for enabling the 2D/3D playback device to seamlessly playing back 3D video images from the two 3D extent blocks 4811 and 4812 according to the playback path 4822 for 3D video images shown in FIG. 48. The second condition is specifically for avoiding an underflow of the read buffers 3902 and 3911 during the long jump LJ2 across the boundary 4822 included in the playback path 4822.

Figure 49:
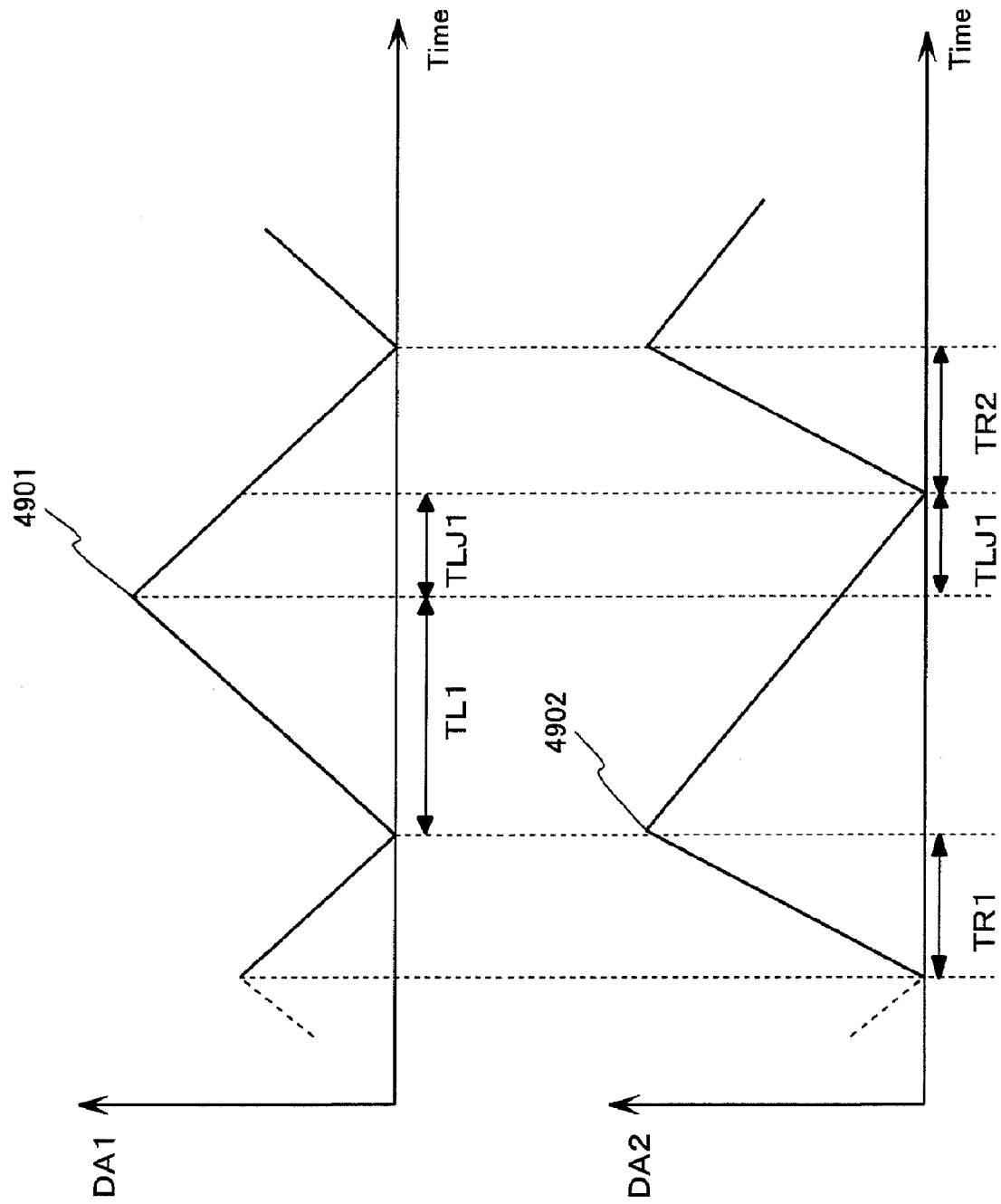
FIGS. 49A and 49B are graphs respectively showing the progressions of the data amounts DA1 and DA2 accumulated in the read buffers 3902 and 3911 in the section including the long jump LJ2 among the sections of the playback path 4822 for 3D video images.

FIGS. 49A and 49B are graphs respectively showing the progressions of the data amounts DA1 and DA2 accumulated in the read buffers 3902 and 3911 in the section including the long jump LJ2 among the sections of the playback path 4822 for 3D video images. Here, assume that the extent 4802R of the 2D/left-view AV stream file is located at the head in the second 3D extent block 4812 as shown in FIG. 48. The above-mentioned section of the playback path 4822 includes the first reading period TR1, the second reading period TL1, the jump period TLJ2, and the third reading period TR2 in this order.

In the first reading period TR1, the second last extent 4801R included in the first 3D extent block 4811 is written into the read buffer (2) 3911. Thus, the data amount DA2 accumulated in the read buffer (2) 3911 increases at the rate equal to the difference $R_{ud\_3D}-R_{ext\_R}$ between the reading rate $R_{ud\_3D}$ and the second average transfer rate $R_{ext\_R}$, as shown in FIG. 49B. As a result, at the end of the first reading period TR1, the data amount DA2 accumulated in the read buffer (2) 3911 reaches a peak 4902.

In the second reading period TL1, the last extent 4801L included in the first 3D extent block 4811 is written into the read buffer (1) 3902. Accordingly, the data amount DA1 accumulated in the read buffer (1) 3902 increases at the rate equal to the difference $R_{ud\_3D}-R_{ext\_L}$ between the reading rate $R_{ud\_3D}$ and the first average transfer rate $R_{ext\_L}$, as shown in FIG. 49A. As a result, at the end of the second reading period TL1, the data amount DA1 accumulated in the read buffer (1) 3902 reaches a peak 4901. Meanwhile, no data is written into the read buffer (2) 3911 in the second reading period TL1, and accordingly the data amount DA2 accumulated in the read buffer (2) 3911 decreases at the second reading rate $R_{ext\_R}$, as shown in FIG. 49B.

In the jump period TLJ2, no data is written into either of the read buffers 3901 and 3911. Accordingly, the data amount DA1 accumulated in the read buffer (1) 3902 decreases at the first average transfer rate $R_{ext\_L}$ and the data amount DA2 accumulated in the read buffer (2) 3911 decreases at the second reading rate $R_{ext\_R}$, as shown in FIGS. 49A and 49B, respectively.

In the third reading period TR2, the top extent 4802R included in the second 3D extent block 4812 is written into the read buffer (2) 3911. Accordingly, the data amount DA2 accumulated in the read buffer (2) 3911 increases again at the rate equal to the difference $R_{ud\_3D} - R_{ext\_R}$ between the reading rate $R_{ud\_3D}$ and the second average transfer rate $R_{ext\_R}$, as shown in FIG. 49B. Meanwhile, the data amount DA1 accumulated in the read buffer (1) 3902 continues decreasing at the first average transfer rate $R_{ext\_L}$, as shown in FIG. 49A.

The data amount DA2 accumulated in the read buffer (2) 3911 decreases at the second average transfer rate $R_{ext\_R}$ from the second reading period TL1 through the jump period TLJ2, that is, until a length of time has elapsed; the length of time is equal to the total of the length Extent_L×8/$R_{ud\_3D}$ of the second reading period TL1 and the jump time $T_{jump\_3D}$ of the jump period TLJ2. Thus, the data amount DA2 accumulated in the read buffer (2) 3911 at the peak 4902 needs to be an amount that allows the read buffer (2) 3911 to avoid an underflow from the second reading period TL1 through the Jump period TLJ2. In other words, the lower limit of the capacity RB2 of the read buffer (2) 3911 is expressed by the following equation (7) with use of the size Extent_L_End of the last extent 4801L included in the first 3D extent block 4811:

$$RB2 \geq CEIL\left(\frac{1}{8} \times \left(\frac{Extent\_L\_End \times 8}{R_{ud\_3D}} + T_{jump\_3D}\right) \times R_{max\_R}\right). \quad (7)$$

In the right hand side of Eq. (7), the extent size is multiplied by "8" to convert the units thereof from bytes to bits, and the division by "8" aims to convert the units of the final result from bits to bytes. The function CEIL ( ) represents the operation to round up fractional numbers after the decimal point of the value in the parentheses.

Similarly, the data amount DA1 accumulated in the read buffer (1) 3902 at the peak 4901 needs to be an amount that allows the read buffer (1) 3902 to avoid an underflow until the length of time equal to the total of the jump time $T_{jump\_3D}$ and the length Extent_R×8/$R_{ud\_3D}$ of the third reading period TR2 has elapsed. In other words, the lower limit of the capacity RB1 of the read buffer (1) 3902 is expressed by the following equation (8) with use of the size Extent_R_Start of the top extent 4802R included in the second 3D extent block 4812:

$$RB1 \geq CEIL\left(\frac{1}{8} \times \left(\frac{Extent\_R\_Start \times 8}{R_{ud\_3D}} + T_{jump\_3D}\right) \times R_{ext\_L}\right). \quad (8)$$

<<Arrangement of Extents for Reducing Capacities of Read Buffers Under First and Second Conditions>>

The following will explain the arrangement of extents of AV stream files that satisfies both the above-described first and second conditions and enables the read buffers 3902 and 3911 to have more reduced capacities when jumps are required while the AV stream files are read. Note that the standards of optical discs specifies the relationship between jump distances and jump times based on the access speeds of optical disc drives and the likes. Regarding the first embodiment, assume that the jump performance of the BD-ROM drive 3901 of the 2D/3D playback device is within the specifications shown in FIG. 22. For convenience of explanation, further assume that the jump distance for the maximum jump time $T_{jump\_max}$, i.e., the maximum jump distance $S_{jump\_max}$ is equal to a specified value required of the 2D playback device. In particular, assume that the maximum jump time $T_{jump\_max}$ is 700 msec, and the maximum jump distance $S_{jump\_max}$ is 1/10 stroke (approximately 1.2 GB) and 40000 sectors (approximately 78.1 MB) without and with a layer boundary between extents, respectively.

Figure 50:
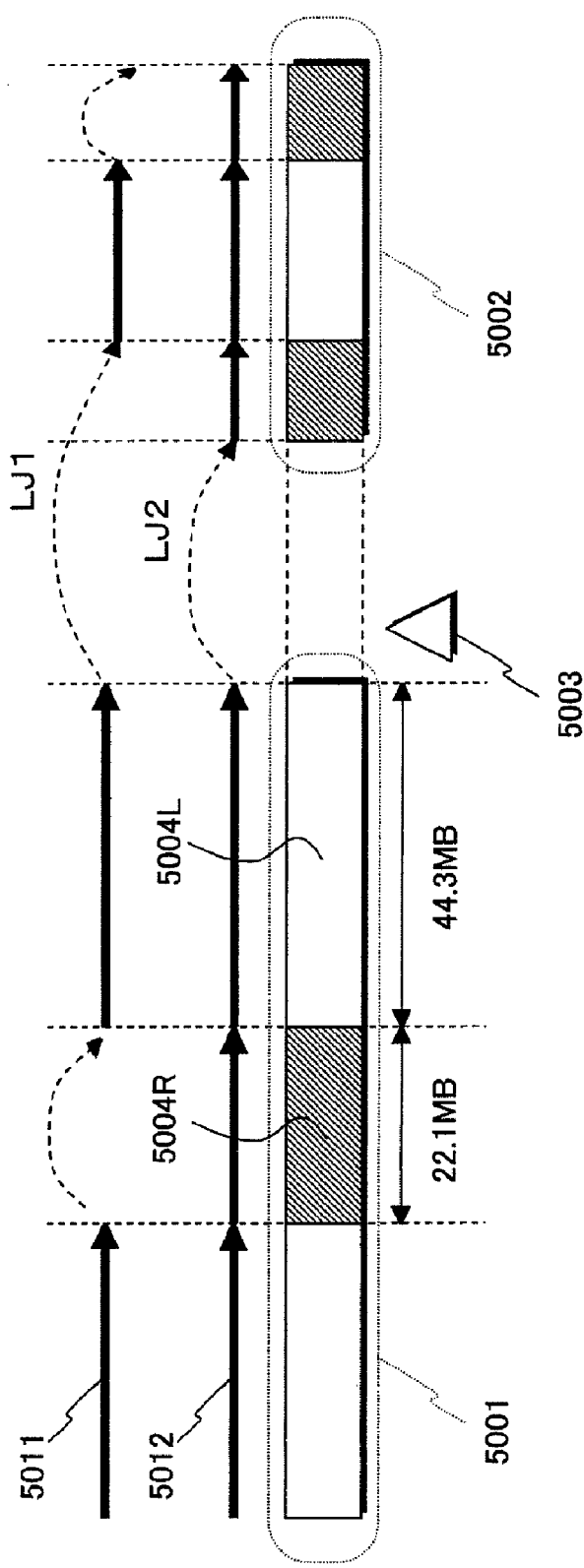
FIG. 50 is a schematic diagram showing an example of the arrangement of the extents when the BD-ROM disc 101 is a multi-layer disc and a series of AV stream files is separated on two layers.

FIG. 50 is a schematic diagram showing an example of the arrangement of the extents when the BD-ROM disc 101 is a multi-layer disc and a series of the AV stream files is separated on two layers. As shown in FIG. 50, the series of the AV stream files is divided into the first 3D extent block 5001 and the second 3D extent block 5002 between which the layer boundary 5003 is located. Thus, long jumps LJ1 and LJ2 caused by layer switching occur across the layer boundary 5003 in both a playback path for playing back 2D video images from the blocks, i.e., a 2D playback path 5011, and another playback path for playing back 3D video images from the blocks, i.e., a 3D playback path 5012. Both the long jumps LJ1 and LJ2 require relatively long jump time, e.g., 700 msec. In this case, seamlessly connecting the video images played back from the two 3D extent blocks 5001 and 5002 despite the long jumps requires both the first and second conditions described above to be satisfied. In FIG. 50, the extents of the 2D/left-view AV stream file and the right view AV stream file are arranged in an interleaved manner throughout the 3D extent blocks 5001 and 5002. In other words, both the 2D playback path 5011 and the 3D playback path 5012 pass through the entirety of the 3D extent blocks 5001 and 5002. In particular, immediately before the long jumps LJ1 and LJ2 in the 2D playback path 5011 and the 3D playback path 5012, respectively, the last extent of the first 3D extent block 5001, i.e., the extent 5004L of the 2D/left-view AV stream file is to be accessed. Thus, the extent 5004L is required to satisfy both the first and second conditions.

As a result, the size of the last extent 5004L is determined from the first condition, which is the condition for seamless 2D video playback. However, this size is generally greater than the size determined from the second condition, which is the condition for seamless 3D video playback. This means that the capacity of the read buffer (1) 3902 of the 2D/3D playback device needs to be greater than the capacity required for 3D video playback. Furthermore, when extents of left-view and right-view AV stream files contain video streams whose playback periods overlap each other, the video streams need to have the same length of playback time, as explained with reference to FIG. 35. Accordingly, the size of the extent 5004R immediately before the last extent 5004L is also generally greater than the size determined from the condition for seamless 3D video playback. For this reason, the capacity of the read buffer (2) 3911 of the 2D/3D playback device needs to be greater than the capacity required for 3D video playback as well. That is, by using the arrangement of extents shown in FIG. 50, it is difficult to further reduce the capacities of the read buffers 3902 and 3911 of the 2D/3D playback device.

This can be represented by using concrete numerical values as follows. For example, assume that the reading rate $R_{ud}$ of the BD-ROM drive 1601 in the 2D playback device is 54 Mbps; the reading rate $R_{ud\_3D}$ of the BD-ROM drive 3901 in the 2D/3D playback device is 90 Mbps; the first average transfer rate is 48 Mbps; the second average transfer rate is 24 Mbps; and the jump time of the long jump caused by layer switching, i.e., the total of the layer switching time and the jump time of a jump over 40000 sectors, is 700 msec. In this case, the size of the last extent 5004L of the first 3D extent block 5001 is determined from the Eq. (1) for seamless 2D video playback, not Eq. (8) for seamless 3D video playback. Considering the difference between bit lengths of one source packet and one TS packet, the actual value to be substituted into the first average transfer rate $R_{ext\_L}$ in the Eq. (1) is 48 Mbps×192/188. Here, 1 Mb=$10^6$ b and 1 MB=$8 \times 1024^2$ b. Thus, the size of the last extent 5004L is $(1/(8 \times 1024^2)) \times R_{ext\_L} \times 700$ msec×54 Mbps/(54 Mbps $R_{ext\_L}$)=approx. 44.3 MB. The playback time of the video stream contained in the extent 5004L is then 44.3 MB/(48 Mbps×192/188)=approx. 7.6 sec. Since the video stream contained in the extent 5004R corresponding to and located immediately before the extent 5004L needs to have the same playback time, the size of the extent 5004R is 7.6 sec×192/188=approx. 22.1 MB. The extent 5004R can be the top extent for interrupt playback. Accordingly, the capacity RB2 of the read buffer (2) 3911 of the 2D/3D playback device is required to be no less than 22.1 MB according to the Eq. (4) for avoiding an overflow of the read buffer caused by the reading of the extent 5004R. On the other hand, the capacity RB1 of the read buffer (1) 3902 of the 2D/3D playback device is required to be no less than 12.1 MB, which can be obtained by substituting the value 22.1 MB into the variable Extent_R in Eq. (5) for avoiding an underflow of the read buffer during the reading of the extent 5004R. Thus, the arrangement of extents shown in FIG. 50 causes an inevitable increase in size of the last two extents 5004R and 5004L of the first 3D extent block 5001 in order to seamlessly connect video images played back from the two 3D extents blocks 5001 and 5002. As a result, the lower limits of the capacities of the read buffers RB1 and RB2 inevitably become large values 12.1 MB and 22.1 MB, respectively.

In the 2D/3D playback device, it is preferable that the capacities of the read buffers 3902 and 3911 are reduced as much as possible. Thus, when a long jump is required, the arrangement of extents of AV stream files is designed to separate a 2D video playback path and a 3D video playback path in the area to be accessed immediately before the long jump.

Figure 51:
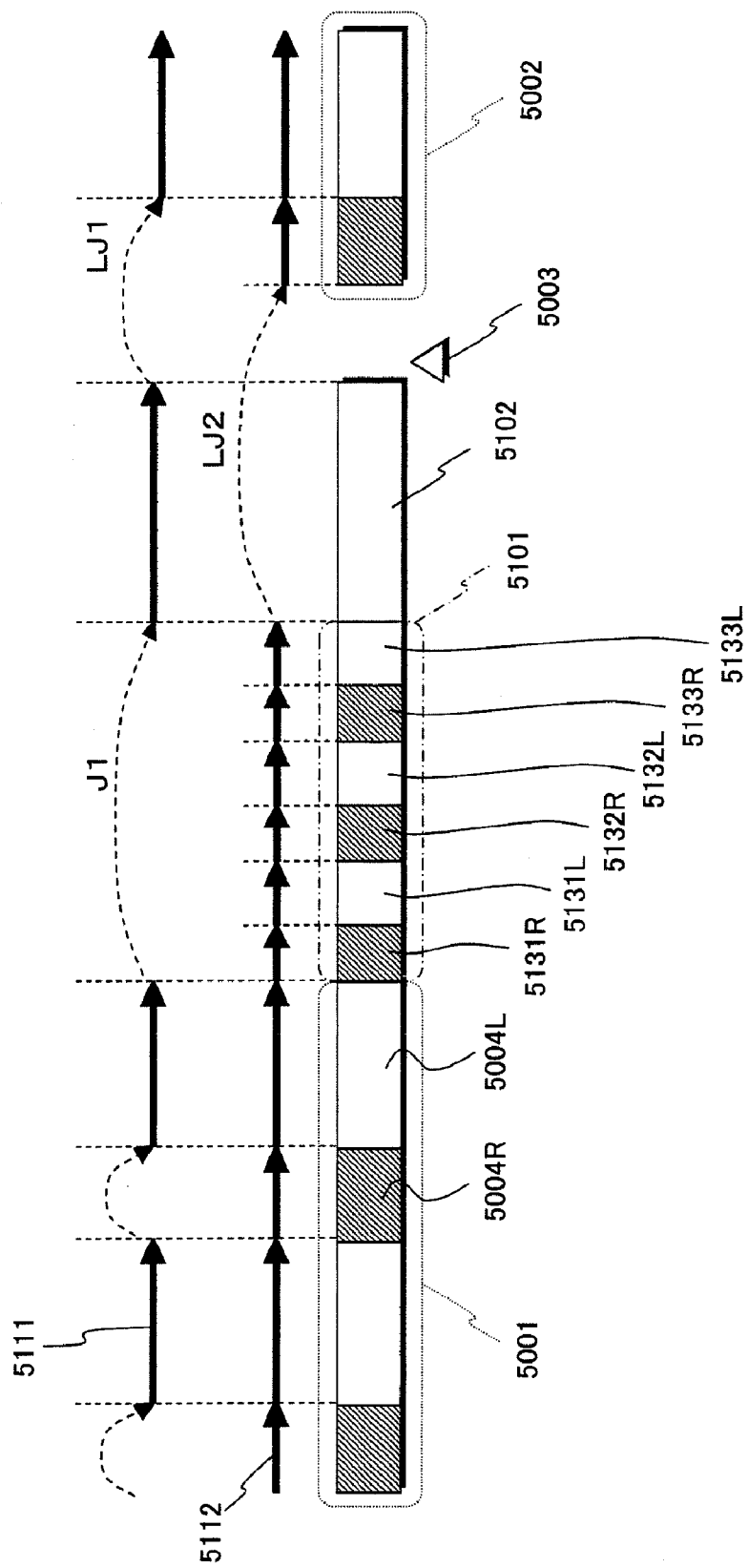
FIG. 51 is a schematic diagram showing an example of the arrangement of extents of AV stream files on which a 2D video playback path and a 3D video playback path for are separated in the area to be accessed immediately before their respective long jumps.

FIG. 51 is a schematic diagram showing an example of such an arrangement. In FIG. 51, in a manner similar to that shown in FIG. 50, a series of AV stream files are divided into the first 3D extent block 5001 and the second 3D extent block 5002 between which the layer boundary 5003 is located. In contrast to FIG. 50, however, FIG. 51 shows that a 3D seamless extent block 5101 and a 2D seamless extent 5102 are arranged in the area next to the recording area for storing the first 3D extent block 5001 and immediately before the layer boundary 5003. The 3D seamless extent block 5101 is a group of extents next in order after the extents 5004R and 5004L of the AV stream files included in the first 3D extent block 5001. In the recording area for storing the 3D seamless extent block 5101, extents 5131L, 5131R, . . . , 5133L, and 5133R belonging to either of the AV stream files are arranged in an interleaved manner similar to that in the first 3D extent block 5001. The 2D seamless extent 5102 is an extent including a contiguous sequence of copies of all the extents 5131L, 5132L, and 5133L of the 2D/left-view AV stream file included in the 3D seamless extent block 5101. In other words, the 2D seamless extent 5102 is one extent belonging to the 2D/left-view AV stream file and being next in order after the last extent 5004L included in the first 3D extent block 5001.

In the recording areas shown in FIG. 51, a 2D video playback path 5111 and a 3D video playback path 5112 are designed as follows. First, according to the 2D video playback path 5111, the extent 5004L of the 2D/left-view AV stream file included in the first 3D extent block 5001 is read, and then a jump J1 to the 2D seamless extent 5102 occurs. The jump J1 causes the playback path 5111 to skip the 3D seamless extent block 5101. In other words, the 3D seamless extent block 5101 is not accessed in the 2D video playback. Furthermore, according to the playback path 5111, a long jump LJ1 to the second 2D extent block 5002 caused by layer switching occurs immediately after the 2D seamless extent 5102 is read. On the other hand, according to the 3D video playback path 5112, the extents 5004R and 5004L are read one after another from the first 3D extent block 5001, and subsequently the extents 5131L, 5131R, . . . , 5133L, and 5133R are alternately read from the 3D seamless extent block 5201. After that, according to the playback path 5112, a long jump LJ2 to the second 3D extent block 5002 caused by layer switching occurs. The long jump LJ2 causes the playback path 5112 to skip the 2D seamless extent 5102. In other words, the 2D seamless extent 5102 is not accessed in the 3D video playback. Thus, the 2D video playback path 5111 and the 3D video playback path 5112 can be separated immediately before the respective long jumps LJ1 and LJ2 in the recording areas shown in FIG. 51.

According to the 2D video playback path 5111, the 2D playback device reads the first 3D extent block 5001 and, after the jump J1, the 2D seamless extent 5102. After the long jump LJ1, the 2D playback device reads the 3D extent block 5002. In this case, the arrangement of the 2D seamless extent 5102 needs to satisfy the conditions for seamlessly playing back 2D video images across the long jump LJ1. That is, the size of the 2D seamless extent 5102 needs to be no less than the minimum extent size calculated from the jump distance of the long jump LJ1, and the jump distance needs to be no greater than the maximum jump distance $S_{jump\_max}$. Accordingly, the size of the 2D seamless extent 5102 is comparable with the size of the last extent 5004L shown in FIG. 50. On the other hand, under the condition to seamlessly play back 2D video images across the jump J1, the size of the last extent 5004L of the first 3D extent block 5001 needs to be no less than the minimum extent size calculated from the jump distance of the jump J1. However, the jump time of the jump L1 only needs to be long enough to skip the recording area for storing the 2D seamless extent block 5101, accordingly being shorter than the jump time of the long jump LJ1 in general. For this reason, the size of the last extent 5004L is generally smaller than the size of the 2D seamless extent 5102. As a result, the jump J1 does not affect the capacity of the read buffer of the 2D playback device. Thus, the 2D playback device can seamlessly connect portions of the 2D video images with one another; the portions are sequentially played back from the first 3D extent block 5001, the 2D seamless extent 5102, and the second 3D extent block 5002.

According to the 3D video playback path 5112, the 2D/3D playback device reads the first 3D extent block 5001 and subsequently the 3D seamless extent block 5101, and after the long jump LJ2, the second 3D extent block 5002. In this case, the arrangement of the extents 5131R-5133L included in the 3D seamless extent block 5101 only needs to satisfy the conditions for seamlessly playing back 3D video images across the long jump LJ2. Accordingly, the 3D seamless extent block 5101 can include the same content as that of the 2D seamless extent 5102 in the form divided into the extents 5131L-5133L each smaller than the 2D seamless extent 5102. In addition to that, the extents 5131R-5133R can be smaller than the extent 5004R shown in FIG. 50; the extents 5131R-5133R include the right-view streams having the playback periods that overlap the playback periods of the left-view streams contained in the extents 5131L-5133L, respectively. On the other hand, the 3D video playback path 5112 passes through the last extent 5004L of the first 3D extent block 5001. However, the size of the last extent 5004L is generally smaller than the size of the 2D seamless extent 5102 as explained above. Accordingly, the size of the extent 5004R immediately before the extent 5004L is generally smaller than the size of the extent 5004R shown in FIG. 50. As a result, the 2D/3D playback device not only can seamlessly connect the portions of the 3D video images with one another, the portions sequentially played back from the first 3D extent block 5001, the 3D seamless extent 5101, and the second 3D extent block 5002, but also can reduce the capacities of the read buffers required for the seamless playback below the levels required for 3D video playback from the extents shown in FIG. 50.

This can be represented by using concrete numerical values as follows. First, assume the reading rate $R_{ud}$ of the BD-ROM drive 1601 included in the 2D playback device, the reading rate $R_{ud\_3D}$ of the BD-ROM drive 3901 included in the 2D/3D playback device, the first average transfer rate, the second average transfer rate, and the jump time of the long jump are equal to the values assumed for the arrangement shown in FIG. 50, i.e., 54 Mbps, 90 Mbps, 48 Mbps, 24 Mbps, and 700 msec, respectively. In this case, the size of the last extent 5004L of the first 3D extent block 5001 is determined from the Eq. (1) for seamless 2D video playback, in a manner similar to that in the case of FIG. 50. However, in contrast to the case of FIG. 50, the jump time to be substituted into Eq. (1) is that of the jump J1, i.e., the time required for skipping the recording area for storing the 3D seamless extent block 5101. This jump time is generally shorter than the jump time 700 msec of the long jump LJ1. Thus, the size of the last extent 5004L is generally smaller than the size of the 2D seamless extent 5102. For example, when the size of the 3D seamless extent block 5101 is no greater than 40000 sectors, the jump time is 350 msec according to the specification in FIG. 22. Accordingly, according to Eq. (1), the size of the last extent 5004L is $(1/(8 \times 1024^2)) \times R_{ext\_L} \times 350$ msec$\times 54$ Mbps/ $(54$ Mbps$-R_{ext\_L})$=approx. 22.2 MB. Here, the actual value to be substituted into the first average transfer rate $R_{ext\_L}$ in Eq. (1) is 48 Mbps$\times 192/188$. Note also that 1 Mb=$10^6$ b and 1 MB=$8 \times 1024^2$ b. On these assumptions, the playback time of the video stream contained in the extent 5004L is 22.2 MB/ (48 Mbps$\times 192/188$)=approx. 3.8 sec. Since the video stream contained in the extent 5004R corresponding to and immediately before the extent 5004L needs to be the same playback time, the size of the extent 5004R is 3.8 sec$\times 24$ Mbps$\times 192/$ 188=approx. 11.1 MB. The extent 5004R can be the top extent for interrupt playback. Accordingly, the capacity RB2 of the read buffer (2) 3911 of the 2D/3D playback device is required to be no less than 12.1 MB according to the Eq. (4) for avoiding an overflow of the read buffer caused by the reading of the extent 5004R. On the other hand, the capacity RB1 of the read buffer (1) 3902 of the 2D/3D playback device is required to be no less than approx. 6.1 MB, which can be obtained by substituting the value 22.1 MB into the variable Extent_R in Eq. (5) for avoiding an underflow of the read buffer during the reading of the extent 5004R. Note that the size of any of the extents 5131R-5133L included in the 3D seamless extent block 5101 is not required to satisfy Eq. (1), thus allowed to be reduced to the level not affecting the capacities of the read buffers 3902 and 3911. In this manner, the arrangement of extents shown in FIG. 51 enables the portions of 3D video images played back from the two 3D extent blocks 5001 and 5002 to be seamlessly connected with one another, even if the sizes of the last two extents 5004R and 5004L of the first 3D extent block 5001 are small, in contrast to the arrangement of extents shown in FIG. 50. As a result, the lower limits of the capacities RB1 and RB2 of the read buffers 3902 and 3911 can be reduced to 6.1 MB and 11.1 MB, respectively.

Figure 52:
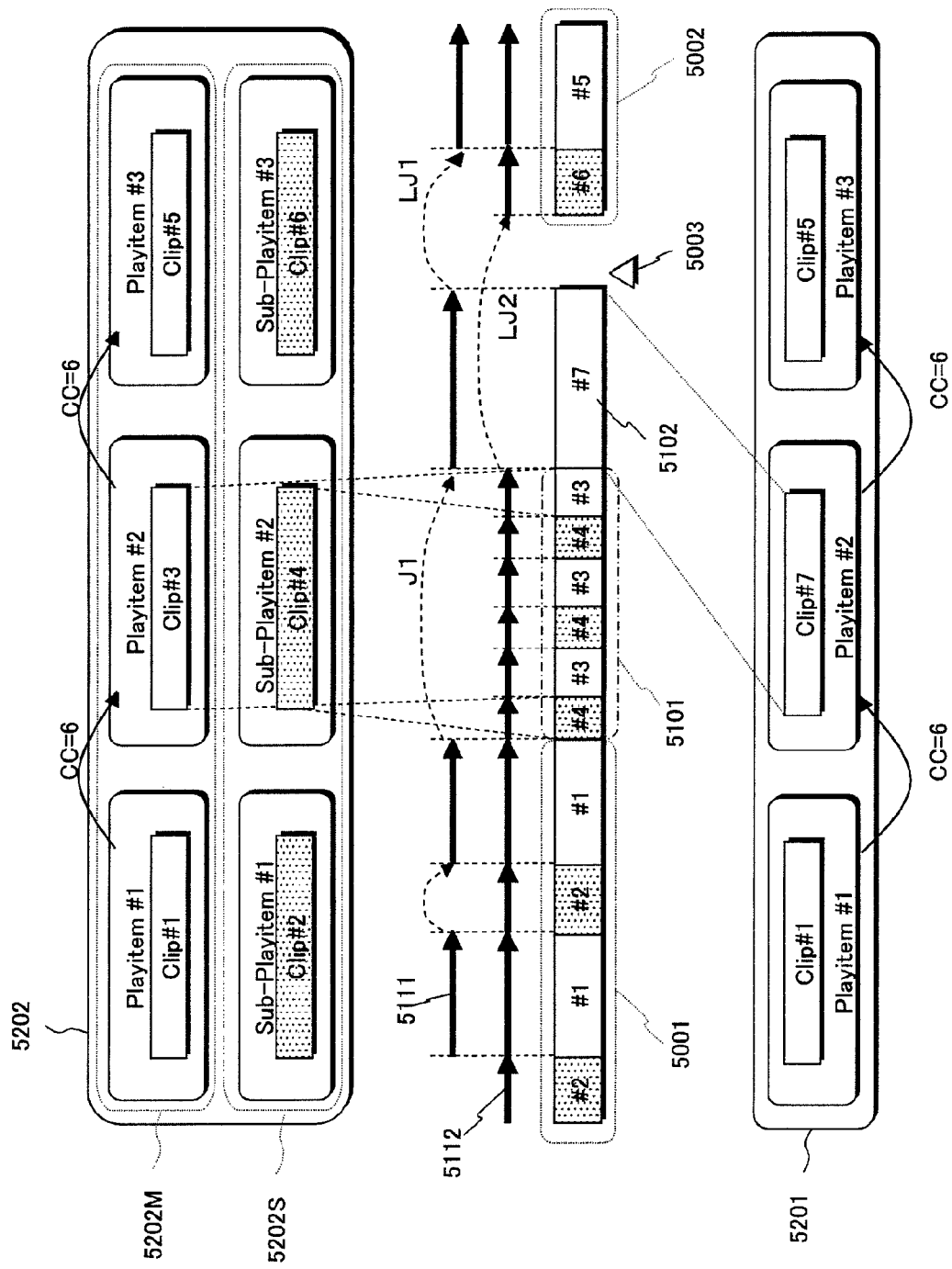
FIG. 52 is a schematic diagram showing the correspondence relationship between playlist files and AV stream files for playing back video images from the extents arranged shown in FIG. 51.

FIG. 52 is a schematic diagram showing the correspondence relationship between playlist files and AV stream files for playing back video images from the extents arranged shown in FIG. 51.

For each piece #1-#3 of playitem information included in a 2D playlist file 5201, the connection condition CC is set at "6". Here, the connection condition CC may be set at "5". These pieces #1-#3 of playitem information specify the 2D video playback path 5111 shown in FIG. 51. Concretely, the playitem information #1 specifies that the first playback section is assigned to the first 3D extent block 5001, thereby allowing video images to be played back from the extents #1 belonging to the first portion Clip#1 of the 2D/left-view AV stream file during the first playback section. The playitem information #2 specifies that the second playback section is assigned to the 2D seamless extent 5102, thereby allowing video images to be played back from the extent #7 belonging to the seventh portion Clip#7 of the 2D/left-view AV stream file, i.e., the 2D seamless extent 5102 during the second playback section. The playitem information #3 specifies that the third playback section is assigned to the second 3D extent block 5002, thereby allowing video images to be played back from the extents #5 belonging to the fifth portion Clip#5 of the 2D/left-view AV stream file during the third playback section.

For each pieces #1-#3 of playitem information included in the main path 5202M specified by a 3D playlist file 5202, the connection condition CC is set at "6". Here, the connection condition CC may be set at "5". For each piece #1-#3 of sub-playitem information included in a subpath 5202S to be played back in synchronization with the main path 5202M, the SP connection condition is set at "6" or "5". The main path 5202M and the subpath 5202S specify the 3D video playback path 5112 shown in FIG. 51. Concretely in the main path 5202M, the playitem information #1 specifies that the first playback section is assigned to the first 3D extent block 5001, thereby allowing video images to be played back from the extents #1 belonging to the first portion Clip#1 of the 2D/left-view AV stream file during the first playback section; the playitem information #2 specifies that the second playback section is assigned to the 3D seamless extent block 5101, thereby allowing video images to be played back from the extents #3 belonging to the third portion Clip#3 of the 2D/left-view AV stream file during the second playback section; and the playitem information #3 specifies that the third playback section is assigned to the second 3D extent block 5002, thereby allowing video images to be played back from the extents #5 belonging to the fifth portion Clip#5 of the 2D/left-view AV stream file during the third playback section. On the other hand, in the subpath 5202S, the sub-playitem information #1 specifies that the first playback section is assigned to the first 3D extent block 5001, thereby allowing video images to be played back from the extents #2 belonging to the second portion Clip#2 of the right-view AV stream file during the first playback section; the sub-playitem information #2 specifies that the second playback section is assigned to the 3D seamless extent block 5101, thereby allowing video images to be played back from the extents #4 belonging to the fourth portion Clip#4 of the right-view AV stream file during the second playback section; and the sub-playitem information #3 specifies that the third playback section is assigned to the second 3D extent block 5002, thereby allowing video images to be played back from the extents #6 belonging to the sixth portion Clip#6 of the right-view AV stream file during the third playback section.

The 2D playback device reads the 2D seamless extent 5102 immediately before the long jump LJ1 according to the 2D playlist file 5201, thus being able to seamlessly play back the 2D video images. On the other hand, the 2D/3D playback device reads the 3D seamless extent block 5101 immediately before the long jump LJ2 according to the 3D playlist file 5202, thus being able to seamlessly play back the 3D video images.

On the recording medium according to the first embodiment as explained above, a 3D seamless extent block and a 2D seamless extent are recorded in a recording area to be accessed immediately before a long jump. In 3D and 2D video playback, the separate recording areas for storing the 3D seamless extent block and the 2D seamless extent are accessed, respectively. In this manner, a 2D playback path and a 3D playback path are separated immediately before the respective long jumps. This allows the sizes of extents included in the 3D seamless extent block to be designed independently from the size of the 2D seamless extent. In particular, it is possible to design the sizes and the arrangement of the extents in the 3D seamless extent block so as to satisfy only the conditions for seamless 3D video playback. Independently of that, it is possible to design the size and the arrangement of the 2D seamless extent so as to satisfy only the conditions for seamless 2D video playback. As a result, it is possible to further reduce the capacities of read buffers to be secured in 3D video playback.

Second Embodiment

The recording medium according to the second embodiment differs that according to the first embodiment in an arrangement of extents in the recording areas to be accessed immediately before/after a long jump. Other features of the second embodiment such as the data structure of the recording medium and the configuration of the playback device are similar to those of the first embodiment. Accordingly, the following will describe the features of the second embodiment different from those of the first embodiment. The explanation about the features of the second embodiment similar to those of the first embodiment can be found the explanation about the first embodiment.

Figure 53:
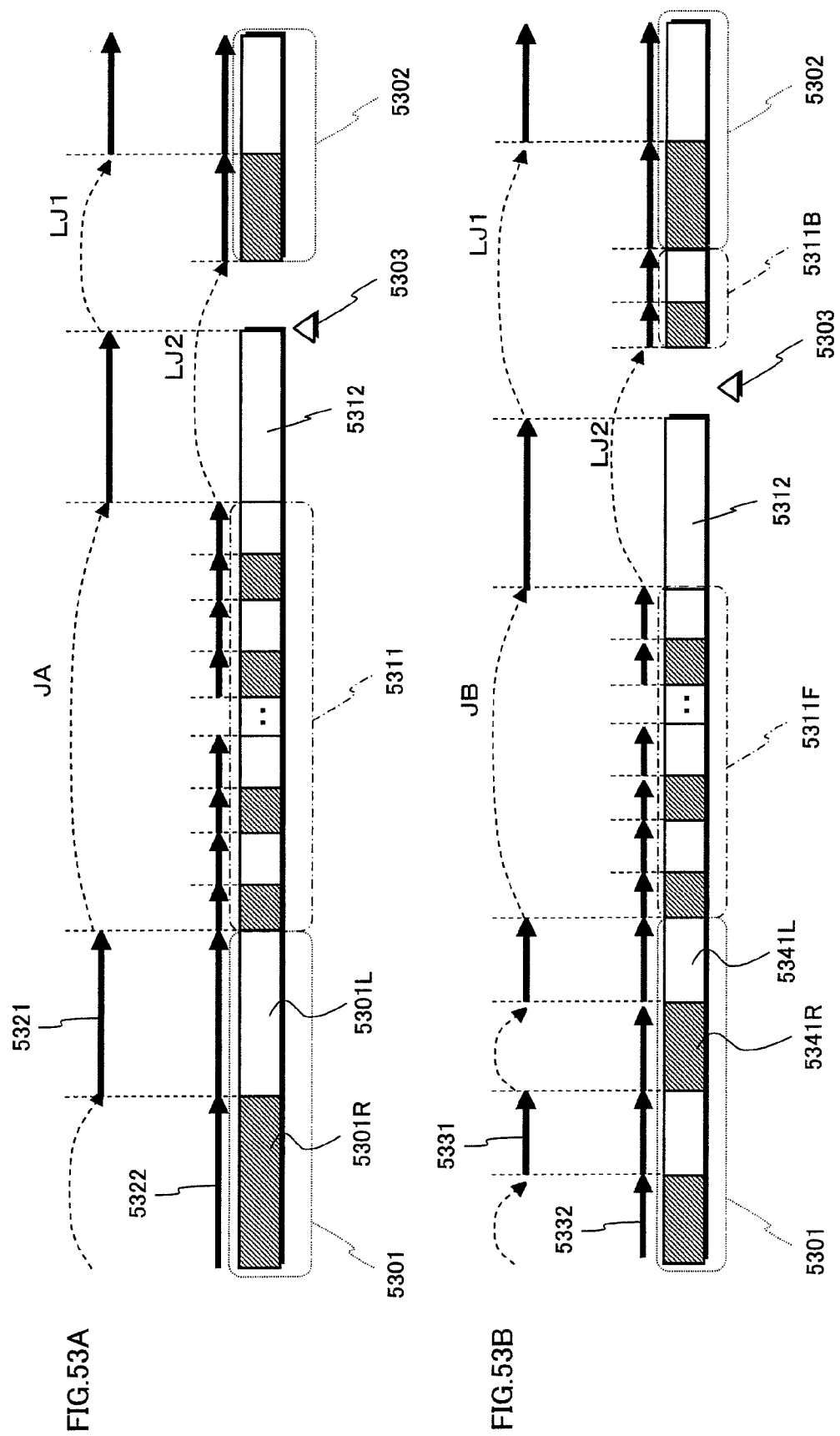
FIGS. 53A and 53B are schematic diagrams showing the arrangements of extents in the recording areas on the discs of the first and second embodiments, respectively, the recording areas being accessed before and after a long jump.

FIGS. 53A and 53B are schematic diagrams showing the arrangements of extents in the recording areas on the discs of the first and second embodiments, respectively. The recording areas are to be accessed before and after a long jump. Like FIG. 51, each of FIGS. 53A and 53B shows that a series of AV stream files is divided into a first 3D extent block 5301 and a second 3D extent block 5302 between which a layer boundary 5303 is located.

On the disc of the first embodiment as shown in FIG. 53A, a 3D seamless extent block 5311 and a 2D seamless extent 5312 are arranged in an area next to the recording area for storing the first 3D extent block 5301 and immediately before the layer boundary 5303. Here, the 2D playback device, according to a 2D video playback path 5321, reads the last extent 5301L of a 2D/left-view AV stream file included in the first 3D extent block 5301, next performs a jump JA over the recording area for storing the 3D seamless extent block 5311, and then reads the 2D seamless extent 5312. Subsequently, the 2D playback device performs a long jump LJ1 from the layer boundary 5303 to the recording area for storing the second 3D extent block 5302. On the other hand, the 2D/3D playback device, according to a 3D video playback path 5322, reads the last extent 5301L included in the first 3D extent block 5301, subsequently reads the 3D seamless extent block 5311, and then performs a long jump LJ2 from the recording area for storing the 2D seamless extent 5312 across the layer boundary 5303 to the recording area for storing the second 3D extent block 5302.

The size of the last extent 5301L is designed so that an underflow would not occur in the read buffer during the jump JA in the 2D video playback path 5321. Accordingly, if the size of the 3D seamless extent block 5311 were excessively large (e.g., larger than 40000 sectors), the jump time of the jump JA would be set at 700 msec according to the specification shown in FIG. 22. In this case, this jump time would be comparable with the jump time of the long jump LJ1, and accordingly, the last extent 5301 L would be inevitably designed to have a similar size to the 2D seamless extent 5312. Furthermore, both the 2D and 3D video playback paths 5321 and 5322 pass through the last extent 5301L, and accordingly, the extent 5301R immediately before the last extent 5301L would also be designed to have an excessively large size in a manner similar to that shown in FIG. 50. This would create a risk of preventing reduction in capacity of read buffers.

On the disc of the second embodiment, the 3D seamless extent block 5311 having a size larger than a predetermined threshold value (e.g., 40000 sectors) as shown in FIG. 53A is divided into a first 3D seamless extent block 5311F and a second 3D seamless extent block 5311B as shown in FIG. 53B. The first 3D seamless extent block 5311F is arranged in the area next to the recording area for storing the first 3D extent block 5301 and immediately before the recording area for storing the 2D seamless extent 5312. On the other hand, the second 3D seamless extent block 5311B is arranged in the area on another recording layer next to the layer boundary 5303 and immediately before the recording area for storing the second 3D extent block 5302.

The 2D playback device, according to a 2D video playback path 5331, reads the last extent 5341L included in the first 3D extent block 5301, subsequently performs a jump JB over the recording area for storing the first 3D seamless extent block 5311F, and then reads the 2D seamless extent 5312. After that, the 2D playback device performs a long jump LJ1 from the layer boundary 5303 over the recording area for storing the second 3D seamless extent block 5311B to the recording area for storing the second 3D extent block 5302. On the other hand, the 2D/3D playback device, according to a 3D video playback path 5332, reads the last extent 5341L included in the first 3D extent block 5301, subsequently reads the first 3D seamless extent block 5311F. After that, the 2D/3D playback device performs a long jump LJ2 from the recording area for storing the 2D seamless extent 5312 across the layer boundary 5303 to the recording area for storing the second 3D seamless extent block 5311B. Then, the 2D/3D playback device subsequently reads the second 3D seamless extent block 5311B and the second 3D extent block 5302.

The first 3D seamless extent block 5311F is designed so that its size would not exceed a predetermined threshold value. This can reduce the size of the last extent 5341L, and accordingly reduce the size of the extent 5341R immediately before the last extent 5341L. On the other hand, the long jump LJ1 performed in the 2D video playback path 5331 has a longer jump distance extended by the size of the second 3D seamless extent block 5311B. However, according to the specification shown in FIG. 22, such an extension of jump distance does not change the jump time of the long jump LJ1. In other words, the jump time of the long jump LJ1 remains to be 700 msec, for example. Therefore, no substantial change is required in the size of the 2D seamless extent 5312. Thus, the capacity of each read buffer can be reduced even when the overall size of the 3D seamless extent blocks 5311F and 5311B combined is excessively large.

Third Embodiment

The recording medium according to the third embodiment differs that according to the first embodiment in the arrangements of extents in the recording area (s) to be accessed immediately before a long jump. Other features of the third embodiment such as the data structure of the recording medium and the configuration of the playback device are similar to those of the first embodiment. Accordingly, the following will describe the features of the third embodiment different from those of the first embodiment. The explanation about the features of the third embodiment similar to those of the first embodiment can be found in the explanation about the first embodiment.

Figure 54:
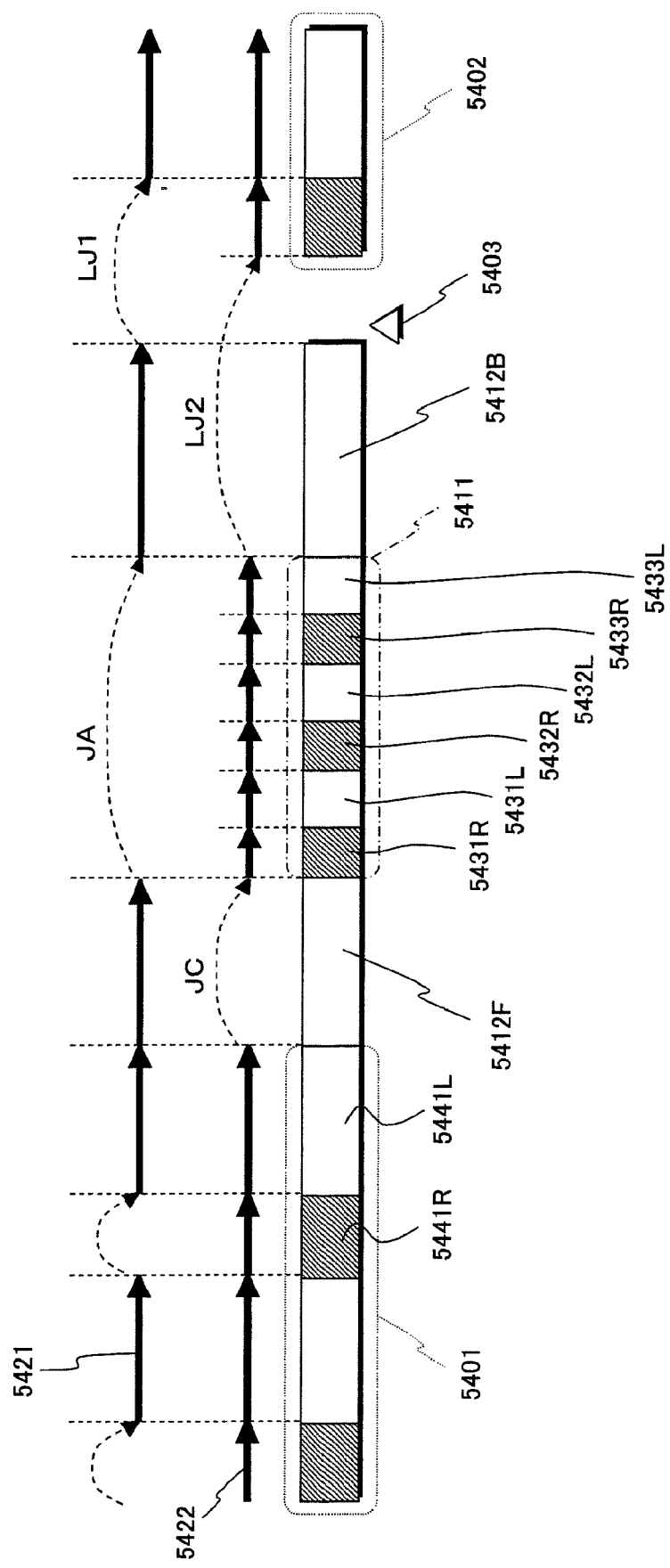
FIG. 54 is a schematic diagram showing the arrangements of extents in the recording area(s) on the disc of the third embodiment, the recording area(s) being accessed immediately before the long jump.

FIG. 54 is a schematic diagram showing the arrangements of extents in the recording area(s) on the disc of the third embodiment. The recording area (s) is to be accessed immediately before a long jump. Like FIG. 51, FIG. 54 shows that a series of AV stream files is divided into a first 3D extent block 5401 and a second 3D extent block 5402 between which a layer boundary 5403 is located.

The disc of the second embodiment is structured such that the 3D seamless extent block 5311 having a size larger than a predetermined threshold value (e.g., 40000 sectors) is divided into the first 3D seamless extent block 5311F and the second 3D seamless extent block 5311B as shown in FIG. 53B. In contrast to this, the disc of the third embodiment is structured such that another 2D seamless extent 5412F different from the original 2D seamless extent 5412B is newly added as shown in FIG. 54. The newly added 2D seamless extent 5412F and the original 2D seamless extent 5412B are hereinafter referred to as the first 2D seamless extent 5412F and the second 2D seamless extent 5412B, respectively. The first 2D seamless extent 5412F is arranged in the area next to the recording area for storing the first 3D extent block 5401 and immediately before the recording area for storing a 3D seamless extent block 5411. The first 2D seamless extent 5412F is one extent belonging to the 2D/left-view AV stream file and being next in order after the last extent 5441L included in the first 3D extent block 5401. On the other hand, the second 2D seamless extent 5412B is arranged in the area next to the recording area for storing the 3D seamless extent block 5411 and before the layer boundary 5403. The second 2D seamless extent 5412B is one extent belonging to the 2D/left-view AV stream file and being next in order after the first 2D seamless extent 5412F. In this case, a copy of the combination of the two 2D seamless extents 5412F and 5412B is divided into smaller extents 5431L-5433L that belong to the 2D/left-view AV stream file and are arranged in the 3D seamless extent block 5411.

The 2D playback device, according to a 2D video playback path 5421, reads the last extent 5441L included in the first 3D extent block 5401, and subsequently reads the first 2D seamless extent 5412F. After that, the 2D playback device performs a jump JA over the recording area for storing the 3D seamless extent block 5411, and then reads the second 2D seamless extent 5412B. Furthermore, the 2D playback device performs a long jump LJ1 from the layer boundary 5403 to the recording area for storing the second 3D extent block 5402. On the other hand, the 2D/3D playback device, according to a 3D video playback path 5422, reads the last extent 5441L included in the first 3D extent block 5401, subsequently performs a jump JC over the recording area for storing the first 2D seamless extent 5412F, and then reads the 3D seamless extent block 5411. After that, the 2D/3D playback device performs a long jump LJ2 from the recording area for storing the second 2D seamless extent 5412B across the layer boundary 5403 to the recording area for storing the second 3D extent block 5402.

In the 2D video playback path 5421, the jump JA occurs after the last extent 5441L included in the first 3D extent block 5401 and the first 2D seamless extent 5412F have been sequentially read. Hence, the size of the first 2D seamless extent 5412F should be designed such that the overall size of the extents 5441L and 5412F combined satisfies the conditions for preventing an underflow of the read buffer during the jump JA. This can reduce the size of the last extent 5441L, and thus reduce the size of the extent 5441R immediately before the last extent 5441L.

On the other hand, in the 3D video playback path 5422, the jump JC occurs over the recording area for storing the first 2D seamless extent 5412F. Accordingly, the size of the last extent 5441L needs to satisfy the conditions for preventing an underflow of each read buffer during the jump JC. However, the jump distance of the jump JC is sufficiently shorter than the jump distance of the long jump LJ2 in general. Hence, the addition of the first 2D seamless extent 5412F does not substantially affect the capacities of the read buffers in the 2D/3D playback device. Thus, the capacities of the read buffers can be reduced even when the size of the 3D seamless extent block 5311 is excessively large.

Figure 55:
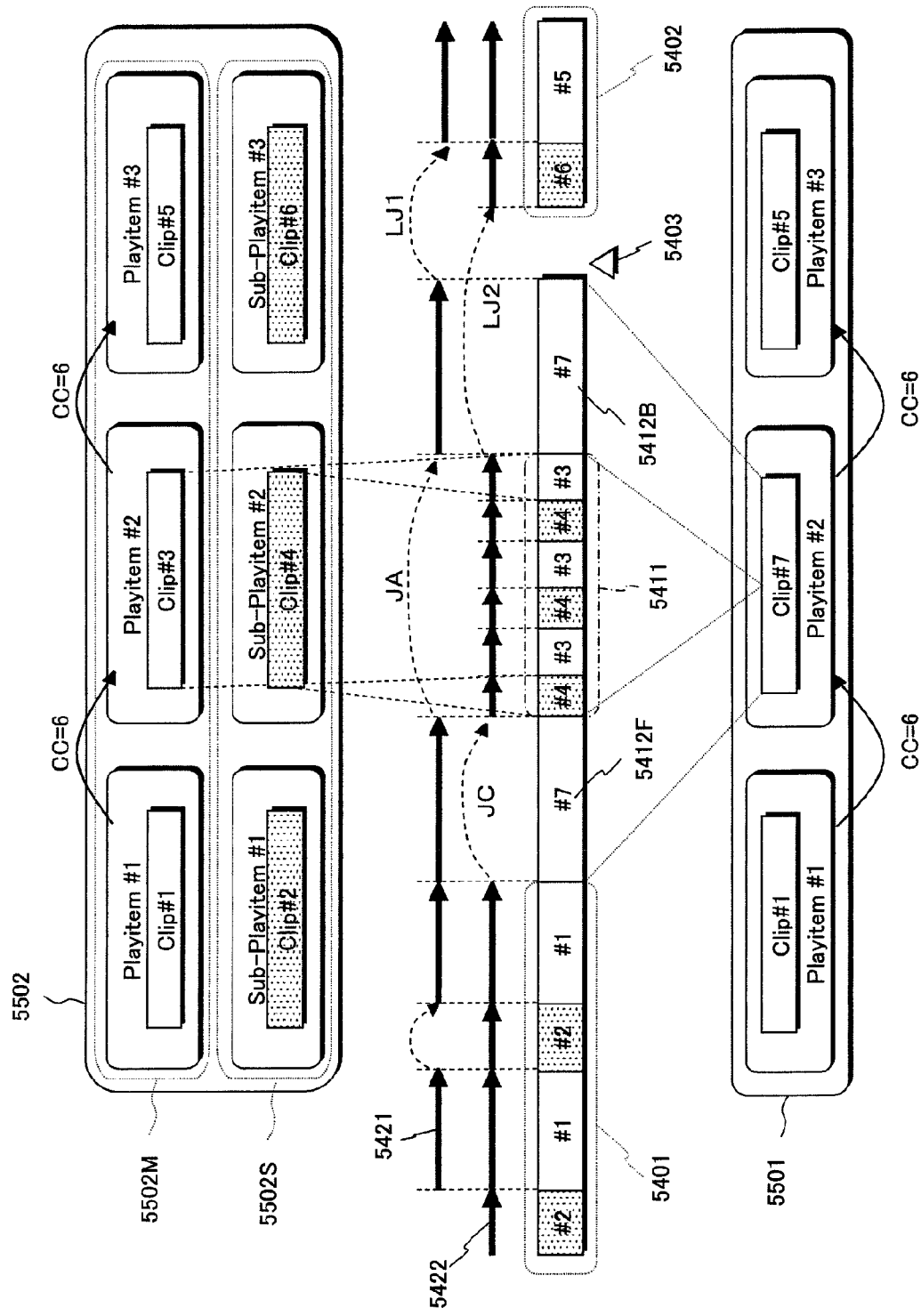
FIG. 55 is a schematic diagram showing the correspondence relationships between playlist files and AV stream files for playing back video images from the extents arranged shown in FIG. 54.

FIG. 55 is a schematic diagram showing the correspondence relationship between playlist files and AV stream files for playing back video images according to the extents arranged as shown in FIG. 54.

The connection condition CC of "6" is set to each piece #1-#3 of playitem information included in a 2D playlist file 5501. Alternatively, the connection condition CC of "5" may be set to each piece #1-#3 of the playitem information. The playitem information #1-#3 specifies the 2D video playback path 5421 shown in FIG. 54. Concretely, the playitem information #1 specifies that the first playback section is assigned to the first 3D extent block 5401, thereby allowing video images to be played back from the extents #1 belonging to the first portion Clip#1 of the 2D/left-view AV stream file during the first playback section. The playitem information #2 specifies that the second playback section is assigned to the first and second 2D seamless extents 5412F and 5412B, thereby allowing video images to be played back from the 2D seamless extents 5412F and 5412B, i.e., the extents #7 belonging to the seventh portion Clip#7 of the 2D/left-view AV stream file during the second playback section. The playitem information #3 specifies that the third playback section is assigned to the second 3D extent block 5402, thereby allowing video images to be played back from the extents #5 belonging to the fifth portion Clip#5 of the 2D/left-view AV stream file during the third playback section.

The connection condition CC of "6" is set to each piece #1-#3 of playitem information included in a main path 5502M specified by a 3D playlist file 5502. Alternatively, the connection condition CC of "5" may be set to each piece #1-#3 of the playitem information. Meanwhile, the SP connection condition of "5" or "6" is set to each piece #1-#3 of sub-playitem information included in a subpath 5502S to be played back in synchronization with the main path 5502M. The main path 5502M and the subpath 5502S define the 3D video playback path 5422 shown in FIG. 54. Concretely, the playitem information #1 in the main path 5502M specifies that the first playback section is assigned to the first 3D extent block 5401, thereby allowing video images to be played back from the extents #1 belonging to the first portion Clip#1 of the 2D/left-view AV stream file during the first playback section. The playitem information #2 specifies that the second playback section is assigned to the 3D seamless extent block 5411, thereby allowing video images to be played back from the extents #3 belonging to the third portion Clip#3 of the 2D/left-view AV stream file during the second playback section. The playitem information #3 specifies that the third playback section is assigned to the second 3D extent block 5402, thereby allowing video images to be played back from the extents #5 belonging to the fifth portion Clip#5 of the 2D/left-view AV stream file during the third playback section. Meanwhile, the sub-playitem information #1 in the subpath 5502S specifies that the first playback section is assigned to the first 3D extent block 5401, thereby allowing video images to be played back from the extents #2 belonging to the second portion Clip#2 of the right-view AV stream file during the first playback section. The sub-playitem information #2 specifies that the second playback section is assigned to the 3D seamless extent block 5411, thereby allowing video images to be played back from the extents #4 belonging to the fourth portion Clip#4 of the right-view AV stream file during the second playback section. The sub-playitem information #3 specifies that the third playback section is assigned to the second 3D extent block 5402, thereby allowing video images to be played back from the extents #6 belonging to the sixth portion Clip#6 of the right-view AV stream file during the third playback section.

In accordance with the 2D playlist file 5501, the 2D playback device reads the first 2D seamless extent 5412F immediately before the jump JA and the second 2D seamless extent 5412B immediately before the long jump LJ1. This enables the 2D playback device to seamlessly play back 2D video images. On the other hand, in accordance with the 3D playlist file 5502, the 2D/3D playback device performs the jump JC over the recording area for storing the first 2D seamless extent 5412F and then reads the 3D seamless extent block 5411 immediately before the long jump LJ2. This enables the 2D/3D playback device to seamlessly play back 3D video images.

<Notes>

The above first to third embodiments have each discussed how to arrange extents when recording a 3D video on the recording medium. However, the present invention may also be utilized when recording a high frame rate video on the recording medium. In this case, video data of the high frame rate video is divided into odd-numbered frames and even-numbered frames; the video data of the odd-numbered frames is regarded as constituting the 2D/left-view stream, while the video data of the even-numbered frames is regarded as constituting the right-view stream. This allows recording the video data of the high frame rate video on a recording medium, particularly on a BD-ROM disc, so that their extents are arranged in the same manner as the extents of the AV stream files described in the above embodiments. With such a BD-ROM disc on which the high frame rate video is thus recorded, the 2D playback device can play back a video from the odd-numbered frames, while the 2D/3D playback device can selectively perform one of (i) playing back a video from the odd-numbered frames and (ii) playing back the entire high frame rate video. This makes it possible to ensure compatibility between a recording medium on which a high frame rate video is recorded and a 2D playback device, i.e., a playback device capable of playing back a video only at a normal frame rate.

Modification Examples

It has been described in the above embodiments that, as shown in FIGS. 31A and 31B, DTSs and PTSs allocated to the pictures of the 2D/left-view stream 3101 and the right-view stream 3102 alternate at intervals of TD along STC. Alternatively, PTSs allocated to a pair of pictures of the 2D/left-view stream and the right-view stream, which realizes one 3D video frame/field, may have the same value. This structure is suitable especially for a display device that displays a left video and a right video simultaneously.

Figure 56:
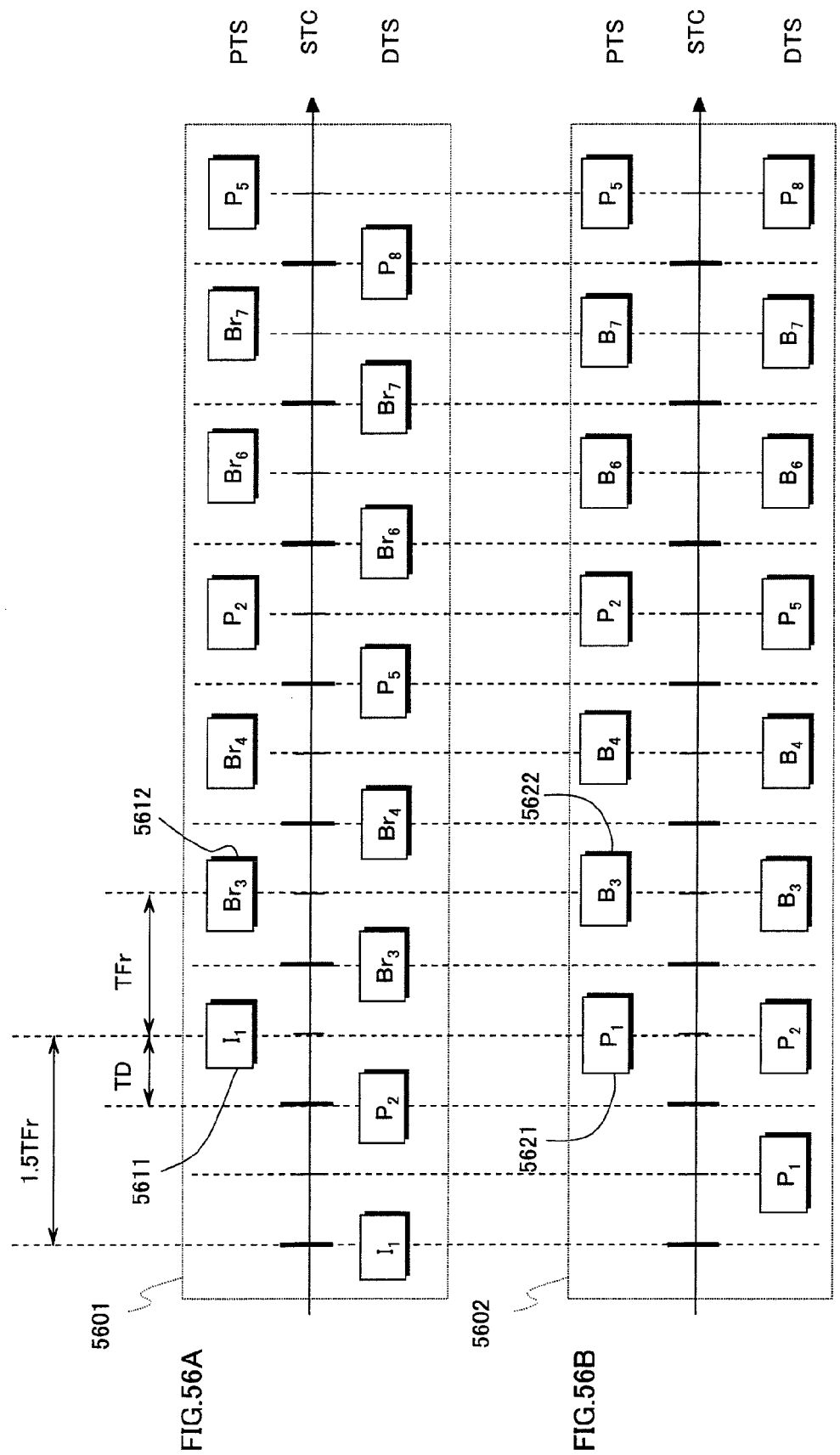
FIGS. 56A and 56B are schematic diagrams showing the relationships between DTSs and PTSs allocated to pictures of a 2D/left-view stream 5601 and a right-view stream 5602, respectively.

FIGS. 56A and 56B are schematic diagrams showing relationships between PTSs and DTSs allocated to pictures of a 2D/left-view stream 5601 and a right-view stream 5602, respectively. In FIGS. 56A and 56B, DTSs are alternately allocated to the pictures of the video streams 5601 and 5602 at intervals TD along STC, in the same manner as that shown in FIGS. 31A and 31B. Here, each interval TD is equal to a half of one frame or field period TFr. On the other hand, the same PTS is allocated to each pair of pictures of the 2D/left-view stream 5601 and the right-view stream 5602, from which one 3D video frame/field is to be reproduced. For example, a pair of left and right images is played back from the pair of the $I_1$ picture 5611 of the 2D/left-view stream 5601 and the $P_1$ picture 5621 of the right-view stream 5602. The pair of the left and right images is used for reproduce the top frame/field of 3D video images. The pictures 5611 and 5621 have the same value of PTS. Similarly, the second pictures of the video streams 5601 and 5602, i.e., the $Br_3$ picture 5612 and the $B_3$ picture 5622, have the same value of PTS. Note that the allocation of PTSs and DTSs as shown in FIGS. 56A and 56B needs the delay between the DTS and the PTS allocated to the first $I_I$ picture 5611 of the 2D/left-view stream 5601, the delay being 1.5 times as long as or longer than the length of one frame or field period TFr.

When the allocations of PTSs and DTSs are changed to those shown in FIGS. 56A and 56B, the entry map 3622 of the right-view clip information file (shown in FIG. 38A), as well as the process of superimposing pieces of plane data performed by the plane adder 3910 (shown in FIG. 40), must be changed as follows.

As shown in FIG. 38A, the entry map 3622 of the right-view clip information file 3602 stores the entry map 3801 relating to the right-view stream (PID=0x10$^{12}$). Here, PTS 3813 of each entry point 3812 included in this entry map 3801 differs from that of the above first embodiment. More specifically, PTS 3813 of each entry point 3812 has the same value as PTS allocated to a corresponding one of I pictures included in the 2D/left-view stream. That is, PTS of each entry point 3812 included in the entry map 3801 has the same value as PTS of a corresponding one of entry points included in an entry map relating to the 2D/left-view stream, which is included in the entry map 3612 of the 2D/left-view clip information file 3601.

As is the case with the above first embodiment, when an extent starts with a TS packet that includes the start of an I picture of the 2D/left-view stream, SPN of a source packet that includes this TS packet must have a corresponding entry point. On the other hand, unlike the above first embodiment, when an extent starts with a TS packet that includes the start of a P picture of the right-view stream whose PTS has the same value as PTS of an I picture of the 2D/left-view stream, SPN of a source packet that includes this TS packet have a corresponding entry point.

Unlike the above first embodiment, in the superimposing process of FIG. 40 which is performed by the plane adder 3910, the system target decoder 3903 writes each of the 2D/left video plane data 4001 and the right video plane data 4002 to a corresponding plane memory at the same PTS time, i.e., simultaneously. First, the switch 4010 selects the 2D/left video plane data 4001 and transfers the 2D/left video plane data 4001 to the first adder 4011. Consequently, the 2D/left video plane data 4001 is composited with the secondary video plane data 4003, the PG plane data 4004, the IG plane data 4005 and the image plane data 4006. Then, when the 3D display delay TD, or half of TFr (a one-frame period), has elapsed since the transfer of the 2D/left video plane data 4001, the switch 4010 selects the right video plane data 4002 and transfers the right video plane data 4002 to the first adder 4011. Consequently, the right video plane data 4002 is composited with pieces of plane data 4003 to 4006.

Fourth Embodiment

The following describes, as the fourth embodiment of the present invention, a recording device and a recording method for recording the recording medium of the present invention.

The recording device described here is called an authoring device. The authoring device is generally located at a creation studio that creates movie contents to be distributed, and is used by authoring staff. The recording device is used as follows. First, in accordance with an operation from the authoring staff, the recording apparatus converts movie content into a digital stream compression encoded in accordance with an MPEG specification, i.e., into an AV stream file. Next, the recording device generates a scenario which is information defining how each title included in the movie content is to be played back. To be more specific, the scenario includes the above-described dynamic scenario information and static scenario information. Then, the recording device generates a volume image or an update kit for a BD-ROM disc from the aforementioned digital stream and scenario. Lastly, the recording device records the volume image on the recording medium in accordance with the arrangements of extents explained in the above first to third embodiments.

Figure 57:
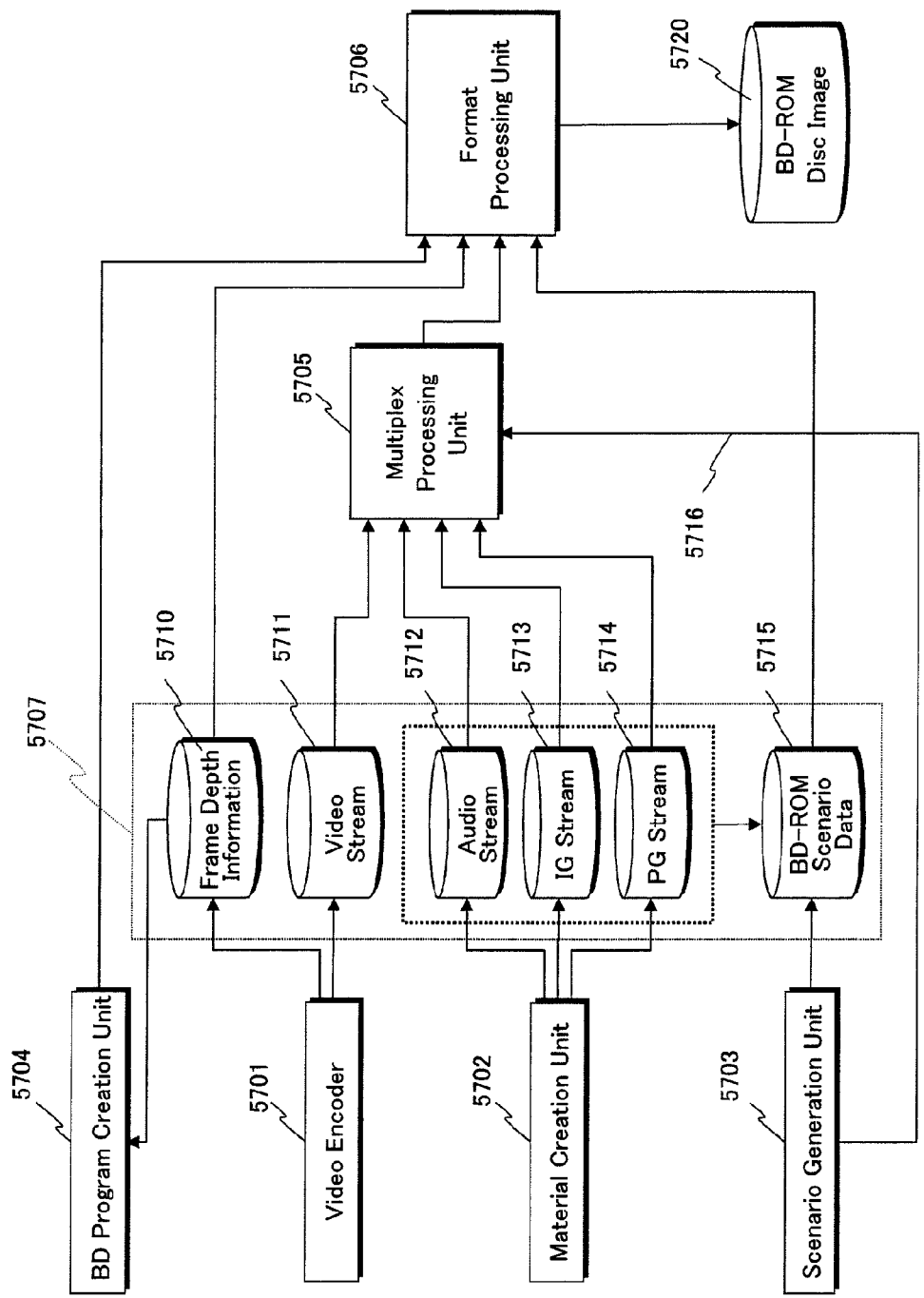
FIG. 57 is a block diagram of the internal configuration of a recording device according to the fourth embodiment.
Figure 59:
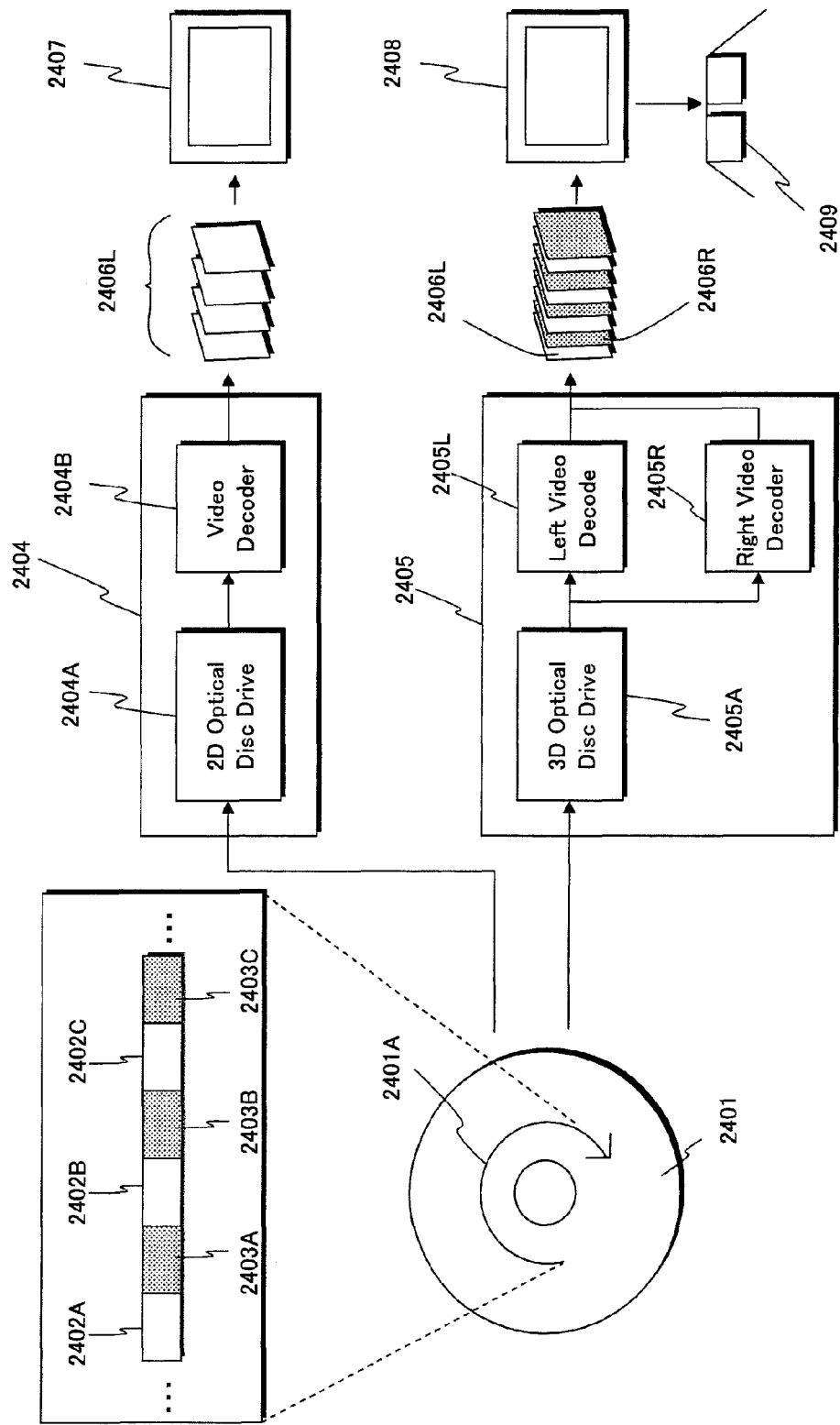
FIG. 59 is a schematic diagram illustrating the mechanism for ensuring the compatibility of an optical disc storing 3D video images with 2D playback devices.

FIG. 57 is a block diagram of an internal structure of the above-described recording device. As shown in FIG. 57, the recording device includes a video encoder 5701, a material creation unit 5702, a scenario generation unit 5703, a BD program creation unit 5704, a multiplex processing unit 5705, a format processing unit 5706, and a database unit 5707.

The database unit 5707 is a nonvolatile storage device embedded in the recording device. Specifically speaking, the database unit 5707 is a hard disk drive (HDD). Alternatively, the database unit 5707 may be an external HDD connected to the recording device, a nonvolatile semiconductor memory device embedded in the recording device, or an external nonvolatile semiconductor memory device connected to the recording device.

The video encoder 5701 receives video data, such as uncompressed bitmap data, from the authoring staff, and compresses the received video data in accordance with a compression/encoding scheme such as MPEG-4 AVC or MPEG-2. This process converts primary video data into a primary video stream, and secondary video data into a secondary video stream. Especially, 3D video data is converted into a 2D/left-view stream or a right-view stream. As shown in FIGS. 30A and 30B, the video encoder 5701 forms the 2D/left-view stream as a base-view stream by performing inter-picture predictive encoding on the pictures included in the 2D/left-view stream. On the other hand, the video encoder 5701 forms the right-view stream as a dependent-view stream by performing inter-picture predictive encoding on both of the pictures included in the 2D/left-view stream and the pictures included in the right-view stream. Alternatively, the right-view stream and the 2D/left-view stream may be formed as the base-view stream and the dependent-view stream, respectively. The converted video streams 5711 are stored into the database unit 5707.

In the above process of inter-picture predictive encoding, the video encoder 5701 further detects motion vectors between images of the left video and images of the right video, and calculates depth information of each image of the 3D video based on the detected motion vectors. Specifics of such detection and calculation are described below. The calculated depth information of each 3D image is organized into the frame depth information 5710 that is stored in the database unit 5707.

FIGS. 58A to 58C are schematic diagrams showing processing of calculating depth information from a pair of left and right pictures. When the video encoder 5701 attempts to perform picture compression using redundancy between a left picture and a right picture, the video encoder 5701 compares an uncompressed left picture and an uncompressed right picture on a per-macroblock basis (here, each macroblock contains 8×8 or 16×16 pixels, and an entirety of the macroblocks represents a matrix) so as to detect a motion vector between image data of the uncompressed left picture and image data of the uncompressed right picture. For example, as shown in FIGS. 58A and 58B, a left video picture 5801 and a right video picture 5802 are each divided into macroblocks 5803 an entirety of which represents a matrix. Then, in each of the pictures 5801 and 5802, an area occupied by image data is identified on a per-macroblock (5803) basis. After the area occupied by the image data in the picture 5801 and the area occupied by the image data in the picture 5802 are compared, a motion vector between these pieces of image data in the pictures 5801 and 5802 is detected based on the result of the comparison. For example, an area occupied by image data 5804 showing the "house" in the picture 5801 is substantially the same as that in the picture 5802. Accordingly, a motion vector is not detected from such areas in the pictures 5801 and 5802. On the other hand, an area occupied by image data 5805 showing the "circle" in the picture 5801 is substantially different from that in the picture 5802. Accordingly, a motion vector indicating the displacement between the pieces of image data 5805 showing the "circles" in the pictures 5801 and 5802 is detected from such areas in the pictures 5801 and 5802. The video encoder 5701 makes use of the detected motion vector not only when compressing the pictures 5801 and 5802, but also when calculating the binocular disparity pertaining to a 3D video constituted from the pieces of image data 5804 and 5805. Furthermore, in accordance with the binocular disparity thus obtained, the "depths" of the 3D "house" and the 3D "circle", which are respectively presented by the pieces of image data 5804 and 5805, are calculated. When a 3D video is displayed on the screen using the left and right pictures 5801 and 5802, each of the 3D "house" and the 3D "circle" looks like it has a corresponding one of the calculated depths to the viewer's eyes. As one example, information indicating the depth of a 3D image may be organized into a matrix 5806 shown in FIG. 58C, which is similar to the matrix of the picture 5801 or 5802 constituted from the macroblocks. This matrix 5806 represents the frame depth information 5710 shown in FIG. 57. In this matrix 5806 indicating the frame depth information, blocks 5807 are in one-to-one correspondence with (i) the macroblocks 5803 in the picture 5801 and (ii) the macroblocks 5803 in the picture 5802. Each block 5807 indicates the depth of a 3D image shown by pieces of image data including the corresponding macroblocks 5803 by using, for example, eight bits. For example, referring to FIG. 58C, in the matrix 5806 indicating the frame depth information, the depth of the 3D image of the "circle" shown by pieces of image data 5805 is stored into each of the blocks constituting an area 5808 that corresponds to the areas occupied by pieces of image data 5805 in the pictures 5801 and 5802.

Returning to FIG. 57, the material creation unit 5702 creates elementary streams other than video streams, such as an audio stream 5712, a PG stream 5713 and an IG stream 5714, and stores the created streams into the database unit 5707. For example, the material creation unit 5702 receives uncompressed LPCM audio data from the authoring staff, encodes the uncompressed LPCM audio data in accordance with a compression/encoding scheme such as AC-3, and converts the encoded LPCM audio data into the audio stream 5712. The material creation unit 5702 also receives a subtitle information file from the authoring staff and creates the PG stream 5713 in accordance with the subtitle information file. The subtitle information file defines image data for showing subtitles, display timings of the subtitles, and visual effects to be added to the subtitles (e.g., fade-in and fade-out). Furthermore, the material creation unit 5702 receives bitmap data and a menu file from the authoring staff and creates the IG stream 5714 in accordance with the bitmap data and the menu file. The bitmap data shows images that are to be presented on a menu. The menu file defines how each button on the menu is to be transitioned from one status to another, and visual effects to be added to each button.

The scenario generation unit 5703 creates BD-ROM scenario data 5715 in accordance with an instruction that has been issued by the authoring stuff and received via GUI, then stores the created BD-ROM scenario data 5715 into the database unit 5707. The BD-ROM scenario data 5715 described here is a file group that defines methods of playing back the elementary streams 5711 to 5714 stored in the database unit 5707. Of the file group shown in FIG. 2, the index file 2043A, the movie object file 2043B and the playlist file 2044A are included in the BD-ROM scenario data 5715. The scenario generation unit 2603 further creates a parameter file 5716 and transfers the created parameter file 5716 to the multiplex processing unit 5705. The parameter file 5716 defines, from among the elementary streams 5711 to 5714 stored in the database unit 5707, one or more streams to be multiplexed to form each AV stream file.

The BD program creation unit 5704 provides the authoring staff with a programming environment where they can program a BD-J object and Java application programs. To be more specific, the BD program creation unit 5704 receives a request from a user via GUI, and creates source code of each program according to the request. The BD program creation unit 5704 further creates the BD-J object file 2047A from the BD-J object, and organizes each Java application program in a file format according to which each Java application program should be stored in the JAR directory. Each file is transferred to the format processing unit 5706.

In a case where the BD-J object is programmed to (i) cause the program execution unit 3906 shown in FIG. 39 to transfer graphics data for GUI to the system target decoder 3909, and (ii) cause the system target decoder 3903 to process the graphics data as the image plane data 4006 shown in FIG. 40, the BD program creation unit 5704 may set offset information corresponding to the image plane data 4006 in the BD-J object by using the frame depth information 5710 stored in the database unit 5707.

In accordance with the parameter file 5716, the multiplex processing unit 5705 multiplexes each of the elementary streams 5711 to 5714 stored in the database unit 5707 to form a stream file of an MPEG-2 TS format. More specifically, as shown in FIG. 5, each of the elementary streams 5711 to 5714 is converted into a source packet series, and the source packets included in each series are assembled to construct a single stream file. In this manner, the AV streams files 2046A, 2901 and 2902 shown in FIGS. 2, 29A and 29B are created.

In parallel with the aforementioned processing, the multiplex processing unit 5705 creates the clip information files 2045A, 3601 and 3602, which respectively correspond to the AV stream files 2046A, 3631 and 3632 as shown in FIGS. 9, 36A and 36B as follows.

First, the multiplex processing unit 5705 generates the entry maps 903 and 3622 shown in FIGS. 11A and 38A. As explained in the above first to third embodiments or modification examples thereof, PTS 3813 of each entry point 3812 relating to the right-view stream, which is included in the entry map 3622 of the right-view clip information file 3602 shown in FIG. 38A, is set to either (i) the same value as PTS of a corresponding I picture included in the 2D/left-view stream, or (ii) a value obtained by adding the 3D display delay TD to this PTS of the corresponding I picture (see FIGS. 31A, 31B, 56A and 56B).

The multiplex processing unit 5705 sets SPN 3814 of the first entry point (EP_ID=0) of the entry points 3812 relating to the right-view stream at a value smaller than the SPN of the first entry point relating to the 2D/left-view stream. This allows the first extent arranged in each recording area for storing 3D video AV stream files on the BD-ROM disc 101 to be always an extent of a right-view AV stream, as shown in FIG. 46B. In addition, when the entry map of each clip information file is configured to allow interrupt playback and a pair of extents contain portions of left and right video streams that have the same playback time period, the SPN of the entry point associated with the extent containing the portion of the right video stream is set at a value smaller than the SPN associated with the extent of the left video stream.

Next, the multiplex processing unit 5608 extracts pieces of attribute information 902, 3611 and 3621 of the elementary streams to be multiplexed to form AV stream files. The multiplex processing unit 5608 further constructs each clip information file such that its entry map and stream attribute information are in correspondence with each other.

The format processing unit 5706 creates a BD-ROM disc image 5720 of the directory structure 204 shown in FIG. 2 from (i) the BD-ROM scenario data 5715 stored in the database unit 5707, (ii) a group of program files including, among others, a BD-J object file created by the BD program creation unit 5704, and (iii) AV stream files and clip information files generated by the multiplex processing unit 5705. In this directory structure 204, UDF is used as a file system.

When creating a file entry of an AV stream file, the format processing unit 5706 refers to the entry map of a corresponding clip information file. In this manner, SPN of each entry point is used for creation of allocation descriptors. Especially, allocation descriptors in a file entry of an AV stream file of a 3D video are created such that, with one of extents of the right-view stream (to be more exact, the dependent-view stream) arranged at the start of the file, the extents of the right-view stream and extents of the left-view stream alternate as shown in FIG. 46B. Accordingly, the series of allocation descriptors indicates that (i) a pair of extents of the left and right streams that share the same playback time period is arranged such that these extents are always substantially adjacent to each other, and (ii) in such a pair, the extent of the right video stream precedes the extent of the left video stream.

When creating file entries of AV stream files of a 3D video, the format processing unit 5706 further detects, from among areas of the disc that are to be allocated as recording areas for such AV stream files of a 3D video, portions in which a long jump is required (e.g., the layer boundary 4800 shown in FIG. 48 and other recording areas in which data is recorded). In this case, the format processing unit 5706 first selects, from among the allocation descriptors in the file entries of the AV stream files, allocation descriptors to be allocated to the detected portions and rewrites the selected allocation descriptors. As a result, the allocation descriptors correspond to the arrangements of the 3D seamless extent blocks and the 2D seamless extents shown in FIGS. 51, 53B and 54. The format processing unit 5706 then selects, from among the entry points included in the clip information files of the AV stream files, entry points to be allocated to the detected portions, and rewrites the selected entry points. As a result, the playback sections of the playitem information #2 and the sub-playitem information #2, which are included in the 3D playlist files 5202 and 5502, correspond to the 3D seamless extent blocks and the 2D seamless extents as shown in FIGS. 52 and 55.

In addition, by using the frame depth information 5710 stored in the database unit 5707, the format processing unit 5706 creates the 3D meta data 3613 shown in FIG. 37A for each of the secondary video stream 5711, the PG stream 5713, and the IG stream 5714. Here, the positions of image data pieces within left and right video frames are automatically adjusted so that 3D images represented by one stream avoid overlap with 3D images represented by other streams in the same visual direction. Furthermore, an offset value for each video frame is also automatically adjusted so that depths of 3D images represented by one stream avoid agreement with depths of 3D images represented by other streams.

Thereafter, the BD-ROM disc image 5702 generated by the format processing unit 5706 is converted into data suited for pressing of a BD-ROM disc, then recorded on the master to be utilized for creation of the BD-ROM disc. Mass production of the BD-ROM disc 101 pertaining to the above first to third embodiments is made possible by using the master in the press process.

<Supplementary Explanation>
<<Data Distribution Via Broadcasting or Communication Circuit>>

The recording medium according to the above first to third embodiments may be, in addition to an optical disc, a general removable medium available as a package medium, such as a portable semiconductor memory device including an SD memory card. Also, in the first to third embodiments describes the example of an optical disc in which data has been recorded beforehand, namely, a conventionally available read-only optical disc such as a BD-ROM and a DVD-ROM. However, the embodiments of the present invention are not limited to these. For example, when a terminal device writes a 3D video content that has been distributed via broadcasting or a network into a conventionally available writable optical disc such as a BD-RE and a DVD-RAM, arrangement of the extent according to the above embodiments may be used. Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to the above embodiments instead of an optical disc.

A part of the playback device that reads data from an optical disc is composed of an optical disc drive, for example. Compared with this, a part of the playback device that reads data from a semiconductor memory card is composed of an exclusive interface (I/F). In more details, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption of the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon other part of the data necessary for generating the "key", namely, an MKB (Media Key Block), and encrypted data of the "key", namely, an encrypted title key. The device key, the MKB, and the encrypted title key are associated with one another, and each are further associated with a particular identifier written into a BCA201A recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above "key", namely, the title key can be generated. Specifically, the encrypted title key is firstly decrypted using the device key, the MKB, and the volume ID. Only when the title key can be obtained as a result of the decryption, the encrypted data can be decoded using the title key as the above "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely, a title key can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and a portable semiconductor memory card such as an SD card especially.

<<Recording Data on Recording Medium through Electronic Distribution>>

The following describes processing of transmitting data such as an AV stream file for 3D video (hereinafter, "distribution data") to the playback device according to the above first to third embodiments via electronic distribution, and causing the playback device to record the distribution data on a semiconductor memory card. Note that the following operations may be performed by a specialized terminal device for performing the processing instead of the above playback device. Also, the following description is based on the assumption that the semiconductor memory card that is a recording destination is an SD memory card.

The playback device includes a card slot as described above. An SD memory card is inserted into the card slot. The playback device in this state firstly transmits a transmission request of distribution data to a distribution server on a network. Here, the playback device reads identification information of the SD memory card from the SD memory card, and transmits the read identification information to the distribution server together with the transmission request. The identification information of the SD memory card is for example an identification number specific to the SD memory card, more specifically, a serial number of the SD memory card. The identification information is used as the volume ID described above.

The distribution server has stored thereon pieces of distribution data. Distribution data that needs to be protected by encryption such as a video stream and/or an audio stream has been encrypted using a predetermined title key. Here, the encrypted distribution data can be decrypted using the same title key.

The distribution server stores thereon a device key as a private key common with the playback device. The distribution server further stores thereon an MKB common with the SD memory card. Upon receiving the transmission request of distribution data and the identification information of the SD memory card from the playback device, the distribution server firstly generates a key from the device key, the MKB, and the identification information, and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have risk of performing unauthorized playback of encrypted data included in the distribution data. In the device list, an identification number or a function (program) is identified with respect to each of the compositional elements of the playback device, such as the device key, a built-in decoder.

The distribution server transmits the distribution data and the public key information to the playback device. The playback device receives the distribution data and the public key information, and records the received distribution data and public key information in the SD memory card via the exclusive I/F of the card slot.

Encrypted distribution data recorded on the SD memory card is decrypted using the public key information in the following manner, for example. Firstly, three types of checks are performed as authentication of the public key information. These checks may be performed in any order.

(1) Check is performed on whether the identification information of the SD memory card included in the public key information matches the identification number stored in the SD memory card inserted into the card slot.

(2) Check is performed on whether a hash value calculated based on the public key information matches the hash value included in the signature information.

(3) Check is performed on whether the playback device is excluded from the device list indicated by the public key information, specifically, whether the device key of the playback device is excluded from the device list.

If at least any one of results of the checks (1) to (3) is negative, the playback device stops decryption processing of the encrypted data. Conversely, if all of the results of the checks (1) to (3) are affirmative, the playback device authorizes the public keys information, and decrypts the encrypted title key included in the public key information using the device key, the MKB, and the identification information of the SD memory card, thereby to obtain a title key. The playback device further decrypts the encrypted data using the title key, thereby to obtain a video stream and/or an audio stream for example.

The above mechanism has the following advantage. If a playback device, compositional elements, and a function (program) that have risk of being in an unauthorized manner are already known when data is transmitted via the electronic distribution, corresponding pieces of identification information are listed in the device list and are distributed as part of the public key information. On the other hand, the playback device that has requested for the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to easily realize illegal copy of the SD memory card. In other words, if the tampering allows generation of a plurality of semiconductor memory cards having the same identification information, it is impossible to identify between authorized products and unauthorized copy products by performing the above check (1). Therefore, it is necessary to record the identification information of the semiconductor memory card on a recording area high confidentiality in order to protect the identification information from being tampered with in an unauthorized manner.

The recording area high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, an application program operating on the playback device acquires data from the distribution server via the electronic distribution and records the acquired data in the semiconductor memory card, the following processing is performed. Firstly, the application program issues an access request, to the control circuit via the memory card I/F, for accessing the identification information of the semiconductor memory card recorded on the second recording area. In response to the access request, the control circuit firstly reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that the above application program desirably checks whether the application program itself has been tampered with, before issuing the access request to the control circuit of the semiconductor memory card. The check may be performed using a digital certificate compliant with the X.509 standard. Furthermore, it is only necessary to record the distribution data in the first recording area of the semiconductor memory card, as described above. The access to the distribution data may not be controlled by the control circuit of the semiconductor memory card.

<<Application to Real-Time Recording>>

The above fourth embodiment is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file in a writable recording medium such as a BD-RE disc, a BD-R disc, a hard disc, and a semiconductor memory card (hereinafter, "BD-RE disc or the like"), and provide the user with the recorded AV stream file and playlist file. In such a case, the AV stream file may be a transport stream that has been obtained as a result of real-time encoding of an analog input signal performed by a recording device. Alternatively, the AV stream file may be a transport stream obtained as a result of partialization of a digitally input transport stream performed by the recording device.

The recording device performing real-time recording includes a video encoder that encodes a video signal thereby to obtain a video stream, an audio encoder that encodes an audio signal thereby to obtain an audio stream, a multiplexer that multiplexes the video stream, the audio stream, and the like thereby to obtain a digital stream in the MPEG2-TS format, and a source packetizer that converts TS packets constituting the digital stream in the MPEG2-TS format into source packets. The recording device stores the MPEG2 digital stream that has been converted to the source packet format in the AV stream file, and writes the AV stream file into the BD-RE disc or the like.

In parallel with the processing of writing the AV stream file, a control unit of the recording device generates a clip information file and a playlist file on the memory. Specifically, when a user requests for performing recording processing, the control unit generates an AV stream file and a clip information file, and writes the generated AV stream file and clip information file into the BD-RE disc or the like. In such a case, each time a head of a GOP of a video stream is detected from a transport stream received from outside, or each time a GOP of a video stream is generated by the encoder, the control unit of the recording device acquires a PTS of an I picture positioned at a head of the GOP and an SPN of a source packet in which the head of the GOP is stored, and additionally writes a pair of the PTS and the SPN as one entry point into an entry map of the clip information file. Here, when the head of the GOP is an IDR picture, the control unit adds an "is_angle_change" flag that is set to be "ON" to the entry point. On the other hand, when the head of the GOP is not the IDR picture, the control unit adds the "is_angle_change" flag that is set to be "OFF" to the entry point. Furthermore, stream attribute information included in the clip information file is set in accordance with an attribute of a stream to be recorded. In this manner, after writing the AV stream file and the clip information file into the BD-RE disc or the BD-R disc, the control unit generates a playlist file that defines a playback path of the AV stream file using the entry map included in the clip information file, and writes the generated playlist file into the BD-RE disc or the like.

By performing the above processing in the real-time recording, it is possible to record, in the BD-RE disc or the like, a file group having the hierarchic structure that includes the AV stream file, the clip information file, and the playlist file.

<<Managed Copy>>

The playback device according to the first to third embodiments may further have a function of writing a digital stream recorded on the BD-ROM disc 101 into another recording medium by performing managed copy. Here, the managed copy is a technique for permitting copy of a digital stream, a playlist file, a clip information file, and an application program from a read-only recording medium such as a BD-ROM disc to a writable recording medium only in the case where authentication with the server via communication succeeds. Here, the writable recording medium may be a writable optical disc such as a BD-R, a BD-RE, a DVD-R, a DVD-RW, and a DVD-RAM, and a portable semiconductor memory device such as a hard disc, an SD memory card, a Memory Stick™, a Compact Flash™, a Smart Media™, and a Multimedia Card™. The managed copy allows limitation of the number of backup of data recorded on a read-only recording medium and charging of the backup.

If managed copy is performed from a BD-ROM disc to a BD-R disc or a BD-RE disc having the same recording capacity as the BD-ROM disc, the managed copy is realized by copying bit streams recorded on the BD-ROM disc in the order from the innermost track to the outermost track of the BD-ROM disc.

If managed copy is performed between different types of recording media, trans code needs to be performed. Here, the "trans code" is processing for adjusting a digital stream recorded on a BD-ROM disc that is a copy origination to an application format of a recording medium that is a copy destination. For example, the trans code includes processing of converting an MPEG2 transport stream format into an MPEG2 program stream format or the like and processing of reducing a bit rate of each of a video stream and an audio stream and re-encoding the video stream and the audio stream. By performing the trans code, an AV stream file, a clip information file, and a playlist file need to be generated in the above real-time recording.

<<How to Describe Data Structure>>

According to the first to third embodiments, the data structure includes a repeated structure "There area plurality of pieces of information having a predetermined type." that can be defined by describing an initial value of a control variable and a cyclic condition in an if sentence. Also, an arbitrary data structure "If a predetermined condition is satisfied, predetermined information is defined." can be defined by describing, in an if sentence, the condition to be satisfied and a variable to be set at the time when the condition is satisfied. In this manner, the data structure described in each of the embodiments can be described using a high level programming language. Accordingly, the data structure is converted by a computer into a computer readable code via the translation process performed by a compiler, which includes "syntax analysis", "optimization", "resource allocation", and "code generation", and the data structure converted into the readable code is recorded on the recording medium. By describing in the high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer invention.

<<Positioning of Playlist File and Clip Information File in Program>>

A program in an executable format for performing playback processing of an AV stream file in accordance with a playlist file is loaded from a recording medium to a memory device of a computer. Then, the program is executed by the computer. Here, the program is composed of a plurality of sections in the memory device. The sections include a text section, a data section, a bss section, and a stack section. The text section is composed of a code array of the program, an initial value, and unrewritable data. The data section is composed of an initial value and data that might be rewritten in execution of the program. A file accessed at any time is recorded on the data section of the recording medium. The bss section includes data having no initial value. Here, the data included in the bss section is referenced by the program included in the text section. Accordingly, an area for storing the bss section needs to be prepared in the RAM determined by performing compile processing or link processing. The stack section is a memory area temporarily given to the program as necessary. A local variable temporarily used in processing shown in each of the flowchart is recorded on the stack section. Note that when the program is initialized, an initial value is set for the bss section, and a necessary area is prepared for the stack section.

The playlist file and the clip information file are each converted into a computer readable code and recorded on a recording medium, as described above. In other words, the playlist file and the clip information file are each managed as "unrewritable data" in the above text section or "data to be recorded on a file and accessed at any time" in the above data section at a time of execution of the program. The playlist file and the clip information file described in the above first to third embodiments are each to be a compositional element of the program at a time of execution of the program. On the other hand, the playlist file and the clip information file each do not amount to just presentation of data.

<<System LSI>>

According to the above first to third embodiments, middleware, a system LSI, hardware other than the system LSI, an interface of the middleware, an interface between the middleware and the system LSI, an interface between the middleware and the hardware other than the system LSI, and a user interface. When these parts are incorporated in a playback device, these parts operate in corporation with one another. This results a particular function.

By appropriately defining the interface of the middleware and the interface between the middleware and the system LSI, it is possible to realize independent development, parallel execution, and more efficient development of the user interface, the middleware, and the system LSI of the playback device. Note that these interfaces are classified using various classification methods.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The invention claimed is:

1. A playback device for playing back video images from a recording medium, the playback device comprising:
   a reading unit operable to read a plurality of extents belonging to a base-view stream file and a dependent-view stream file extent by extent, the base-view stream file being used for monoscopic video playback, and the dependent-view stream file being used for stereoscopic video playback in combination with the base-view stream file;
   a first read buffer unit and a second read buffer unit operable to store the plurality of extents read by the reading unit; and
   a decoder unit operable to receive, from the first read buffer unit and the second read buffer unit, compressed pictures contained in the stored plurality of extents, and operable to decode the compressed pictures,
   wherein the recording medium includes a stereoscopic/monoscopic shared area, a stereoscopic specific area, and a monoscopic specific area,
   wherein the stereoscopic/monoscopic shared area is a contiguous area in which a plurality of extents belonging to the base-view stream file and a plurality of extents belonging to the dependent-view stream file are recorded in an interleaved manner, the interleaved plurality of extents recorded in the stereoscopic/monoscopic shared area being first extents,
   wherein both of the stereoscopic specific area and the monoscopic specific area are contiguous areas located one after another next to the stereoscopic/monoscopic shared area,
   wherein the stereoscopic specific area is an area in which a plurality of extents belonging to the base-view stream file and a plurality of extents belonging to the dependent-view stream file are recorded in an interleaved manner, the interleaved plurality of extents recorded in the stereoscopic specific area being second extents, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, wherein the monoscopic specific area includes a copy of an entirety of the plurality of extents belonging to the base-view stream file and recorded in the stereoscopic specific area, wherein, when a stereoscopic video is played back, the reading unit sequentially reads the first extents from the stereoscopic/monoscopic shared area and alternately transfers the read first extents to the first read buffer unit and the second read buffer unit, wherein, immediately before a long jump occurring in the stereoscopic video playback, the reading unit sequentially reads the second extents from the stereoscopic specific area and alternately transfers the read second extents to the first read buffer unit and the second read buffer unit without accessing the monoscopic specific area, wherein, when a monoscopic video is played back, the reading unit reads only the plurality of extents belonging to the base-view stream file from the stereoscopic/monoscopic shared area and transfers the read plurality of extents to the first read buffer unit, and wherein, immediately before a long jump occurring in the monoscopic video playback, the reading unit reads the copy from the monoscopic specific area and transfers the copy to the first read buffer unit without accessing the stereoscopic specific area.

2. An integrated circuit to be mounted on a playback device for playing back video images from a recording medium, the integrated circuit comprising:

a decoder unit operable to receive compressed pictures contained in a plurality of extents read from the recording medium, and then decode the compressed pictures; and a control unit operable to control a supply of the compressed pictures to the decoder unit, wherein the recording medium includes a stereoscopic/monoscopic shared area, a stereoscopic specific area, and a monoscopic specific area, wherein the stereoscopic/monoscopic shared area is a contiguous area in which a plurality of extents belonging to a base-view stream file and a plurality of extents belonging to a dependent-view stream file are recorded in an interleaved manner, the interleaved plurality of extents recorded in the stereoscopic/monoscopic shared area being first extents, the base-view stream file being used for monoscopic video playback, and the dependent-view stream file being used for stereoscopic video playback in combination with the base-view stream file, wherein both of the stereoscopic specific area and the monoscopic specific area are contiguous areas located one after another next to the stereoscopic/monoscopic shared area, wherein the stereoscopic specific area is an area in which a plurality of extents belonging to the base-view stream file and a plurality of extents belonging to the dependent-view stream file are recorded in an interleaved manner, the interleaved plurality of extents recorded in the stereoscopic specific area being second extents, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, wherein the monoscopic specific area includes a copy of an entirety of the plurality of extents belonging to the base-view stream file and recorded in the stereoscopic specific area, wherein, when a stereoscopic video is played back, the control unit controls the first extents to be sequentially read from the stereoscopic/monoscopic shared area and alternately transferred to a first read buffer unit and a second read buffer unit, wherein, immediately before a long jump occurring in the stereoscopic video playback, the control unit controls the second extents to be sequentially read from the stereoscopic specific area and alternately transferred to the first read buffer unit and the second read buffer unit without any access to the monoscopic specific area, wherein, when a monoscopic video is played back, the control unit controls only the plurality of extents belonging to the base-view stream file to be sequentially read from the stereoscopic/monoscopic shared area and transferred to the first read buffer unit, and wherein, immediately before a long jump occurring in the monoscopic video playback, the control unit controls the copy to be read from the monoscopic specific area and transferred to the first read buffer unit without any access to the stereoscopic specific area.

3. A playback device for playing back a non-transitory recording medium having a base-view stream file and a dependent-view stream file, wherein the base-view stream file is used for monoscopic video playback, wherein the dependent-view stream file is used for stereoscopic video playback in combination with the base-view stream file, wherein the non-transitory recording medium includes a stereoscopic/monoscopic shared area, a stereoscopic specific area, and a monoscopic specific area, wherein the stereoscopic/monoscopic shared area is a contiguous area to be accessed both in the stereoscopic video playback and in the monoscopic video playback, wherein the stereoscopic/monoscopic shared area is an area in which a plurality of extents belonging to the base-view stream file and a plurality of extents belonging to the dependent-view stream file are recorded in an interleaved manner, wherein both of the stereoscopic specific area and the monoscopic specific area are contiguous areas located one after another next to the stereoscopic/monoscopic shared area, wherein the stereoscopic specific area is (i) an area to be accessed immediately before a long jump occurring in the stereoscopic video playback, and (ii) an area in which a plurality of extents belonging to the base-view stream file and a plurality of extents belonging to the dependent-view stream file are recorded in an interleaved manner, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, wherein the monoscopic specific area is an area to be accessed immediately before a long jump occurring in the monoscopic video playback and includes a copy of an entirety of the plurality of extents belonging to the base-view stream file and recorded in the stereoscopic specific area, wherein the playback device comprises:
- a reading unit operable to read, from the non-transitory recording medium, (i) the plurality of extents belonging to the base-view stream file and recorded in the stereoscopic specific area, (ii) the plurality of extents belonging to the dependent-view stream file and recorded in the stereoscopic specific area, and (iii) the copy recorded in the monoscopic specific area, wherein, immediately before the long jump occurring in the stereoscopic video playback, the reading unit reads the plurality of extents belonging to the base-view stream file and recorded in the stereoscopic specific area, and the plurality of extents belonging to the dependent-view stream file and recorded in the stereoscopic specific area, without reading the copy recorded in the monoscopic specific area, and wherein, immediately before the long jump occurring in the monoscopic video playback, the reading unit reads the copy recorded in the monoscopic specific area, without reading the plurality of extents belonging to the base-view stream file and recorded in the stereoscopic specific area, and the plurality of extents belonging to the dependent-view stream file and recorded in the stereoscopic specific area.

4. A playback method for playing back a non-transitory recording medium having a base-view stream file and a dependent-view stream file, wherein the base-view stream file is used for monoscopic video playback, wherein the dependent-view stream file is used for stereoscopic video playback in combination with the base-view stream file, wherein the non-transitory recording medium includes a stereoscopic/monoscopic shared area, a stereoscopic specific area, and a monoscopic specific area, wherein the stereoscopic/monoscopic shared area is a contiguous area to be accessed both in the stereoscopic video playback and in the monoscopic video playback, wherein the stereoscopic/monoscopic shared area is an area in which a plurality of extents belonging to the base-view stream file and a plurality of extents belonging to the dependent-view stream file are recorded in an interleaved manner, wherein both of the stereoscopic specific area and the monoscopic specific area are contiguous areas located one after another next to the stereoscopic/monoscopic shared area, wherein the stereoscopic specific area is (i) an area to be accessed immediately before a long jump occurring in the stereoscopic video playback, and (ii) an area in which a plurality of extents belonging to the base-view stream file and a plurality of extents belonging to the dependent-view stream file are recorded in an interleaved manner, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, wherein the monoscopic specific area is an area to be accessed immediately before a long jump occurring in the monoscopic video playback and includes a copy of an entirety of the plurality of extents belonging to the base-view stream file and recorded in the stereoscopic specific area, wherein the playback method comprises:
- reading, from the non-transitory recording medium, (i) the plurality of extents belonging to the base-view stream file and recorded in the stereoscopic specific area, (ii) the plurality of extents belonging to the dependent-view stream file and recorded in the stereoscopic specific area, and (iii) the copy recorded in the monoscopic specific area, wherein, immediately before the long jump occurring in the stereoscopic video playback, the reading includes reading the plurality of extents belonging to the base-view stream file and recorded in the stereoscopic specific area, and the plurality of extents belonging to the dependent-view stream file and recorded in the stereoscopic specific area, without reading the copy recorded in the monoscopic specific area, and wherein, immediately before the long jump occurring in the monoscopic video playback, the reading includes reading the copy recorded in the monoscopic specific area, without reading the plurality of extents belonging to the base-view stream file and recorded in the stereoscopic specific area, and the plurality of extents belonging to the dependent-view stream file and recorded in the stereoscopic specific area.

5. A playback system comprising:
a non-transitory recording medium; and
a playback device, wherein the non-transitory recording medium has a base-view stream file and a dependent view stream file, wherein the base-view stream file is used for monoscopic video playback, wherein the dependent-view stream file is used for stereoscopic video playback in combination with the base-view stream file, wherein the non-transitory recording medium includes a stereoscopic/monoscopic shared area, a stereoscopic specific area, and a monoscopic specific area, wherein the stereoscopic/monoscopic shared area is a contiguous area to be accessed both in the stereoscopic video playback and in the monoscopic video playback, wherein the stereoscopic/monoscopic shared area is an area in which a plurality of extents belonging to the base-view stream file and a plurality of extents belonging to the dependent-view stream file are recorded in an interleaved manner, wherein both of the stereoscopic specific area and the monoscopic specific area are contiguous areas located one after another next to the stereoscopic/monoscopic shared area, wherein the stereoscopic specific area is (i) an area to be accessed immediately before a long jump occurring in the stereoscopic video playback, and (ii) an area in which a plurality of extents belonging to the base-view stream file and a plurality of extents belonging to the dependent-view stream file are recorded in an interleaved manner, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, and wherein the monoscopic specific area is an area to be accessed immediately before a long jump occurring in the monoscopic video playback and includes a copy of an entirety of the plurality of extents belonging to the base-view stream file and recorded in the stereoscopic specific area, wherein the playback device includes a reading unit operable to read, from the non-transitory recording medium, (i) the plurality of extents belonging to the base-view stream file and recorded in the stereoscopic specific area, (ii) the plurality of extents belonging to the dependent-view stream file and recorded in the stereoscopic specific area, and (iii) the copy recorded in the monoscopic specific area, wherein, immediately before the long jump occurring in the stereoscopic video playback, the reading unit reads the plurality of extents belonging to the base-view stream file and recorded in the stereoscopic specific area, and the plurality of extents belonging to the dependent-view stream file and recorded in the stereoscopic specific area, without reading the copy recorded in the monoscopic specific area, and wherein, immediately before the long jump occurring in the monoscopic video playback, the reading unit reads the copy recorded in the monoscopic specific area, without reading the plurality of extents belonging to the base-view stream file and recorded in the stereoscopic specific area, and the plurality of extents belonging to the dependent-view stream file and recorded in the stereoscopic specific area.

6. A recording method comprising:
a generation step of generating a digital stream; and
a recording step of recording the generated digital stream onto a non-transitory recording medium, wherein the digital stream includes a base-view stream file and a dependent-view stream file, wherein the base-view stream file is used for monoscopic video playback, wherein the dependent-view stream file is used for stereoscopic video playback in combination with the base-view stream file, wherein the non-transitory recording medium includes a stereoscopic/monoscopic shared area, a stereoscopic specific area, and a monoscopic specific area, wherein the stereoscopic/monoscopic shared area is a contiguous area to be accessed both in the stereoscopic video playback and in the monoscopic video playback, wherein the stereoscopic/monoscopic shared area is an area in which a plurality of extents belonging to the base-view stream file and a plurality of extents belonging to the dependent-view stream file are recorded in an interleaved manner, wherein both of the stereoscopic specific area and the monoscopic specific area are contiguous areas located one after another next to the stereoscopic/monoscopic shared area, wherein the stereoscopic specific area is (i) an area to be accessed immediately before a long jump occurring in the stereoscopic video playback, and (ii) an area in which a plurality of extents belonging to the base-view stream file and a plurality of extents belonging to the dependent-view stream file are recorded in an interleaved manner, such that the plurality of extents belonging to the base-view stream file and recorded in the stereoscopic specific area are subsequent in order after the plurality of extents belonging to the base-view stream file and recorded in the stereoscopic/monoscopic shared area, and such that the plurality of extents belonging to the dependent-view stream file and recorded in the stereoscopic specific area are subsequent in order after the plurality of extents belonging to the dependent-view stream file and recorded in the stereoscopic/monoscopic shared area, and wherein the monoscopic specific area is an area to be accessed immediately before a long jump occurring in the monoscopic video playback and includes a copy of an entirety of the plurality of extents belonging to the base-view stream file and recorded in the stereoscopic specific area.

* * * * *